US008892495B2

(12) United States Patent
Hoffberg et al.

(10) Patent No.: US 8,892,495 B2
(45) Date of Patent: Nov. 18, 2014

(54) ADAPTIVE PATTERN RECOGNITION BASED CONTROLLER APPARATUS AND METHOD AND HUMAN-INTERFACE THEREFORE

(71) Applicants: Steven M. Hoffberg, West Harrison, NY (US); Linda I. Hoffberg-Borghesani, Acton, MA (US)

(72) Inventors: Steven M. Hoffberg, West Harrison, NY (US); Linda I. Hoffberg-Borghesani, Acton, MA (US)

(73) Assignee: Blanding Hovenweep, LLC, Las Vegas, NV (US)

( * ) Notice: Subject to any disclaimer, the term of this patent is extended or adjusted under 35 U.S.C. 154(b) by 0 days.

(21) Appl. No.: 13/736,509

(22) Filed: Jan. 8, 2013

(65) Prior Publication Data

US 2013/0147598 A1 Jun. 13, 2013

Related U.S. Application Data

(60) Continuation of application No. 13/244,152, filed on Sep. 23, 2011, now Pat. No. 8,352,400, which is a
(Continued)

(51) Int. Cl.
*F24F 11/00* (2006.01)
*G06F 7/02* (2006.01)
*G06N 7/06* (2006.01)

(52) U.S. Cl.
CPC ............ *F24F 11/0034* (2013.01); *G06F 7/023* (2013.01); *G06N 7/06* (2013.01); *G05B 2219/2642* (2013.01)
USPC ........................................... 706/48; 700/276

(58) Field of Classification Search
CPC ..................... F24F 11/0034; G05B 2219/2642
USPC .................. 706/11, 12, 14, 48; 700/276–278
See application file for complete search history.

(56) References Cited

U.S. PATENT DOCUMENTS

| 312,516 A | 2/1885 | Schilling |
|---|---|---|
| 2,819,020 A | 1/1958 | Baer et al. |

(Continued)

FOREIGN PATENT DOCUMENTS

| CA | 2009171 | 8/1990 |
|---|---|---|
| CA | 1298387 | 3/1992 |

(Continued)

OTHER PUBLICATIONS

Green, Lee, "Thermo Tech: Here's a common sense guide to the new thinking thermostats", Popular Mechanics, Oct. 1985, 155-159.
(Continued)

*Primary Examiner* — Jeffrey A Gaffin
*Assistant Examiner* — Benjamin Buss
(74) *Attorney, Agent, or Firm* — Steven M. Hoffberg; Ostrolenk Faber LLP

(57) ABSTRACT

A system and method of predicting items likely to appeal to a user, based on data received from a remote site. One or more local systems are provided, along with a remote system, said local systems communicating with said remote system over a network connection. Each local system maintains a set of characterized items. A local processor predicts an appeal of an item to a user based on the comparison with the set of characterized items with, e.g., user preferences. The user may interact through graphical user interface. At least one user-preference predictive algorithm may be employed to present items predicted to appeal to the user.

27 Claims, 19 Drawing Sheets

Related U.S. Application Data division of application No. 10/389,865, filed on Mar. 14, 2003, now Pat. No. 8,032,477, which is a continuation-in-part of application No. 09/304,536, filed on May 4, 1999, now Pat. No. 6,418,424, and a continuation-in-part of application No. 10/162,079, filed on Jun. 3, 2002, now Pat. No. 6,640,145, and a continuation-in-part of application No. 09/497,071, filed on Feb. 2, 2000, and a continuation of application No. 10/189,832, filed on Jul. 3, 2002, now abandoned, which is a continuation of application No. 09/241,135, filed on Feb. 1, 1999, now Pat. No. 6,400,996, application No. 10/389,865, which is a continuation-in-part of application No. 09/260,802, filed on Mar. 2, 1999, now Pat. No. 7,242,988, and a continuation-in-part of application No. 09/680,049, filed on Oct. 5, 2000, now Pat. No. 6,850,252, application No. 10/162,079, which is a continuation of application No. 09/241,135, filed on Feb. 1, 1999, now Pat. No. 6,400,996.

(60) Provisional application No. 60/157,829, filed on Oct. 5, 1999.

(56) References Cited

U.S. PATENT DOCUMENTS

| | | | |
|---|---|---|---|
| 2,918,846 | A | 12/1959 | Poter |
| 2,956,114 | A | 10/1960 | Ginsburg et al. |
| 3,310,111 | A | 3/1967 | Pavlich et al. |
| 3,325,810 | A | 6/1967 | Frank et al. |
| 3,419,156 | A | 12/1968 | Mork |
| 3,567,115 | A * | 3/1971 | Nelson ............ 236/1 B |
| 3,609,684 | A | 9/1971 | Lipp |
| 3,621,263 | A | 11/1971 | Gilson et al. |
| 3,745,462 | A | 7/1973 | Trimble |
| 3,769,710 | A | 11/1973 | Reister |
| 3,771,483 | A | 11/1973 | Bond |
| 3,772,688 | A | 11/1973 | Smit et al. |
| 3,774,215 | A | 11/1973 | Reed |
| 3,793,635 | A | 2/1974 | Potter |
| 3,796,433 | A | 3/1974 | Fraley et al. |
| 3,828,306 | A | 8/1974 | Angeloni |
| 3,848,193 | A | 11/1974 | Martin et al. |
| 3,848,254 | A | 11/1974 | Drebinger et al. |
| 3,849,760 | A | 11/1974 | Endou et al. |
| 3,899,687 | A | 8/1975 | Jones |
| 3,914,692 | A | 10/1975 | Seaborn, Jr. |
| 3,917,317 | A | 11/1975 | Ryan |
| 3,922,673 | A | 11/1975 | Bishop |
| 3,928,719 | A | 12/1975 | Sasabe et al. |
| 3,950,733 | A | 4/1976 | Cooper et al. |
| 3,953,669 | A | 4/1976 | Saccomani et al. |
| 3,967,241 | A | 6/1976 | Kawa |
| 3,980,948 | A | 9/1976 | Olive |
| 3,984,638 | A | 10/1976 | Carrouge |
| 3,986,119 | A | 10/1976 | Hemmer, Jr. et al. |
| 3,987,398 | A | 10/1976 | Fung |
| 3,993,955 | A | 11/1976 | Belcher et al. |
| 3,993,976 | A | 11/1976 | Ginsburg |
| 4,002,983 | A | 1/1977 | Kavalir et al. |
| 4,008,376 | A | 2/1977 | Flanagan et al. |
| 4,010,619 | A | 3/1977 | Hightower et al. |
| 4,013,994 | A | 3/1977 | Ragano et al. |
| 4,024,382 | A | 5/1977 | Fowler |
| 4,024,401 | A | 5/1977 | Bernstein et al. |
| 4,025,851 | A | 5/1977 | Haselwood et al. |
| 4,025,920 | A | 5/1977 | Reitboeck et al. |
| 4,028,662 | A | 6/1977 | Young |
| 4,035,979 | A | 7/1977 | Koreska |
| 4,044,243 | A | 8/1977 | Cooper et al. |
| 4,052,058 | A | 10/1977 | Hintz |
| 4,065,778 | A | 12/1977 | Harvey |
| 4,067,411 | A | 1/1978 | Conley et al. |
| 4,077,005 | A | 2/1978 | Bishop |
| 4,081,753 | A | 3/1978 | Miller |
| 4,084,323 | A | 4/1978 | McMurtry |
| 4,100,370 | A | 7/1978 | Suzuki et al. |
| 4,114,155 | A | 9/1978 | Raab |
| 4,114,453 | A | 9/1978 | Sandler |
| 4,117,511 | A | 9/1978 | Baer et al. |
| 4,118,730 | A | 10/1978 | Lemelson |
| 4,123,097 | A | 10/1978 | Allemann |
| 4,135,791 | A | 1/1979 | Govignon |
| 4,138,726 | A | 2/1979 | Girault et al. |
| 4,139,889 | A | 2/1979 | Ingels |
| 4,146,892 | A | 3/1979 | Overman et al. |
| 4,148,061 | A | 4/1979 | Lemelson |
| 4,152,693 | A | 5/1979 | Ashworth, Jr. |
| 4,155,042 | A | 5/1979 | Permut et al. |
| 4,162,377 | A | 7/1979 | Mearns |
| 4,168,499 | A | 9/1979 | Matsumura et al. |
| 4,168,576 | A | 9/1979 | McMurtry |
| 4,170,782 | A | 10/1979 | Miller |
| 4,185,265 | A | 1/1980 | Griffin et al. |
| 4,186,413 | A | 1/1980 | Mortimer |
| 4,187,492 | A | 2/1980 | Delignieres |
| 4,200,770 | A | 4/1980 | Hellman et al. |
| 4,203,076 | A | 5/1980 | Yamashita |
| 4,208,652 | A | 6/1980 | Marshall |
| 4,213,183 | A | 7/1980 | Barron et al. |
| 4,218,582 | A | 8/1980 | Hellman et al. |
| 4,221,975 | A | 9/1980 | Ledniczki et al. |
| 4,224,644 | A | 9/1980 | Lewis et al. |
| 4,225,850 | A | 9/1980 | Chang et al. |
| 4,228,421 | A | 10/1980 | Asada |
| 4,229,620 | A | 10/1980 | Schaible |
| 4,229,737 | A | 10/1980 | Heldwein et al. |
| 4,230,990 | A | 10/1980 | Lert, Jr. et al. |
| 4,235,441 | A | 11/1980 | Ciccarello |
| 4,237,987 | A | 12/1980 | Sherman |
| 4,239,415 | A | 12/1980 | Blikken |
| 4,240,079 | A | 12/1980 | Zhilin |
| 4,244,043 | A | 1/1981 | Fujita et al. |
| 4,244,123 | A | 1/1981 | Lazure et al. |
| 4,245,245 | A | 1/1981 | Matsumoto et al. |
| 4,254,474 | A | 3/1981 | Cooper et al. |
| 4,264,924 | A | 4/1981 | Freeman |
| 4,264,925 | A | 4/1981 | Freeman et al. |
| 4,271,532 | A | 6/1981 | Wine |
| 4,280,148 | A | 7/1981 | Saxena |
| 4,283,709 | A | 8/1981 | Lucero et al. |
| 4,287,592 | A | 9/1981 | Paulish et al. |
| 4,288,809 | A | 9/1981 | Yabe |
| 4,298,889 | A | 11/1981 | Burianek et al. |
| 4,300,040 | A | 11/1981 | Gould et al. |
| 4,301,506 | A | 11/1981 | Turco |
| 4,303,978 | A | 12/1981 | Shaw et al. |
| 4,305,101 | A | 12/1981 | Yarbrough et al. |
| 4,305,131 | A | 12/1981 | Best |
| 4,307,446 | A | 12/1981 | Barton et al. |
| 4,311,876 | A | 1/1982 | Endo et al. |
| 4,323,921 | A | 4/1982 | Guillou |
| 4,326,259 | A | 4/1982 | Cooper et al. |
| 4,331,974 | A | 5/1982 | Cogswell et al. |
| 4,337,529 | A | 6/1982 | Morokawa |
| 4,338,492 | A | 7/1982 | Snopko |
| 4,338,626 | A | 7/1982 | Lemelson |
| 4,338,644 | A | 7/1982 | Staar |
| 4,339,798 | A | 7/1982 | Hedges et al. |
| 4,345,315 | A | 8/1982 | Cadotte et al. |
| 4,346,407 | A | 8/1982 | Baer et al. |
| 4,347,498 | A | 8/1982 | Lee et al. |
| 4,349,701 | A | 9/1982 | Snopko |
| 4,349,823 | A | 9/1982 | Tagami et al. |
| 4,350,970 | A | 9/1982 | von Tomkewitsch |
| 4,355,415 | A | 10/1982 | George et al. |
| 4,355,806 | A | 10/1982 | Buck et al. |
| 4,356,509 | A | 10/1982 | Skerlos et al. |
| 4,358,824 | A | 11/1982 | Glickman et al. |
| 4,359,733 | A | 11/1982 | O'Neill |
| 4,363,108 | A | 12/1982 | Lange et al. |
| 4,367,453 | A | 1/1983 | Kuno et al. |

(56) References Cited

U.S. PATENT DOCUMENTS

| | | |
|---|---|---|
| 4,367,559 A | 1/1983 | Tults |
| 4,369,426 A | 1/1983 | Merkel |
| 4,375,651 A | 3/1983 | Templin et al. |
| 4,377,729 A | 3/1983 | Stacy |
| 4,381,522 A | 4/1983 | Lambert |
| 4,384,293 A | 5/1983 | Deem et al. |
| 4,390,901 A | 6/1983 | Keiser |
| 4,390,904 A | 6/1983 | Johnston et al. |
| 4,393,270 A | 7/1983 | van den Berg |
| 4,393,819 A | 7/1983 | Tanaka et al. |
| 4,395,780 A | 7/1983 | Gohm et al. |
| 4,399,330 A | 8/1983 | Kuenzel |
| 4,402,049 A | 8/1983 | Gray |
| 4,403,291 A | 9/1983 | Von Tomkewitsch |
| 4,405,829 A | 9/1983 | Rivest et al. |
| 4,405,946 A | 9/1983 | Knight |
| 4,406,016 A | 9/1983 | Abrams et al. |
| 4,414,005 A | 11/1983 | De Bievre et al. |
| 4,414,432 A | 11/1983 | Skerlos et al. |
| 4,417,246 A | 11/1983 | Agnor et al. |
| 4,420,769 A | 12/1983 | Novak |
| 4,422,105 A | 12/1983 | Rodesch et al. |
| 4,422,202 A | 12/1983 | Malvasio |
| 4,422,802 A | 12/1983 | Choate |
| 4,424,414 A | 1/1984 | Hellman et al. |
| 4,424,415 A | 1/1984 | Lin |
| 4,425,579 A | 1/1984 | Merrell |
| 4,426,937 A | 1/1984 | Sietmann et al. |
| 4,427,847 A | 1/1984 | Hofmann et al. |
| 4,428,057 A | 1/1984 | Setliff et al. |
| 4,429,385 A | 1/1984 | Cichelli et al. |
| 4,431,389 A | 2/1984 | Johnson |
| 4,437,151 A | 3/1984 | Hurt et al. |
| 4,438,511 A | 3/1984 | Baran |
| 4,439,788 A | 3/1984 | Frame |
| 4,441,256 A | 4/1984 | Cummings et al. |
| 4,441,526 A | 4/1984 | Taft et al. |
| 4,442,544 A | 4/1984 | Moreland et al. |
| 4,445,118 A | 4/1984 | Taylor et al. |
| 4,449,240 A | 5/1984 | Yoshida |
| 4,450,477 A | 5/1984 | Lovett |
| 4,450,531 A | 5/1984 | Kenyon et al. |
| 4,451,825 A | 5/1984 | Hall et al. |
| 4,454,529 A | 6/1984 | Philofsky et al. |
| 4,454,556 A | 6/1984 | DePuy |
| 4,455,025 A | 6/1984 | Itkis |
| 4,456,925 A | 6/1984 | Skerlos et al. |
| 4,458,920 A | 7/1984 | Ozaki |
| 4,459,657 A | 7/1984 | Murao |
| 4,459,667 A | 7/1984 | Takeuchi |
| 4,463,357 A | 7/1984 | MacDoran |
| 4,464,625 A | 8/1984 | Lienhard et al. |
| 4,465,220 A | 8/1984 | Ledlow et al. |
| 4,465,902 A | 8/1984 | Zato |
| 4,466,125 A | 8/1984 | Kanayama |
| 4,467,424 A | 8/1984 | Hedges et al. |
| 4,468,704 A | 8/1984 | Stoffel et al. |
| 4,468,930 A | 9/1984 | Johnson |
| 4,471,273 A | 9/1984 | Melocik et al. |
| 4,471,319 A | 9/1984 | Metz |
| 4,471,518 A | 9/1984 | Gold |
| 4,471,520 A | 9/1984 | Houck et al. |
| 4,472,663 A | 9/1984 | Melocik |
| 4,476,336 A | 10/1984 | Sherwin |
| 4,476,488 A | 10/1984 | Merrell |
| 4,476,584 A | 10/1984 | Dages |
| 4,479,373 A | 10/1984 | Montorfano et al. |
| 4,481,437 A | 11/1984 | Parker |
| 4,481,584 A | 11/1984 | Holland |
| 4,484,044 A | 11/1984 | Yoshigae |
| 4,485,383 A | 11/1984 | Maher |
| 4,486,832 A | 12/1984 | Haubner et al. |
| 4,488,179 A | 12/1984 | Kruger et al. |
| 4,491,694 A | 1/1985 | Harmeyer |
| 4,491,962 A | 1/1985 | Sakou et al. |
| 4,492,036 A | 1/1985 | Beckwith, Jr. |
| 4,492,170 A | 1/1985 | Solomon |
| 4,492,952 A | 1/1985 | Miller |
| 4,494,114 A | 1/1985 | Kaish |
| 4,494,121 A | 1/1985 | Walter et al. |
| 4,494,197 A | 1/1985 | Troy et al. |
| 4,495,112 A | 1/1985 | Itou et al. |
| 4,495,283 A | 1/1985 | Araki et al. |
| 4,495,654 A | 1/1985 | Deiss |
| 4,499,006 A | 2/1985 | Valone et al. |
| 4,499,009 A | 2/1985 | Yamanaka et al. |
| 4,499,022 A | 2/1985 | Battais et al. |
| 4,499,057 A | 2/1985 | Burgard et al. |
| 4,499,601 A | 2/1985 | Matthews |
| 4,501,016 A | 2/1985 | Persoon et al. |
| 4,502,313 A | 3/1985 | Phalin et al. |
| 4,504,545 A | 3/1985 | Kurita et al. |
| 4,504,546 A | 3/1985 | Sallay |
| 4,506,301 A | 3/1985 | Kingsley et al. |
| 4,508,271 A | 4/1985 | Gress |
| 4,508,845 A | 4/1985 | Dromard et al. |
| 4,508,999 A | 4/1985 | Melocik et al. |
| 4,509,986 A | 4/1985 | Hooykaas |
| 4,511,918 A | 4/1985 | Lemelson |
| 4,511,947 A | 4/1985 | Melocik et al. |
| 4,514,665 A | 4/1985 | Melocik et al. |
| 4,518,350 A | 5/1985 | Mueller et al. |
| 4,518,902 A | 5/1985 | Melocik et al. |
| 4,519,086 A | 5/1985 | Hull et al. |
| 4,519,462 A | 5/1985 | Kelley |
| 4,520,674 A | 6/1985 | Canada et al. |
| 4,521,021 A | 6/1985 | Dixon |
| 4,521,644 A | 6/1985 | Bernard, Jr. |
| 4,521,885 A | 6/1985 | Melocik et al. |
| 4,526,078 A | 7/1985 | Chadabe |
| 4,527,194 A | 7/1985 | Sirazi |
| 4,527,508 A | 7/1985 | Juve |
| 4,527,608 A | 7/1985 | Bak et al. |
| 4,528,335 A | 7/1985 | Selby et al. |
| 4,528,563 A | 7/1985 | Takeuchi |
| 4,528,643 A | 7/1985 | Freeny, Jr. |
| 4,529,410 A | 7/1985 | Khaladji et al. |
| 4,529,435 A | 7/1985 | Lavanish |
| 4,529,436 A | 7/1985 | Pasarela |
| 4,529,437 A | 7/1985 | Colle et al. |
| 4,529,919 A | 7/1985 | Melocik et al. |
| 4,531,187 A | 7/1985 | Uhland |
| 4,532,589 A | 7/1985 | Shintani et al. |
| 4,535,453 A | 8/1985 | Rhodes et al. |
| 4,535,866 A | 8/1985 | Shiga |
| 4,536,791 A | 8/1985 | Campbell et al. |
| 4,538,072 A | 8/1985 | Immler et al. |
| 4,539,642 A | 9/1985 | Mizuno et al. |
| 4,542,897 A | 9/1985 | Melton et al. |
| 4,543,577 A | 9/1985 | Tachibana et al. |
| 4,543,660 A | 9/1985 | Maeda |
| 4,543,665 A | 9/1985 | Sotelo et al. |
| 4,544,295 A | 10/1985 | Hashimoto et al. |
| 4,546,382 A | 10/1985 | McKenna et al. |
| 4,546,387 A | 10/1985 | Glaab |
| 4,546,439 A | 10/1985 | Gene Esparza |
| 4,547,438 A | 10/1985 | McArthur et al. |
| 4,547,439 A | 10/1985 | Genies |
| 4,547,778 A | 10/1985 | Hinkle et al. |
| 4,547,811 A | 10/1985 | Ochi et al. |
| 4,547,899 A | 10/1985 | Nally et al. |
| 4,548,815 A | 10/1985 | Ponsford et al. |
| 4,549,004 A | 10/1985 | von Au et al. |
| 4,549,014 A | 10/1985 | Georgiev et al. |
| 4,550,317 A | 10/1985 | Moriyama et al. |
| 4,550,663 A | 11/1985 | DeViaris |
| 4,552,456 A | 11/1985 | Endo |
| 4,553,261 A | 11/1985 | Froessl |
| 4,555,192 A | 11/1985 | Ochiai |
| 4,555,651 A | 11/1985 | Melocik et al. |
| 4,558,464 A | 12/1985 | O'Brien, Jr. |
| 4,561,907 A | 12/1985 | Raicu |
| 4,567,359 A | 1/1986 | Lockwood |
| 4,567,756 A | 2/1986 | Colborn |

(56) References Cited

U.S. PATENT DOCUMENTS

| | | |
|---|---|---|
| 4,567,757 A | 2/1986 | Melocik et al. |
| 4,570,227 A | 2/1986 | Tachi et al. |
| 4,571,131 A | 2/1986 | Date |
| 4,572,079 A | 2/1986 | Theurer |
| 4,573,072 A | 2/1986 | Freeman |
| 4,575,223 A | 3/1986 | Shimono et al. |
| 4,575,579 A | 3/1986 | Simon et al. |
| 4,575,628 A | 3/1986 | Bankart et al. |
| 4,575,679 A | 3/1986 | Chung et al. |
| 4,575,755 A | 3/1986 | Schoeneberger et al. |
| 4,575,763 A | 3/1986 | Elabd |
| 4,575,769 A | 3/1986 | Arnoldi |
| 4,578,678 A | 3/1986 | Hurd |
| 4,579,482 A | 4/1986 | Gastaldi et al. |
| 4,579,882 A | 4/1986 | Kanbe et al. |
| 4,579,906 A | 4/1986 | Zabrocki et al. |
| 4,580,742 A | 4/1986 | Moosberg et al. |
| 4,581,762 A | 4/1986 | Lapidus et al. |
| 4,581,769 A | 4/1986 | Grimsley et al. |
| 4,582,942 A | 4/1986 | Comninellis et al. |
| 4,584,412 A | 4/1986 | Aicher et al. |
| 4,584,709 A | 4/1986 | Kneisel et al. |
| 4,588,458 A | 5/1986 | Previsani |
| 4,589,423 A | 5/1986 | Turner |
| 4,591,730 A | 5/1986 | Pennoni |
| 4,591,752 A | 5/1986 | Thouret et al. |
| 4,591,823 A | 5/1986 | Horvat |
| 4,591,976 A | 5/1986 | Webber et al. |
| 4,592,004 A | 5/1986 | Bocker et al. |
| 4,592,280 A | 6/1986 | Shores |
| 4,592,282 A | 6/1986 | Niemi et al. |
| 4,593,367 A | 6/1986 | Slack et al. |
| 4,593,814 A | 6/1986 | Hagiwara et al. |
| 4,593,819 A | 6/1986 | Will |
| 4,595,560 A | 6/1986 | Buchner et al. |
| 4,595,625 A | 6/1986 | Crass et al. |
| 4,595,662 A | 6/1986 | Mochida et al. |
| 4,596,005 A | 6/1986 | Frasier |
| 4,596,010 A | 6/1986 | Beckner et al. |
| 4,596,362 A | 6/1986 | Pralle et al. |
| 4,596,988 A | 6/1986 | Wanka |
| 4,597,653 A | 7/1986 | Seely et al. |
| 4,597,772 A | 7/1986 | Coffman |
| 4,599,620 A | 7/1986 | Evans |
| 4,600,921 A | 7/1986 | Thomas |
| 4,602,279 A | 7/1986 | Freeman |
| 4,603,349 A | 7/1986 | Robbins |
| 4,603,677 A | 8/1986 | Gile et al. |
| 4,603,689 A | 8/1986 | Horner |
| 4,604,007 A | 8/1986 | Hall et al. |
| 4,605,964 A | 8/1986 | Chard |
| 4,606,815 A | 8/1986 | Gibson |
| 4,607,842 A | 8/1986 | Daoust |
| 4,607,867 A | 8/1986 | Jansen |
| 4,607,872 A | 8/1986 | Herner |
| 4,609,089 A | 9/1986 | Kobayashi et al. |
| 4,609,092 A | 9/1986 | Takai |
| 4,609,095 A | 9/1986 | Lenherr et al. |
| 4,609,098 A | 9/1986 | Morgan et al. |
| 4,609,104 A | 9/1986 | Kasper et al. |
| 4,610,025 A | 9/1986 | Blum et al. |
| 4,612,850 A | 9/1986 | Kanazashi et al. |
| 4,613,867 A | 9/1986 | Golinsky |
| 4,614,342 A | 9/1986 | Takashima |
| 4,614,452 A | 9/1986 | Wang |
| 4,614,474 A | 9/1986 | Sudo |
| 4,614,533 A | 9/1986 | Schallner et al. |
| 4,614,545 A | 9/1986 | Hess |
| 4,614,546 A | 9/1986 | Schroer et al. |
| 4,616,214 A | 10/1986 | Naito |
| 4,617,406 A | 10/1986 | Willging |
| 4,617,407 A | 10/1986 | Young et al. |
| 4,619,943 A | 10/1986 | Rao |
| 4,619,946 A | 10/1986 | Sapienza et al. |
| 4,619,976 A | 10/1986 | Morris et al. |
| 4,620,036 A | 10/1986 | Ono et al. |
| 4,620,225 A | 10/1986 | Wendland et al. |
| 4,620,235 A | 10/1986 | Watt |
| 4,620,247 A | 10/1986 | Papciak et al. |
| 4,620,253 A | 10/1986 | Garwin et al. |
| 4,620,259 A | 10/1986 | Oshizawa |
| 4,620,265 A | 10/1986 | Lerude et al. |
| 4,620,266 A | 10/1986 | Baumann et al. |
| 4,620,268 A | 10/1986 | Ferenc |
| 4,621,285 A | 11/1986 | Schilling et al. |
| 4,622,557 A | 11/1986 | Westerfield |
| 4,624,108 A | 11/1986 | Leiber |
| 4,625,080 A | 11/1986 | Scott |
| 4,625,222 A | 11/1986 | Bassetti et al. |
| 4,626,634 A | 12/1986 | Brahm et al. |
| 4,626,658 A | 12/1986 | Gray et al. |
| 4,626,670 A | 12/1986 | Miller |
| 4,626,676 A | 12/1986 | Gerardin |
| 4,626,677 A | 12/1986 | Browne |
| 4,626,678 A | 12/1986 | Morita et al. |
| 4,626,788 A | 12/1986 | Ishigaki |
| 4,626,801 A | 12/1986 | Field |
| 4,626,850 A | 12/1986 | Chey |
| 4,626,891 A | 12/1986 | Achiha |
| 4,626,929 A | 12/1986 | Ichinoi et al. |
| 4,626,933 A | 12/1986 | Bucska et al. |
| 4,626,939 A | 12/1986 | Takai et al. |
| 4,627,620 A | 12/1986 | Yang |
| 4,628,608 A | 12/1986 | Kuhlmann et al. |
| 4,630,108 A | 12/1986 | Gomersall |
| 4,630,308 A | 12/1986 | Hongo |
| 4,630,685 A | 12/1986 | Huck, Jr. et al. |
| 4,630,910 A | 12/1986 | Ross et al. |
| 4,631,542 A | 12/1986 | Grimsley |
| 4,631,735 A | 12/1986 | Qureshi |
| 4,632,058 A | 12/1986 | Dixon et al. |
| 4,632,109 A | 12/1986 | Paterson |
| 4,632,197 A | 12/1986 | Karpa |
| 4,632,198 A | 12/1986 | Uchimura |
| 4,632,199 A | 12/1986 | Ober et al. |
| 4,632,200 A | 12/1986 | Doyen et al. |
| 4,633,507 A | 12/1986 | Cannistra et al. |
| 4,633,966 A | 1/1987 | Fotheringham |
| 4,634,402 A | 1/1987 | Hazebrook |
| 4,636,848 A | 1/1987 | Yamamoto |
| 4,636,951 A | 1/1987 | Harlick |
| 4,637,182 A | 1/1987 | Ellsworth et al. |
| 4,637,540 A | 1/1987 | Fujita et al. |
| 4,638,188 A | 1/1987 | Cray |
| 4,638,445 A | 1/1987 | Mattaboni |
| 4,639,978 A | 2/1987 | Boden |
| 4,640,339 A | 2/1987 | Klaren |
| 4,641,205 A | 2/1987 | Beyers, Jr. |
| 4,642,639 A | 2/1987 | Nelson |
| 4,642,775 A | 2/1987 | Cline et al. |
| 4,644,141 A | 2/1987 | Hagen et al. |
| 4,644,351 A | 2/1987 | Zabarsky et al. |
| 4,644,368 A | 2/1987 | Mutz |
| 4,644,903 A | 2/1987 | Shaver |
| 4,644,907 A | 2/1987 | Hunter |
| 4,645,049 A | 2/1987 | Matsuda et al. |
| 4,645,458 A | 2/1987 | Williams |
| 4,645,873 A | 2/1987 | Chomet |
| 4,646,089 A | 2/1987 | Takanabe et al. |
| 4,646,096 A | 2/1987 | Brown |
| 4,646,250 A | 2/1987 | Childress |
| 4,647,784 A | 3/1987 | Stephens |
| 4,648,042 A | 3/1987 | Staiger |
| 4,649,524 A | 3/1987 | Vance |
| 4,651,157 A | 3/1987 | Gray et al. |
| 4,652,884 A | 3/1987 | Starker |
| 4,653,109 A | 3/1987 | Lemelson et al. |
| 4,654,377 A | 3/1987 | Mohring et al. |
| 4,654,867 A | 3/1987 | Labedz et al. |
| 4,654,879 A | 3/1987 | Goldman et al. |
| 4,656,179 A | 4/1987 | Bernath et al. |
| 4,656,463 A | 4/1987 | Anders et al. |
| 4,656,476 A | 4/1987 | Tavtigian |
| 4,656,665 A | 4/1987 | Pennebaker |

(56) References Cited

U.S. PATENT DOCUMENTS

| | | |
|---|---|---|
| 4,656,976 A | 4/1987 | Rhoads |
| 4,657,256 A | 4/1987 | Okada |
| 4,657,258 A | 4/1987 | Melov et al. |
| 4,657,264 A | 4/1987 | Wehber |
| 4,657,799 A | 4/1987 | Nann et al. |
| 4,658,094 A | 4/1987 | Clark |
| 4,658,298 A | 4/1987 | Takeda et al. |
| 4,658,370 A | 4/1987 | Erman et al. |
| 4,658,429 A | 4/1987 | Orita et al. |
| 4,659,970 A | 4/1987 | Melocik |
| 4,660,166 A | 4/1987 | Hopfield |
| 4,663,630 A | 5/1987 | Numaho et al. |
| 4,666,379 A | 5/1987 | Smith |
| 4,666,384 A | 5/1987 | Kaga et al. |
| 4,666,461 A | 5/1987 | Dorer, Jr. |
| 4,666,480 A | 5/1987 | Mann |
| 4,666,490 A | 5/1987 | Drake |
| 4,666,580 A | 5/1987 | Beaver et al. |
| 4,666,757 A | 5/1987 | Helinski |
| 4,667,203 A | 5/1987 | Counselman, III |
| 4,668,515 A | 5/1987 | Bankit et al. |
| 4,668,952 A | 5/1987 | Imazeki et al. |
| 4,669,185 A | 6/1987 | Westover et al. |
| 4,669,186 A | 6/1987 | Liu |
| 4,670,688 A | 6/1987 | Sigai et al. |
| 4,671,654 A | 6/1987 | Miyahara et al. |
| 4,671,772 A | 6/1987 | Slade et al. |
| 4,672,683 A | 6/1987 | Matsueda |
| 4,672,860 A | 6/1987 | Parker |
| 4,673,936 A | 6/1987 | Kotoh |
| 4,674,041 A | 6/1987 | Lemon et al. |
| 4,674,048 A | 6/1987 | Okumura |
| 4,675,755 A | 6/1987 | Baumeister et al. |
| 4,677,466 A | 6/1987 | Lert, Jr. et al. |
| 4,677,555 A | 6/1987 | Goyet |
| 4,677,563 A | 6/1987 | Itoh et al. |
| 4,677,680 A | 6/1987 | Harima et al. |
| 4,677,686 A | 6/1987 | Hustig et al. |
| 4,677,845 A | 7/1987 | Izumi et al. |
| 4,678,329 A | 7/1987 | Lukowski, Jr. et al. |
| 4,678,792 A | 7/1987 | Nickl et al. |
| 4,678,793 A | 7/1987 | Klaus et al. |
| 4,678,814 A | 7/1987 | Rembaum |
| 4,679,137 A | 7/1987 | Lane et al. |
| 4,679,147 A | 7/1987 | Tsujii et al. |
| 4,680,715 A | 7/1987 | Pawelek |
| 4,680,787 A | 7/1987 | Marry |
| 4,680,835 A | 7/1987 | Horng |
| 4,681,576 A | 7/1987 | Colon et al. |
| 4,682,365 A | 7/1987 | Orita et al. |
| 4,682,953 A | 7/1987 | Doerfel et al. |
| 4,683,860 A | 8/1987 | Shimamura et al. |
| 4,684,247 A | 8/1987 | Hammill, III |
| 4,684,331 A | 8/1987 | LaGrange et al. |
| 4,685,145 A | 8/1987 | Schiller |
| 4,685,821 A | 8/1987 | Marsh |
| 4,686,006 A | 8/1987 | Cheshire et al. |
| 4,686,009 A | 8/1987 | McCabe |
| 4,686,356 A | 8/1987 | Ueda et al. |
| 4,686,357 A | 8/1987 | Douno et al. |
| 4,686,995 A | 8/1987 | Fournial et al. |
| 4,687,732 A | 8/1987 | Ward et al. |
| 4,688,244 A | 8/1987 | Hannon et al. |
| 4,689,022 A | 8/1987 | Peers et al. |
| 4,689,867 A | 9/1987 | Tolliver |
| 4,690,610 A | 9/1987 | Fotheringham |
| 4,690,859 A | 9/1987 | Porter et al. |
| 4,691,097 A | 9/1987 | Theiss et al. |
| 4,691,104 A | 9/1987 | Murata et al. |
| 4,691,106 A | 9/1987 | Hyun et al. |
| 4,691,149 A | 9/1987 | Baumgartner et al. |
| 4,691,351 A | 9/1987 | Hayashi et al. |
| 4,691,354 A | 9/1987 | Palminteri |
| 4,691,385 A | 9/1987 | Tupman |
| 4,694,458 A | 9/1987 | Midavaine et al. |
| 4,694,463 A | 9/1987 | Hirth et al. |
| 4,694,490 A | 9/1987 | Harvey et al. |
| 4,695,175 A | 9/1987 | Tsukada et al. |
| 4,695,429 A | 9/1987 | Lupoli et al. |
| 4,695,587 A | 9/1987 | Terahara et al. |
| 4,695,953 A | 9/1987 | Blair et al. |
| 4,695,975 A | 9/1987 | Bedrij |
| 4,696,290 A | 9/1987 | Steffee |
| 4,696,291 A | 9/1987 | Tyo |
| 4,697,209 A | 9/1987 | Kiewit et al. |
| 4,697,248 A | 9/1987 | Shirota |
| 4,697,251 A | 9/1987 | Birrittella et al. |
| 4,697,256 A | 9/1987 | Shinkai |
| 4,697,281 A | 9/1987 | O'Sullivan |
| 4,697,282 A | 9/1987 | Winter et al. |
| 4,697,503 A | 10/1987 | Okabe et al. |
| 4,698,632 A | 10/1987 | Baba et al. |
| 4,699,458 A | 10/1987 | Ohtsuki et al. |
| 4,699,527 A | 10/1987 | Hutzel |
| 4,699,540 A | 10/1987 | Gibbon et al. |
| 4,700,191 A | 10/1987 | Manor |
| 4,700,301 A | 10/1987 | Dyke |
| 4,701,135 A | 10/1987 | Volk et al. |
| 4,701,197 A | 10/1987 | Thornton et al. |
| 4,701,760 A | 10/1987 | Raoux |
| 4,701,794 A | 10/1987 | Froling et al. |
| 4,701,934 A | 10/1987 | Jasper |
| 4,702,077 A | 10/1987 | Lilley et al. |
| 4,702,475 A | 10/1987 | Elstein et al. |
| 4,703,444 A | 10/1987 | Storms, Jr. et al. |
| 4,704,763 A | 11/1987 | Sacks et al. |
| 4,706,056 A | 11/1987 | McCullough |
| 4,706,074 A | 11/1987 | Muhich et al. |
| 4,706,081 A | 11/1987 | Hart et al. |
| 4,706,121 A | 11/1987 | Young |
| 4,706,675 A | 11/1987 | Ekins |
| 4,706,688 A | 11/1987 | Don Michael et al. |
| 4,706,772 A | 11/1987 | Dawson et al. |
| 4,707,126 A | 11/1987 | Ohshima et al. |
| 4,707,926 A | 11/1987 | Decker, Jr. |
| 4,709,195 A | 11/1987 | Hellekson et al. |
| 4,709,407 A | 11/1987 | Baba |
| 4,710,822 A | 12/1987 | Matsunawa |
| 4,710,955 A | 12/1987 | Kauffman |
| 4,710,964 A | 12/1987 | Yamaguchi et al. |
| 4,711,543 A | 12/1987 | Blair et al. |
| 4,713,008 A | 12/1987 | Stocker et al. |
| 4,713,767 A | 12/1987 | Sato et al. |
| 4,713,775 A | 12/1987 | Scott et al. |
| 4,716,404 A | 12/1987 | Tabata et al. |
| 4,716,804 A | 1/1988 | Chadabe |
| 4,718,080 A | 1/1988 | Serrano et al. |
| 4,718,107 A | 1/1988 | Hayes |
| 4,719,591 A | 1/1988 | Hopfield et al. |
| 4,722,054 A | 1/1988 | Yorozu et al. |
| 4,722,410 A | 2/1988 | Melocik et al. |
| 4,725,840 A | 2/1988 | Orazietti |
| 4,727,492 A | 2/1988 | Reeve et al. |
| 4,727,962 A | 3/1988 | Nelson |
| 4,728,922 A | 3/1988 | Christen et al. |
| 4,730,690 A | 3/1988 | McNutt et al. |
| 4,731,613 A | 3/1988 | Endo et al. |
| 4,731,863 A | 3/1988 | Sezan et al. |
| 4,733,356 A | 3/1988 | Haeussermann et al. |
| 4,734,690 A | 3/1988 | Waller |
| 4,734,786 A | 3/1988 | Minakawa et al. |
| 4,734,928 A | 3/1988 | Weiner et al. |
| 4,736,439 A | 4/1988 | May |
| 4,737,927 A | 4/1988 | Hanabusa et al. |
| 4,737,978 A | 4/1988 | Burke et al. |
| 4,739,398 A | 4/1988 | Thomas et al. |
| 4,740,778 A | 4/1988 | Harding et al. |
| 4,741,245 A | 5/1988 | Malone |
| 4,741,412 A | 5/1988 | Sable |
| 4,742,557 A | 5/1988 | Ma |
| 4,743,913 A | 5/1988 | Takai |
| 4,744,761 A | 5/1988 | Doerfel et al. |
| 4,745,468 A | 5/1988 | Von Kohorn |
| 4,745,549 A | 5/1988 | Hashimoto |

(56) References Cited

U.S. PATENT DOCUMENTS

| | | |
|---|---|---|
| 4,747,148 A | 5/1988 | Watanabe et al. |
| 4,748,678 A | 5/1988 | Takeda et al. |
| 4,750,197 A | 6/1988 | Denekamp et al. |
| 4,750,215 A | 6/1988 | Biggs |
| 4,751,512 A | 6/1988 | Longaker |
| 4,751,578 A | 6/1988 | Reiter et al. |
| 4,751,642 A | 6/1988 | Silva et al. |
| 4,751,669 A | 6/1988 | Sturgis et al. |
| 4,751,983 A | 6/1988 | Leskovec et al. |
| 4,752,677 A | 6/1988 | Nakano et al. |
| 4,752,890 A | 6/1988 | Natarajan et al. |
| 4,754,280 A | 6/1988 | Brown et al. |
| 4,754,283 A | 6/1988 | Fowler |
| 4,754,326 A | 6/1988 | Kram et al. |
| 4,754,465 A | 6/1988 | Trimble |
| 4,755,872 A | 7/1988 | Bestler et al. |
| 4,755,905 A | 7/1988 | Telecky, Jr. |
| 4,757,267 A | 7/1988 | Riskin |
| 4,757,450 A | 7/1988 | Etoh |
| 4,757,455 A | 7/1988 | Tsunoda et al. |
| 4,758,959 A | 7/1988 | Thoone et al. |
| 4,760,527 A | 7/1988 | Sidley |
| 4,760,604 A | 7/1988 | Cooper et al. |
| 4,761,684 A | 8/1988 | Clark et al. |
| 4,761,742 A | 8/1988 | Hanabusa et al. |
| 4,763,270 A | 8/1988 | Itoh et al. |
| 4,763,418 A | 8/1988 | Decker, Jr. |
| 4,764,971 A | 8/1988 | Sullivan |
| 4,764,973 A | 8/1988 | O'Hair |
| 4,768,110 A | 8/1988 | Dunlap et al. |
| 4,769,697 A | 9/1988 | Gilley et al. |
| 4,771,467 A | 9/1988 | Catros et al. |
| 4,773,024 A | 9/1988 | Faggin et al. |
| 4,773,099 A | 9/1988 | Bokser |
| 4,774,672 A | 9/1988 | Tsunoda et al. |
| 4,774,677 A | 9/1988 | Buckley |
| 4,775,935 A | 10/1988 | Yourick |
| 4,776,464 A | 10/1988 | Miller et al. |
| 4,776,750 A | 10/1988 | Griswold, Jr. et al. |
| 4,780,717 A | 10/1988 | Takanabe et al. |
| 4,780,759 A | 10/1988 | Matsushima et al. |
| 4,781,514 A | 11/1988 | Schneider |
| 4,782,447 A | 11/1988 | Ueno et al. |
| 4,783,741 A | 11/1988 | Mitterauer |
| 4,783,752 A | 11/1988 | Kaplan et al. |
| 4,783,754 A | 11/1988 | Bauck et al. |
| 4,783,829 A | 11/1988 | Miyakawa et al. |
| 4,785,463 A | 11/1988 | Janc et al. |
| 4,786,164 A | 11/1988 | Kawata |
| 4,787,063 A | 11/1988 | Muguet |
| 4,789,933 A | 12/1988 | Chen et al. |
| 4,790,025 A | 12/1988 | Inoue et al. |
| 4,790,402 A | 12/1988 | Field et al. |
| 4,791,420 A | 12/1988 | Baba |
| 4,791,572 A | 12/1988 | Green, III et al. |
| 4,792,995 A | 12/1988 | Harding |
| 4,796,189 A | 1/1989 | Nakayama et al. |
| 4,796,191 A | 1/1989 | Honey et al. |
| 4,796,997 A | 1/1989 | Svetkoff et al. |
| 4,797,920 A | 1/1989 | Stein |
| 4,799,062 A | 1/1989 | Sanderford, Jr. et al. |
| 4,799,270 A | 1/1989 | Kim et al. |
| 4,801,938 A | 1/1989 | Holmes |
| 4,802,022 A | 1/1989 | Harada |
| 4,802,103 A | 1/1989 | Faggin et al. |
| 4,802,230 A | 1/1989 | Horowitz |
| 4,803,103 A | 2/1989 | Pithouse et al. |
| 4,803,348 A | 2/1989 | Lohrey et al. |
| 4,803,736 A | 2/1989 | Grossberg et al. |
| 4,804,893 A | 2/1989 | Melocik |
| 4,804,937 A | 2/1989 | Barbiaux et al. |
| 4,804,949 A | 2/1989 | Faulkerson |
| 4,805,099 A | 2/1989 | Huber |
| 4,805,224 A | 2/1989 | Koezuka et al. |
| 4,805,225 A | 2/1989 | Clark |
| 4,805,231 A | 2/1989 | Whidden |
| 4,805,255 A | 2/1989 | Hed |
| 4,807,131 A | 2/1989 | Clegg |
| 4,807,158 A | 2/1989 | Blanton et al. |
| 4,807,714 A | 2/1989 | Blau et al. |
| 4,809,005 A | 2/1989 | Counselman, III |
| 4,809,065 A | 2/1989 | Harris et al. |
| 4,809,178 A | 2/1989 | Ninomiya et al. |
| 4,809,331 A | 2/1989 | Holmes |
| 4,809,341 A | 2/1989 | Matsui et al. |
| 4,812,820 A | 3/1989 | Chatwin |
| 4,812,843 A | 3/1989 | Champion, III et al. |
| 4,812,845 A | 3/1989 | Yamada et al. |
| 4,812,991 A | 3/1989 | Hatch |
| 4,814,711 A | 3/1989 | Olsen et al. |
| 4,814,989 A | 3/1989 | Dobereiner et al. |
| 4,815,020 A | 3/1989 | Cormier |
| 4,815,030 A | 3/1989 | Cross et al. |
| 4,817,171 A | 3/1989 | Stentiford |
| 4,817,176 A | 3/1989 | Marshall et al. |
| 4,817,950 A | 4/1989 | Goo |
| 4,818,171 A | 4/1989 | Burkholder |
| 4,818,997 A | 4/1989 | Holmes |
| 4,819,053 A | 4/1989 | Halavais |
| 4,819,174 A | 4/1989 | Furuno et al. |
| 4,819,195 A | 4/1989 | Bell et al. |
| 4,819,860 A | 4/1989 | Hargrove et al. |
| 4,821,102 A | 4/1989 | Ichikawa et al. |
| 4,821,294 A | 4/1989 | Thomas, Jr. |
| 4,821,309 A | 4/1989 | Namekawa |
| 4,821,333 A | 4/1989 | Gillies |
| 4,823,122 A | 4/1989 | Mann et al. |
| 4,823,194 A | 4/1989 | Mishima et al. |
| 4,823,901 A | 4/1989 | Harding |
| 4,825,457 A | 4/1989 | Lebowitz |
| 4,829,372 A | 5/1989 | McCalley et al. |
| 4,829,434 A | 5/1989 | Karmel et al. |
| 4,829,442 A | 5/1989 | Kadonoff et al. |
| 4,829,453 A | 5/1989 | Katsuta et al. |
| 4,829,569 A | 5/1989 | Seth-Smith et al. |
| 4,829,872 A | 5/1989 | Topic et al. |
| 4,831,539 A | 5/1989 | Hagenbuch |
| 4,831,659 A | 5/1989 | Miyaoka et al. |
| 4,833,469 A | 5/1989 | David |
| 4,833,477 A | 5/1989 | Tendler |
| 4,833,637 A | 5/1989 | Casasent et al. |
| 4,837,700 A | 6/1989 | Ando et al. |
| 4,837,842 A | 6/1989 | Holt |
| 4,839,835 A | 6/1989 | Hagenbuch |
| 4,841,302 A | 6/1989 | Henry |
| 4,841,562 A | 6/1989 | Lem |
| 4,841,575 A | 6/1989 | Welsh et al. |
| 4,842,275 A | 6/1989 | Tsatskin |
| 4,843,562 A | 6/1989 | Kenyon et al. |
| 4,843,568 A | 6/1989 | Krueger et al. |
| 4,843,631 A | 6/1989 | Steinpichler et al. |
| 4,845,610 A | 7/1989 | Parvin |
| 4,845,739 A | 7/1989 | Katz |
| 4,846,297 A | 7/1989 | Field et al. |
| 4,847,698 A | 7/1989 | Freeman |
| 4,847,699 A | 7/1989 | Freeman |
| 4,847,700 A | 7/1989 | Freeman |
| 4,847,862 A | 7/1989 | Braisted et al. |
| 4,849,731 A | 7/1989 | Melocik |
| 4,852,146 A | 7/1989 | Hathcock et al. |
| 4,853,859 A | 8/1989 | Morita et al. |
| 4,855,713 A | 8/1989 | Brunius |
| 4,855,915 A | 8/1989 | Dallaire |
| 4,856,787 A | 8/1989 | Itkis |
| 4,857,999 A | 8/1989 | Welsh |
| 4,860,352 A | 8/1989 | Laurance et al. |
| 4,861,220 A | 8/1989 | Smith |
| 4,862,015 A | 8/1989 | Grandfield |
| 4,862,175 A | 8/1989 | Biggs et al. |
| 4,862,422 A | 8/1989 | Brac |
| 4,864,284 A | 9/1989 | Crayton et al. |
| 4,864,592 A | 9/1989 | Lee |
| 4,864,629 A | 9/1989 | Deering |
| 4,866,434 A | 9/1989 | Keenan |

(56) References Cited

U.S. PATENT DOCUMENTS

| | | |
|---|---|---|
| 4,866,450 A | 9/1989 | Chisholm |
| 4,866,700 A | 9/1989 | Berry et al. |
| 4,866,776 A | 9/1989 | Kasai et al. |
| 4,868,859 A | 9/1989 | Sheffer |
| 4,868,866 A | 9/1989 | Williams, Jr. |
| 4,869,635 A | 9/1989 | Krahn |
| 4,870,422 A | 9/1989 | Counselman, III |
| 4,870,579 A | 9/1989 | Hey |
| 4,872,024 A | 10/1989 | Nagai et al. |
| 4,873,662 A | 10/1989 | Sargent |
| 4,875,164 A | 10/1989 | Monfort |
| 4,876,527 A | 10/1989 | Oka et al. |
| 4,876,592 A | 10/1989 | Von Kohorn |
| 4,876,659 A | 10/1989 | Devereux et al. |
| 4,876,731 A | 10/1989 | Loris et al. |
| 4,878,170 A | 10/1989 | Zeevi |
| 4,878,179 A | 10/1989 | Larsen et al. |
| 4,879,658 A | 11/1989 | Takashima et al. |
| 4,881,270 A | 11/1989 | Knecht et al. |
| 4,882,689 A | 11/1989 | Aoki |
| 4,882,696 A | 11/1989 | Nimura et al. |
| 4,882,732 A | 11/1989 | Kaminaga |
| 4,884,217 A | 11/1989 | Skeirik et al. |
| 4,884,348 A | 12/1989 | Zeller et al. |
| 4,885,632 A | 12/1989 | Mabey et al. |
| 4,887,068 A | 12/1989 | Umehara |
| 4,887,304 A | 12/1989 | Terzian |
| 4,888,699 A | 12/1989 | Knoll et al. |
| 4,888,814 A | 12/1989 | Yamaguchi et al. |
| 4,888,890 A | 12/1989 | Studebaker et al. |
| 4,890,230 A | 12/1989 | Tanoshima et al. |
| 4,890,233 A | 12/1989 | Ando et al. |
| 4,890,321 A | 12/1989 | Seth-Smith et al. |
| 4,891,650 A | 1/1990 | Sheffer |
| 4,891,761 A | 1/1990 | Gray et al. |
| 4,891,762 A | 1/1990 | Chotiros |
| 4,893,183 A | 1/1990 | Nayar |
| 4,893,346 A | 1/1990 | Bishop |
| 4,894,655 A | 1/1990 | Joguet et al. |
| 4,894,662 A | 1/1990 | Counselman |
| 4,894,734 A | 1/1990 | Fischler et al. |
| 4,896,370 A | 1/1990 | Kasparian et al. |
| 4,897,642 A | 1/1990 | DiLullo et al. |
| 4,897,811 A | 1/1990 | Scofield |
| D306,162 S | 2/1990 | Faulkerson et al. |
| 4,899,285 A | 2/1990 | Nakayama et al. |
| 4,899,370 A | 2/1990 | Kameo et al. |
| 4,901,340 A | 2/1990 | Parker et al. |
| 4,901,362 A | 2/1990 | Terzian |
| 4,901,364 A | 2/1990 | Faulkerson et al. |
| 4,902,020 A | 2/1990 | Auxier |
| 4,902,986 A | 2/1990 | Lesmeister |
| 4,903,211 A | 2/1990 | Ando |
| 4,903,212 A | 2/1990 | Yokouchi et al. |
| 4,903,229 A | 2/1990 | Schmidt et al. |
| 4,904,983 A | 2/1990 | Mitchell |
| 4,905,162 A | 2/1990 | Hartzband et al. |
| 4,905,163 A | 2/1990 | Garber et al. |
| 4,905,168 A | 2/1990 | McCarthy et al. |
| 4,905,286 A | 2/1990 | Sedgwick et al. |
| 4,905,296 A | 2/1990 | Nishihara |
| 4,906,099 A | 3/1990 | Casasent |
| 4,906,940 A | 3/1990 | Greene et al. |
| 4,907,159 A | 3/1990 | Mauge et al. |
| 4,908,629 A | 3/1990 | Apsell et al. |
| 4,908,707 A | 3/1990 | Kinghorn |
| 4,908,713 A | 3/1990 | Levine |
| 4,908,758 A | 3/1990 | Sanders |
| 4,910,493 A | 3/1990 | Chambers et al. |
| 4,910,677 A | 3/1990 | Remedio et al. |
| 4,912,433 A | 3/1990 | Motegi et al. |
| 4,912,475 A | 3/1990 | Counselman, III |
| 4,912,643 A | 3/1990 | Beirne |
| 4,912,645 A | 3/1990 | Kakihara et al. |
| 4,912,648 A | 3/1990 | Tyler |
| 4,912,756 A | 3/1990 | Hop |
| 4,914,609 A | 4/1990 | Shimizu et al. |
| 4,914,708 A | 4/1990 | Carpenter et al. |
| 4,914,709 A | 4/1990 | Rudak |
| 4,918,425 A | 4/1990 | Greenberg et al. |
| 4,918,516 A | 4/1990 | Freeman |
| 4,918,609 A | 4/1990 | Yamawaki |
| 4,920,432 A | 4/1990 | Eggers et al. |
| 4,920,499 A | 4/1990 | Skeirik |
| 4,924,402 A | 5/1990 | Ando et al. |
| 4,924,417 A | 5/1990 | Yuasa |
| 4,924,699 A | 5/1990 | Kuroda et al. |
| 4,925,189 A | 5/1990 | Braeunig |
| 4,926,255 A | 5/1990 | Von Kohorn |
| 4,926,327 A | 5/1990 | Sidley |
| 4,926,336 A | 5/1990 | Yamada |
| 4,926,491 A | 5/1990 | Maeda et al. |
| 4,928,105 A | 5/1990 | Langner |
| 4,928,106 A | 5/1990 | Ashjaee et al. |
| 4,928,107 A | 5/1990 | Kuroda et al. |
| 4,928,246 A | 5/1990 | Crawley et al. |
| 4,928,247 A | 5/1990 | Doyle et al. |
| 4,930,158 A | 5/1990 | Vogel |
| 4,930,160 A | 5/1990 | Vogel |
| 4,931,926 A | 6/1990 | Tanaka et al. |
| 4,931,985 A | 6/1990 | Glaise et al. |
| 4,932,065 A | 6/1990 | Feldgajer |
| 4,932,910 A | 6/1990 | Hayday |
| 4,933,872 A | 6/1990 | Vandenberg et al. |
| 4,937,751 A | 6/1990 | Nimura et al. |
| 4,937,752 A | 6/1990 | Nanba et al. |
| 4,939,521 A | 7/1990 | Burin |
| 4,941,125 A | 7/1990 | Boyne |
| 4,941,193 A | 7/1990 | Barnsley et al. |
| 4,943,925 A | 7/1990 | Moroto et al. |
| 4,944,023 A | 7/1990 | Imao et al. |
| 4,945,501 A | 7/1990 | Bell et al. |
| 4,945,563 A | 7/1990 | Horton et al. |
| RE33,316 E | 8/1990 | Katsuta et al. |
| 4,947,151 A | 8/1990 | Rosenberger |
| 4,947,244 A | 8/1990 | Fenwick et al. |
| 4,947,261 A | 8/1990 | Ishikawa et al. |
| 4,949,088 A | 8/1990 | Ryan et al. |
| 4,949,187 A | 8/1990 | Cohen |
| 4,949,268 A | 8/1990 | Nishikawa et al. |
| 4,949,391 A | 8/1990 | Faulkerson et al. |
| 4,951,029 A | 8/1990 | Severson |
| 4,951,211 A | 8/1990 | De Villeroche |
| 4,951,212 A | 8/1990 | Kurihara et al. |
| 4,952,936 A | 8/1990 | Martinson |
| 4,952,937 A | 8/1990 | Allen |
| 4,954,824 A | 9/1990 | Yamada et al. |
| 4,954,828 A | 9/1990 | Orr |
| 4,954,837 A | 9/1990 | Baird et al. |
| 4,954,951 A | 9/1990 | Hyatt |
| 4,954,958 A | 9/1990 | Savage et al. |
| 4,954,959 A | 9/1990 | Moroto et al. |
| 4,955,693 A | 9/1990 | Bobba |
| 4,956,870 A | 9/1990 | Hara |
| 4,958,220 A | 9/1990 | Alessi et al. |
| 4,958,375 A | 9/1990 | Reilly et al. |
| 4,958,379 A | 9/1990 | Yamaguchi et al. |
| 4,959,719 A | 9/1990 | Strubbe et al. |
| 4,959,720 A | 9/1990 | Duffield et al. |
| 4,961,074 A | 10/1990 | Martinson |
| 4,962,473 A | 10/1990 | Crain |
| 4,963,865 A | 10/1990 | Ichikawa et al. |
| 4,963,889 A | 10/1990 | Hatch |
| 4,963,994 A | 10/1990 | Levine |
| 4,964,077 A | 10/1990 | Eisen et al. |
| 4,965,285 A | 10/1990 | Bair |
| 4,965,725 A | 10/1990 | Rutenberg |
| 4,965,821 A | 10/1990 | Bishop et al. |
| 4,965,825 A | 10/1990 | Harvey et al. |
| 4,967,273 A | 10/1990 | Greenberg |
| 4,968,877 A | 11/1990 | McAvinney et al. |
| 4,968,981 A | 11/1990 | Sekine et al. |
| 4,969,036 A | 11/1990 | Bhanu et al. |
| 4,969,093 A | 11/1990 | Barker et al. |

(56) References Cited

U.S. PATENT DOCUMENTS

| | | |
|---|---|---|
| 4,970,652 A | 11/1990 | Nagashima |
| 4,972,431 A | 11/1990 | Keegan |
| 4,972,484 A | 11/1990 | Theile et al. |
| 4,972,499 A | 11/1990 | Kurosawa |
| 4,974,149 A | 11/1990 | Valenti |
| 4,974,170 A | 11/1990 | Bouve et al. |
| 4,975,707 A | 12/1990 | Smith |
| 4,975,904 A | 12/1990 | Mann et al. |
| 4,975,905 A | 12/1990 | Mann et al. |
| 4,976,619 A | 12/1990 | Carlson |
| 4,977,455 A | 12/1990 | Young |
| 4,977,679 A | 12/1990 | Saito et al. |
| 4,979,222 A | 12/1990 | Weber |
| 4,982,344 A | 1/1991 | Jordan |
| 4,982,346 A | 1/1991 | Girouard et al. |
| 4,983,980 A | 1/1991 | Ando |
| 4,984,255 A | 1/1991 | Davis et al. |
| 4,985,863 A | 1/1991 | Fujisawa et al. |
| 4,986,384 A | 1/1991 | Okamoto et al. |
| 4,986,385 A | 1/1991 | Masaki |
| 4,987,486 A | 1/1991 | Johnson et al. |
| 4,987,492 A | 1/1991 | Stults et al. |
| 4,987,604 A | 1/1991 | Rouch |
| 4,988,981 A | 1/1991 | Zimmerman et al. |
| 4,989,090 A | 1/1991 | Campbell et al. |
| 4,989,151 A | 1/1991 | Nuimura |
| 4,989,256 A | 1/1991 | Buckley |
| 4,989,258 A | 1/1991 | Takahashi et al. |
| 4,991,011 A | 2/1991 | Johnson et al. |
| 4,991,304 A | 2/1991 | McMurtry |
| 4,992,940 A | 2/1991 | Dworkin |
| 4,992,947 A | 2/1991 | Nimura et al. |
| 4,992,972 A | 2/1991 | Brooks et al. |
| 4,994,908 A | 2/1991 | Kuban et al. |
| 4,995,078 A | 2/1991 | Monslow et al. |
| 4,996,642 A | 2/1991 | Hey |
| 4,996,645 A | 2/1991 | Schneyderberg Van Der Zon |
| 4,996,703 A | 2/1991 | Gray |
| 4,996,707 A | 2/1991 | O'Malley et al. |
| 4,998,286 A | 3/1991 | Tsujiuchi et al. |
| 5,001,554 A | 3/1991 | Johnson et al. |
| 5,001,777 A | 3/1991 | Liautaud |
| 5,003,317 A | 3/1991 | Gray et al. |
| 5,003,584 A | 3/1991 | Benyacar et al. |
| 5,005,084 A | 4/1991 | Skinner |
| 5,006,855 A | 4/1991 | Braff |
| 5,008,678 A | 4/1991 | Herman |
| 5,008,853 A | 4/1991 | Bly et al. |
| 5,009,429 A | 4/1991 | Auxier |
| 5,010,491 A | 4/1991 | Biasillo et al. |
| 5,010,500 A | 4/1991 | Makkuni et al. |
| 5,012,334 A | 4/1991 | Etra |
| 5,012,349 A | 4/1991 | de Fay |
| 5,014,098 A | 5/1991 | Schlais et al. |
| 5,014,206 A | 5/1991 | Scribner et al. |
| 5,014,219 A | 5/1991 | White |
| 5,014,234 A | 5/1991 | Edwards, Jr. |
| 5,014,327 A | 5/1991 | Potter et al. |
| 5,016,272 A | 5/1991 | Stubbs et al. |
| 5,016,273 A | 5/1991 | Hoff |
| 5,017,926 A | 5/1991 | Ames et al. |
| 5,018,169 A | 5/1991 | Wong et al. |
| 5,018,218 A | 5/1991 | Peregrim et al. |
| 5,018,219 A | 5/1991 | Matsuzaki et al. |
| 5,019,899 A | 5/1991 | Boles et al. |
| 5,020,112 A | 5/1991 | Chou |
| 5,020,113 A | 5/1991 | Lo et al. |
| 5,021,792 A | 6/1991 | Hwang |
| 5,021,794 A | 6/1991 | Lawrence |
| 5,021,976 A | 6/1991 | Wexelblat et al. |
| 5,022,062 A | 6/1991 | Annis |
| 5,025,261 A | 6/1991 | Ohta et al. |
| 5,025,310 A | 6/1991 | Sekiya et al. |
| 5,025,324 A | 6/1991 | Hashimoto |
| 5,027,400 A | 6/1991 | Baji et al. |
| 5,028,888 A | 7/1991 | Ray |
| 5,030,957 A | 7/1991 | Evans |
| 5,031,104 A | 7/1991 | Ikeda et al. |
| 5,031,224 A | 7/1991 | Mengel et al. |
| 5,031,228 A | 7/1991 | Lu |
| 5,031,330 A | 7/1991 | Stuart |
| 5,033,101 A | 7/1991 | Sood |
| 5,034,807 A | 7/1991 | Von Kohorn |
| 5,034,916 A | 7/1991 | Ordish |
| 5,034,991 A | 7/1991 | Hagimae et al. |
| 5,036,314 A | 7/1991 | Barillari et al. |
| 5,036,329 A | 7/1991 | Ando |
| 5,036,537 A | 7/1991 | Jeffers et al. |
| 5,038,022 A | 8/1991 | Lucero |
| 5,038,102 A | 8/1991 | Glasheen |
| 5,038,211 A | 8/1991 | Hallenbeck |
| 5,038,379 A | 8/1991 | Sano |
| 5,038,390 A | 8/1991 | Ravi Chandran |
| 5,039,979 A | 8/1991 | McClive |
| 5,040,134 A | 8/1991 | Park |
| 5,041,833 A | 8/1991 | Weinberg |
| 5,041,967 A | 8/1991 | Ephrath et al. |
| 5,043,736 A | 8/1991 | Darnell et al. |
| 5,043,881 A | 8/1991 | Hamazaki |
| 5,043,902 A | 8/1991 | Yokoyama et al. |
| 5,045,861 A | 9/1991 | Duffett-Smith |
| 5,045,937 A | 9/1991 | Myrick |
| 5,046,011 A | 9/1991 | Kakihara et al. |
| 5,046,113 A | 9/1991 | Hoki |
| 5,046,121 A | 9/1991 | Yonekawa et al. |
| 5,046,122 A | 9/1991 | Nakaya et al. |
| 5,046,130 A | 9/1991 | Hall et al. |
| 5,046,179 A | 9/1991 | Uomori et al. |
| 5,047,867 A | 9/1991 | Strubbe et al. |
| 5,048,095 A | 9/1991 | Bhanu et al. |
| 5,048,100 A | 9/1991 | Kuperstein |
| 5,048,112 A | 9/1991 | Alves et al. |
| 5,049,884 A | 9/1991 | Jaeger et al. |
| 5,049,885 A | 9/1991 | Orr |
| 5,050,223 A | 9/1991 | Sumi |
| 5,051,817 A | 9/1991 | Takano |
| 5,051,840 A | 9/1991 | Watanabe et al. |
| 5,051,998 A | 9/1991 | Murai et al. |
| 5,052,043 A | 9/1991 | Gaborski |
| 5,052,045 A | 9/1991 | Peregrim et al. |
| 5,052,046 A | 9/1991 | Fukuda et al. |
| 5,052,799 A | 10/1991 | Sasser et al. |
| 5,053,889 A | 10/1991 | Nakano et al. |
| 5,053,974 A | 10/1991 | Penz |
| 5,054,093 A | 10/1991 | Cooper et al. |
| 5,054,095 A | 10/1991 | Bernsen et al. |
| 5,054,101 A | 10/1991 | Prakash |
| 5,054,103 A | 10/1991 | Yasuda et al. |
| 5,054,110 A | 10/1991 | Comroe et al. |
| 5,055,658 A | 10/1991 | Cockburn |
| 5,055,851 A | 10/1991 | Sheffer |
| 5,055,926 A | 10/1991 | Christensen et al. |
| 5,056,056 A | 10/1991 | Gustin |
| 5,056,106 A | 10/1991 | Wang et al. |
| 5,056,147 A | 10/1991 | Turner et al. |
| 5,057,915 A | 10/1991 | Von Kohorn |
| 5,058,108 A | 10/1991 | Mann et al. |
| 5,058,179 A | 10/1991 | Denker et al. |
| 5,058,180 A | 10/1991 | Khan |
| 5,058,183 A | 10/1991 | Schmidt et al. |
| 5,058,184 A | 10/1991 | Fukushima |
| 5,058,186 A | 10/1991 | Miyaoka et al. |
| 5,058,698 A | 10/1991 | Yoshida et al. |
| 5,059,126 A | 10/1991 | Kimball |
| 5,059,969 A | 10/1991 | Sakaguchi et al. |
| 5,060,262 A | 10/1991 | Bevins, Jr. et al. |
| 5,060,276 A | 10/1991 | Morris et al. |
| 5,060,277 A | 10/1991 | Bokser |
| 5,060,278 A | 10/1991 | Fukumizu |
| 5,060,279 A | 10/1991 | Crawford et al. |
| 5,060,282 A | 10/1991 | Molley |
| 5,060,285 A | 10/1991 | Dixit et al. |
| 5,061,063 A | 10/1991 | Casasent |
| 5,061,936 A | 10/1991 | Suzuki |

(56) References Cited

U.S. PATENT DOCUMENTS

| | | | |
|---|---|---|---|
| 5,062,143 A | 10/1991 | Schmitt | |
| 5,063,385 A | 11/1991 | Caschera | |
| 5,063,524 A | 11/1991 | Ferre et al. | |
| 5,063,525 A | 11/1991 | Kurakake et al. | |
| 5,063,601 A | 11/1991 | Hayduk | |
| 5,063,602 A | 11/1991 | Peppers et al. | |
| 5,063,603 A | 11/1991 | Burt | |
| 5,063,605 A | 11/1991 | Samad | |
| 5,063,608 A | 11/1991 | Siegel | |
| 5,065,326 A | 11/1991 | Sahm | |
| 5,065,439 A | 11/1991 | Takasaki et al. | |
| 5,065,440 A | 11/1991 | Yoshida et al. | |
| 5,065,447 A | 11/1991 | Barnsley et al. | |
| 5,067,082 A | 11/1991 | Nimura et al. | |
| 5,067,160 A | 11/1991 | Omata et al. | |
| 5,067,161 A | 11/1991 | Mikami et al. | |
| 5,067,162 A | 11/1991 | Driscoll, Jr. et al. | |
| 5,067,163 A | 11/1991 | Adachi | |
| 5,067,164 A | 11/1991 | Denker et al. | |
| 5,067,166 A | 11/1991 | Ito | |
| 5,068,656 A | 11/1991 | Sutherland | |
| 5,068,663 A | 11/1991 | Valentine et al. | |
| 5,068,664 A | 11/1991 | Appriou et al. | |
| 5,068,723 A | 11/1991 | Dixit et al. | |
| 5,068,724 A | 11/1991 | Krause et al. | |
| 5,068,733 A | 11/1991 | Bennett | |
| 5,068,744 A | 11/1991 | Ito | |
| 5,068,909 A | 11/1991 | Rutherford et al. | |
| 5,068,911 A | 11/1991 | Resnikoff et al. | |
| 5,070,404 A | 12/1991 | Bullock et al. | |
| 5,072,227 A | 12/1991 | Hatch | |
| 5,072,395 A | 12/1991 | Bliss et al. | |
| 5,073,931 A | 12/1991 | Audebert et al. | |
| 5,075,693 A | 12/1991 | McMillan et al. | |
| 5,075,771 A | 12/1991 | Hashimoto | |
| 5,075,863 A | 12/1991 | Nagamune et al. | |
| 5,076,662 A | 12/1991 | Shih et al. | |
| 5,077,557 A | 12/1991 | Ingensand | |
| 5,077,607 A | 12/1991 | Johnson et al. | |
| 5,079,553 A | 1/1992 | Orr | |
| 5,081,667 A | 1/1992 | Drori et al. | |
| 5,081,703 A | 1/1992 | Lee | |
| 5,083,129 A | 1/1992 | Valentine et al. | |
| 5,083,218 A | 1/1992 | Takasu et al. | |
| 5,083,256 A | 1/1992 | Trovato et al. | |
| 5,083,271 A | 1/1992 | Thacher et al. | |
| 5,083,860 A | 1/1992 | Miyatake et al. | |
| 5,084,822 A | 1/1992 | Hayami | |
| 5,086,385 A | 2/1992 | Launey et al. | |
| 5,086,390 A | 2/1992 | Matthews | |
| 5,086,394 A | 2/1992 | Shapira | |
| 5,087,919 A | 2/1992 | Odagawa et al. | |
| 5,088,645 A * | 2/1992 | Bell | 236/46 R |
| 5,089,826 A | 2/1992 | Yano et al. | |
| 5,089,885 A | 2/1992 | Clark | |
| 5,089,978 A | 2/1992 | Lipner et al. | |
| 5,090,049 A | 2/1992 | Chen | |
| 5,093,718 A | 3/1992 | Hoarty et al. | |
| 5,093,873 A | 3/1992 | Takahashi | |
| 5,093,918 A | 3/1992 | Heyen et al. | |
| 5,095,480 A | 3/1992 | Fenner | |
| 5,095,531 A | 3/1992 | Ito | |
| 5,097,269 A | 3/1992 | Takayama et al. | |
| 5,099,319 A | 3/1992 | Esch et al. | |
| 5,099,422 A | 3/1992 | Foresman et al. | |
| 5,101,356 A | 3/1992 | Timothy et al. | |
| 5,101,416 A | 3/1992 | Fenton et al. | |
| 5,101,444 A | 3/1992 | Wilson et al. | |
| 5,103,400 A | 4/1992 | Yamada et al. | |
| 5,103,459 A | 4/1992 | Gilhousen et al. | |
| 5,103,498 A | 4/1992 | Lanier et al. | |
| 5,105,184 A | 4/1992 | Pirani et al. | |
| 5,107,256 A | 4/1992 | Ueno et al. | |
| 5,108,334 A | 4/1992 | Eschenbach et al. | |
| 5,109,279 A | 4/1992 | Ando | |
| 5,109,399 A | 4/1992 | Thompson | |
| 5,109,431 A | 4/1992 | Nishiya et al. | |
| 5,109,439 A | 4/1992 | Froessl | |
| 5,109,482 A | 4/1992 | Bohrman | |
| 5,111,400 A | 5/1992 | Yoder | |
| 5,111,401 A | 5/1992 | Everett, Jr. et al. | |
| 5,111,516 A | 5/1992 | Nakano et al. | |
| 5,113,259 A | 5/1992 | Romesburg et al. | |
| 5,113,496 A | 5/1992 | McCalley et al. | |
| 5,115,223 A | 5/1992 | Moody | |
| 5,115,233 A | 5/1992 | Zdunek et al. | |
| 5,115,245 A | 5/1992 | Wen et al. | |
| 5,115,398 A | 5/1992 | De Jong | |
| 5,115,501 A | 5/1992 | Kerr | |
| 5,117,232 A | 5/1992 | Cantwell | |
| 5,117,360 A | 5/1992 | Hotz et al. | |
| 5,119,081 A | 6/1992 | Ikehira | |
| 5,119,102 A | 6/1992 | Barnard | |
| 5,119,301 A | 6/1992 | Shimizu et al. | |
| 5,119,475 A | 6/1992 | Smith et al. | |
| 5,119,479 A | 6/1992 | Arai et al. | |
| 5,119,504 A | 6/1992 | Durboraw, III | |
| 5,119,507 A | 6/1992 | Mankovitz | |
| 5,121,326 A | 6/1992 | Moroto et al. | |
| 5,122,802 A | 6/1992 | Marin | |
| 5,122,803 A | 6/1992 | Stann et al. | |
| 5,122,886 A | 6/1992 | Tanaka | |
| 5,122,957 A | 6/1992 | Hattori | |
| 5,123,046 A | 6/1992 | Levine | |
| 5,123,052 A | 6/1992 | Brisson | |
| 5,123,057 A | 6/1992 | Verly et al. | |
| 5,123,087 A | 6/1992 | Newell et al. | |
| 5,124,908 A | 6/1992 | Broadbent | |
| 5,124,915 A | 6/1992 | Krenzel | |
| 5,126,748 A | 6/1992 | Ames et al. | |
| 5,126,851 A | 6/1992 | Yoshimura et al. | |
| 5,127,487 A | 7/1992 | Yamamoto et al. | |
| 5,128,525 A | 7/1992 | Stearns et al. | |
| 5,128,669 A | 7/1992 | Dadds et al. | |
| 5,128,874 A | 7/1992 | Bhanu et al. | |
| 5,128,979 A | 7/1992 | Reich et al. | |
| 5,130,792 A | 7/1992 | Tindell et al. | |
| 5,131,020 A | 7/1992 | Liebesny et al. | |
| 5,132,992 A | 7/1992 | Yurt et al. | |
| 5,133,021 A | 7/1992 | Carpenter et al. | |
| 5,133,024 A | 7/1992 | Froessl | |
| 5,133,045 A | 7/1992 | Gaither et al. | |
| 5,133,052 A | 7/1992 | Bier et al. | |
| 5,133,075 A | 7/1992 | Risch | |
| 5,133,079 A | 7/1992 | Ballantyne et al. | |
| 5,134,406 A | 7/1992 | Orr | |
| 5,134,649 A | 7/1992 | Gutzmer | |
| 5,134,719 A | 7/1992 | Mankovitz | |
| 5,136,659 A | 8/1992 | Kaneko et al. | |
| 5,136,687 A | 8/1992 | Edelman et al. | |
| 5,136,696 A | 8/1992 | Beckwith et al. | |
| 5,141,234 A | 8/1992 | Boylan et al. | |
| 5,142,161 A | 8/1992 | Brackmann | |
| 5,142,574 A | 8/1992 | West, Jr. et al. | |
| 5,144,317 A | 9/1992 | Duddek et al. | |
| 5,144,318 A | 9/1992 | Kishi | |
| 5,146,226 A | 9/1992 | Valentine et al. | |
| 5,146,227 A | 9/1992 | Papadopoulos | |
| 5,146,231 A | 9/1992 | Ghaem et al. | |
| 5,146,404 A | 9/1992 | Calloway et al. | |
| 5,146,552 A | 9/1992 | Cassorla et al. | |
| 5,148,154 A | 9/1992 | MacKay et al. | |
| 5,148,179 A | 9/1992 | Allison | |
| 5,148,452 A | 9/1992 | Kennedy et al. | |
| 5,148,497 A | 9/1992 | Pentland et al. | |
| 5,148,522 A | 9/1992 | Okazaki | |
| 5,151,701 A | 9/1992 | Valentine et al. | |
| 5,151,789 A | 9/1992 | Young | |
| 5,153,512 A | 10/1992 | Glasheen | |
| 5,153,598 A | 10/1992 | Alves, Jr. | |
| 5,153,836 A | 10/1992 | Fraughton et al. | |
| 5,155,490 A | 10/1992 | Spradley, Jr. et al. | |
| 5,155,491 A | 10/1992 | Ando | |
| 5,155,591 A | 10/1992 | Wachob | |

(56) References Cited

U.S. PATENT DOCUMENTS

| | | |
|---|---|---|
| 5,155,688 A | 10/1992 | Tanaka et al. |
| 5,155,689 A | 10/1992 | Wortham |
| 5,157,384 A | 10/1992 | Greanias et al. |
| 5,157,691 A | 10/1992 | Ohkubo et al. |
| 5,159,315 A | 10/1992 | Schultz et al. |
| 5,159,474 A | 10/1992 | Franke et al. |
| 5,159,549 A | 10/1992 | Hallman, Jr. et al. |
| 5,159,556 A | 10/1992 | Schorter |
| 5,159,668 A | 10/1992 | Kaasila |
| 5,161,027 A | 11/1992 | Liu |
| 5,161,107 A | 11/1992 | Mayeaux et al. |
| 5,161,204 A | 11/1992 | Hutcheson et al. |
| 5,161,886 A | 11/1992 | De Jong et al. |
| 5,162,997 A | 11/1992 | Takahashi |
| 5,164,729 A | 11/1992 | Decker et al. |
| 5,164,904 A | 11/1992 | Sumner |
| 5,168,147 A | 12/1992 | Bloomberg |
| 5,168,353 A | 12/1992 | Walker et al. |
| 5,168,452 A | 12/1992 | Yamada et al. |
| 5,168,529 A | 12/1992 | Peregrim et al. |
| 5,168,565 A | 12/1992 | Morita |
| 5,170,171 A | 12/1992 | Brown |
| 5,170,388 A | 12/1992 | Endoh |
| 5,170,427 A | 12/1992 | Guichard et al. |
| 5,170,466 A | 12/1992 | Rogan et al. |
| 5,170,499 A | 12/1992 | Grothause |
| 5,172,321 A | 12/1992 | Ghaem et al. |
| 5,172,413 A | 12/1992 | Bradley et al. |
| 5,173,710 A | 12/1992 | Kelley et al. |
| 5,173,777 A | 12/1992 | Dangschat |
| 5,173,949 A | 12/1992 | Peregrim et al. |
| 5,175,557 A | 12/1992 | King et al. |
| 5,177,680 A | 1/1993 | Tsukino et al. |
| 5,177,685 A | 1/1993 | Davis et al. |
| 5,177,796 A | 1/1993 | Feig et al. |
| 5,179,439 A | 1/1993 | Hashimoto |
| 5,179,449 A | 1/1993 | Doi |
| 5,179,652 A | 1/1993 | Rozmanith et al. |
| 5,182,555 A | 1/1993 | Sumner |
| 5,182,640 A | 1/1993 | Takano |
| 5,184,123 A | 2/1993 | Bremer et al. |
| 5,184,295 A | 2/1993 | Mann |
| 5,184,303 A | 2/1993 | Link |
| 5,184,311 A | 2/1993 | Kraus et al. |
| 5,185,610 A | 2/1993 | Ward et al. |
| 5,185,761 A | 2/1993 | Kawasaki |
| 5,185,857 A | 2/1993 | Rozmanith et al. |
| 5,187,589 A | 2/1993 | Kono et al. |
| 5,187,787 A | 2/1993 | Skeen et al. |
| 5,187,788 A | 2/1993 | Marmelstein |
| 5,187,797 A | 2/1993 | Nielsen et al. |
| 5,187,805 A | 2/1993 | Bertiger et al. |
| 5,189,612 A | 2/1993 | Lemercier et al. |
| 5,189,619 A | 2/1993 | Adachi et al. |
| 5,189,630 A | 2/1993 | Barstow et al. |
| 5,191,410 A | 3/1993 | McCalley et al. |
| 5,191,423 A | 3/1993 | Yoshida |
| 5,191,532 A | 3/1993 | Moroto et al. |
| 5,192,957 A | 3/1993 | Kennedy |
| 5,192,999 A | 3/1993 | Graczyk et al. |
| 5,193,215 A | 3/1993 | Olmer |
| 5,194,871 A | 3/1993 | Counselman, III |
| 5,195,134 A | 3/1993 | Inoue |
| 5,196,846 A | 3/1993 | Brockelsby et al. |
| 5,200,822 A | 4/1993 | Bronfin et al. |
| 5,200,823 A | 4/1993 | Yoneda et al. |
| 5,201,010 A | 4/1993 | Deaton et al. |
| 5,202,828 A | 4/1993 | Vertelney et al. |
| 5,202,829 A | 4/1993 | Geier |
| 5,202,915 A | 4/1993 | Nishii |
| 5,202,985 A | 4/1993 | Goyal |
| 5,203,199 A | 4/1993 | Henderson et al. |
| 5,203,704 A | 4/1993 | McCloud |
| 5,206,500 A | 4/1993 | Decker et al. |
| 5,206,651 A | 4/1993 | Valentine et al. |
| 5,206,806 A | 4/1993 | Gerardi et al. |
| 5,208,665 A | 5/1993 | McCalley et al. |
| 5,208,756 A | 5/1993 | Song |
| 5,210,540 A | 5/1993 | Masumoto |
| 5,210,611 A | 5/1993 | Yee et al. |
| 5,210,787 A | 5/1993 | Hayes et al. |
| 5,212,739 A | 5/1993 | Johnson |
| 5,214,504 A | 5/1993 | Toriu et al. |
| 5,214,793 A | 5/1993 | Conway et al. |
| 5,216,228 A | 6/1993 | Hashimoto |
| 5,218,367 A | 6/1993 | Sheffer et al. |
| 5,218,620 A | 6/1993 | Mori et al. |
| 5,220,420 A | 6/1993 | Hoarty et al. |
| 5,220,501 A | 6/1993 | Lawlor et al. |
| 5,220,507 A | 6/1993 | Kirson |
| 5,220,509 A | 6/1993 | Takemura et al. |
| 5,220,640 A | 6/1993 | Frank |
| 5,220,648 A | 6/1993 | Sato |
| 5,220,657 A | 6/1993 | Bly et al. |
| 5,220,664 A | 6/1993 | Lee |
| 5,220,674 A | 6/1993 | Morgan et al. |
| 5,222,155 A | 6/1993 | Delanoy et al. |
| 5,223,844 A | 6/1993 | Mansell et al. |
| 5,223,914 A | 6/1993 | Auda et al. |
| 5,223,924 A | 6/1993 | Strubbe |
| 5,224,151 A | 6/1993 | Bowen et al. |
| 5,224,706 A | 7/1993 | Bridgeman et al. |
| 5,225,842 A | 7/1993 | Brown et al. |
| 5,225,902 A | 7/1993 | McMullan, Jr. |
| 5,227,874 A | 7/1993 | Von Kohorn |
| 5,228,077 A | 7/1993 | Darbee |
| 5,228,695 A | 7/1993 | Meyer |
| 5,228,854 A | 7/1993 | Eldridge |
| 5,229,590 A | 7/1993 | Harden et al. |
| 5,229,754 A | 7/1993 | Aoki et al. |
| 5,229,756 A | 7/1993 | Kosugi et al. |
| 5,230,048 A | 7/1993 | Moy |
| 5,231,493 A | 7/1993 | Apitz |
| 5,231,494 A | 7/1993 | Wachob |
| 5,231,568 A | 7/1993 | Cohen et al. |
| 5,231,584 A | 7/1993 | Nimura et al. |
| 5,231,698 A | 7/1993 | Forcier |
| RE34,340 E | 8/1993 | Freeman |
| D338,841 S | 8/1993 | Davis et al. |
| 5,233,423 A | 8/1993 | Jernigan et al. |
| 5,233,533 A | 8/1993 | Edstrom et al. |
| 5,235,509 A | 8/1993 | Mueller et al. |
| 5,235,633 A | 8/1993 | Dennison et al. |
| 5,239,296 A | 8/1993 | Jenkins |
| 5,239,463 A | 8/1993 | Blair et al. |
| 5,239,464 A | 8/1993 | Blair et al. |
| 5,239,617 A | 8/1993 | Gardner et al. |
| 5,241,428 A | 8/1993 | Goldwasser et al. |
| 5,241,465 A | 8/1993 | Oba et al. |
| 5,241,542 A | 8/1993 | Natarajan et al. |
| 5,241,620 A | 8/1993 | Ruggiero |
| 5,241,625 A | 8/1993 | Epard et al. |
| 5,241,645 A | 8/1993 | Cimral et al. |
| 5,243,149 A | 9/1993 | Comerford et al. |
| 5,243,528 A | 9/1993 | Lefebvre |
| 5,245,537 A | 9/1993 | Barber |
| 5,245,909 A | 9/1993 | Corrigan et al. |
| 5,247,285 A | 9/1993 | Yokota et al. |
| 5,247,306 A | 9/1993 | Hardange et al. |
| 5,247,347 A | 9/1993 | Litteral et al. |
| 5,247,363 A | 9/1993 | Sun et al. |
| 5,247,433 A | 9/1993 | Kitaura et al. |
| 5,247,440 A | 9/1993 | Capurka et al. |
| 5,247,564 A | 9/1993 | Zicker |
| 5,247,651 A | 9/1993 | Clarisse |
| 5,249,043 A | 9/1993 | Grandmougin |
| 5,250,951 A | 10/1993 | Valentine et al. |
| 5,251,106 A | 10/1993 | Hui |
| 5,251,205 A | 10/1993 | Callon et al. |
| 5,251,294 A | 10/1993 | Abelow |
| 5,251,316 A | 10/1993 | Anick et al. |
| 5,251,324 A | 10/1993 | McMullan, Jr. |
| 5,252,951 A | 10/1993 | Tannenbaum et al. |
| 5,253,061 A | 10/1993 | Takahama et al. |

(56) References Cited

U.S. PATENT DOCUMENTS

| | | |
|---|---|---|
| 5,253,066 A | 10/1993 | Vogel |
| 5,253,275 A | 10/1993 | Yurt et al. |
| 5,255,386 A | 10/1993 | Prager |
| 5,257,195 A | 10/1993 | Hirata |
| 5,257,789 A | 11/1993 | LeVasseur |
| 5,257,810 A | 11/1993 | Schorr et al. |
| 5,259,038 A | 11/1993 | Sakou et al. |
| 5,260,778 A | 11/1993 | Kauffman et al. |
| 5,261,042 A | 11/1993 | Brandt |
| 5,261,081 A | 11/1993 | White et al. |
| 5,262,775 A | 11/1993 | Tamai et al. |
| 5,262,860 A | 11/1993 | Fitzpatrick et al. |
| 5,263,167 A | 11/1993 | Conner, Jr. et al. |
| 5,263,174 A | 11/1993 | Layman |
| 5,265,025 A | 11/1993 | Hirata |
| 5,265,033 A | 11/1993 | Vajk et al. |
| 5,266,958 A | 11/1993 | Durboraw, III |
| 5,267,171 A | 11/1993 | Suzuki et al. |
| RE34,476 E | 12/1993 | Norwood |
| 5,268,689 A | 12/1993 | Ono et al. |
| 5,268,927 A | 12/1993 | Dimos et al. |
| 5,269,067 A | 12/1993 | Waeldele et al. |
| 5,270,706 A | 12/1993 | Smith |
| 5,270,936 A | 12/1993 | Fukushima et al. |
| 5,272,324 A | 12/1993 | Blevins |
| 5,272,483 A | 12/1993 | Kato |
| 5,272,638 A | 12/1993 | Martin et al. |
| 5,274,387 A | 12/1993 | Kakihara et al. |
| 5,274,560 A | 12/1993 | LaRue |
| 5,274,667 A | 12/1993 | Olmstead |
| 5,274,714 A | 12/1993 | Hutcheson et al. |
| 5,276,451 A | 1/1994 | Odagawa |
| 5,276,737 A | 1/1994 | Micali |
| 5,278,424 A | 1/1994 | Kagawa |
| 5,278,568 A | 1/1994 | Enge et al. |
| 5,278,759 A | 1/1994 | Berra et al. |
| 5,280,530 A | 1/1994 | Trew et al. |
| 5,283,560 A | 2/1994 | Bartlett |
| 5,283,570 A | 2/1994 | DeLuca et al. |
| 5,283,575 A | 2/1994 | Kao et al. |
| 5,283,639 A | 2/1994 | Esch et al. |
| 5,283,641 A | 2/1994 | Lemelson |
| 5,283,731 A | 2/1994 | Lalonde et al. |
| 5,283,734 A | 2/1994 | Von Kohorn |
| 5,283,819 A | 2/1994 | Glick et al. |
| 5,283,829 A | 2/1994 | Anderson |
| 5,283,856 A | 2/1994 | Gross et al. |
| 5,285,272 A | 2/1994 | Bradley et al. |
| 5,285,284 A | 2/1994 | Takashima et al. |
| 5,285,523 A | 2/1994 | Takahashi |
| 5,287,199 A | 2/1994 | Zoccolillo |
| 5,288,078 A | 2/1994 | Capper et al. |
| 5,288,938 A | 2/1994 | Wheaton |
| 5,291,068 A | 3/1994 | Rammel et al. |
| 5,291,202 A | 3/1994 | McClintock |
| 5,291,412 A | 3/1994 | Tamai et al. |
| 5,291,413 A | 3/1994 | Tamai et al. |
| 5,292,254 A | 3/1994 | Miller et al. |
| 5,293,163 A | 3/1994 | Kakihara et al. |
| 5,293,318 A | 3/1994 | Fukushima |
| 5,293,484 A | 3/1994 | Dabbs, III et al. |
| 5,293,513 A | 3/1994 | Umezu et al. |
| 5,295,154 A | 3/1994 | Meier et al. |
| 5,295,491 A | 3/1994 | Gevins |
| 5,296,861 A | 3/1994 | Knight |
| 5,296,931 A | 3/1994 | Na |
| 5,297,204 A | 3/1994 | Levine |
| 5,297,249 A | 3/1994 | Bernstein et al. |
| 5,298,674 A | 3/1994 | Yun |
| 5,299,132 A | 3/1994 | Wortham |
| 5,300,932 A | 4/1994 | Valentine et al. |
| 5,301,028 A | 4/1994 | Banker et al. |
| 5,301,243 A | 4/1994 | Olschafskie et al. |
| 5,301,354 A | 4/1994 | Schwendeman et al. |
| 5,301,368 A | 4/1994 | Hirata |
| 5,303,297 A | 4/1994 | Hillis |
| 5,303,313 A | 4/1994 | Mark et al. |
| 5,303,393 A | 4/1994 | Noreen et al. |
| 5,305,007 A | 4/1994 | Orr et al. |
| 5,305,195 A | 4/1994 | Murphy |
| 5,305,197 A | 4/1994 | Axler et al. |
| 5,305,386 A | 4/1994 | Yamato |
| 5,305,389 A | 4/1994 | Palmer |
| 5,307,173 A | 4/1994 | Yuen et al. |
| 5,307,421 A | 4/1994 | Darboux et al. |
| 5,309,437 A | 5/1994 | Perlman et al. |
| 5,309,474 A | 5/1994 | Gilhousen et al. |
| 5,311,173 A | 5/1994 | Komura et al. |
| 5,311,516 A | 5/1994 | Kuznicki et al. |
| 5,314,037 A | 5/1994 | Shaw et al. |
| 5,315,302 A | 5/1994 | Katsukura et al. |
| 5,315,670 A | 5/1994 | Shapiro |
| 5,317,320 A | 5/1994 | Grover et al. |
| 5,317,321 A | 5/1994 | Sass |
| 5,317,403 A | 5/1994 | Keenan |
| 5,317,647 A | 5/1994 | Pagallo |
| 5,317,677 A | 5/1994 | Dolan et al. |
| 5,319,363 A | 6/1994 | Welch et al. |
| 5,319,445 A | 6/1994 | Fitts |
| 5,319,454 A | 6/1994 | Schutte |
| 5,319,455 A | 6/1994 | Hoarty et al. |
| 5,319,548 A | 6/1994 | Germain |
| 5,319,707 A | 6/1994 | Wasilewski et al. |
| 5,320,356 A | 6/1994 | Cauda |
| 5,320,538 A | 6/1994 | Baum |
| 5,321,241 A | 6/1994 | Craine |
| 5,323,234 A | 6/1994 | Kawasaki |
| 5,323,240 A | 6/1994 | Amano et al. |
| 5,323,321 A | 6/1994 | Smith, Jr. |
| 5,323,322 A | 6/1994 | Mueller et al. |
| 5,324,028 A | 6/1994 | Luna |
| 5,325,183 A | 6/1994 | Rhee |
| 5,325,423 A | 6/1994 | Lewis |
| 5,326,104 A | 7/1994 | Pease et al. |
| 5,327,144 A | 7/1994 | Stilp et al. |
| 5,327,529 A | 7/1994 | Fults et al. |
| 5,329,611 A | 7/1994 | Pechanek et al. |
| 5,331,327 A | 7/1994 | Brocia et al. |
| 5,334,974 A | 8/1994 | Simms et al. |
| 5,334,986 A | 8/1994 | Fernhout |
| 5,335,079 A | 8/1994 | Yuen et al. |
| 5,335,246 A | 8/1994 | Yokev et al. |
| 5,335,277 A | 8/1994 | Harvey et al. |
| 5,337,155 A | 8/1994 | Cornelis |
| 5,337,244 A | 8/1994 | Nobe et al. |
| 5,339,086 A | 8/1994 | DeLuca et al. |
| 5,339,239 A | 8/1994 | Manabe et al. |
| 5,339,392 A | 8/1994 | Risberg et al. |
| 5,341,138 A | 8/1994 | Ono et al. |
| 5,341,140 A | 8/1994 | Perry |
| 5,341,301 A | 8/1994 | Shirai et al. |
| 5,343,239 A | 8/1994 | Lappington et al. |
| 5,343,251 A | 8/1994 | Nafeh |
| 5,343,300 A | 8/1994 | Hennig |
| 5,343,399 A | 8/1994 | Yokoyama et al. |
| 5,343,493 A | 8/1994 | Karimullah |
| 5,345,388 A | 9/1994 | Kashiwazaki |
| 5,345,594 A | 9/1994 | Tsuda |
| 5,347,120 A | 9/1994 | Decker et al. |
| 5,347,285 A | 9/1994 | MacDoran et al. |
| 5,347,286 A | 9/1994 | Babitch |
| 5,347,295 A | 9/1994 | Agulnick et al. |
| 5,347,306 A | 9/1994 | Nitta |
| 5,347,456 A | 9/1994 | Zhang et al. |
| 5,347,477 A | 9/1994 | Lee |
| 5,347,600 A | 9/1994 | Barnsley et al. |
| 5,347,632 A | 9/1994 | Filepp et al. |
| 5,349,531 A | 9/1994 | Sato et al. |
| 5,349,670 A | 9/1994 | Agrawal et al. |
| 5,351,075 A | 9/1994 | Herz et al. |
| 5,351,078 A | 9/1994 | Lemelson |
| 5,351,194 A | 9/1994 | Ross et al. |
| 5,351,235 A | 9/1994 | Lahtinen |
| 5,351,970 A | 10/1994 | Fioretti |

(56) References Cited

U.S. PATENT DOCUMENTS

| | | |
|---|---|---|
| 5,353,023 A | 10/1994 | Mitsugi |
| 5,353,034 A | 10/1994 | Sato et al. |
| 5,353,121 A | 10/1994 | Young et al. |
| 5,353,218 A | 10/1994 | De Lapa et al. |
| 5,355,146 A | 10/1994 | Chiu et al. |
| 5,355,302 A | 10/1994 | Martin et al. |
| 5,355,480 A | 10/1994 | Smith et al. |
| 5,357,276 A | 10/1994 | Banker et al. |
| 5,359,332 A | 10/1994 | Allison et al. |
| 5,359,367 A | 10/1994 | Stockill |
| 5,359,527 A | 10/1994 | Takanabe et al. |
| 5,359,529 A | 10/1994 | Snider |
| 5,360,971 A | 11/1994 | Kaufman et al. |
| 5,361,393 A | 11/1994 | Rossillo |
| 5,363,105 A | 11/1994 | Ono et al. |
| 5,364,093 A | 11/1994 | Huston et al. |
| 5,365,055 A | 11/1994 | Decker et al. |
| 5,365,282 A | 11/1994 | Levine |
| 5,365,447 A | 11/1994 | Dennis |
| 5,365,450 A | 11/1994 | Schuchman et al. |
| 5,365,451 A | 11/1994 | Wang et al. |
| 5,365,516 A | 11/1994 | Jandrell |
| 5,367,453 A | 11/1994 | Capps et al. |
| 5,369,584 A | 11/1994 | Kajiwara |
| 5,369,588 A | 11/1994 | Hayami et al. |
| 5,371,348 A | 12/1994 | Kumar et al. |
| 5,371,551 A | 12/1994 | Logan et al. |
| 5,373,330 A | 12/1994 | Levine |
| 5,373,440 A | 12/1994 | Cohen et al. |
| 5,374,952 A | 12/1994 | Flohr |
| 5,375,059 A | 12/1994 | Kyrtsos et al. |
| 5,375,235 A | 12/1994 | Berry et al. |
| 5,377,317 A | 12/1994 | Bates et al. |
| 5,377,354 A | 12/1994 | Scannell et al. |
| 5,377,706 A | 1/1995 | Huang |
| 5,377,997 A | 1/1995 | Wilden et al. |
| 5,379,224 A | 1/1995 | Brown et al. |
| 5,381,158 A | 1/1995 | Takahara et al. |
| 5,381,338 A | 1/1995 | Wysocki et al. |
| 5,382,957 A | 1/1995 | Blume |
| 5,382,958 A | 1/1995 | FitzGerald |
| 5,382,983 A | 1/1995 | Kwoh et al. |
| 5,383,127 A | 1/1995 | Shibata |
| 5,384,867 A | 1/1995 | Barnsley et al. |
| 5,385,519 A | 1/1995 | Hsu et al. |
| 5,388,147 A | 2/1995 | Grimes |
| 5,388,198 A | 2/1995 | Layman et al. |
| 5,389,824 A | 2/1995 | Moroto et al. |
| 5,389,930 A | 2/1995 | Ono |
| 5,389,934 A | 2/1995 | Kass |
| 5,390,125 A | 2/1995 | Sennott et al. |
| 5,390,238 A | 2/1995 | Kirk et al. |
| 5,390,281 A | 2/1995 | Luciw et al. |
| 5,392,052 A | 2/1995 | Eberwine |
| 5,393,067 A | 2/1995 | Paulsen et al. |
| 5,394,333 A | 2/1995 | Kao |
| 5,396,227 A | 3/1995 | Carroll et al. |
| 5,396,429 A | 3/1995 | Hanchett |
| 5,396,546 A | 3/1995 | Remillard |
| 5,398,074 A | 3/1995 | Duffield et al. |
| 5,398,138 A | 3/1995 | Tomita |
| 5,398,189 A | 3/1995 | Inoue et al. |
| 5,398,190 A | 3/1995 | Wortham |
| 5,398,310 A | 3/1995 | Tchao et al. |
| 5,398,932 A | 3/1995 | Eberhardt et al. |
| 5,400,018 A | 3/1995 | Scholl et al. |
| 5,400,034 A | 3/1995 | Smith |
| 5,400,254 A | 3/1995 | Fujita |
| 5,401,946 A | 3/1995 | Weinblatt |
| 5,402,347 A | 3/1995 | McBurney et al. |
| 5,402,441 A | 3/1995 | Washizu et al. |
| 5,403,015 A | 4/1995 | Forte et al. |
| 5,404,442 A | 4/1995 | Foster et al. |
| 5,404,458 A | 4/1995 | Zetts |
| 5,404,505 A | 4/1995 | Levinson |
| 5,404,579 A | 4/1995 | Obayashi et al. |
| 5,404,661 A | 4/1995 | Sahm et al. |
| 5,405,152 A | 4/1995 | Katanics et al. |
| 5,406,491 A | 4/1995 | Lima |
| 5,406,492 A | 4/1995 | Suzuki |
| 5,408,415 A | 4/1995 | Inoue et al. |
| 5,410,326 A | 4/1995 | Goldstein |
| 5,410,343 A | 4/1995 | Coddington et al. |
| 5,410,344 A | 4/1995 | Graves et al. |
| 5,410,367 A | 4/1995 | Zahavi et al. |
| 5,410,480 A | 4/1995 | Koseki et al. |
| 5,410,643 A | 4/1995 | Yomdin et al. |
| 5,410,750 A | 4/1995 | Cantwell et al. |
| 5,412,573 A | 5/1995 | Barnea et al. |
| 5,412,660 A | 5/1995 | Chen et al. |
| 5,412,720 A | 5/1995 | Hoarty |
| 5,412,773 A | 5/1995 | Carlucci et al. |
| 5,414,432 A | 5/1995 | Penny, Jr. et al. |
| 5,414,756 A | 5/1995 | Levine |
| 5,414,773 A | 5/1995 | Handelman |
| 5,416,508 A | 5/1995 | Sakuma et al. |
| 5,416,695 A | 5/1995 | Stutman et al. |
| 5,416,712 A | 5/1995 | Geier et al. |
| 5,416,856 A | 5/1995 | Jacobs et al. |
| 5,417,210 A | 5/1995 | Funda et al. |
| 5,418,526 A | 5/1995 | Crawford |
| 5,418,537 A | 5/1995 | Bird |
| 5,418,538 A | 5/1995 | Lau |
| 5,418,622 A | 5/1995 | Takeuchi |
| 5,418,684 A | 5/1995 | Koenck et al. |
| 5,418,717 A | 5/1995 | Su et al. |
| 5,418,951 A | 5/1995 | Damashek |
| 5,420,592 A | 5/1995 | Johnson |
| 5,420,593 A | 5/1995 | Niles |
| 5,420,594 A | 5/1995 | FitzGerald et al. |
| 5,420,647 A | 5/1995 | Levine |
| 5,420,794 A | 5/1995 | James |
| 5,420,825 A | 5/1995 | Fischer et al. |
| 5,420,975 A | 5/1995 | Blades et al. |
| 5,421,008 A | 5/1995 | Banning et al. |
| 5,422,624 A | 6/1995 | Smith |
| 5,422,813 A | 6/1995 | Schuchman et al. |
| 5,422,816 A | 6/1995 | Sprague et al. |
| 5,423,554 A | 6/1995 | Davis |
| 5,424,951 A | 6/1995 | Nobe et al. |
| 5,425,058 A | 6/1995 | Mui |
| 5,425,100 A | 6/1995 | Thomas et al. |
| 5,425,890 A | 6/1995 | Yudin et al. |
| 5,426,594 A | 6/1995 | Wright et al. |
| 5,426,732 A | 6/1995 | Boies et al. |
| 5,428,559 A | 6/1995 | Kano |
| 5,428,606 A | 6/1995 | Moskowitz |
| 5,428,636 A | 6/1995 | Meier |
| 5,428,727 A | 6/1995 | Kurosu et al. |
| 5,428,730 A | 6/1995 | Baker et al. |
| 5,428,774 A | 6/1995 | Takahashi et al. |
| 5,429,361 A | 7/1995 | Raven et al. |
| 5,430,552 A | 7/1995 | O'Callaghan |
| 5,430,558 A | 7/1995 | Sohaei et al. |
| 5,430,653 A | 7/1995 | Inoue |
| 5,430,812 A | 7/1995 | Barnsley et al. |
| 5,430,948 A | 7/1995 | Vander Wal, III |
| 5,431,407 A | 7/1995 | Hofberg et al. |
| 5,432,520 A | 7/1995 | Schneider et al. |
| 5,432,542 A | 7/1995 | Thibadeau et al. |
| 5,432,561 A | 7/1995 | Strubbe |
| 5,432,841 A | 7/1995 | Rimer |
| 5,432,902 A | 7/1995 | Matsumoto |
| 5,432,932 A | 7/1995 | Chen et al. |
| 5,433,446 A | 7/1995 | Lindstedt, Jr. |
| 5,434,574 A | 7/1995 | Hayashi et al. |
| 5,434,777 A | 7/1995 | Luciw |
| 5,434,787 A | 7/1995 | Okamoto et al. |
| 5,434,788 A | 7/1995 | Seymour et al. |
| 5,434,789 A | 7/1995 | Fraker et al. |
| 5,434,933 A | 7/1995 | Karnin et al. |
| 5,434,966 A | 7/1995 | Nakazawa et al. |
| 5,434,978 A | 7/1995 | Dockter et al. |
| 5,436,653 A | 7/1995 | Ellis et al. |

(56) References Cited

U.S. PATENT DOCUMENTS

| | | |
|---|---|---|
| 5,436,834 A | 7/1995 | Graf et al. |
| 5,437,462 A | 8/1995 | Breeding |
| 5,438,357 A | 8/1995 | McNelley |
| 5,438,361 A | 8/1995 | Coleman |
| 5,438,630 A | 8/1995 | Chen et al. |
| 5,438,687 A | 8/1995 | Suchowerskyj et al. |
| 5,440,262 A | 8/1995 | Lum et al. |
| 5,440,400 A | 8/1995 | Micheron et al. |
| 5,440,678 A | 8/1995 | Eisen et al. |
| 5,441,047 A | 8/1995 | David et al. |
| 5,442,363 A | 8/1995 | Remondi |
| 5,442,389 A | 8/1995 | Blahut et al. |
| 5,442,553 A | 8/1995 | Parrillo |
| 5,442,557 A | 8/1995 | Kaneko |
| 5,442,771 A | 8/1995 | Filepp et al. |
| 5,444,450 A | 8/1995 | Olds et al. |
| 5,444,499 A | 8/1995 | Saitoh |
| 5,444,779 A | 8/1995 | Daniele |
| 5,446,659 A | 8/1995 | Yamawaki |
| 5,446,736 A | 8/1995 | Gleeson et al. |
| 5,446,891 A | 8/1995 | Kaplan et al. |
| 5,446,919 A | 8/1995 | Wilkins |
| 5,446,923 A | 8/1995 | Martinson et al. |
| 5,448,638 A | 9/1995 | Johnson et al. |
| 5,450,329 A | 9/1995 | Tanner |
| 5,450,490 A | 9/1995 | Jensen et al. |
| 5,451,964 A | 9/1995 | Babu |
| 5,452,217 A | 9/1995 | Kishi et al. |
| 5,452,442 A | 9/1995 | Kephart |
| 5,454,043 A | 9/1995 | Freeman |
| 5,455,570 A | 10/1995 | Cook et al. |
| 5,455,892 A | 10/1995 | Minot et al. |
| 5,458,123 A | 10/1995 | Unger |
| 5,459,304 A | 10/1995 | Eisenmann |
| 5,459,306 A | 10/1995 | Stein et al. |
| 5,459,517 A | 10/1995 | Kunitake et al. |
| 5,459,522 A | 10/1995 | Pint |
| 5,459,660 A | 10/1995 | Berra |
| 5,459,667 A | 10/1995 | Odagaki et al. |
| 5,461,365 A | 10/1995 | Schlager et al. |
| 5,461,383 A | 10/1995 | Ono et al. |
| 5,461,415 A | 10/1995 | Wolf et al. |
| 5,461,699 A | 10/1995 | Arbabi et al. |
| 5,462,275 A | 10/1995 | Lowe et al. |
| 5,462,473 A | 10/1995 | Sheller |
| 5,464,946 A | 11/1995 | Lewis |
| 5,465,079 A | 11/1995 | Bouchard et al. |
| 5,465,089 A | 11/1995 | Nakatani et al. |
| 5,465,113 A | 11/1995 | Gilboy |
| 5,465,204 A | 11/1995 | Sekine et al. |
| 5,465,308 A | 11/1995 | Hutcheson et al. |
| 5,465,325 A | 11/1995 | Capps et al. |
| 5,465,353 A | 11/1995 | Hull et al. |
| 5,465,358 A | 11/1995 | Blades et al. |
| 5,465,385 A | 11/1995 | Ohga et al. |
| 5,465,413 A | 11/1995 | Enge et al. |
| 5,467,264 A | 11/1995 | Rauch et al. |
| 5,467,425 A | 11/1995 | Lau et al. |
| 5,469,206 A | 11/1995 | Strubbe et al. |
| 5,469,371 A | 11/1995 | Bass |
| 5,469,740 A | 11/1995 | French et al. |
| 5,471,214 A | 11/1995 | Faibish et al. |
| 5,471,218 A | 11/1995 | Talbot et al. |
| 5,471,629 A | 11/1995 | Risch |
| 5,473,466 A | 12/1995 | Tanielian et al. |
| 5,473,538 A | 12/1995 | Fujita et al. |
| 5,473,602 A | 12/1995 | McKenna et al. |
| 5,475,597 A | 12/1995 | Buck |
| 5,475,651 A | 12/1995 | Bishop et al. |
| 5,475,687 A | 12/1995 | Markkula, Jr. et al. |
| 5,477,228 A | 12/1995 | Tiwari et al. |
| 5,477,262 A | 12/1995 | Banker et al. |
| 5,477,447 A | 12/1995 | Luciw et al. |
| 5,479,264 A | 12/1995 | Ueda et al. |
| 5,479,266 A | 12/1995 | Young et al. |
| 5,479,268 A | 12/1995 | Young et al. |
| 5,479,408 A | 12/1995 | Will |
| 5,479,479 A | 12/1995 | Braitberg et al. |
| 5,479,482 A | 12/1995 | Grimes |
| 5,479,497 A | 12/1995 | Kovarik |
| 5,479,932 A | 1/1996 | Higgins et al. |
| 5,481,278 A | 1/1996 | Shigematsu et al. |
| 5,481,294 A | 1/1996 | Thomas et al. |
| 5,481,296 A | 1/1996 | Cragun et al. |
| 5,481,542 A | 1/1996 | Logston et al. |
| 5,481,712 A | 1/1996 | Silver et al. |
| 5,483,234 A | 1/1996 | Carreel et al. |
| 5,483,278 A | 1/1996 | Strubbe et al. |
| 5,483,466 A | 1/1996 | Kawahara et al. |
| 5,483,827 A | 1/1996 | Kulka et al. |
| 5,485,161 A | 1/1996 | Vaughn |
| 5,485,163 A | 1/1996 | Singer et al. |
| 5,485,197 A | 1/1996 | Hoarty |
| 5,485,219 A | 1/1996 | Woo |
| 5,485,221 A | 1/1996 | Banker et al. |
| 5,485,518 A | 1/1996 | Hunter et al. |
| 5,485,565 A | 1/1996 | Saund et al. |
| 5,486,822 A | 1/1996 | Tenmoku et al. |
| 5,487,132 A | 1/1996 | Cheng |
| 5,488,196 A | 1/1996 | Zimmerman et al. |
| 5,488,409 A | 1/1996 | Yuen et al. |
| 5,488,425 A | 1/1996 | Grimes |
| 5,488,484 A | 1/1996 | Miyano |
| 5,490,208 A | 2/1996 | Remillard |
| 5,491,517 A | 2/1996 | Kreitman et al. |
| 5,493,692 A | 2/1996 | Theimer et al. |
| 5,495,292 A | 2/1996 | Zhang et al. |
| 5,495,537 A | 2/1996 | Bedrosian et al. |
| 5,495,576 A | 2/1996 | Ritchey |
| 5,495,609 A | 2/1996 | Scott |
| 5,496,177 A | 3/1996 | Collia et al. |
| 5,497,314 A | 3/1996 | Novak |
| 5,497,479 A | 3/1996 | Hornbuckle |
| 5,498,003 A | 3/1996 | Gechter |
| 5,498,711 A | 3/1996 | Highsmith et al. |
| 5,499,103 A | 3/1996 | Mankovitz |
| 5,499,108 A | 3/1996 | Cotte et al. |
| 5,500,671 A | 3/1996 | Andersson et al. |
| 5,500,741 A | 3/1996 | Baik et al. |
| 5,500,920 A | 3/1996 | Kupiec |
| 5,500,937 A | 3/1996 | Thompson-Rohrlich |
| 5,502,504 A | 3/1996 | Marshall et al. |
| 5,502,774 A | 3/1996 | Bellegarda et al. |
| 5,502,803 A | 3/1996 | Yoshida et al. |
| 5,504,482 A | 4/1996 | Schreder |
| 5,504,491 A | 4/1996 | Chapman |
| 5,504,518 A | 4/1996 | Ellis et al. |
| 5,504,675 A | 4/1996 | Cragun et al. |
| 5,505,449 A | 4/1996 | Eberhardt et al. |
| 5,506,584 A | 4/1996 | Boles |
| 5,506,768 A | 4/1996 | Seem et al. |
| 5,506,886 A | 4/1996 | Maine et al. |
| 5,506,897 A | 4/1996 | Moore et al. |
| 5,506,963 A | 4/1996 | Ducateau et al. |
| 5,507,491 A | 4/1996 | Gatto et al. |
| 5,508,731 A | 4/1996 | Kohorn |
| 5,508,815 A | 4/1996 | Levine |
| 5,509,009 A | 4/1996 | Laycock et al. |
| 5,510,793 A | 4/1996 | Gregg, III et al. |
| 5,510,798 A | 4/1996 | Bauer |
| 5,510,838 A | 4/1996 | Yomdin et al. |
| 5,511,134 A | 4/1996 | Kuratomi et al. |
| 5,511,153 A | 4/1996 | Azarbayejani et al. |
| 5,511,160 A | 4/1996 | Robson |
| 5,512,707 A | 4/1996 | Ohshima |
| 5,512,908 A | 4/1996 | Herrick |
| 5,512,935 A | 4/1996 | Majeti et al. |
| 5,512,963 A | 4/1996 | Mankovitz |
| 5,513,110 A | 4/1996 | Fujita et al. |
| 5,513,254 A | 4/1996 | Markowitz |
| 5,515,042 A | 5/1996 | Nelson |
| 5,515,043 A | 5/1996 | Berard et al. |
| 5,515,098 A | 5/1996 | Carles |
| 5,515,099 A | 5/1996 | Cortjens et al. |

(56) References Cited

U.S. PATENT DOCUMENTS

| | | |
|---|---|---|
| 5,515,106 A | 5/1996 | Chaney et al. |
| 5,515,173 A | 5/1996 | Mankovitz et al. |
| 5,515,284 A | 5/1996 | Abe |
| 5,515,285 A | 5/1996 | Garrett, Sr. et al. |
| 5,515,419 A | 5/1996 | Sheffer |
| 5,515,453 A | 5/1996 | Hennessey et al. |
| 5,515,471 A | 5/1996 | Yamamoto et al. |
| 5,515,511 A | 5/1996 | Nguyen et al. |
| 5,515,972 A | 5/1996 | Shames |
| 5,516,105 A | 5/1996 | Eisenbrey et al. |
| 5,517,199 A | 5/1996 | DiMattei |
| 5,517,254 A | 5/1996 | Monta et al. |
| 5,517,256 A | 5/1996 | Hashimoto |
| 5,517,257 A | 5/1996 | Dunn et al. |
| 5,517,331 A | 5/1996 | Murai et al. |
| 5,517,578 A | 5/1996 | Altman et al. |
| 5,517,598 A | 5/1996 | Sirat |
| 5,519,403 A | 5/1996 | Bickley et al. |
| 5,519,452 A | 5/1996 | Parulski |
| 5,519,620 A | 5/1996 | Talbot et al. |
| 5,519,718 A | 5/1996 | Yokev et al. |
| 5,519,760 A | 5/1996 | Borkowski et al. |
| 5,521,696 A | 5/1996 | Dunne |
| 5,521,841 A | 5/1996 | Arman et al. |
| 5,521,984 A | 5/1996 | Denenberg et al. |
| 5,522,155 A | 6/1996 | Jones |
| 5,522,798 A | 6/1996 | Johnson et al. |
| 5,523,796 A | 6/1996 | Marshall et al. |
| 5,523,950 A | 6/1996 | Peterson |
| 5,524,065 A | 6/1996 | Yagasaki |
| 5,524,195 A | 6/1996 | Clanton, III et al. |
| 5,524,637 A | 6/1996 | Erickson |
| 5,525,989 A | 6/1996 | Holt |
| 5,525,996 A | 6/1996 | Aker et al. |
| 5,526,034 A | 6/1996 | Hoarty et al. |
| 5,526,035 A | 6/1996 | Lappington et al. |
| 5,526,041 A | 6/1996 | Glatt |
| 5,526,127 A | 6/1996 | Yonetani et al. |
| 5,526,405 A | 6/1996 | Toda |
| 5,526,427 A | 6/1996 | Thomas et al. |
| 5,526,479 A | 6/1996 | Barstow et al. |
| 5,528,234 A | 6/1996 | Mani et al. |
| 5,528,245 A | 6/1996 | Aker et al. |
| 5,528,246 A | 6/1996 | Henderson et al. |
| 5,528,248 A | 6/1996 | Steiner et al. |
| 5,528,304 A | 6/1996 | Cherrick et al. |
| 5,528,391 A | 6/1996 | Elrod |
| 5,528,490 A | 6/1996 | Hill |
| 5,529,138 A | 6/1996 | Shaw et al. |
| 5,529,139 A | 6/1996 | Kurahashi et al. |
| 5,529,660 A | 6/1996 | Kogan et al. |
| 5,530,440 A | 6/1996 | Danzer et al. |
| 5,530,447 A | 6/1996 | Henderson et al. |
| 5,530,655 A | 6/1996 | Lokhoff et al. |
| 5,530,852 A | 6/1996 | Meske, Jr. et al. |
| 5,530,914 A | 6/1996 | McPheters |
| 5,532,469 A | 7/1996 | Shepard et al. |
| 5,532,706 A | 7/1996 | Reinhardt et al. |
| 5,532,732 A | 7/1996 | Yuen et al. |
| 5,532,754 A | 7/1996 | Young et al. |
| 5,532,923 A | 7/1996 | Sone |
| 5,533,141 A | 7/1996 | Futatsugi et al. |
| 5,534,697 A | 7/1996 | Creekmore et al. |
| 5,534,911 A | 7/1996 | Levitan |
| 5,534,917 A | 7/1996 | MacDougall |
| 5,535,302 A | 7/1996 | Tsao |
| 5,535,321 A | 7/1996 | Massaro et al. |
| 5,535,323 A | 7/1996 | Miller et al. |
| 5,535,380 A | 7/1996 | Bergkvist, Jr. et al. |
| 5,537,141 A | 7/1996 | Harper et al. |
| 5,537,472 A | 7/1996 | Estevez-Alcolado et al. |
| 5,537,528 A | 7/1996 | Takahashi et al. |
| 5,537,586 A | 7/1996 | Amram et al. |
| 5,538,181 A * | 7/1996 | Simmons et al. ............. 236/51 |
| 5,539,395 A | 7/1996 | Buss et al. |
| 5,539,398 A | 7/1996 | Hall et al. |
| 5,539,427 A | 7/1996 | Bricklin et al. |
| 5,539,449 A | 7/1996 | Blahut et al. |
| 5,539,450 A | 7/1996 | Handelman |
| 5,539,645 A | 7/1996 | Mandhyan et al. |
| 5,539,822 A | 7/1996 | Lett |
| 5,539,829 A | 7/1996 | Lokhoff et al. |
| 5,541,419 A | 7/1996 | Arackellian |
| 5,541,590 A | 7/1996 | Nishio |
| 5,541,606 A | 7/1996 | Lennen |
| 5,541,638 A | 7/1996 | Story |
| 5,541,662 A | 7/1996 | Adams et al. |
| 5,541,738 A | 7/1996 | Mankovitz |
| 5,542,102 A | 7/1996 | Smith et al. |
| 5,543,591 A | 8/1996 | Gillespie et al. |
| 5,543,789 A | 8/1996 | Behr et al. |
| 5,543,856 A | 8/1996 | Rosser et al. |
| 5,543,929 A | 8/1996 | Mankovitz et al. |
| 5,544,225 A | 8/1996 | Kennedy, III et al. |
| 5,544,254 A | 8/1996 | Hartley et al. |
| 5,544,358 A | 8/1996 | Capps et al. |
| 5,544,661 A | 8/1996 | Davis et al. |
| 5,544,892 A | 8/1996 | Breeding |
| 5,546,445 A | 8/1996 | Dennison et al. |
| 5,546,475 A | 8/1996 | Bolle et al. |
| 5,546,518 A | 8/1996 | Blossom et al. |
| 5,548,322 A | 8/1996 | Zhou |
| 5,548,345 A | 8/1996 | Brian et al. |
| 5,548,515 A | 8/1996 | Pilley et al. |
| 5,548,645 A | 8/1996 | Ananda |
| 5,548,667 A | 8/1996 | Tu |
| 5,549,300 A | 8/1996 | Sardarian |
| 5,550,055 A | 8/1996 | Reinherz et al. |
| 5,550,551 A | 8/1996 | Alesio |
| 5,550,575 A | 8/1996 | West et al. |
| 5,550,576 A | 8/1996 | Klosterman |
| 5,550,578 A | 8/1996 | Hoarty et al. |
| 5,550,863 A | 8/1996 | Yurt et al. |
| 5,550,928 A | 8/1996 | Lu et al. |
| 5,550,930 A | 8/1996 | Berman et al. |
| 5,550,965 A | 8/1996 | Gabbe et al. |
| 5,552,773 A | 9/1996 | Kuhnert |
| 5,552,833 A | 9/1996 | Henmi et al. |
| 5,553,076 A | 9/1996 | Behtash et al. |
| 5,553,123 A | 9/1996 | Chan et al. |
| 5,553,221 A | 9/1996 | Reimer et al. |
| 5,553,277 A | 9/1996 | Hirano et al. |
| 5,553,609 A | 9/1996 | Chen et al. |
| 5,554,983 A | 9/1996 | Kitamura et al. |
| 5,555,286 A | 9/1996 | Tendler |
| 5,555,363 A | 9/1996 | Tou et al. |
| 5,555,416 A | 9/1996 | Owens et al. |
| 5,555,443 A | 9/1996 | Ikehama |
| 5,555,495 A | 9/1996 | Bell et al. |
| 5,556,749 A | 9/1996 | Mitsuhashi et al. |
| 5,557,254 A | 9/1996 | Johnson et al. |
| 5,557,338 A | 9/1996 | Maze et al. |
| 5,557,658 A | 9/1996 | Gregorek et al. |
| 5,557,721 A | 9/1996 | Fite et al. |
| 5,557,724 A | 9/1996 | Sampat et al. |
| 5,557,728 A | 9/1996 | Garrett et al. |
| 5,557,765 A | 9/1996 | Lipner et al. |
| 5,559,312 A | 9/1996 | Lucero |
| 5,559,508 A | 9/1996 | Orr et al. |
| 5,559,548 A | 9/1996 | Davis et al. |
| 5,559,549 A | 9/1996 | Hendricks et al. |
| 5,559,550 A | 9/1996 | Mankovitz |
| 5,559,707 A | 9/1996 | DeLorme et al. |
| 5,559,945 A | 9/1996 | Beaudet et al. |
| 5,560,011 A | 9/1996 | Uyama |
| 5,561,649 A | 10/1996 | Lee et al. |
| 5,561,704 A | 10/1996 | Salimando |
| 5,561,707 A | 10/1996 | Katz |
| 5,561,709 A | 10/1996 | Remillard |
| 5,561,718 A | 10/1996 | Trew et al. |
| 5,561,796 A | 10/1996 | Sakamoto et al. |
| 5,563,607 A | 10/1996 | Loomis et al. |
| 5,563,665 A | 10/1996 | Chang |
| 5,563,786 A | 10/1996 | Torii |

(56) References Cited

U.S. PATENT DOCUMENTS

| | | |
|---|---|---|
| 5,563,928 A | 10/1996 | Rostoker et al. |
| 5,563,948 A | 10/1996 | Diehl et al. |
| 5,563,988 A | 10/1996 | Maes et al. |
| 5,563,996 A | 10/1996 | Tchao |
| 5,564,001 A | 10/1996 | Lewis |
| 5,564,038 A | 10/1996 | Grantz et al. |
| 5,565,874 A | 10/1996 | Rode |
| 5,565,909 A | 10/1996 | Thibadeau et al. |
| 5,565,910 A | 10/1996 | Rowse et al. |
| 5,566,274 A | 10/1996 | Ishida et al. |
| 5,567,988 A | 10/1996 | Rostoker et al. |
| 5,568,153 A | 10/1996 | Beliveau |
| 5,568,272 A | 10/1996 | Levine |
| 5,568,390 A | 10/1996 | Hirota et al. |
| 5,568,450 A | 10/1996 | Grande et al. |
| 5,568,452 A | 10/1996 | Kronenberg |
| 5,569,082 A | 10/1996 | Kaye |
| 5,570,113 A | 10/1996 | Zetts |
| 5,570,295 A | 10/1996 | Isenberg et al. |
| 5,570,415 A | 10/1996 | Stretton et al. |
| 5,572,201 A | 11/1996 | Graham et al. |
| 5,572,204 A | 11/1996 | Timm et al. |
| 5,572,246 A | 11/1996 | Ellis et al. |
| 5,572,401 A | 11/1996 | Carroll |
| 5,572,428 A | 11/1996 | Ishida et al. |
| 5,572,442 A | 11/1996 | Schulhof et al. |
| 5,572,528 A | 11/1996 | Shuen |
| 5,572,604 A | 11/1996 | Simard |
| 5,572,643 A | 11/1996 | Judson |
| 5,574,804 A | 11/1996 | Olschafskie et al. |
| 5,574,845 A | 11/1996 | Benson et al. |
| 5,574,963 A | 11/1996 | Weinblatt et al. |
| 5,576,642 A | 11/1996 | Nguyen et al. |
| 5,576,716 A | 11/1996 | Sadler |
| 5,576,755 A | 11/1996 | Davis et al. |
| 5,576,950 A | 11/1996 | Tonomura et al. |
| 5,576,951 A | 11/1996 | Lockwood |
| 5,576,952 A | 11/1996 | Stutman et al. |
| 5,577,266 A | 11/1996 | Takahisa et al. |
| 5,577,981 A | 11/1996 | Jarvik |
| 5,579,013 A | 11/1996 | Hershey et al. |
| 5,579,239 A | 11/1996 | Freeman et al. |
| 5,579,285 A | 11/1996 | Hubert |
| 5,579,471 A | 11/1996 | Barber et al. |
| 5,579,535 A | 11/1996 | Orlen et al. |
| 5,579,537 A | 11/1996 | Takahisa |
| 5,580,249 A | 12/1996 | Jacobsen et al. |
| 5,581,276 A | 12/1996 | Cipolla et al. |
| 5,581,462 A | 12/1996 | Rogers |
| 5,581,479 A | 12/1996 | McLaughlin et al. |
| 5,581,658 A | 12/1996 | O'Hagan et al. |
| 5,581,665 A | 12/1996 | Sugiura et al. |
| 5,581,670 A | 12/1996 | Bier et al. |
| 5,581,681 A | 12/1996 | Tchao et al. |
| 5,581,764 A | 12/1996 | Fitzgerald et al. |
| 5,581,800 A | 12/1996 | Fardeau et al. |
| 5,583,542 A | 12/1996 | Capps et al. |
| 5,583,543 A | 12/1996 | Takahashi et al. |
| 5,583,560 A | 12/1996 | Florin et al. |
| 5,583,561 A | 12/1996 | Baker et al. |
| 5,583,563 A | 12/1996 | Wanderscheid et al. |
| 5,583,653 A | 12/1996 | Timmermans |
| 5,583,763 A | 12/1996 | Atcheson et al. |
| 5,583,774 A | 12/1996 | Diesel |
| 5,583,776 A | 12/1996 | Levi et al. |
| 5,583,966 A | 12/1996 | Nakajima |
| 5,583,980 A | 12/1996 | Anderson |
| 5,584,050 A | 12/1996 | Lyons |
| 5,585,798 A | 12/1996 | Yoshioka et al. |
| 5,585,838 A | 12/1996 | Lawler et al. |
| 5,585,858 A | 12/1996 | Harper et al. |
| 5,585,865 A | 12/1996 | Amano et al. |
| 5,585,866 A | 12/1996 | Miller et al. |
| 5,585,958 A | 12/1996 | Giraud |
| 5,586,024 A | 12/1996 | Shaibani |
| 5,586,025 A | 12/1996 | Tsuji et al. |
| 5,586,218 A | 12/1996 | Allen |
| 5,586,257 A | 12/1996 | Perlman |
| 5,586,317 A | 12/1996 | Smith |
| 5,586,766 A | 12/1996 | Forte et al. |
| 5,586,936 A | 12/1996 | Bennett et al. |
| 5,586,937 A | 12/1996 | Menashe |
| 5,588,074 A | 12/1996 | Sugiyama |
| 5,588,148 A | 12/1996 | Landis et al. |
| 5,588,650 A | 12/1996 | Eman et al. |
| 5,589,892 A | 12/1996 | Knee et al. |
| 5,590,219 A | 12/1996 | Gourdol |
| 5,590,256 A | 12/1996 | Tchao et al. |
| 5,592,212 A | 1/1997 | Handelman |
| 5,592,482 A | 1/1997 | Abraham |
| 5,592,549 A | 1/1997 | Nagel et al. |
| 5,592,551 A | 1/1997 | Lett et al. |
| 5,592,560 A | 1/1997 | Deaton et al. |
| 5,592,566 A | 1/1997 | Pagallo et al. |
| 5,593,349 A | 1/1997 | Miguel et al. |
| 5,594,469 A | 1/1997 | Freeman et al. |
| 5,594,490 A | 1/1997 | Dawson et al. |
| 5,594,509 A | 1/1997 | Florin et al. |
| 5,594,640 A | 1/1997 | Capps et al. |
| 5,594,661 A | 1/1997 | Bruner et al. |
| 5,594,780 A | 1/1997 | Wiedeman et al. |
| 5,594,810 A | 1/1997 | Gourdol |
| 5,594,911 A | 1/1997 | Cruz et al. |
| 5,595,445 A | 1/1997 | Bobry |
| 5,596,373 A | 1/1997 | White et al. |
| 5,596,697 A | 1/1997 | Foster et al. |
| 5,596,705 A | 1/1997 | Reimer et al. |
| 5,597,162 A | 1/1997 | Franklin |
| 5,597,307 A | 1/1997 | Redford et al. |
| 5,597,309 A | 1/1997 | Riess |
| 5,598,456 A | 1/1997 | Feinberg |
| 5,598,460 A | 1/1997 | Tendler |
| 5,600,364 A | 2/1997 | Hendricks et al. |
| 5,600,366 A | 2/1997 | Schulman |
| 5,600,561 A | 2/1997 | Okamura |
| 5,600,573 A | 2/1997 | Hendricks et al. |
| 5,600,646 A | 2/1997 | Polomski |
| 5,600,711 A | 2/1997 | Yuen |
| 5,600,733 A | 2/1997 | MacDonald et al. |
| 5,600,765 A | 2/1997 | Ando et al. |
| 5,600,775 A | 2/1997 | King et al. |
| 5,600,781 A | 2/1997 | Root et al. |
| 5,602,376 A | 2/1997 | Coleman et al. |
| 5,602,570 A | 2/1997 | Capps et al. |
| 5,602,582 A | 2/1997 | Wanderscheid et al. |
| 5,602,739 A | 2/1997 | Haagenstad et al. |
| 5,603,502 A | 2/1997 | Nakagawa |
| 5,604,542 A | 2/1997 | Dedrick |
| 5,604,820 A | 2/1997 | Ono |
| 5,604,823 A | 2/1997 | Ono |
| 5,605,334 A | 2/1997 | McCrea, Jr. |
| 5,606,374 A | 2/1997 | Bertram |
| 5,606,506 A | 2/1997 | Kyrtsos |
| 5,606,618 A | 2/1997 | Lokhoff et al. |
| 5,606,655 A | 2/1997 | Arman et al. |
| 5,606,726 A | 2/1997 | Yoshinobu |
| 5,608,624 A | 3/1997 | Luciw |
| 5,608,778 A | 3/1997 | Partridge, III |
| 5,610,653 A | 3/1997 | Abecassis |
| 5,610,815 A | 3/1997 | Gudat et al. |
| 5,610,821 A | 3/1997 | Gazis et al. |
| 5,610,984 A | 3/1997 | Lennen |
| 5,611,020 A | 3/1997 | Bigus |
| 5,611,730 A | 3/1997 | Weiss |
| 5,612,719 A | 3/1997 | Beernink et al. |
| 5,613,032 A | 3/1997 | Cruz et al. |
| 5,613,190 A | 3/1997 | Hylton |
| 5,613,191 A | 3/1997 | Hylton et al. |
| 5,613,912 A | 3/1997 | Slater |
| 5,614,940 A | 3/1997 | Cobbley et al. |
| 5,615,109 A | 3/1997 | Eder |
| 5,615,116 A | 3/1997 | Gudat et al. |
| 5,615,175 A | 3/1997 | Carter et al. |
| 5,616,078 A | 4/1997 | Oh |

(56) References Cited

U.S. PATENT DOCUMENTS

| | | | |
|---|---|---|---|
| 5,616,876 A | 4/1997 | Cluts | |
| 5,617,085 A | 4/1997 | Tsutsumi et al. | |
| 5,617,312 A | 4/1997 | Iura et al. | |
| 5,617,371 A | 4/1997 | Williams | |
| 5,617,483 A | 4/1997 | Osawa | |
| 5,617,526 A | 4/1997 | Oran et al. | |
| 5,617,565 A | 4/1997 | Augenbraun et al. | |
| 5,619,247 A | 4/1997 | Russo | |
| 5,619,249 A | 4/1997 | Billock et al. | |
| 5,619,274 A | 4/1997 | Roop et al. | |
| 5,619,710 A | 4/1997 | Travis, Jr. et al. | |
| 5,621,416 A | 4/1997 | Lennen | |
| 5,621,454 A | 4/1997 | Ellis et al. | |
| 5,621,456 A | 4/1997 | Florin et al. | |
| 5,621,484 A | 4/1997 | Cotty | |
| 5,621,579 A | 4/1997 | Yuen | |
| 5,621,662 A | 4/1997 | Humphries et al. | |
| 5,621,793 A | 4/1997 | Bednarek et al. | |
| 5,621,903 A | 4/1997 | Luciw et al. | |
| 5,623,494 A | 4/1997 | Rostoker et al. | |
| 5,623,601 A | 4/1997 | Vu | |
| 5,623,613 A | 4/1997 | Rowe et al. | |
| 5,624,265 A | 4/1997 | Redford et al. | |
| 5,624,316 A | 4/1997 | Roskowski et al. | |
| 5,625,406 A | 4/1997 | Newberry et al. | |
| 5,625,464 A | 4/1997 | Compoint et al. | |
| 5,625,668 A | 4/1997 | Loomis et al. | |
| 5,625,693 A | 4/1997 | Rohatgi et al. | |
| 5,625,711 A | 4/1997 | Nicholson et al. | |
| 5,625,715 A | 4/1997 | Trew et al. | |
| 5,625,783 A | 4/1997 | Ezekiel et al. | |
| 5,625,814 A | 4/1997 | Luciw | |
| 5,625,833 A | 4/1997 | Levine et al. | |
| 5,627,547 A | 5/1997 | Ramaswamy et al. | |
| 5,627,564 A | 5/1997 | Yang | |
| 5,627,915 A | 5/1997 | Rosser et al. | |
| 5,627,960 A | 5/1997 | Clifford et al. | |
| 5,629,626 A | 5/1997 | Russell et al. | |
| 5,629,693 A | 5/1997 | Janky | |
| 5,629,733 A | 5/1997 | Youman et al. | |
| 5,629,981 A | 5/1997 | Nerlikar | |
| 5,630,119 A | 5/1997 | Aristides et al. | |
| 5,630,159 A | 5/1997 | Zancho | |
| 5,630,204 A | 5/1997 | Hylton et al. | |
| 5,630,206 A | 5/1997 | Urban et al. | |
| 5,630,757 A | 5/1997 | Gagin et al. | |
| 5,631,995 A | 5/1997 | Weissensteiner et al. | |
| 5,632,007 A | 5/1997 | Freeman | |
| 5,632,041 A | 5/1997 | Peterson et al. | |
| 5,633,484 A | 5/1997 | Zancho et al. | |
| 5,633,630 A | 5/1997 | Park | |
| 5,633,872 A | 5/1997 | Dinkins | |
| 5,634,051 A | 5/1997 | Thomson | |
| 5,634,590 A * | 6/1997 | Gorski et al. | 236/47 |
| 5,634,849 A | 6/1997 | Abecassis | |
| 5,635,925 A | 6/1997 | Kishi et al. | |
| 5,635,978 A | 6/1997 | Alten et al. | |
| 5,635,979 A | 6/1997 | Kostreski et al. | |
| 5,635,982 A | 6/1997 | Zhang et al. | |
| 5,635,986 A | 6/1997 | Kim | |
| 5,635,989 A | 6/1997 | Rothmuller | |
| 5,636,276 A | 6/1997 | Brugger | |
| 5,636,346 A | 6/1997 | Saxe | |
| 5,637,826 A | 6/1997 | Bessacini et al. | |
| 5,638,078 A | 6/1997 | Wichtel | |
| 5,638,092 A | 6/1997 | Eng et al. | |
| 5,638,279 A | 6/1997 | Kishi et al. | |
| 5,638,300 A | 6/1997 | Johnson | |
| 5,638,426 A | 6/1997 | Lewis | |
| 5,640,193 A | 6/1997 | Wellner | |
| 5,640,323 A | 6/1997 | Kleimenhagen et al. | |
| 5,640,484 A | 6/1997 | Mankovitz | |
| 5,641,288 A | 6/1997 | Zaenglein, Jr. | |
| 5,642,434 A | 6/1997 | Nakao et al. | |
| 5,643,088 A | 7/1997 | Vaughn et al. | |
| 5,644,354 A | 7/1997 | Thompson et al. |
| 5,644,686 A | 7/1997 | Hekmatpour |
| 5,644,735 A | 7/1997 | Luciw et al. |
| 5,646,603 A | 7/1997 | Nagata et al. |
| 5,646,612 A | 7/1997 | Byon |
| 5,646,843 A | 7/1997 | Gudat et al. |
| 5,648,768 A | 7/1997 | Bouve |
| 5,648,824 A | 7/1997 | Dunn et al. |
| 5,649,060 A | 7/1997 | Ellozy et al. |
| 5,649,061 A | 7/1997 | Smyth |
| 5,649,284 A | 7/1997 | Yoshinobu |
| 5,650,826 A | 7/1997 | Eitz |
| 5,650,831 A | 7/1997 | Farwell |
| 5,651,068 A | 7/1997 | Klemba et al. |
| 5,652,570 A | 7/1997 | Lepkofker |
| 5,652,613 A | 7/1997 | Lazarus et al. |
| 5,652,615 A | 7/1997 | Bryant et al. |
| 5,652,849 A | 7/1997 | Conway et al. |
| 5,652,909 A | 7/1997 | Kodosky |
| 5,654,747 A | 8/1997 | Ottesen et al. |
| 5,654,748 A | 8/1997 | Matthews, III |
| 5,654,771 A | 8/1997 | Tekalp et al. |
| 5,654,886 A | 8/1997 | Zereski, Jr. et al. |
| 5,655,117 A | 8/1997 | Goldberg et al. |
| 5,655,214 A | 8/1997 | Mullett |
| 5,655,966 A | 8/1997 | Werdin, Jr. et al. |
| 5,656,804 A | 8/1997 | Barkan et al. |
| 5,657,072 A | 8/1997 | Aristides et al. |
| 5,657,397 A | 8/1997 | Bokser |
| 5,657,414 A | 8/1997 | Lett et al. |
| 5,659,195 A | 8/1997 | Kaiser et al. |
| 5,659,350 A | 8/1997 | Hendricks et al. |
| 5,659,367 A | 8/1997 | Yuen |
| 5,659,368 A | 8/1997 | Landis |
| 5,659,638 A | 8/1997 | Bengtson |
| 5,659,653 A | 8/1997 | Diehl et al. |
| 5,659,732 A | 8/1997 | Kirsch |
| 5,659,742 A | 8/1997 | Beattie et al. |
| 5,659,793 A | 8/1997 | Escobar et al. |
| 5,660,391 A | 8/1997 | Klasee |
| 5,661,516 A | 8/1997 | Carles |
| 5,661,652 A | 8/1997 | Sprague et al. |
| 5,661,755 A | 8/1997 | Van De Kerkhof et al. |
| 5,663,514 A | 9/1997 | Usa |
| 5,663,733 A | 9/1997 | Lennen |
| 5,663,734 A | 9/1997 | Krasner |
| 5,663,757 A | 9/1997 | Morales |
| 5,663,808 A | 9/1997 | Park |
| 5,664,046 A | 9/1997 | Abecassis |
| 5,664,948 A | 9/1997 | Dimitriadis et al. |
| 5,666,293 A | 9/1997 | Metz et al. |
| 5,666,498 A | 9/1997 | Amro |
| 5,666,645 A | 9/1997 | Thomas et al. |
| 5,668,554 A | 9/1997 | Orr et al. |
| 5,668,573 A | 9/1997 | Favot et al. |
| 5,668,880 A | 9/1997 | Alajajian |
| 5,668,897 A | 9/1997 | Stolfo |
| 5,669,061 A | 9/1997 | Schipper |
| 5,669,817 A | 9/1997 | Tarantino |
| 5,671,343 A | 9/1997 | Kondo et al. |
| 5,671,411 A | 9/1997 | Watts et al. |
| 5,671,607 A | 9/1997 | Clemens et al. |
| 5,673,305 A | 9/1997 | Ross |
| 5,673,322 A | 9/1997 | Pepe et al. |
| 5,675,390 A | 10/1997 | Schindler et al. |
| 5,675,494 A | 10/1997 | Sakurai et al. |
| 5,675,507 A | 10/1997 | Bobo, II |
| 5,675,752 A | 10/1997 | Scott et al. |
| 5,677,684 A | 10/1997 | McArthur |
| 5,677,708 A | 10/1997 | Matthews, III et al. |
| 5,677,710 A | 10/1997 | Thompson-Rohrlich |
| 5,677,837 A | 10/1997 | Reynolds |
| 5,677,981 A | 10/1997 | Kato et al. |
| 5,678,057 A | 10/1997 | Rostoker et al. |
| 5,678,175 A | 10/1997 | Stuart et al. |
| 5,678,182 A | 10/1997 | Miller et al. |
| 5,679,077 A | 10/1997 | Pocock et al. |
| 5,680,607 A | 10/1997 | Brueckheimer |
| 5,682,142 A | 10/1997 | Loosmore et al. |

(56) References Cited

U.S. PATENT DOCUMENTS

| | | | |
|---|---|---|---|
| 5,682,196 A | 10/1997 | Freeman | |
| 5,682,206 A | 10/1997 | Wehmeyer et al. | |
| 5,682,229 A | 10/1997 | Wangler | |
| 5,682,437 A | 10/1997 | Okino et al. | |
| 5,682,439 A | 10/1997 | Beernink et al. | |
| 5,682,525 A | 10/1997 | Bouve et al. | |
| 5,683,082 A | 11/1997 | Takemoto et al. | |
| 5,684,488 A | 11/1997 | Liautaud et al. | |
| 5,684,525 A | 11/1997 | Klosterman | |
| 5,684,526 A | 11/1997 | Yoshinobu | |
| 5,684,860 A | 11/1997 | Milani et al. | |
| 5,684,863 A | 11/1997 | Katz | |
| 5,684,873 A | 11/1997 | Tiilikainen | |
| 5,684,891 A | 11/1997 | Tanaka et al. | |
| 5,684,918 A | 11/1997 | Abecassis | |
| 5,686,910 A | 11/1997 | Timm et al. | |
| 5,686,954 A | 11/1997 | Yoshinobu et al. | |
| 5,687,215 A | 11/1997 | Timm et al. | |
| 5,687,254 A | 11/1997 | Poon et al. | |
| 5,687,331 A | 11/1997 | Volk et al. | |
| 5,687,971 A | 11/1997 | Khaladkar | |
| 5,688,174 A | 11/1997 | Kennedy | |
| 5,689,245 A | 11/1997 | Noreen et al. | |
| 5,689,269 A | 11/1997 | Norris | |
| 5,689,431 A | 11/1997 | Rudow et al. | |
| 5,689,442 A | 11/1997 | Swanson et al. | |
| 5,689,648 A | 11/1997 | Diaz et al. | |
| 5,689,663 A | 11/1997 | Williams | |
| 5,689,666 A | 11/1997 | Berquist et al. | |
| 5,690,582 A | 11/1997 | Ulrich et al. | |
| 5,691,476 A | 11/1997 | Madaras | |
| 5,691,724 A | 11/1997 | Aker et al. | |
| 5,691,903 A | 11/1997 | Racette, III | |
| 5,692,073 A | 11/1997 | Cass | |
| 5,692,214 A | 11/1997 | Levine | |
| 5,694,163 A | 12/1997 | Harrison | |
| 5,694,176 A | 12/1997 | Bruette et al. | |
| 5,694,381 A | 12/1997 | Sako | |
| 5,696,403 A | 12/1997 | Rostoker et al. | |
| 5,696,503 A | 12/1997 | Nasburg | |
| 5,696,695 A | 12/1997 | Ehlers et al. | |
| 5,696,824 A | 12/1997 | Walsh | |
| 5,696,905 A | 12/1997 | Reimer et al. | |
| 5,696,964 A | 12/1997 | Cox et al. | |
| 5,696,965 A | 12/1997 | Dedrick | |
| 5,697,844 A | 12/1997 | Von Kohorn | |
| 5,699,052 A | 12/1997 | Miyahara | |
| 5,699,053 A | 12/1997 | Jonsson | |
| 5,699,056 A | 12/1997 | Yoshida | |
| 5,699,107 A | 12/1997 | Lawler et al. | |
| 5,699,255 A | 12/1997 | Ellis et al. | |
| 5,699,441 A | 12/1997 | Sagawa et al. | |
| 5,699,497 A | 12/1997 | Erdahl et al. | |
| 5,701,120 A | 12/1997 | Perelman et al. | |
| 5,701,328 A | 12/1997 | Schuchman et al. | |
| 5,701,369 A | 12/1997 | Moon et al. | |
| 5,701,383 A | 12/1997 | Russo et al. | |
| 5,701,419 A | 12/1997 | McConnell | |
| 5,701,424 A | 12/1997 | Atkinson | |
| 5,701,497 A | 12/1997 | Yamauchi et al. | |
| 5,702,104 A | 12/1997 | Malek et al. | |
| 5,702,305 A | 12/1997 | Norman et al. | |
| 5,703,367 A | 12/1997 | Hashimoto et al. | |
| 5,704,029 A | 12/1997 | Wright, Jr. | |
| 5,704,837 A | 1/1998 | Iwasaki et al. | |
| 5,706,145 A | 1/1998 | Hindman et al. | |
| 5,706,191 A | 1/1998 | Bassett et al. | |
| 5,706,498 A | 1/1998 | Fujimiya et al. | |
| 5,707,287 A | 1/1998 | McCrea, Jr. | |
| 5,707,289 A | 1/1998 | Watanabe et al. | |
| 5,708,767 A | 1/1998 | Yeo et al. | |
| 5,708,780 A | 1/1998 | Levergood et al. | |
| 5,708,825 A | 1/1998 | Sotomayor | |
| 5,708,845 A | 1/1998 | Wistendahl et al. | |
| 5,709,603 A | 1/1998 | Kaye | |
| 5,710,565 A | 1/1998 | Shirai et al. | |
| 5,710,601 A | 1/1998 | Marshall et al. | |
| 5,710,605 A | 1/1998 | Nelson | |
| 5,710,831 A | 1/1998 | Beernink et al. | |
| 5,710,833 A | 1/1998 | Moghaddam et al. | |
| 5,710,834 A | 1/1998 | Rhoads | |
| 5,710,884 A | 1/1998 | Dedrick | |
| 5,710,918 A | 1/1998 | Lagarde et al. | |
| 5,711,715 A | 1/1998 | Ringo et al. | |
| 5,712,899 A | 1/1998 | Pace, II | |
| 5,712,979 A | 1/1998 | Graber et al. | |
| 5,713,045 A | 1/1998 | Berdahl | |
| 5,713,574 A | 2/1998 | Hughes | |
| 5,713,795 A | 2/1998 | Kohorn | |
| 5,714,698 A | 2/1998 | Tokioka et al. | |
| 5,715,020 A | 2/1998 | Kuroiwa et al. | |
| 5,715,371 A * | 2/1998 | Ahamed et al. | 706/10 |
| 5,715,400 A | 2/1998 | Reimer et al. | |
| 5,715,834 A | 2/1998 | Bergamasco et al. | |
| 5,717,391 A | 2/1998 | Rodriguez | |
| 5,717,452 A | 2/1998 | Janin et al. | |
| 5,717,814 A | 2/1998 | Abecassis | |
| 5,717,846 A | 2/1998 | Iida et al. | |
| 5,717,860 A | 2/1998 | Graber et al. | |
| 5,717,923 A | 2/1998 | Dedrick | |
| 5,718,431 A | 2/1998 | Ornstein | |
| 5,719,579 A | 2/1998 | Torre et al. | |
| 5,719,918 A | 2/1998 | Serbetciouglu et al. | |
| 5,721,781 A | 2/1998 | Deo et al. | |
| 5,721,827 A | 2/1998 | Logan et al. | |
| 5,722,041 A | 2/1998 | Freadman | |
| 5,722,418 A | 3/1998 | Bro | |
| 5,724,070 A | 3/1998 | Denninghoff et al. | |
| 5,724,091 A | 3/1998 | Freeman et al. | |
| 5,724,103 A | 3/1998 | Batchelor | |
| 5,724,106 A | 3/1998 | Autry et al. | |
| 5,724,424 A | 3/1998 | Gifford | |
| 5,724,425 A | 3/1998 | Chang et al. | |
| 5,724,472 A | 3/1998 | Abecassis | |
| 5,724,521 A | 3/1998 | Dedrick | |
| 5,724,567 A | 3/1998 | Rose et al. | |
| 5,724,985 A | 3/1998 | Snell et al. | |
| 5,726,688 A | 3/1998 | Siefert et al. | |
| 5,726,702 A | 3/1998 | Hamaguchi et al. | |
| 5,726,893 A | 3/1998 | Schuchman et al. | |
| 5,726,898 A | 3/1998 | Jacobs | |
| 5,726,911 A | 3/1998 | Canada et al. | |
| 5,727,057 A | 3/1998 | Emery et al. | |
| 5,727,060 A | 3/1998 | Young | |
| 5,729,212 A | 3/1998 | Martin | |
| 5,729,217 A | 3/1998 | Ito et al. | |
| 5,729,279 A | 3/1998 | Fuller | |
| 5,729,741 A | 3/1998 | Liaguno et al. | |
| 5,731,785 A | 3/1998 | Lemelson et al. | |
| 5,731,788 A | 3/1998 | Reeds | |
| 5,731,844 A | 3/1998 | Rauch et al. | |
| 5,732,074 A | 3/1998 | Spaur et al. | |
| 5,732,125 A | 3/1998 | Oyama | |
| 5,732,214 A | 3/1998 | Subrahmanyam | |
| 5,732,227 A | 3/1998 | Kuzunuki et al. | |
| 5,732,338 A | 3/1998 | Schwob | |
| 5,732,949 A | 3/1998 | Josephs | |
| 5,734,337 A | 3/1998 | Kupersmit | |
| 5,734,348 A | 3/1998 | Aoki et al. | |
| 5,734,589 A | 3/1998 | Kostreski et al. | |
| 5,734,699 A | 3/1998 | Lu et al. | |
| 5,734,720 A | 3/1998 | Salganicoff | |
| 5,734,786 A | 3/1998 | Mankovitz | |
| 5,734,831 A | 3/1998 | Sanders | |
| 5,734,853 A | 3/1998 | Hendricks et al. | |
| 5,734,893 A | 3/1998 | Li et al. | |
| 5,734,923 A | 3/1998 | Sagawa et al. | |
| 5,735,525 A | 4/1998 | McCrea, Jr. | |
| 5,735,742 A | 4/1998 | French | |
| 5,737,444 A | 4/1998 | Colla et al. | |
| 5,737,507 A | 4/1998 | Smith | |
| 5,737,529 A | 4/1998 | Dolin, Jr. et al. | |
| 5,737,533 A | 4/1998 | de Hond | |
| 5,737,619 A | 4/1998 | Judson | |

(56) References Cited

U.S. PATENT DOCUMENTS

| | | |
|---|---|---|
| 5,737,700 A | 4/1998 | Cox et al. |
| 5,740,252 A | 4/1998 | Minor et al. |
| 5,740,274 A | 4/1998 | Ono et al. |
| 5,740,369 A | 4/1998 | Yokozawa et al. |
| 5,740,532 A | 4/1998 | Fernandez et al. |
| 5,740,549 A | 4/1998 | Reilly et al. |
| 5,742,086 A | 4/1998 | Rostoker et al. |
| 5,742,289 A | 4/1998 | Naylor et al. |
| 5,742,762 A | 4/1998 | Scholl et al. |
| 5,742,797 A | 4/1998 | Celi, Jr. et al. |
| 5,742,816 A | 4/1998 | Barr et al. |
| 5,742,829 A | 4/1998 | Davis et al. |
| 5,742,845 A | 4/1998 | Wagner |
| 5,742,905 A | 4/1998 | Pepe et al. |
| 5,745,116 A | 4/1998 | Pisutha-Arnond |
| 5,745,126 A | 4/1998 | Jain et al. |
| 5,745,573 A | 4/1998 | Lipner et al. |
| 5,745,640 A | 4/1998 | Ishii et al. |
| 5,745,681 A | 4/1998 | Levine et al. |
| 5,745,710 A | 4/1998 | Clanton, III et al. |
| 5,745,758 A | 4/1998 | Shaw et al. |
| 5,745,759 A | 4/1998 | Hayden et al. |
| 5,746,656 A | 5/1998 | Bezick et al. |
| 5,748,191 A | 5/1998 | Rozak et al. |
| 5,748,716 A | 5/1998 | Levine |
| 5,748,732 A | 5/1998 | Le Berre et al. |
| 5,748,742 A | 5/1998 | Tisdale et al. |
| 5,748,780 A | 5/1998 | Stolfo |
| 5,748,805 A | 5/1998 | Withgott et al. |
| 5,748,867 A | 5/1998 | Cosman et al. |
| 5,748,926 A | 5/1998 | Fukuda et al. |
| 5,749,060 A | 5/1998 | Graf et al. |
| 5,749,075 A | 5/1998 | Toader et al. |
| 5,749,081 A | 5/1998 | Whiteis |
| 5,749,735 A | 5/1998 | Redford et al. |
| 5,749,785 A | 5/1998 | Rossides |
| 5,751,211 A | 5/1998 | Shirai et al. |
| 5,751,282 A | 5/1998 | Girard et al. |
| 5,751,286 A | 5/1998 | Barber et al. |
| 5,751,338 A | 5/1998 | Ludwig, Jr. |
| 5,751,831 A | 5/1998 | Ono |
| 5,751,956 A | 5/1998 | Kirsch |
| 5,752,051 A | 5/1998 | Cohen |
| 5,752,159 A | 5/1998 | Faust et al. |
| 5,752,160 A | 5/1998 | Dunn |
| 5,752,217 A | 5/1998 | Ishizaki et al. |
| 5,753,970 A | 5/1998 | Rostoker |
| 5,754,060 A | 5/1998 | Nguyen et al. |
| 5,754,308 A | 5/1998 | Lopresti et al. |
| 5,754,657 A | 5/1998 | Schipper et al. |
| 5,754,771 A | 5/1998 | Epperson et al. |
| 5,754,938 A | 5/1998 | Herz et al. |
| 5,754,939 A | 5/1998 | Herz et al. |
| 5,755,621 A | 5/1998 | Marks et al. |
| 5,756,981 A | 5/1998 | Roustaei et al. |
| 5,757,916 A | 5/1998 | MacDoran et al. |
| 5,758,068 A | 5/1998 | Brandt et al. |
| 5,758,110 A | 5/1998 | Boss et al. |
| 5,758,257 A | 5/1998 | Herz et al. |
| 5,758,259 A | 5/1998 | Lawler |
| 5,759,101 A | 6/1998 | Von Kohorn |
| 5,760,530 A | 6/1998 | Kolesar |
| 5,760,713 A | 6/1998 | Yokoyama et al. |
| 5,760,739 A | 6/1998 | Pauli |
| 5,760,742 A | 6/1998 | Branch et al. |
| 5,760,821 A | 6/1998 | Ellis et al. |
| 5,761,320 A | 6/1998 | Farinelli et al. |
| 5,761,372 A | 6/1998 | Yoshinobu et al. |
| 5,761,477 A | 6/1998 | Wahbe et al. |
| 5,761,516 A | 6/1998 | Rostoker et al. |
| 5,761,606 A | 6/1998 | Wolzien |
| 5,761,655 A | 6/1998 | Hoffman |
| 5,761,662 A | 6/1998 | Dasan |
| 5,764,139 A | 6/1998 | Nojima et al. |
| 5,764,770 A | 6/1998 | Schipper et al. |
| 5,764,794 A | 6/1998 | Perlin |
| 5,764,809 A | 6/1998 | Nomami et al. |
| 5,764,906 A | 6/1998 | Edelstein et al. |
| 5,764,923 A | 6/1998 | Tallman et al. |
| 5,765,152 A | 6/1998 | Erickson |
| 5,767,457 A | 6/1998 | Gerpheide et al. |
| 5,767,804 A | 6/1998 | Murphy |
| 5,767,893 A | 6/1998 | Chen et al. |
| 5,767,894 A | 6/1998 | Fuller et al. |
| 5,767,913 A | 6/1998 | Kassatly |
| 5,767,922 A | 6/1998 | Zabih et al. |
| 5,768,382 A | 6/1998 | Schneier et al. |
| 5,768,418 A | 6/1998 | Berman et al. |
| 5,768,421 A | 6/1998 | Gaffin et al. |
| 5,768,426 A | 6/1998 | Rhoads |
| 5,768,437 A | 6/1998 | Monro et al. |
| 5,768,528 A | 6/1998 | Stumm |
| 5,768,607 A | 6/1998 | Drews et al. |
| 5,768,680 A | 6/1998 | Thomas |
| 5,770,533 A | 6/1998 | Franchi |
| 5,771,275 A | 6/1998 | Brunner et al. |
| 5,771,347 A | 6/1998 | Grantz et al. |
| 5,771,353 A | 6/1998 | Eggleston et al. |
| 5,774,170 A | 6/1998 | Hite et al. |
| 5,774,357 A | 6/1998 | Hoffberg et al. |
| 5,774,539 A | 6/1998 | Maass et al. |
| 5,774,591 A | 6/1998 | Black et al. |
| 5,774,650 A | 6/1998 | Chapman et al. |
| 5,774,664 A | 6/1998 | Hidary et al. |
| 5,774,666 A | 6/1998 | Portuesi |
| 5,774,670 A | 6/1998 | Montulli |
| 5,774,825 A | 6/1998 | Reynolds |
| 5,774,827 A | 6/1998 | Smith, Jr. et al. |
| 5,774,828 A | 6/1998 | Brunts et al. |
| 5,774,859 A | 6/1998 | Houser et al. |
| 5,774,869 A | 6/1998 | Toader |
| 5,777,360 A | 7/1998 | Rostoker et al. |
| 5,777,374 A | 7/1998 | Rostoker et al. |
| 5,777,451 A | 7/1998 | Kobayashi et al. |
| 5,777,580 A | 7/1998 | Janky et al. |
| 5,777,614 A | 7/1998 | Ando et al. |
| 5,778,181 A | 7/1998 | Hidary et al. |
| 5,778,182 A | 7/1998 | Cathey et al. |
| 5,778,333 A | 7/1998 | Koizumi et al. |
| 5,779,242 A | 7/1998 | Kaufmann |
| 5,779,549 A | 7/1998 | Walker et al. |
| 5,781,101 A | 7/1998 | Stephen et al. |
| 5,781,226 A | 7/1998 | Sheehan |
| 5,781,228 A | 7/1998 | Sposato |
| 5,781,245 A | 7/1998 | Van Der Weij et al. |
| 5,781,246 A | 7/1998 | Alten et al. |
| 5,781,662 A | 7/1998 | Mori et al. |
| 5,781,723 A | 7/1998 | Yee et al. |
| 5,781,734 A | 7/1998 | Ohno et al. |
| 5,781,879 A | 7/1998 | Arnold et al. |
| 5,784,007 A | 7/1998 | Pepper |
| 5,784,061 A | 7/1998 | Moran et al. |
| 5,784,365 A | 7/1998 | Ikeda |
| 5,784,504 A | 7/1998 | Anderson et al. |
| 5,784,616 A | 7/1998 | Horvitz |
| 5,786,998 A | 7/1998 | Neeson et al. |
| 5,787,156 A | 7/1998 | Katz |
| 5,787,201 A | 7/1998 | Nelson et al. |
| 5,787,259 A | 7/1998 | Haroun et al. |
| 5,788,507 A | 8/1998 | Redford et al. |
| 5,788,574 A | 8/1998 | Ornstein et al. |
| 5,789,892 A | 8/1998 | Takei |
| 5,790,198 A | 8/1998 | Roop et al. |
| 5,790,201 A | 8/1998 | Antos |
| 5,790,202 A | 8/1998 | Kummer et al. |
| 5,790,753 A | 8/1998 | Krishnamoorthy et al. |
| 5,790,935 A | 8/1998 | Payton |
| 5,790,974 A | 8/1998 | Tognazzini |
| 5,791,294 A | 8/1998 | Manning |
| 5,791,991 A | 8/1998 | Small |
| 5,793,413 A | 8/1998 | Hylton et al. |
| 5,793,631 A | 8/1998 | Ito et al. |
| 5,793,753 A | 8/1998 | Hershey et al. |
| 5,793,813 A | 8/1998 | Cleave |

(56) References Cited

U.S. PATENT DOCUMENTS

| | | |
|---|---|---|
| 5,793,888 A | 8/1998 | Delanoy |
| 5,793,964 A | 8/1998 | Rogers et al. |
| 5,793,972 A | 8/1998 | Shane |
| 5,794,164 A | 8/1998 | Beckert et al. |
| 5,794,174 A | 8/1998 | Janky et al. |
| 5,794,210 A | 8/1998 | Goldhaber et al. |
| 5,794,249 A | 8/1998 | Orsolini et al. |
| 5,795,156 A | 8/1998 | Redford et al. |
| 5,795,228 A | 8/1998 | Trumbull et al. |
| 5,796,634 A | 8/1998 | Craport et al. |
| 5,796,866 A | 8/1998 | Sakurai et al. |
| 5,796,945 A | 8/1998 | Tarabella |
| 5,796,952 A | 8/1998 | Davis et al. |
| 5,797,001 A | 8/1998 | Augenbraun et al. |
| 5,797,395 A | 8/1998 | Martin |
| 5,798,519 A | 8/1998 | Vock et al. |
| 5,798,693 A | 8/1998 | Engellenner |
| 5,798,758 A | 8/1998 | Harada et al. |
| 5,798,785 A | 8/1998 | Hendricks et al. |
| 5,799,082 A | 8/1998 | Murphy et al. |
| 5,799,109 A | 8/1998 | Chung et al. |
| 5,799,219 A | 8/1998 | Moghadam et al. |
| 5,799,267 A | 8/1998 | Siegel |
| 5,799,292 A | 8/1998 | Hekmatpour |
| 5,800,268 A | 9/1998 | Molnick |
| 5,801,422 A | 9/1998 | Rostoker et al. |
| 5,801,432 A | 9/1998 | Rostoker et al. |
| 5,801,747 A | 9/1998 | Bedard |
| 5,801,750 A | 9/1998 | Kurihara |
| 5,801,753 A | 9/1998 | Eyer et al. |
| 5,801,787 A | 9/1998 | Schein et al. |
| 5,802,220 A | 9/1998 | Black et al. |
| 5,802,243 A | 9/1998 | Yao et al. |
| 5,802,284 A | 9/1998 | Karlton et al. |
| 5,802,361 A | 9/1998 | Wang et al. |
| 5,802,492 A | 9/1998 | DeLorme et al. |
| 5,802,510 A | 9/1998 | Jones |
| 5,805,082 A | 9/1998 | Hassett |
| 5,805,154 A | 9/1998 | Brown |
| 5,805,155 A | 9/1998 | Allibhoy et al. |
| 5,805,167 A | 9/1998 | van Cruyningen |
| 5,805,204 A | 9/1998 | Thompson et al. |
| 5,805,763 A | 9/1998 | Lawler et al. |
| 5,805,804 A | 9/1998 | Laursen et al. |
| 5,805,806 A | 9/1998 | McArthur |
| 5,805,815 A | 9/1998 | Hill |
| 5,806,005 A | 9/1998 | Hull et al. |
| 5,806,018 A | 9/1998 | Smith et al. |
| 5,808,197 A | 9/1998 | Dao |
| 5,808,330 A | 9/1998 | Rostoker et al. |
| 5,808,564 A | 9/1998 | Simms et al. |
| 5,808,566 A | 9/1998 | Behr et al. |
| 5,808,608 A | 9/1998 | Young et al. |
| 5,808,694 A | 9/1998 | Usui et al. |
| 5,808,907 A | 9/1998 | Shetty et al. |
| 5,809,172 A | 9/1998 | Melen |
| 5,809,204 A | 9/1998 | Young et al. |
| 5,809,214 A | 9/1998 | Nureki et al. |
| 5,809,267 A | 9/1998 | Moran et al. |
| 5,809,415 A | 9/1998 | Rossmann |
| 5,809,437 A | 9/1998 | Breed |
| 5,809,471 A | 9/1998 | Brodsky |
| 5,809,476 A | 9/1998 | Ryan |
| 5,809,481 A | 9/1998 | Baron et al. |
| 5,809,482 A | 9/1998 | Strisower |
| 5,810,680 A | 9/1998 | Lobb et al. |
| 5,811,863 A | 9/1998 | Rostoker et al. |
| 5,812,086 A | 9/1998 | Bertiger et al. |
| 5,812,087 A | 9/1998 | Krasner |
| 5,812,123 A | 9/1998 | Rowe et al. |
| 5,812,124 A | 9/1998 | Eick et al. |
| 5,812,205 A | 9/1998 | Milnes et al. |
| 5,812,591 A | 9/1998 | Shumaker et al. |
| 5,812,749 A | 9/1998 | Fernandez et al. |
| 5,812,769 A | 9/1998 | Graber et al. |
| 5,812,776 A | 9/1998 | Gifford |
| 5,812,930 A | 9/1998 | Zavrel |
| 5,812,931 A | 9/1998 | Yuen |
| 5,812,937 A | 9/1998 | Takahisa et al. |
| 5,814,798 A | 9/1998 | Zancho |
| 5,815,092 A | 9/1998 | Gregg, III et al. |
| 5,815,135 A | 9/1998 | Yui et al. |
| 5,815,145 A | 9/1998 | Matthews, III |
| 5,815,551 A | 9/1998 | Katz |
| 5,815,577 A | 9/1998 | Clark |
| 5,816,918 A | 10/1998 | Kelly et al. |
| 5,818,438 A | 10/1998 | Howe et al. |
| 5,818,441 A | 10/1998 | Throckmorton et al. |
| 5,818,510 A | 10/1998 | Cobbley et al. |
| 5,818,511 A | 10/1998 | Farry et al. |
| 5,818,935 A | 10/1998 | Maa |
| 5,818,965 A | 10/1998 | Davies |
| 5,819,019 A | 10/1998 | Nelson |
| 5,819,020 A | 10/1998 | Beeler, Jr. |
| 5,819,156 A | 10/1998 | Belmont |
| 5,819,227 A | 10/1998 | Obuchi |
| 5,819,284 A | 10/1998 | Farber et al. |
| 5,819,288 A | 10/1998 | De Bonet |
| 5,821,880 A | 10/1998 | Morimoto et al. |
| 5,821,925 A | 10/1998 | Carey et al. |
| 5,822,123 A | 10/1998 | Davis et al. |
| 5,822,523 A | 10/1998 | Rothschild et al. |
| 5,822,539 A | 10/1998 | van Hoff |
| 5,822,606 A | 10/1998 | Morton |
| 5,823,879 A | 10/1998 | Goldberg et al. |
| 5,825,283 A | 10/1998 | Camhi |
| 5,825,943 A | 10/1998 | DeVito et al. |
| 5,826,195 A | 10/1998 | Westerlage et al. |
| 5,828,402 A | 10/1998 | Collings |
| 5,828,419 A | 10/1998 | Bruette et al. |
| 5,828,420 A | 10/1998 | Marshall et al. |
| 5,828,734 A | 10/1998 | Katz |
| 5,828,809 A | 10/1998 | Chang et al. |
| 5,828,839 A | 10/1998 | Moncreiff |
| 5,828,945 A | 10/1998 | Klosterman |
| RE35,954 E | 11/1998 | Levine |
| 5,829,782 A | 11/1998 | Breed et al. |
| 5,830,067 A | 11/1998 | Graves et al. |
| 5,830,068 A | 11/1998 | Brenner et al. |
| 5,831,527 A | 11/1998 | Jones, II et al. |
| 5,832,119 A | 11/1998 | Rhoads |
| 5,832,212 A | 11/1998 | Cragun et al. |
| 5,832,223 A | 11/1998 | Hara et al. |
| 5,832,279 A | 11/1998 | Rostoker et al. |
| 5,832,474 A | 11/1998 | Lopresti et al. |
| 5,832,528 A | 11/1998 | Kwatinetz et al. |
| 5,833,468 A | 11/1998 | Guy et al. |
| 5,834,821 A | 11/1998 | Rostoker et al. |
| 5,835,087 A | 11/1998 | Herz et al. |
| 5,835,126 A | 11/1998 | Lewis |
| 5,835,717 A | 11/1998 | Karlton et al. |
| 5,836,817 A | 11/1998 | Acres et al. |
| 5,837,987 A | 11/1998 | Koenck et al. |
| 5,838,237 A | 11/1998 | Revell et al. |
| 5,838,314 A | 11/1998 | Neel et al. |
| 5,838,326 A | 11/1998 | Card et al. |
| 5,838,383 A | 11/1998 | Chimoto et al. |
| 5,838,889 A | 11/1998 | Booker |
| 5,838,906 A | 11/1998 | Doyle et al. |
| 5,839,088 A | 11/1998 | Hancock et al. |
| 5,839,438 A | 11/1998 | Graettinger et al. |
| 5,839,725 A | 11/1998 | Conway |
| 5,839,905 A | 11/1998 | Redford et al. |
| 5,840,020 A | 11/1998 | Heinonen et al. |
| 5,841,367 A | 11/1998 | Giovanni |
| 5,841,396 A | 11/1998 | Krasner |
| 5,844,552 A | 12/1998 | Gaughan et al. |
| 5,844,553 A | 12/1998 | Hao et al. |
| 5,844,620 A | 12/1998 | Coleman et al. |
| 5,845,227 A | 12/1998 | Peterson |
| 5,845,240 A | 12/1998 | Fielder |
| 5,845,288 A | 12/1998 | Syeda-Mahmood |
| 5,845,301 A | 12/1998 | Rivette et al. |
| 5,847,661 A | 12/1998 | Ricci |

(56) References Cited

U.S. PATENT DOCUMENTS

| | | |
|---|---|---|
| 5,847,688 A | 12/1998 | Ohi et al. |
| 5,848,158 A | 12/1998 | Saito et al. |
| 5,848,187 A | 12/1998 | Bricklin et al. |
| 5,848,373 A | 12/1998 | DeLorme et al. |
| 5,848,396 A | 12/1998 | Gerace |
| 5,848,397 A | 12/1998 | Marsh et al. |
| 5,848,410 A | 12/1998 | Walls et al. |
| 5,850,218 A | 12/1998 | LaJoie et al. |
| 5,850,352 A | 12/1998 | Moezzi et al. |
| 5,850,446 A | 12/1998 | Berger et al. |
| 5,850,470 A | 12/1998 | Kung et al. |
| 5,851,149 A | 12/1998 | Xidos et al. |
| 5,852,232 A | 12/1998 | Samsavar et al. |
| 5,852,351 A | 12/1998 | Canada et al. |
| 5,852,437 A | 12/1998 | Wugofski et al. |
| 5,852,676 A | 12/1998 | Lazar |
| 5,852,823 A | 12/1998 | De Bonet |
| 5,854,856 A | 12/1998 | Moura et al. |
| 5,854,923 A | 12/1998 | Dockter et al. |
| 5,854,994 A | 12/1998 | Canada et al. |
| 5,855,007 A | 12/1998 | Jovicic et al. |
| 5,855,008 A | 12/1998 | Goldhaber et al. |
| 5,857,036 A | 1/1999 | Barnsley et al. |
| 5,857,149 A | 1/1999 | Suzuki |
| 5,857,155 A | 1/1999 | Hill et al. |
| 5,857,181 A | 1/1999 | Augenbraun et al. |
| 5,857,201 A | 1/1999 | Wright, Jr. et al. |
| 5,857,911 A | 1/1999 | Fioretti |
| 5,860,073 A | 1/1999 | Ferrel et al. |
| 5,861,881 A | 1/1999 | Freeman et al. |
| 5,861,886 A | 1/1999 | Moran et al. |
| 5,861,906 A | 1/1999 | Dunn et al. |
| 5,862,256 A | 1/1999 | Zetts et al. |
| 5,862,260 A | 1/1999 | Rhoads |
| 5,862,262 A | 1/1999 | Jacobs et al. |
| 5,862,264 A | 1/1999 | Ishikawa et al. |
| 5,862,292 A | 1/1999 | Kubota et al. |
| 5,862,325 A | 1/1999 | Reed et al. |
| 5,862,391 A | 1/1999 | Salas et al. |
| 5,862,509 A | 1/1999 | Desai et al. |
| 5,864,125 A | 1/1999 | Szabo |
| 5,864,165 A | 1/1999 | Rostoker et al. |
| 5,864,323 A | 1/1999 | Berthon |
| 5,864,481 A | 1/1999 | Gross et al. |
| 5,864,635 A | 1/1999 | Zetts et al. |
| 5,864,667 A | 1/1999 | Barkan |
| 5,864,704 A | 1/1999 | Battle et al. |
| 5,864,823 A | 1/1999 | Levitan |
| 5,864,848 A | 1/1999 | Horvitz et al. |
| 5,867,118 A | 2/1999 | McCoy et al. |
| 5,867,150 A | 2/1999 | Bricklin et al. |
| 5,867,205 A | 2/1999 | Harrison |
| 5,867,208 A | 2/1999 | McLaren |
| 5,867,221 A | 2/1999 | Pullen et al. |
| 5,867,223 A | 2/1999 | Schindler et al. |
| 5,867,226 A | 2/1999 | Wehmeyer et al. |
| 5,867,233 A | 2/1999 | Tanaka |
| 5,867,386 A | 2/1999 | Hoffberg et al. |
| 5,867,404 A | 2/1999 | Bryan |
| 5,867,579 A | 2/1999 | Saito |
| 5,867,597 A | 2/1999 | Peairs et al. |
| 5,867,603 A | 2/1999 | Barnsley et al. |
| 5,867,795 A | 2/1999 | Novis et al. |
| 5,867,799 A | 2/1999 | Lang et al. |
| 5,867,821 A | 2/1999 | Ballantyne et al. |
| 5,870,030 A | 2/1999 | DeLuca et al. |
| 5,870,150 A | 2/1999 | Yuen |
| 5,870,151 A | 2/1999 | Korber |
| 5,870,493 A | 2/1999 | Vogl et al. |
| 5,870,502 A | 2/1999 | Bonneau et al. |
| 5,870,710 A | 2/1999 | Ozawa et al. |
| 5,870,724 A | 2/1999 | Lawlor et al. |
| 5,870,754 A | 2/1999 | Dimitrova et al. |
| 5,871,398 A | 2/1999 | Schneier et al. |
| 5,872,380 A | 2/1999 | Rostoker et al. |
| 5,872,508 A | 2/1999 | Taoka |
| 5,873,080 A | 2/1999 | Coden et al. |
| 5,873,660 A | 2/1999 | Walsh et al. |
| 5,874,914 A | 2/1999 | Krasner |
| 5,875,108 A | 2/1999 | Hoffberg et al. |
| 5,875,183 A | 2/1999 | Nitadori |
| 5,875,265 A | 2/1999 | Kasao |
| 5,875,446 A | 2/1999 | Brown et al. |
| 5,876,286 A | 3/1999 | Lee |
| 5,877,759 A | 3/1999 | Bauer |
| 5,877,803 A | 3/1999 | Wee et al. |
| 5,877,906 A | 3/1999 | Nagasawa et al. |
| 5,878,135 A | 3/1999 | Blatter et al. |
| 5,878,222 A | 3/1999 | Harrison |
| 5,878,356 A | 3/1999 | Garrot, Jr. et al. |
| 5,878,417 A | 3/1999 | Baldwin et al. |
| 5,879,233 A | 3/1999 | Stupero |
| 5,879,235 A | 3/1999 | Kaneko et al. |
| 5,880,411 A | 3/1999 | Gillespie et al. |
| 5,880,720 A | 3/1999 | Iwafune et al. |
| 5,880,731 A | 3/1999 | Liles et al. |
| 5,880,743 A | 3/1999 | Moran et al. |
| 5,880,768 A | 3/1999 | Lemmons et al. |
| 5,880,769 A | 3/1999 | Nemirofsky et al. |
| 5,881,231 A | 3/1999 | Takagi et al. |
| 5,883,621 A | 3/1999 | Iwamura |
| 5,884,046 A | 3/1999 | Antonov |
| 5,884,267 A | 3/1999 | Goldenthal et al. |
| 5,884,282 A | 3/1999 | Robinson |
| 5,884,298 A | 3/1999 | Smith, II et al. |
| 5,885,158 A | 3/1999 | Torango et al. |
| 5,886,707 A | 3/1999 | Berg |
| 5,886,732 A | 3/1999 | Humpleman |
| 5,886,743 A | 3/1999 | Oh et al. |
| 5,886,746 A | 3/1999 | Yuen et al. |
| 5,887,133 A | 3/1999 | Brown et al. |
| 5,887,243 A | 3/1999 | Harvey et al. |
| 5,887,269 A | 3/1999 | Brunts et al. |
| 5,889,236 A | 3/1999 | Gillespie et al. |
| 5,889,477 A | 3/1999 | Fastenrath |
| 5,889,506 A | 3/1999 | Lopresti et al. |
| 5,889,523 A | 3/1999 | Wilcox et al. |
| 5,889,852 A | 3/1999 | Rosecrans et al. |
| 5,889,868 A | 3/1999 | Moskowitz et al. |
| 5,889,896 A | 3/1999 | Meshinsky et al. |
| 5,889,919 A | 3/1999 | Inoue et al. |
| 5,889,950 A | 3/1999 | Kuzma |
| 5,890,061 A | 3/1999 | Timm et al. |
| 5,890,068 A | 3/1999 | Fattouche et al. |
| 5,890,079 A | 3/1999 | Levine |
| 5,890,147 A | 3/1999 | Peltonen et al. |
| 5,890,152 A | 3/1999 | Rapaport et al. |
| 5,892,346 A | 4/1999 | Moroto et al. |
| 5,892,536 A | 4/1999 | Logan et al. |
| 5,892,767 A | 4/1999 | Bell et al. |
| 5,893,095 A | 4/1999 | Jain et al. |
| 5,893,110 A | 4/1999 | Weber et al. |
| 5,893,111 A | 4/1999 | Sharon, Jr. et al. |
| 5,893,113 A | 4/1999 | McGrath et al. |
| 5,893,126 A | 4/1999 | Drews et al. |
| 5,893,130 A | 4/1999 | Inoue et al. |
| 5,894,323 A | 4/1999 | Kain et al. |
| 5,895,371 A | 4/1999 | Levitas et al. |
| 5,895,470 A | 4/1999 | Pirolli et al. |
| 5,896,176 A | 4/1999 | Das et al. |
| 5,896,369 A | 4/1999 | Warsta et al. |
| 5,898,391 A | 4/1999 | Jefferies et al. |
| 5,898,392 A | 4/1999 | Bambini et al. |
| 5,898,434 A | 4/1999 | Small et al. |
| 5,898,762 A | 4/1999 | Katz |
| 5,898,835 A | 4/1999 | Truong |
| 5,899,700 A | 5/1999 | Williams et al. |
| 5,899,975 A | 5/1999 | Nielsen |
| 5,899,999 A | 5/1999 | De Bonet |
| 5,900,825 A | 5/1999 | Pressel et al. |
| 5,901,214 A | 5/1999 | Shaffer et al. |
| 5,901,244 A | 5/1999 | Souma et al. |
| 5,901,246 A | 5/1999 | Hoffberg et al. |
| 5,901,255 A | 5/1999 | Yagasaki |

(56) References Cited

U.S. PATENT DOCUMENTS

| | | |
|---|---|---|
| 5,901,287 A | 5/1999 | Bull et al. |
| 5,901,342 A | 5/1999 | Heiskari et al. |
| 5,901,366 A | 5/1999 | Nakano et al. |
| 5,901,978 A | 5/1999 | Breed et al. |
| 5,903,261 A | 5/1999 | Walsh et al. |
| 5,903,317 A | 5/1999 | Sharir et al. |
| 5,903,454 A | 5/1999 | Hoffberg et al. |
| 5,903,545 A | 5/1999 | Sabourin et al. |
| 5,903,654 A | 5/1999 | Milton et al. |
| 5,903,678 A | 5/1999 | Ibenthal |
| 5,903,732 A | 5/1999 | Reed et al. |
| 5,903,816 A | 5/1999 | Broadwin et al. |
| 5,903,848 A | 5/1999 | Takahashi |
| 5,903,892 A | 5/1999 | Hoffert et al. |
| 5,905,251 A | 5/1999 | Knowles |
| 5,905,433 A | 5/1999 | Wortham |
| 5,905,493 A | 5/1999 | Belzer et al. |
| 5,905,800 A | 5/1999 | Moskowitz et al. |
| 5,907,293 A | 5/1999 | Tognazzini |
| 5,907,322 A | 5/1999 | Kelly et al. |
| 5,907,323 A | 5/1999 | Lawler et al. |
| 5,907,328 A | 5/1999 | Brush, II et al. |
| 5,907,446 A | 5/1999 | Ishii et al. |
| 5,907,491 A | 5/1999 | Canada et al. |
| 5,907,793 A | 5/1999 | Reams |
| 5,907,836 A | 5/1999 | Sumita et al. |
| 5,908,454 A | 6/1999 | Zyburt et al. |
| 5,909,183 A | 6/1999 | Borgstahl et al. |
| 5,909,559 A | 6/1999 | So |
| 5,910,987 A | 6/1999 | Ginter et al. |
| 5,910,999 A | 6/1999 | Mukohzaka |
| 5,911,035 A | 6/1999 | Tsao |
| 5,911,582 A | 6/1999 | Redford et al. |
| 5,912,696 A | 6/1999 | Buehl |
| 5,912,989 A | 6/1999 | Watanabe |
| 5,913,040 A | 6/1999 | Rakavy et al. |
| 5,913,185 A | 6/1999 | Martino et al. |
| 5,913,727 A | 6/1999 | Ahdoot |
| 5,913,917 A | 6/1999 | Murphy |
| 5,914,654 A | 6/1999 | Smith |
| 5,914,712 A | 6/1999 | Sartain et al. |
| 5,914,746 A | 6/1999 | Matthews, III et al. |
| 5,915,026 A | 6/1999 | Mankovitz |
| 5,915,034 A | 6/1999 | Nakajima et al. |
| 5,915,038 A | 6/1999 | Abdel-Mottaleb et al. |
| 5,915,068 A | 6/1999 | Levine |
| 5,915,214 A | 6/1999 | Reece et al. |
| 5,915,250 A | 6/1999 | Jain et al. |
| 5,916,024 A | 6/1999 | Von Kohorn |
| 5,916,300 A | 6/1999 | Kirk et al. |
| 5,917,405 A | 6/1999 | Joao |
| 5,917,491 A | 6/1999 | Bauersfeld |
| 5,917,725 A | 6/1999 | Thacher et al. |
| 5,917,893 A | 6/1999 | Katz |
| 5,917,912 A | 6/1999 | Ginter et al. |
| 5,917,958 A | 6/1999 | Nunally et al. |
| 5,918,014 A | 6/1999 | Robinson |
| 5,918,213 A | 6/1999 | Bernard et al. |
| 5,918,223 A | 6/1999 | Blum et al. |
| 5,920,477 A | 7/1999 | Hoffberg et al. |
| 5,920,694 A | 7/1999 | Carleton et al. |
| 5,920,854 A | 7/1999 | Kirsch et al. |
| 5,920,856 A | 7/1999 | Syeda-Mahmood |
| 5,920,861 A | 7/1999 | Hall et al. |
| 5,922,040 A | 7/1999 | Prabhakaran |
| 5,922,074 A | 7/1999 | Richard et al. |
| 5,923,362 A | 7/1999 | Klosterman |
| 5,923,376 A | 7/1999 | Pullen et al. |
| 5,923,780 A | 7/1999 | Morfill et al. |
| 5,923,848 A | 7/1999 | Goodhand et al. |
| 5,924,053 A | 7/1999 | Horowitz et al. |
| 5,924,486 A | 7/1999 | Ehlers et al. |
| 5,926,117 A | 7/1999 | Gunji et al. |
| 5,926,624 A | 7/1999 | Katz et al. |
| 5,928,306 A | 7/1999 | France et al. |
| 5,928,325 A | 7/1999 | Shaughnessy et al. |
| 5,929,753 A | 7/1999 | Montague |
| 5,929,849 A | 7/1999 | Kikinis |
| 5,929,850 A | 7/1999 | Broadwin et al. |
| 5,929,932 A | 7/1999 | Otsuki et al. |
| 5,930,250 A | 7/1999 | Klok et al. |
| 5,931,901 A | 8/1999 | Wolfe et al. |
| 5,931,905 A | 8/1999 | Hashimoto et al. |
| 5,932,863 A | 8/1999 | Rathus et al. |
| 5,933,080 A | 8/1999 | Nojima |
| 5,933,100 A | 8/1999 | Golding |
| 5,933,125 A | 8/1999 | Fernie et al. |
| 5,933,811 A | 8/1999 | Angles et al. |
| 5,933,823 A | 8/1999 | Cullen et al. |
| 5,933,827 A | 8/1999 | Cole et al. |
| 5,933,829 A | 8/1999 | Durst et al. |
| 5,935,004 A | 8/1999 | Tarr et al. |
| 5,935,190 A | 8/1999 | Davis et al. |
| 5,937,037 A | 8/1999 | Kamel et al. |
| 5,937,160 A | 8/1999 | Davis et al. |
| 5,937,163 A | 8/1999 | Lee et al. |
| 5,937,392 A | 8/1999 | Alberts |
| 5,937,421 A | 8/1999 | Petrov et al. |
| 5,937,422 A | 8/1999 | Nelson et al. |
| 5,938,704 A | 8/1999 | Torii |
| 5,938,717 A | 8/1999 | Dunne et al. |
| 5,938,721 A | 8/1999 | Dussell et al. |
| 5,938,757 A | 8/1999 | Bertsch |
| 5,940,004 A | 8/1999 | Fulton |
| 5,940,073 A | 8/1999 | Klosterman et al. |
| 5,940,387 A | 8/1999 | Humpleman |
| 5,940,572 A | 8/1999 | Balaban et al. |
| 5,940,821 A | 8/1999 | Wical |
| 5,943,427 A | 8/1999 | Massie et al. |
| 5,943,428 A | 8/1999 | Seri et al. |
| 5,945,919 A | 8/1999 | Trask |
| 5,945,944 A | 8/1999 | Krasner |
| 5,945,988 A | 8/1999 | Williams et al. |
| 5,946,083 A | 8/1999 | Melendez et al. |
| 5,946,386 A | 8/1999 | Rogers et al. |
| 5,946,406 A | 8/1999 | Frink et al. |
| 5,946,488 A | 8/1999 | Tanguay et al. |
| 5,946,629 A | 8/1999 | Sawyer et al. |
| 5,946,646 A | 8/1999 | Schena et al. |
| 5,946,664 A | 8/1999 | Ebisawa |
| 5,946,687 A | 8/1999 | Gehani et al. |
| 5,948,026 A | 9/1999 | Beemer, II et al. |
| 5,948,038 A | 9/1999 | Daly et al. |
| 5,948,040 A | 9/1999 | DeLorme et al. |
| 5,948,061 A | 9/1999 | Merriman et al. |
| 5,949,921 A | 9/1999 | Kojima et al. |
| 5,949,954 A | 9/1999 | Young et al. |
| 5,950,137 A | 9/1999 | Kim |
| 5,950,176 A | 9/1999 | Keiser et al. |
| 5,951,620 A | 9/1999 | Ahrens et al. |
| 5,952,599 A | 9/1999 | Dolby et al. |
| 5,952,941 A | 9/1999 | Mardirossian |
| 5,953,005 A | 9/1999 | Liu |
| 5,953,541 A | 9/1999 | King et al. |
| 5,953,650 A | 9/1999 | Villevieille |
| 5,953,677 A | 9/1999 | Sato |
| 5,954,773 A | 9/1999 | Luper |
| 5,955,973 A | 9/1999 | Anderson |
| 5,955,988 A | 9/1999 | Blonstein et al. |
| 5,956,025 A | 9/1999 | Goulden et al. |
| 5,956,038 A | 9/1999 | Rekimoto |
| 5,956,423 A | 9/1999 | Frink et al. |
| 5,956,487 A | 9/1999 | Venkatraman et al. |
| 5,956,660 A | 9/1999 | Neumann |
| 5,956,664 A | 9/1999 | Bryan |
| 5,956,716 A | 9/1999 | Kenner et al. |
| 5,957,695 A | 9/1999 | Redford et al. |
| 5,959,529 A | 9/1999 | Kail, IV |
| 5,959,536 A | 9/1999 | Chambers et al. |
| 5,959,580 A | 9/1999 | Maloney et al. |
| 5,959,592 A | 9/1999 | Petruzzelli |
| 5,959,623 A | 9/1999 | van Hoff et al. |
| 5,959,688 A | 9/1999 | Schein et al. |
| 5,960,362 A | 9/1999 | Grob et al. |

(56) References Cited

U.S. PATENT DOCUMENTS

| | | |
|---|---|---|
| 5,960,383 A | 9/1999 | Fleischer |
| 5,960,409 A | 9/1999 | Wexler |
| 5,961,569 A | 10/1999 | Craport et al. |
| 5,961,572 A | 10/1999 | Craport et al. |
| 5,961,603 A | 10/1999 | Kunkel et al. |
| 5,963,092 A | 10/1999 | Van Zalinge |
| 5,963,167 A | 10/1999 | Lichten et al. |
| 5,963,264 A | 10/1999 | Jackson |
| 5,963,582 A | 10/1999 | Stansell, Jr. |
| 5,963,645 A | 10/1999 | Kigawa et al. |
| 5,963,670 A | 10/1999 | Lipson et al. |
| 5,963,746 A | 10/1999 | Barker et al. |
| 5,963,966 A | 10/1999 | Mitchell et al. |
| 5,964,463 A | 10/1999 | Moore, Jr. |
| 5,964,660 A | 10/1999 | James et al. |
| 5,964,821 A | 10/1999 | Brunts et al. |
| 5,964,822 A | 10/1999 | Alland et al. |
| 5,966,126 A | 10/1999 | Szabo |
| 5,966,533 A | 10/1999 | Moody |
| 5,966,658 A | 10/1999 | Kennedy, III et al. |
| 5,966,696 A | 10/1999 | Giraud |
| 5,968,109 A | 10/1999 | Israni et al. |
| 5,969,598 A | 10/1999 | Kimura |
| 5,969,748 A | 10/1999 | Casement et al. |
| 5,969,765 A | 10/1999 | Boon |
| 5,970,143 A | 10/1999 | Schneier et al. |
| 5,970,173 A | 10/1999 | Lee et al. |
| 5,970,206 A | 10/1999 | Yuen et al. |
| 5,970,455 A | 10/1999 | Wilcox et al. |
| 5,970,473 A | 10/1999 | Gerszberg et al. |
| 5,970,486 A | 10/1999 | Yoshida et al. |
| 5,971,397 A | 10/1999 | Miguel et al. |
| 5,973,309 A | 10/1999 | Livingston |
| 5,973,376 A | 10/1999 | Rostoker et al. |
| 5,973,643 A | 10/1999 | Hawkes et al. |
| 5,973,683 A | 10/1999 | Cragun et al. |
| 5,974,222 A | 10/1999 | Yuen et al. |
| 5,974,368 A | 10/1999 | Schepps et al. |
| 5,974,398 A | 10/1999 | Hanson et al. |
| 5,974,412 A | 10/1999 | Hazlehurst et al. |
| 5,974,547 A | 10/1999 | Klimenko |
| 5,977,884 A | 11/1999 | Ross |
| 5,977,906 A | 11/1999 | Ameen et al. |
| 5,977,964 A | 11/1999 | Williams et al. |
| 5,978,484 A | 11/1999 | Apperson et al. |
| 5,978,578 A | 11/1999 | Azarya et al. |
| 5,978,747 A | 11/1999 | Craport et al. |
| 5,978,766 A | 11/1999 | Luciw |
| 5,978,804 A | 11/1999 | Dietzman |
| 5,980,256 A | 11/1999 | Carmein |
| 5,982,281 A | 11/1999 | Layson, Jr. |
| 5,982,324 A | 11/1999 | Watters et al. |
| 5,982,411 A | 11/1999 | Eyer et al. |
| 5,982,853 A | 11/1999 | Liebermann |
| 5,982,891 A | 11/1999 | Ginter et al. |
| 5,982,928 A | 11/1999 | Shimada et al. |
| 5,982,929 A | 11/1999 | Ilan et al. |
| 5,983,092 A | 11/1999 | Whinnett et al. |
| 5,983,099 A | 11/1999 | Yao et al. |
| 5,983,158 A | 11/1999 | Suzuki et al. |
| 5,983,161 A | 11/1999 | Lemelson et al. |
| 5,983,171 A | 11/1999 | Yokoyama et al. |
| 5,983,176 A | 11/1999 | Hoffert et al. |
| 5,983,190 A | 11/1999 | Trower, II et al. |
| 5,983,236 A | 11/1999 | Yager et al. |
| 5,983,295 A | 11/1999 | Cotugno |
| 5,986,200 A | 11/1999 | Curtin |
| 5,986,644 A | 11/1999 | Herder et al. |
| 5,986,655 A | 11/1999 | Chiu et al. |
| 5,987,136 A | 11/1999 | Schipper et al. |
| 5,987,213 A | 11/1999 | Mankovitz et al. |
| 5,987,306 A | 11/1999 | Nilsen et al. |
| 5,987,381 A | 11/1999 | Oshizawa |
| 5,987,454 A | 11/1999 | Hobbs |
| 5,987,498 A | 11/1999 | Athing et al. |
| 5,987,509 A | 11/1999 | Portuesi |
| 5,987,511 A | 11/1999 | Elixmann et al. |
| 5,987,519 A | 11/1999 | Peifer et al. |
| 5,987,552 A | 11/1999 | Chittor et al. |
| 5,987,979 A | 11/1999 | Bryan |
| 5,988,078 A | 11/1999 | Levine |
| 5,989,157 A | 11/1999 | Walton |
| 5,990,687 A | 11/1999 | Williams |
| 5,990,801 A | 11/1999 | Kyouno et al. |
| 5,990,878 A | 11/1999 | Ikeda et al. |
| 5,990,885 A | 11/1999 | Gopinath |
| 5,990,893 A | 11/1999 | Numazaki |
| 5,990,927 A | 11/1999 | Hendricks et al. |
| 5,991,406 A | 11/1999 | Lipner et al. |
| 5,991,441 A | 11/1999 | Jourjine |
| 5,991,498 A | 11/1999 | Young |
| 5,991,690 A | 11/1999 | Murphy |
| 5,991,735 A | 11/1999 | Gerace |
| 5,991,751 A | 11/1999 | Rivette et al. |
| 5,991,799 A | 11/1999 | Yen et al. |
| 5,991,806 A | 11/1999 | McHann, Jr. |
| 5,991,832 A | 11/1999 | Sato et al. |
| 5,995,094 A | 11/1999 | Eggen et al. |
| 5,995,643 A | 11/1999 | Saito |
| 5,995,649 A | 11/1999 | Marugame |
| 5,995,673 A | 11/1999 | Ibenthal et al. |
| 5,995,882 A | 11/1999 | Patterson et al. |
| 5,995,978 A | 11/1999 | Cullen et al. |
| 5,995,997 A | 11/1999 | Horvitz |
| 5,996,006 A | 11/1999 | Speicher |
| 5,999,091 A | 12/1999 | Wortham |
| 5,999,124 A | 12/1999 | Sheynblat |
| 5,999,126 A | 12/1999 | Ito |
| 5,999,179 A | 12/1999 | Kekic et al. |
| 5,999,216 A | 12/1999 | Kaars |
| 5,999,664 A | 12/1999 | Mahoney et al. |
| 5,999,808 A | 12/1999 | LaDue |
| 5,999,878 A | 12/1999 | Hanson et al. |
| 5,999,940 A | 12/1999 | Ranger |
| 5,999,997 A | 12/1999 | Pipes |
| 6,000,000 A | 12/1999 | Hawkins et al. |
| 6,000,044 A | 12/1999 | Chrysos et al. |
| 6,002,393 A | 12/1999 | Hite et al. |
| 6,002,394 A | 12/1999 | Schein et al. |
| 6,002,443 A | 12/1999 | Iggulden |
| 6,002,444 A | 12/1999 | Marshall et al. |
| 6,002,450 A | 12/1999 | Darbee et al. |
| 6,002,491 A | 12/1999 | Li et al. |
| 6,002,798 A | 12/1999 | Palmer et al. |
| 6,002,808 A | 12/1999 | Freeman |
| 6,003,030 A | 12/1999 | Kenner et al. |
| 6,003,775 A | 12/1999 | Ackley |
| 6,005,513 A | 12/1999 | Hardesty |
| 6,005,548 A | 12/1999 | Latypov et al. |
| 6,005,561 A | 12/1999 | Hawkins et al. |
| 6,005,563 A | 12/1999 | White et al. |
| 6,005,565 A | 12/1999 | Legall et al. |
| 6,005,597 A | 12/1999 | Barrett et al. |
| 6,005,602 A | 12/1999 | Matthews, III |
| 6,005,631 A | 12/1999 | Anderson et al. |
| 6,006,218 A | 12/1999 | Breese et al. |
| 6,006,257 A | 12/1999 | Slezak |
| 6,006,635 A | 12/1999 | Stojkovic et al. |
| 6,008,802 A | 12/1999 | Iki et al. |
| 6,008,803 A | 12/1999 | Rowe et al. |
| 6,009,153 A | 12/1999 | Houghton et al. |
| 6,009,210 A | 12/1999 | Kang |
| 6,009,323 A | 12/1999 | Heffield et al. |
| 6,009,330 A | 12/1999 | Kennedy, III et al. |
| 6,009,356 A | 12/1999 | Monroe |
| 6,009,363 A | 12/1999 | Beckert et al. |
| 6,009,386 A | 12/1999 | Cruickshank et al. |
| 6,009,403 A | 12/1999 | Sato |
| 6,009,420 A | 12/1999 | Fagg, III et al. |
| 6,009,452 A | 12/1999 | Horvitz |
| 6,009,465 A | 12/1999 | Decker et al. |
| 6,011,537 A | 1/2000 | Slotznick |
| 6,011,787 A | 1/2000 | Nakano et al. |
| 6,011,895 A | 1/2000 | Abecassis |

(56) References Cited

U.S. PATENT DOCUMENTS

| | | |
|---|---|---|
| 6,011,905 A | 1/2000 | Huttenlocher et al. |
| 6,012,046 A | 1/2000 | Lupien et al. |
| 6,012,051 A | 1/2000 | Sammon, Jr. et al. |
| 6,012,052 A | 1/2000 | Altschuler et al. |
| 6,012,071 A | 1/2000 | Krishna et al. |
| 6,012,083 A | 1/2000 | Savitzky et al. |
| 6,012,086 A | 1/2000 | Lowell |
| 6,012,984 A | 1/2000 | Roseman |
| 6,013,007 A | 1/2000 | Root et al. |
| 6,014,090 A | 1/2000 | Rosen et al. |
| 6,014,184 A | 1/2000 | Knee et al. |
| 6,014,406 A | 1/2000 | Shida et al. |
| 6,014,634 A | 1/2000 | Scroggie et al. |
| 6,014,638 A | 1/2000 | Burge et al. |
| 6,015,348 A | 1/2000 | Lambright et al. |
| 6,016,141 A | 1/2000 | Knudson et al. |
| 6,016,485 A | 1/2000 | Amakawa et al. |
| 6,016,509 A | 1/2000 | Dedrick |
| 6,018,292 A | 1/2000 | Penny, Jr. |
| 6,018,342 A | 1/2000 | Bristor |
| 6,018,346 A | 1/2000 | Moran et al. |
| 6,018,372 A | 1/2000 | Etheredge |
| 6,018,659 A | 1/2000 | Ayyagari et al. |
| 6,018,695 A | 1/2000 | Ahrens et al. |
| 6,018,699 A | 1/2000 | Baron, Sr. et al. |
| 6,018,710 A | 1/2000 | Wynblatt et al. |
| 6,018,738 A | 1/2000 | Breese et al. |
| 6,020,845 A | 2/2000 | Weinberg et al. |
| 6,020,880 A | 2/2000 | Naimpally |
| 6,020,883 A | 2/2000 | Herz et al. |
| 6,021,218 A | 2/2000 | Capps et al. |
| 6,021,231 A | 2/2000 | Miyatake et al. |
| 6,021,403 A | 2/2000 | Horvitz et al. |
| 6,023,223 A | 2/2000 | Baxter, Jr. |
| 6,023,232 A | 2/2000 | Eitzenberger |
| 6,023,241 A | 2/2000 | Clapper |
| 6,023,242 A | 2/2000 | Dixon |
| 6,023,267 A | 2/2000 | Chapuis et al. |
| 6,023,507 A | 2/2000 | Wookey |
| 6,023,694 A | 2/2000 | Kouchi et al. |
| 6,023,724 A | 2/2000 | Bhatia et al. |
| 6,023,729 A | 2/2000 | Samuel et al. |
| 6,024,643 A | 2/2000 | Begis |
| 6,025,788 A | 2/2000 | Diduck |
| 6,025,837 A | 2/2000 | Matthews, III et al. |
| 6,025,844 A | 2/2000 | Parsons |
| 6,025,868 A | 2/2000 | Russo |
| 6,025,869 A | 2/2000 | Stas et al. |
| 6,026,368 A | 2/2000 | Brown et al. |
| 6,026,375 A | 2/2000 | Hall et al. |
| 6,026,388 A | 2/2000 | Liddy et al. |
| 6,028,271 A | 2/2000 | Gillespie et al. |
| 6,028,537 A | 2/2000 | Suman et al. |
| 6,028,548 A | 2/2000 | Farmer |
| 6,028,599 A | 2/2000 | Yuen et al. |
| 6,028,604 A | 2/2000 | Matthews, III et al. |
| 6,028,857 A | 2/2000 | Poor |
| 6,028,937 A | 2/2000 | Tatebayashi et al. |
| 6,029,045 A | 2/2000 | Picco et al. |
| 6,029,046 A | 2/2000 | Khan et al. |
| 6,029,092 A | 2/2000 | Stein |
| 6,029,141 A | 2/2000 | Bezos et al. |
| 6,029,195 A | 2/2000 | Herz |
| 6,031,525 A | 2/2000 | Perlin |
| 6,031,531 A | 2/2000 | Kimble |
| 6,031,580 A | 2/2000 | Sim |
| 6,032,051 A | 2/2000 | Hall et al. |
| 6,032,054 A | 2/2000 | Schwinke |
| 6,032,084 A | 2/2000 | Anderson et al. |
| 6,032,089 A | 2/2000 | Buckley |
| 6,032,097 A | 2/2000 | Iihoshi et al. |
| 6,032,141 A | 2/2000 | O'Connor et al. |
| 6,032,156 A | 2/2000 | Marcus |
| 6,033,086 A | 3/2000 | Bohn |
| 6,034,677 A | 3/2000 | Noguchi et al. |
| 6,035,021 A | 3/2000 | Katz |
| 6,035,038 A | 3/2000 | Campinos et al. |
| 6,035,339 A | 3/2000 | Agraharam et al. |
| 6,035,714 A | 3/2000 | Yazdi et al. |
| 6,036,086 A | 3/2000 | Sizer, II et al. |
| 6,036,601 A | 3/2000 | Heckel |
| 6,037,933 A | 3/2000 | Blonstein et al. |
| 6,037,998 A | 3/2000 | Usui et al. |
| 6,038,337 A | 3/2000 | Lawrence et al. |
| 6,038,342 A | 3/2000 | Bernzott et al. |
| 6,038,367 A | 3/2000 | Abecassis |
| 6,038,436 A | 3/2000 | Priest |
| 6,038,554 A | 3/2000 | Vig |
| 6,038,561 A | 3/2000 | Snyder et al. |
| 6,038,563 A | 3/2000 | Bapat et al. |
| 6,038,568 A | 3/2000 | McGrath et al. |
| 6,040,829 A | 3/2000 | Croy et al. |
| 6,040,840 A | 3/2000 | Koshiba et al. |
| 6,041,323 A | 3/2000 | Kubota |
| 6,042,012 A | 3/2000 | Olmstead et al. |
| 6,042,383 A | 3/2000 | Herron |
| 6,044,170 A | 3/2000 | Migdal et al. |
| 6,044,376 A | 3/2000 | Kurtzman, II |
| 6,044,378 A | 3/2000 | Gladney |
| 6,044,403 A | 3/2000 | Gerszberg et al. |
| 6,044,464 A | 3/2000 | Shamir |
| 6,044,698 A | 4/2000 | Bryan |
| 6,047,234 A | 4/2000 | Cherveny et al. |
| 6,047,236 A | 4/2000 | Hancock et al. |
| 6,047,258 A | 4/2000 | Allison et al. |
| 6,047,289 A | 4/2000 | Thorne et al. |
| 6,047,311 A | 4/2000 | Ueno et al. |
| 6,047,327 A | 4/2000 | Tso et al. |
| 6,048,276 A | 4/2000 | Vandergrift |
| 6,049,034 A | 4/2000 | Cook |
| 6,049,327 A | 4/2000 | Walker et al. |
| 6,049,652 A | 4/2000 | Yuen et al. |
| 6,049,758 A | 4/2000 | Bunks et al. |
| 6,049,823 A | 4/2000 | Hwang |
| 6,052,081 A | 4/2000 | Krasner |
| 6,052,082 A | 4/2000 | Hassan et al. |
| 6,052,120 A | 4/2000 | Nahi et al. |
| 6,052,145 A | 4/2000 | Macrae et al. |
| 6,052,481 A | 4/2000 | Grajski et al. |
| 6,052,556 A | 4/2000 | Sampsell |
| 6,052,591 A | 4/2000 | Bhatia |
| 6,052,598 A | 4/2000 | Rudrapatna et al. |
| 6,052,676 A | 4/2000 | Hekmatpour |
| 6,053,413 A | 4/2000 | Swift et al. |
| 6,054,950 A | 4/2000 | Fontana |
| 6,054,991 A | 4/2000 | Crane et al. |
| 6,055,333 A | 4/2000 | Guzik et al. |
| 6,055,335 A | 4/2000 | Ida et al. |
| 6,055,337 A | 4/2000 | Kim |
| 6,055,478 A | 4/2000 | Heron |
| 6,055,513 A | 4/2000 | Katz et al. |
| 6,055,542 A | 4/2000 | Nielsen et al. |
| 6,055,560 A | 4/2000 | Mills et al. |
| 6,055,569 A | 4/2000 | O'Brien et al. |
| D424,061 S | 5/2000 | Backs et al. |
| D424,577 S | 5/2000 | Backs et al. |
| 6,057,808 A | 5/2000 | Tajima |
| 6,057,844 A | 5/2000 | Strauss |
| 6,057,845 A | 5/2000 | Dupouy |
| 6,057,872 A | 5/2000 | Candelore |
| 6,057,890 A | 5/2000 | Virden et al. |
| 6,057,966 A | 5/2000 | Carroll et al. |
| 6,058,179 A | 5/2000 | Shaffer et al. |
| 6,058,238 A | 5/2000 | Ng |
| 6,058,307 A | 5/2000 | Garner |
| 6,058,338 A | 5/2000 | Agashe et al. |
| 6,060,989 A | 5/2000 | Gehlot |
| 6,060,995 A | 5/2000 | Wicks et al. |
| 6,060,996 A | 5/2000 | Kaiser et al. |
| 6,061,018 A | 5/2000 | Sheynblat |
| 6,061,021 A | 5/2000 | Zibell |
| 6,061,050 A | 5/2000 | Allport et al. |
| 6,061,097 A | 5/2000 | Satterfield |
| 6,061,468 A | 5/2000 | Kang |

(56) References Cited

U.S. PATENT DOCUMENTS

| | | |
|---|---|---|
| 6,061,503 A | 5/2000 | Chamberlain |
| 6,061,561 A | 5/2000 | Alanara et al. |
| 6,061,632 A | 5/2000 | Dreier |
| 6,061,658 A | 5/2000 | Chou et al. |
| 6,061,680 A | 5/2000 | Scherf et al. |
| 6,061,709 A | 5/2000 | Bronte |
| 6,061,779 A | 5/2000 | Garde |
| 6,064,336 A | 5/2000 | Krasner |
| 6,064,376 A | 5/2000 | Berezowski et al. |
| 6,064,378 A | 5/2000 | Chaney et al. |
| 6,064,398 A | 5/2000 | Ellenby et al. |
| 6,064,438 A | 5/2000 | Miller |
| 6,064,854 A | 5/2000 | Peters et al. |
| 6,064,967 A | 5/2000 | Speicher |
| 6,064,970 A | 5/2000 | McMillan et al. |
| 6,064,976 A | 5/2000 | Tolopka |
| 6,064,980 A | 5/2000 | Jacobi et al. |
| 6,065,042 A | 5/2000 | Reimer et al. |
| 6,065,047 A | 5/2000 | Carpenter et al. |
| 6,066,075 A | 5/2000 | Poulton |
| 6,066,794 A | 5/2000 | Longo |
| 6,067,045 A | 5/2000 | Castelloe et al. |
| 6,067,121 A | 5/2000 | Shigihara |
| 6,067,500 A | 5/2000 | Morimoto et al. |
| 6,067,561 A | 5/2000 | Dillon |
| 6,067,564 A | 5/2000 | Urakoshi et al. |
| 6,067,570 A | 5/2000 | Kreynin et al. |
| 6,069,622 A | 5/2000 | Kurlander |
| 6,070,167 A | 5/2000 | Qian et al. |
| 6,070,228 A | 5/2000 | Belknap et al. |
| 6,070,240 A | 5/2000 | Xydis |
| 6,070,798 A | 6/2000 | Nethery |
| 6,072,421 A | 6/2000 | Fukae et al. |
| 6,072,460 A | 6/2000 | Marshall et al. |
| 6,072,494 A | 6/2000 | Nguyen |
| 6,072,502 A | 6/2000 | Gupta |
| 6,072,934 A | 6/2000 | Abecassis |
| 6,072,983 A | 6/2000 | Klosterman |
| 6,073,489 A | 6/2000 | French et al. |
| 6,075,466 A | 6/2000 | Cohen et al. |
| 6,075,467 A | 6/2000 | Ninagawa |
| 6,075,526 A | 6/2000 | Rothmuller |
| 6,075,551 A | 6/2000 | Berezowski et al. |
| 6,075,568 A | 6/2000 | Matsuura |
| 6,075,570 A | 6/2000 | Usui et al. |
| 6,075,575 A | 6/2000 | Schein et al. |
| 6,075,895 A | 6/2000 | Qiao et al. |
| 6,075,987 A | 6/2000 | Camp, Jr. et al. |
| 6,077,201 A | 6/2000 | Cheng |
| 6,078,269 A | 6/2000 | Markwell et al. |
| 6,078,284 A | 6/2000 | Levanon |
| 6,078,308 A | 6/2000 | Rosenberg et al. |
| 6,078,348 A | 6/2000 | Klosterman et al. |
| 6,078,502 A | 6/2000 | Rostoker et al. |
| 6,081,206 A | 6/2000 | Kielland |
| 6,081,229 A | 6/2000 | Soliman et al. |
| 6,081,621 A | 6/2000 | Ackner |
| 6,081,629 A | 6/2000 | Browning |
| 6,081,691 A | 6/2000 | Renard et al. |
| 6,081,750 A | 6/2000 | Hoffberg et al. |
| 6,081,780 A | 6/2000 | Lumelsky |
| 6,083,248 A | 7/2000 | Thompson |
| 6,083,353 A | 7/2000 | Alexander, Jr. |
| 6,084,510 A | 7/2000 | Lemelson et al. |
| 6,084,512 A | 7/2000 | Elberty et al. |
| 6,084,870 A | 7/2000 | Wooten et al. |
| 6,085,162 A | 7/2000 | Cherny |
| 6,085,244 A | 7/2000 | Wookey |
| 6,085,256 A | 7/2000 | Kitano et al. |
| 6,085,320 A | 7/2000 | Kaliski, Jr. |
| 6,087,952 A | 7/2000 | Prabhakaran |
| 6,087,960 A | 7/2000 | Kyouno et al. |
| 6,088,484 A | 7/2000 | Mead |
| 6,088,635 A | 7/2000 | Cox et al. |
| 6,088,651 A | 7/2000 | Nageswaran |
| 6,088,654 A | 7/2000 | Lepere et al. |
| 6,088,722 A | 7/2000 | Herz et al. |
| 6,088,731 A | 7/2000 | Kiraly et al. |
| 6,091,882 A | 7/2000 | Yuen et al. |
| 6,091,883 A | 7/2000 | Artigalas et al. |
| 6,091,884 A | 7/2000 | Yuen et al. |
| 6,091,956 A | 7/2000 | Hollenberg |
| 6,092,038 A | 7/2000 | Kanevsky et al. |
| 6,092,068 A | 7/2000 | Dinkelacker |
| 6,094,164 A | 7/2000 | Murphy |
| 6,094,169 A | 7/2000 | Smith et al. |
| 6,094,618 A | 7/2000 | Harada |
| 6,094,689 A | 7/2000 | Embry et al. |
| 6,095,418 A | 8/2000 | Swartz et al. |
| 6,097,073 A | 8/2000 | Rostoker et al. |
| 6,097,285 A | 8/2000 | Curtin |
| 6,097,313 A | 8/2000 | Takahashi et al. |
| 6,097,392 A | 8/2000 | Leyerle |
| 6,097,441 A | 8/2000 | Allport |
| 6,097,974 A | 8/2000 | Camp, Jr. et al. |
| 6,098,048 A | 8/2000 | Dashefsky et al. |
| 6,098,065 A | 8/2000 | Skillen et al. |
| 6,098,106 A | 8/2000 | Philyaw et al. |
| 6,098,458 A | 8/2000 | French et al. |
| 6,100,896 A | 8/2000 | Strohecker et al. |
| 6,101,289 A | 8/2000 | Kellner |
| 6,101,510 A | 8/2000 | Stone et al. |
| 6,101,916 A | 8/2000 | Panot et al. |
| 6,104,316 A | 8/2000 | Behr et al. |
| 6,104,334 A | 8/2000 | Allport |
| 6,104,338 A | 8/2000 | Krasner |
| 6,104,401 A | 8/2000 | Parsons |
| 6,104,705 A | 8/2000 | Ismail et al. |
| 6,104,712 A | 8/2000 | Robert et al. |
| 6,104,815 A | 8/2000 | Alcorn et al. |
| 6,104,845 A | 8/2000 | Lipman et al. |
| 6,107,944 A | 8/2000 | Behr et al. |
| 6,107,959 A | 8/2000 | Levanon |
| 6,107,961 A | 8/2000 | Takagi |
| 6,107,994 A | 8/2000 | Harada et al. |
| 6,108,555 A | 8/2000 | Maloney et al. |
| 6,108,637 A | 8/2000 | Blumenau |
| 6,108,656 A | 8/2000 | Durst et al. |
| 6,108,715 A | 8/2000 | Leach et al. |
| 6,111,523 A | 8/2000 | Mee |
| 6,111,541 A | 8/2000 | Karmel |
| 6,111,580 A | 8/2000 | Kazama et al. |
| 6,111,588 A | 8/2000 | Newell |
| 6,111,883 A | 8/2000 | Terada et al. |
| 6,112,181 A | 8/2000 | Shear et al. |
| 6,112,186 A | 8/2000 | Bergh et al. |
| 6,113,494 A | 9/2000 | Lennert |
| 6,114,970 A | 9/2000 | Kirson et al. |
| 6,115,053 A | 9/2000 | Perlin |
| 6,115,471 A | 9/2000 | Oki et al. |
| 6,115,482 A | 9/2000 | Sears et al. |
| 6,115,611 A | 9/2000 | Kimoto et al. |
| 6,115,724 A | 9/2000 | Booker |
| 6,118,403 A | 9/2000 | Lang |
| 6,118,492 A | 9/2000 | Milnes et al. |
| 6,118,521 A | 9/2000 | Jung et al. |
| 6,118,888 A | 9/2000 | Chino et al. |
| 6,118,899 A | 9/2000 | Bloomfield et al. |
| 6,119,013 A | 9/2000 | Maloney et al. |
| 6,119,095 A | 9/2000 | Morita |
| 6,119,098 A | 9/2000 | Guyot et al. |
| 6,121,915 A | 9/2000 | Cooper et al. |
| 6,121,923 A | 9/2000 | King |
| 6,121,924 A | 9/2000 | Meek et al. |
| 6,122,403 A | 9/2000 | Rhoads |
| 6,122,514 A | 9/2000 | Spaur et al. |
| 6,122,520 A | 9/2000 | Want et al. |
| 6,122,593 A | 9/2000 | Friederich et al. |
| 6,124,810 A | 9/2000 | Segal et al. |
| 6,125,230 A | 9/2000 | Yaginuma |
| 6,125,387 A | 9/2000 | Simonoff et al. |
| D432,539 S | 10/2000 | Philyaw |
| 6,127,945 A | 10/2000 | Mura-Smith |
| 6,127,970 A | 10/2000 | Lin |

(56) References Cited

U.S. PATENT DOCUMENTS

| | | |
|---|---|---|
| 6,127,975 A | 10/2000 | Maloney |
| 6,128,003 A | 10/2000 | Smith et al. |
| 6,128,469 A | 10/2000 | Zenick, Jr. et al. |
| 6,128,482 A | 10/2000 | Nixon et al. |
| 6,128,501 A | 10/2000 | Ffoulkes-Jones |
| 6,128,608 A | 10/2000 | Barnhill |
| 6,130,677 A | 10/2000 | Kunz |
| 6,130,726 A | 10/2000 | Darbee et al. |
| 6,131,066 A | 10/2000 | Ahrens et al. |
| 6,131,067 A | 10/2000 | Girerd et al. |
| 6,133,847 A | 10/2000 | Yang |
| 6,133,853 A | 10/2000 | Obradovich et al. |
| 6,133,874 A | 10/2000 | Krasner |
| 6,133,909 A | 10/2000 | Schein et al. |
| 6,133,910 A | 10/2000 | Stinebruner |
| 6,133,912 A | 10/2000 | Montero |
| 6,134,483 A | 10/2000 | Vayanos et al. |
| 6,134,532 A | 10/2000 | Lazarus et al. |
| 6,137,433 A | 10/2000 | Zavorotny et al. |
| 6,137,950 A | 10/2000 | Yuen |
| 6,138,072 A | 10/2000 | Nagai |
| 6,138,073 A | 10/2000 | Uchigaki |
| 6,138,155 A | 10/2000 | Davis et al. |
| 6,138,173 A | 10/2000 | Hisano |
| 6,138,915 A | 10/2000 | Danielson et al. |
| 6,139,177 A | 10/2000 | Venkatraman et al. |
| 6,140,140 A | 10/2000 | Hopper |
| 6,140,943 A | 10/2000 | Levine |
| 6,140,957 A | 10/2000 | Wilson et al. |
| 6,141,003 A | 10/2000 | Chor et al. |
| 6,141,010 A | 10/2000 | Hoyle |
| 6,141,488 A | 10/2000 | Knudson et al. |
| 6,141,611 A | 10/2000 | Mackey et al. |
| 6,141,699 A | 10/2000 | Luzzi et al. |
| 6,144,318 A | 11/2000 | Hayashi et al. |
| 6,144,338 A | 11/2000 | Davies |
| 6,144,366 A | 11/2000 | Numazaki et al. |
| 6,144,401 A | 11/2000 | Casement et al. |
| 6,144,702 A | 11/2000 | Yurt et al. |
| 6,144,905 A | 11/2000 | Gannon |
| 6,144,917 A | 11/2000 | Walters et al. |
| 6,145,003 A | 11/2000 | Sanu et al. |
| 6,145,082 A | 11/2000 | Gannon et al. |
| 6,147,598 A | 11/2000 | Murphy et al. |
| 6,147,678 A | 11/2000 | Kumar et al. |
| 6,148,179 A | 11/2000 | Wright et al. |
| 6,148,261 A | 11/2000 | Obradovich et al. |
| 6,149,519 A | 11/2000 | Osaki et al. |
| 6,150,927 A | 11/2000 | Nesbitt |
| 6,150,937 A | 11/2000 | Rackman |
| 6,150,961 A | 11/2000 | Alewine et al. |
| 6,150,980 A | 11/2000 | Krasner |
| 6,151,059 A | 11/2000 | Schein et al. |
| 6,151,208 A | 11/2000 | Bartlett |
| 6,151,551 A | 11/2000 | Geier et al. |
| 6,151,600 A | 11/2000 | Dedrick |
| 6,151,624 A | 11/2000 | Teare et al. |
| 6,151,631 A | 11/2000 | Ansell et al. |
| 6,151,643 A | 11/2000 | Cheng et al. |
| 6,152,856 A | 11/2000 | Studor et al. |
| 6,154,123 A | 11/2000 | Kleinberg |
| 6,154,172 A | 11/2000 | Piccionelli et al. |
| 6,154,207 A | 11/2000 | Farris et al. |
| 6,154,222 A | 11/2000 | Haratsch et al. |
| 6,154,658 A | 11/2000 | Caci |
| 6,154,723 A | 11/2000 | Cox et al. |
| 6,154,737 A | 11/2000 | Inaba et al. |
| 6,154,745 A | 11/2000 | Kari et al. |
| 6,154,758 A | 11/2000 | Chiang |
| 6,157,317 A | 12/2000 | Walker |
| 6,157,411 A | 12/2000 | Williams et al. |
| 6,157,413 A | 12/2000 | Hanafee et al. |
| 6,157,465 A | 12/2000 | Suda et al. |
| 6,157,621 A | 12/2000 | Brown et al. |
| 6,157,890 A | 12/2000 | Nakai et al. |
| 6,157,924 A | 12/2000 | Austin |
| 6,157,935 A | 12/2000 | Tran et al. |
| 6,159,100 A | 12/2000 | Smith |
| 6,160,477 A | 12/2000 | Sandelman et al. |
| 6,160,841 A | 12/2000 | Stansell, Jr. et al. |
| 6,160,988 A | 12/2000 | Shroyer |
| 6,160,998 A | 12/2000 | Wright et al. |
| 6,161,062 A | 12/2000 | Sicre et al. |
| 6,161,071 A | 12/2000 | Shuman et al. |
| 6,161,097 A | 12/2000 | Glass et al. |
| 6,161,125 A | 12/2000 | Traversat et al. |
| 6,163,316 A | 12/2000 | Killian |
| 6,163,338 A | 12/2000 | Johnson et al. |
| 6,163,345 A | 12/2000 | Noguchi et al. |
| 6,163,681 A | 12/2000 | Wright et al. |
| 6,163,711 A | 12/2000 | Juntunen et al. |
| 6,163,748 A | 12/2000 | Guenther |
| 6,163,749 A | 12/2000 | McDonough et al. |
| 6,164,534 A | 12/2000 | Rathus et al. |
| 6,165,070 A | 12/2000 | Nolte et al. |
| 6,166,627 A | 12/2000 | Reeley |
| 6,167,188 A | 12/2000 | Young et al. |
| 6,167,238 A | 12/2000 | Wright |
| 6,167,239 A | 12/2000 | Wright et al. |
| 6,167,253 A | 12/2000 | Farris et al. |
| 6,167,255 A | 12/2000 | Kennedy, III et al. |
| 6,167,369 A | 12/2000 | Schulze |
| 6,169,543 B1 | 1/2001 | Wehmeyer |
| 6,169,894 B1 | 1/2001 | McCormick et al. |
| 6,169,901 B1 | 1/2001 | Boucher |
| 6,169,902 B1 | 1/2001 | Kawamoto |
| 6,169,969 B1 | 1/2001 | Cohen |
| 6,169,976 B1 | 1/2001 | Colosso |
| 6,169,992 B1 | 1/2001 | Beall et al. |
| 6,170,075 B1 | 1/2001 | Schuster et al. |
| 6,172,674 B1 | 1/2001 | Etheredge |
| 6,172,677 B1 | 1/2001 | Stautner et al. |
| 6,173,066 B1 | 1/2001 | Peurach et al. |
| 6,173,316 B1 | 1/2001 | De Boor et al. |
| 6,175,728 B1 | 1/2001 | Mitama |
| 6,175,772 B1 | 1/2001 | Kamiya et al. |
| 6,175,782 B1 | 1/2001 | Obradovich et al. |
| 6,175,789 B1 | 1/2001 | Beckert et al. |
| 6,175,868 B1 | 1/2001 | Lavian et al. |
| 6,175,922 B1 | 1/2001 | Wang |
| 6,177,873 B1 | 1/2001 | Cragun |
| 6,177,931 B1 | 1/2001 | Alexander et al. |
| 6,178,261 B1 | 1/2001 | Williams et al. |
| 6,178,263 B1 | 1/2001 | Fan et al. |
| 6,178,506 B1 | 1/2001 | Quick, Jr. |
| 6,179,713 B1 | 1/2001 | James et al. |
| 6,181,335 B1 | 1/2001 | Hendricks et al. |
| 6,181,343 B1 | 1/2001 | Lyons |
| 6,181,778 B1 | 1/2001 | Ohki et al. |
| 6,181,922 B1 | 1/2001 | Iwai et al. |
| 6,181,988 B1 | 1/2001 | Schneider et al. |
| 6,181,994 B1 | 1/2001 | Colson et al. |
| 6,182,006 B1 | 1/2001 | Meek |
| 6,182,069 B1 | 1/2001 | Niblack et al. |
| 6,182,089 B1 | 1/2001 | Ganapathy et al. |
| 6,182,094 B1 | 1/2001 | Humpleman et al. |
| 6,182,509 B1 | 2/2001 | Leung |
| 6,183,365 B1 | 2/2001 | Tonomura et al. |
| 6,183,366 B1 | 2/2001 | Goldberg et al. |
| 6,184,798 B1 | 2/2001 | Egri |
| 6,184,847 B1 | 2/2001 | Fateh et al. |
| 6,184,877 B1 | 2/2001 | Dodson et al. |
| 6,185,427 B1 | 2/2001 | Krasner et al. |
| 6,185,484 B1 | 2/2001 | Rhinehart |
| 6,185,491 B1 | 2/2001 | Gray et al. |
| 6,185,586 B1 | 2/2001 | Judson |
| 6,185,625 B1 | 2/2001 | Tso et al. |
| 6,188,354 B1 | 2/2001 | Soliman et al. |
| 6,188,381 B1 | 2/2001 | van der Wal et al. |
| 6,188,397 B1 | 2/2001 | Humpleman |
| 6,188,777 B1 | 2/2001 | Darrell et al. |
| 6,188,909 B1 | 2/2001 | Alanara et al. |
| 6,189,098 B1 | 2/2001 | Kaliski, Jr. |
| 6,192,165 B1 | 2/2001 | Irons |

(56) References Cited

U.S. PATENT DOCUMENTS

| | | |
|---|---|---|
| 6,192,282 B1 | 2/2001 | Smith et al. |
| 6,192,314 B1 | 2/2001 | Khavakh et al. |
| 6,192,340 B1 | 2/2001 | Abecassis |
| 6,192,478 B1 | 2/2001 | Elledge |
| 6,195,104 B1 | 2/2001 | Lyons |
| 6,195,475 B1 | 2/2001 | Beausoleil, Jr. et al. |
| 6,195,542 B1 | 2/2001 | Griffith |
| 6,195,557 B1 | 2/2001 | Havinis et al. |
| 6,195,654 B1 | 2/2001 | Wachtel |
| 6,196,920 B1 | 3/2001 | Spaur et al. |
| 6,198,920 B1 | 3/2001 | Doviak et al. |
| 6,199,015 B1 | 3/2001 | Curtwright et al. |
| 6,199,045 B1 | 3/2001 | Giniger et al. |
| 6,199,048 B1 | 3/2001 | Hudetz et al. |
| 6,199,076 B1 | 3/2001 | Logan et al. |
| 6,199,082 B1 | 3/2001 | Ferrel et al. |
| 6,199,099 B1 | 3/2001 | Gershman et al. |
| 6,201,493 B1 | 3/2001 | Silverman |
| 6,201,903 B1 | 3/2001 | Wolff et al. |
| 6,201,996 B1 | 3/2001 | Crater et al. |
| 6,202,008 B1 | 3/2001 | Beckert et al. |
| 6,202,023 B1 | 3/2001 | Hancock et al. |
| 6,202,027 B1 | 3/2001 | Alland et al. |
| 6,202,096 B1 | 3/2001 | Williams et al. |
| 6,202,211 B1 | 3/2001 | Williams, Jr. |
| 6,203,366 B1 | 3/2001 | Muller et al. |
| 6,204,798 B1 | 3/2001 | Fleming, III |
| 6,204,804 B1 | 3/2001 | Andersson |
| 6,204,852 B1 | 3/2001 | Kumar et al. |
| 6,205,330 B1 | 3/2001 | Winbladh |
| 6,208,247 B1 | 3/2001 | Agre et al. |
| 6,208,290 B1 | 3/2001 | Krasner |
| 6,208,335 B1 | 3/2001 | Gordon et al. |
| 6,208,355 B1 | 3/2001 | Schuster |
| 6,208,384 B1 | 3/2001 | Schultheiss |
| 6,208,435 B1 | 3/2001 | Zwolinski |
| 6,208,799 B1 | 3/2001 | Marsh et al. |
| 6,208,805 B1 | 3/2001 | Abecassis |
| 6,208,844 B1 | 3/2001 | Abdelgany |
| 6,208,862 B1 | 3/2001 | Lee |
| 6,211,777 B1 | 4/2001 | Greenwood et al. |
| 6,211,907 B1 | 4/2001 | Scaman et al. |
| 6,212,299 B1 | 4/2001 | Yuge |
| 6,212,327 B1 | 4/2001 | Berstis et al. |
| 6,212,552 B1 | 4/2001 | Biliris et al. |
| 6,212,553 B1 | 4/2001 | Lee et al. |
| 6,215,441 B1 | 4/2001 | Moeglein et al. |
| 6,215,890 B1 | 4/2001 | Matsuo et al. |
| 6,215,898 B1 | 4/2001 | Woodfill et al. |
| 6,216,129 B1 | 4/2001 | Eldering |
| 6,216,264 B1 | 4/2001 | Maze et al. |
| 6,216,265 B1 | 4/2001 | Roop et al. |
| 6,218,964 B1 | 4/2001 | Ellis |
| 6,219,057 B1 | 4/2001 | Carey et al. |
| 6,219,669 B1 | 4/2001 | Haff et al. |
| 6,219,696 B1 | 4/2001 | Wynblatt et al. |
| 6,219,839 B1 | 4/2001 | Sampsell |
| 6,222,465 B1 | 4/2001 | Kumar et al. |
| 6,223,124 B1 | 4/2001 | Matsuno et al. |
| 6,225,890 B1 | 5/2001 | Murphy |
| 6,225,901 B1 | 5/2001 | Kail, IV |
| 6,226,389 B1 | 5/2001 | Lemelson et al. |
| 6,226,396 B1 | 5/2001 | Marugame |
| 6,226,631 B1 | 5/2001 | Evans |
| 6,229,137 B1 | 5/2001 | Bohn |
| 6,229,542 B1 | 5/2001 | Miller |
| 6,229,913 B1 | 5/2001 | Nayar et al. |
| 6,230,501 B1 | 5/2001 | Bailey, Sr. et al. |
| 6,233,389 B1 | 5/2001 | Barton et al. |
| 6,233,468 B1 | 5/2001 | Chen |
| 6,233,591 B1 | 5/2001 | Sherman et al. |
| 6,233,610 B1 | 5/2001 | Hayball et al. |
| 6,233,734 B1 | 5/2001 | Macrae et al. |
| 6,236,360 B1 | 5/2001 | Rudow et al. |
| 6,236,365 B1 | 5/2001 | LeBlanc et al. |
| 6,236,652 B1 | 5/2001 | Preston et al. |
| 6,236,975 B1 | 5/2001 | Boe et al. |
| 6,237,049 B1 | 5/2001 | Ludtke |
| 6,238,290 B1 | 5/2001 | Tarr et al. |
| 6,239,081 B1 | 5/2001 | Korzilius et al. |
| 6,239,742 B1 | 5/2001 | Krasner |
| 6,239,794 B1 | 5/2001 | Yuen et al. |
| 6,240,207 B1 | 5/2001 | Shinozuka et al. |
| 6,240,365 B1 | 5/2001 | Bunn |
| 6,240,555 B1 | 5/2001 | Shoff et al. |
| 6,243,450 B1 | 6/2001 | Jansen et al. |
| 6,243,683 B1 | 6/2001 | Peters |
| 6,244,873 B1 | 6/2001 | Hill et al. |
| 6,246,471 B1 | 6/2001 | Jung et al. |
| 6,246,479 B1 | 6/2001 | Jung et al. |
| 6,246,672 B1 | 6/2001 | Lumelsky |
| 6,246,688 B1 | 6/2001 | Angwin et al. |
| 6,246,935 B1 | 6/2001 | Buckley |
| 6,247,019 B1 | 6/2001 | Davies |
| 6,247,135 B1 | 6/2001 | Feague |
| 6,247,176 B1 | 6/2001 | Schein et al. |
| 6,249,218 B1 | 6/2001 | Blair |
| 6,249,252 B1 | 6/2001 | Dupray |
| 6,249,292 B1 | 6/2001 | Christian et al. |
| 6,249,294 B1 | 6/2001 | Lefebvre et al. |
| 6,249,348 B1 | 6/2001 | Jung et al. |
| 6,249,606 B1 | 6/2001 | Kiraly et al. |
| 6,249,817 B1 | 6/2001 | Nakabayashi et al. |
| 6,249,873 B1 | 6/2001 | Richard et al. |
| 6,250,148 B1 | 6/2001 | Lynam |
| 6,250,601 B1 * | 6/2001 | Kolar et al. ............. 251/129.04 |
| 6,251,017 B1 | 6/2001 | Leason et al. |
| 6,252,539 B1 | 6/2001 | Phillips et al. |
| 6,252,544 B1 | 6/2001 | Hoffberg |
| 6,252,598 B1 | 6/2001 | Segen |
| 6,253,187 B1 | 6/2001 | Fox |
| 6,253,203 B1 | 6/2001 | O'Flaherty et al. |
| 6,253,258 B1 | 6/2001 | Cohen |
| 6,253,326 B1 | 6/2001 | Lincke et al. |
| 6,255,942 B1 | 7/2001 | Knudsen |
| 6,255,953 B1 | 7/2001 | Barber |
| 6,256,033 B1 | 7/2001 | Nguyen |
| 6,256,400 B1 | 7/2001 | Takata et al. |
| 6,260,088 B1 | 7/2001 | Gove et al. |
| 6,260,147 B1 | 7/2001 | Quick, Jr. |
| 6,262,722 B1 | 7/2001 | Allison et al. |
| 6,262,772 B1 | 7/2001 | Shen et al. |
| 6,263,268 B1 | 7/2001 | Nathanson |
| 6,263,360 B1 | 7/2001 | Arnold et al. |
| 6,263,363 B1 | 7/2001 | Rosenblatt et al. |
| 6,263,384 B1 | 7/2001 | Yanase |
| 6,263,501 B1 | 7/2001 | Schein et al. |
| 6,263,503 B1 | 7/2001 | Margulis |
| 6,263,507 B1 | 7/2001 | Ahmad et al. |
| 6,264,555 B1 | 7/2001 | Glazman et al. |
| 6,264,560 B1 | 7/2001 | Goldberg et al. |
| 6,265,844 B1 | 7/2001 | Wakefield |
| 6,266,057 B1 | 7/2001 | Kuzunuki et al. |
| 6,266,667 B1 | 7/2001 | Olsson |
| 6,266,814 B1 | 7/2001 | Lemmons et al. |
| 6,267,672 B1 | 7/2001 | Vance |
| 6,267,675 B1 | 7/2001 | Lee |
| 6,268,849 B1 | 7/2001 | Boyer et al. |
| 6,268,853 B1 | 7/2001 | Hoskins et al. |
| 6,269,187 B1 | 7/2001 | Frink et al. |
| 6,269,188 B1 | 7/2001 | Jamali |
| 6,270,013 B1 | 8/2001 | Lipman et al. |
| 6,271,858 B1 | 8/2001 | Dalal et al. |
| 6,272,405 B1 | 8/2001 | Kubota |
| 6,272,537 B1 | 8/2001 | Kekic et al. |
| 6,272,632 B1 | 8/2001 | Carman et al. |
| 6,273,771 B1 | 8/2001 | Buckley et al. |
| 6,275,231 B1 | 8/2001 | Obradovich |
| 6,275,648 B1 | 8/2001 | Knudson et al. |
| 6,275,692 B1 | 8/2001 | Skog |
| 6,275,774 B1 | 8/2001 | Baron, Sr. et al. |
| 6,275,849 B1 | 8/2001 | Ludwig |
| 6,275,854 B1 | 8/2001 | Himmel et al. |
| 6,275,989 B1 | 8/2001 | Broadwin et al. |

(56) References Cited

U.S. PATENT DOCUMENTS

| | | | |
|---|---|---|---|
| 6,279,029 B1 | 8/2001 | Sampat et al. |
| 6,281,792 B1 | 8/2001 | Lerg et al. |
| 6,281,808 B1 | 8/2001 | Glier et al. |
| 6,282,464 B1 | 8/2001 | Obradovich |
| D448,366 S | 9/2001 | Youngers et al. |
| 6,283,860 B1 | 9/2001 | Lyons et al. |
| 6,285,794 B1 | 9/2001 | Georgiev et al. |
| 6,285,899 B1 | 9/2001 | Ghaem et al. |
| 6,285,931 B1 | 9/2001 | Hattori et al. |
| 6,286,142 B1 | 9/2001 | Ehreth |
| 6,287,201 B1 | 9/2001 | Hightower |
| 6,288,643 B1 | 9/2001 | Lerg et al. |
| 6,288,716 B1 | 9/2001 | Humpleman et al. |
| 6,289,112 B1 | 9/2001 | Jain et al. |
| 6,289,304 B1 | 9/2001 | Grefenstette |
| 6,289,319 B1 | 9/2001 | Lockwood |
| 6,292,109 B1 | 9/2001 | Murano et al. |
| 6,292,274 B1 | 9/2001 | Bohn |
| 6,292,624 B1 | 9/2001 | Saib et al. |
| 6,292,747 B1 | 9/2001 | Amro et al. |
| 6,292,889 B1 | 9/2001 | Fitzgerald et al. |
| 6,294,987 B1 | 9/2001 | Matsuda et al. |
| 6,295,001 B1 | 9/2001 | Barber |
| 6,295,346 B1 | 9/2001 | Markowitz et al. |
| 6,295,449 B1 | 9/2001 | Westerlage et al. |
| 6,295,492 B1 | 9/2001 | Lang et al. |
| 6,295,513 B1 | 9/2001 | Thackston |
| 6,295,530 B1 | 9/2001 | Ritchie et al. |
| 6,297,732 B2 | 10/2001 | Hsu et al. |
| 6,297,768 B1 | 10/2001 | Allen, Jr. |
| 6,298,302 B2 | 10/2001 | Walgers et al. |
| 6,298,348 B1 | 10/2001 | Eldering |
| 6,298,445 B1 | 10/2001 | Shostack et al. |
| 6,298,482 B1 | 10/2001 | Seidman et al. |
| 6,299,308 B1 | 10/2001 | Voronka et al. |
| 6,301,245 B1 | 10/2001 | Luzeski et al. |
| 6,304,674 B1 | 10/2001 | Cass et al. |
| 6,304,816 B1 | 10/2001 | Berstis |
| 6,305,018 B1 | 10/2001 | Usui et al. |
| 6,307,504 B1 | 10/2001 | Sheynblat |
| 6,307,751 B1 | 10/2001 | Bodony et al. |
| 6,307,952 B1 | 10/2001 | Dietz |
| 6,307,955 B1 | 10/2001 | Zank et al. |
| 6,308,175 B1 | 10/2001 | Lang et al. |
| 6,308,269 B2 | 10/2001 | Proidl |
| 6,308,328 B1 | 10/2001 | Bowcutt et al. |
| 6,308,565 B1 | 10/2001 | French et al. |
| 6,310,886 B1 | 10/2001 | Barton |
| 6,310,971 B1 | 10/2001 | Shiiyama |
| 6,310,988 B1 | 10/2001 | Flores et al. |
| 6,311,011 B1 | 10/2001 | Kuroda |
| 6,311,060 B1 | 10/2001 | Evans et al. |
| 6,311,152 B1 | 10/2001 | Bai et al. |
| 6,312,175 B1 | 11/2001 | Lum |
| 6,312,337 B1 | 11/2001 | Edwards et al. |
| 6,313,786 B1 | 11/2001 | Sheynblat et al. |
| 6,313,853 B1 | 11/2001 | Lamontagne et al. |
| 6,314,184 B1 | 11/2001 | Fernandez-Martinez |
| 6,314,326 B1 | 11/2001 | Fuchu |
| 6,314,364 B1 | 11/2001 | Nakamura |
| 6,314,365 B1 | 11/2001 | Smith |
| 6,314,366 B1 | 11/2001 | Farmakis et al. |
| 6,314,399 B1 | 11/2001 | Deligne et al. |
| 6,314,406 B1 | 11/2001 | O'Hagan et al. |
| 6,314,415 B1 | 11/2001 | Mukherjee |
| 6,314,420 B1 | 11/2001 | Lang et al. |
| 6,314,422 B1 | 11/2001 | Barker et al. |
| 6,314,452 B1 | 11/2001 | Dekel et al. |
| 6,314,457 B1 | 11/2001 | Schena et al. |
| 6,316,710 B1 | 11/2001 | Lindemann |
| 6,316,934 B1 | 11/2001 | Amorai-Moriya et al. |
| 6,317,090 B1 | 11/2001 | Nagy et al. |
| 6,317,132 B1 | 11/2001 | Perlin |
| 6,317,718 B1 | 11/2001 | Fano |
| 6,317,761 B1 | 11/2001 | Landsman et al. |
| 6,317,777 B1 | 11/2001 | Skarbo et al. |
| 6,317,781 B1 | 11/2001 | De Boor et al. |
| 6,317,881 B1 | 11/2001 | Shah-Nazaroff et al. |
| 6,317,884 B1 | 11/2001 | Eames et al. |
| 6,317,885 B1 | 11/2001 | Fries |
| 6,318,087 B1 | 11/2001 | Baumann et al. |
| 6,320,495 B1 | 11/2001 | Sporgis |
| 6,321,257 B1 | 11/2001 | Kotola et al. |
| 6,321,318 B1 | 11/2001 | Baltz et al. |
| 6,321,991 B1 | 11/2001 | Knowles |
| 6,323,803 B1 | 11/2001 | Jolley et al. |
| 6,323,846 B1 | 11/2001 | Westerman et al. |
| 6,323,894 B1 | 11/2001 | Katz |
| 6,323,911 B1 | 11/2001 | Schein et al. |
| 6,324,338 B1 | 11/2001 | Wood et al. |
| 6,324,393 B1 | 11/2001 | Doshay |
| 6,324,450 B1 | 11/2001 | Iwama |
| 6,324,519 B1 | 11/2001 | Eldering |
| 6,324,542 B1 | 11/2001 | Wright, Jr. et al. |
| 6,324,650 B1 | 11/2001 | Ogilvie |
| 6,326,903 B1 | 12/2001 | Gross et al. |
| 6,326,962 B1 | 12/2001 | Szabo |
| 6,326,982 B1 | 12/2001 | Wu et al. |
| 6,327,049 B1 | 12/2001 | Ohtsuka |
| 6,327,073 B1 | 12/2001 | Yahav et al. |
| 6,327,418 B1 | 12/2001 | Barton |
| 6,327,473 B1 | 12/2001 | Soliman et al. |
| 6,327,536 B1 | 12/2001 | Tsuji et al. |
| 6,327,590 B1 | 12/2001 | Chidlovskii et al. |
| 6,327,607 B1 | 12/2001 | Fant |
| 6,329,984 B1 | 12/2001 | Boss et al. |
| 6,330,021 B1 | 12/2001 | Devaux |
| 6,330,022 B1 | 12/2001 | Seligmann |
| 6,330,499 B1 | 12/2001 | Chou et al. |
| 6,330,976 B1 | 12/2001 | Dymetman et al. |
| 6,331,877 B1 | 12/2001 | Bennington et al. |
| 6,332,086 B2 | 12/2001 | Avis |
| 6,332,127 B1 | 12/2001 | Bandera et al. |
| 6,333,703 B1 | 12/2001 | Alewine et al. |
| 6,333,919 B2 | 12/2001 | Gaffney |
| 6,335,569 B1 | 1/2002 | Joshi |
| 6,335,725 B1 | 1/2002 | Koh et al. |
| 6,335,963 B1 | 1/2002 | Bosco |
| 6,335,965 B1 | 1/2002 | Katz |
| 6,336,099 B1 | 1/2002 | Barnett et al. |
| 6,338,059 B1 | 1/2002 | Fields et al. |
| 6,339,370 B1 | 1/2002 | Ruhl et al. |
| 6,339,842 B1 | 1/2002 | Fernandez et al. |
| 6,340,959 B1 | 1/2002 | Inamori |
| 6,340,977 B1 | 1/2002 | Lui et al. |
| 6,341,195 B1 | 1/2002 | Mankovitz et al. |
| 6,341,280 B1 | 1/2002 | Glass et al. |
| 6,341,288 B1 | 1/2002 | Yach et al. |
| 6,341,290 B1 | 1/2002 | Lombardo et al. |
| 6,341,374 B2 | 1/2002 | Schein et al. |
| 6,341,523 B2 | 1/2002 | Lynam |
| 6,343,218 B1 | 1/2002 | Kaneda et al. |
| 6,343,318 B1 | 1/2002 | Hawkins et al. |
| 6,343,377 B1 | 1/2002 | Gessner et al. |
| 6,343,810 B1 | 2/2002 | Breed |
| 6,343,990 B1 | 2/2002 | Rasmussen et al. |
| 6,344,906 B1 | 2/2002 | Gatto et al. |
| 6,345,104 B1 | 2/2002 | Rhoads |
| 6,345,239 B1 | 2/2002 | Bowman-Amuah |
| 6,345,288 B1 | 2/2002 | Reed et al. |
| 6,346,045 B2 | 2/2002 | Rider et al. |
| 6,346,933 B1 | 2/2002 | Lin |
| 6,346,951 B1 | 2/2002 | Mastronardi |
| 6,347,290 B1 | 2/2002 | Bartlett |
| 6,347,313 B1 | 2/2002 | Ma et al. |
| 6,349,134 B1 | 2/2002 | Katz |
| 6,349,308 B1 | 2/2002 | Whang et al. |
| 6,349,339 B1 | 2/2002 | Williams |
| 6,351,222 B1 | 2/2002 | Swan et al. |
| 6,351,776 B1 | 2/2002 | O'Brien et al. |
| 6,353,398 B1 | 3/2002 | Amin et al. |
| 6,353,839 B1 | 3/2002 | King et al. |
| 6,353,850 B1 | 3/2002 | Wies et al. |
| 6,356,281 B1 | 3/2002 | Isenman |

(56) References Cited

U.S. PATENT DOCUMENTS

| | | |
|---|---|---|
| 6,356,899 B1 | 3/2002 | Chakrabarti et al. |
| 6,356,933 B2 | 3/2002 | Mitchell et al. |
| 6,357,043 B1 | 3/2002 | Ellis et al. |
| 6,359,636 B1 | 3/2002 | Schindler et al. |
| 6,360,093 B1 | 3/2002 | Ross et al. |
| 6,360,102 B1 | 3/2002 | Havinis et al. |
| 6,360,949 B1 | 3/2002 | Shepard et al. |
| 6,360,951 B1 | 3/2002 | Swinehart |
| 6,362,730 B2 | 3/2002 | Razavi et al. |
| 6,362,748 B1 | 3/2002 | Huang |
| 6,362,888 B1 | 3/2002 | Jung et al. |
| 6,363,160 B1 | 3/2002 | Bradski et al. |
| 6,363,254 B1 | 3/2002 | Jones et al. |
| 6,363,421 B2 | 3/2002 | Barker et al. |
| RE37,654 E | 4/2002 | Longo |
| 6,366,288 B1 | 4/2002 | Naruki et al. |
| 6,366,701 B1 | 4/2002 | Chalom et al. |
| 6,366,893 B2 | 4/2002 | Hannula et al. |
| 6,367,019 B1 | 4/2002 | Ansell et al. |
| 6,367,080 B1 | 4/2002 | Enomoto et al. |
| 6,369,811 B1 | 4/2002 | Graham et al. |
| 6,370,448 B1 | 4/2002 | Eryurek |
| 6,370,475 B1 | 4/2002 | Breed et al. |
| 6,371,850 B1 | 4/2002 | Sonoda |
| 6,373,528 B1 | 4/2002 | Bennington et al. |
| 6,373,573 B1 | 4/2002 | Jung et al. |
| 6,373,841 B1 | 4/2002 | Goh et al. |
| 6,373,851 B1 | 4/2002 | Dadario |
| 6,374,237 B1 | 4/2002 | Reese |
| 6,374,286 B1 | 4/2002 | Gee et al. |
| 6,374,290 B1 | 4/2002 | Scharber et al. |
| 6,374,406 B2 | 4/2002 | Hirata |
| 6,377,209 B1 | 4/2002 | Krasner |
| 6,377,296 B1 | 4/2002 | Zlatsin et al. |
| 6,377,712 B1 | 4/2002 | Georgiev et al. |
| 6,377,825 B1 | 4/2002 | Kennedy et al. |
| 6,377,860 B1 | 4/2002 | Gray et al. |
| 6,377,986 B1 | 4/2002 | Philyaw et al. |
| 6,378,075 B1 | 4/2002 | Goldstein et al. |
| 6,379,251 B1 | 4/2002 | Auxier et al. |
| 6,380,931 B1 | 4/2002 | Gillespie et al. |
| 6,381,341 B1 | 4/2002 | Rhoads |
| 6,381,362 B1 | 4/2002 | Deshpande et al. |
| 6,381,535 B1 | 4/2002 | Durocher et al. |
| 6,381,575 B1 | 4/2002 | Martin et al. |
| 6,381,602 B1 | 4/2002 | Shoroff et al. |
| 6,381,603 B1 | 4/2002 | Chan et al. |
| 6,381,677 B1 | 4/2002 | Beardsley et al. |
| 6,381,747 B1 | 4/2002 | Wonfor et al. |
| 6,382,897 B2 | 5/2002 | Mattio et al. |
| 6,384,744 B1 | 5/2002 | Philyaw et al. |
| 6,384,776 B1 | 5/2002 | Martin |
| 6,384,819 B1 | 5/2002 | Hunter |
| 6,384,829 B1 | 5/2002 | Prevost et al. |
| 6,385,592 B1 | 5/2002 | Angles et al. |
| 6,385,653 B1 | 5/2002 | Sitaraman et al. |
| 6,388,579 B1 | 5/2002 | Adcox et al. |
| 6,388,714 B1 | 5/2002 | Schein et al. |
| 6,389,340 B1 | 5/2002 | Rayner |
| 6,389,464 B1 | 5/2002 | Krishnamurthy et al. |
| 6,389,483 B1 | 5/2002 | Larsson |
| 6,390,922 B1 | 5/2002 | Vange et al. |
| 6,392,591 B1 | 5/2002 | Hsu et al. |
| 6,392,692 B1 | 5/2002 | Monroe |
| 6,393,443 B1 | 5/2002 | Rubin et al. |
| 6,393,574 B1 | 5/2002 | Kashiwagi et al. |
| 6,394,899 B1 | 5/2002 | Walker |
| 6,396,523 B1 | 5/2002 | Segal et al. |
| 6,396,544 B1 | 5/2002 | Schindler et al. |
| 6,396,546 B1 | 5/2002 | Alten et al. |
| 6,396,951 B1 | 5/2002 | Grefenstette |
| 6,397,080 B1 | 5/2002 | Viktorsson et al. |
| 6,397,259 B1 | 5/2002 | Lincke et al. |
| 6,400,304 B1 | 6/2002 | Chubbs, III |
| 6,400,314 B1 | 6/2002 | Krasner |
| 6,400,690 B1 | 6/2002 | Liu et al. |
| 6,400,845 B1 | 6/2002 | Volino |
| 6,400,953 B1 | 6/2002 | Furukawa |
| 6,400,958 B1 | 6/2002 | Isomursu et al. |
| 6,400,990 B1 | 6/2002 | Silvian |
| 6,400,996 B1 | 6/2002 | Hoffberg et al. |
| 6,401,027 B1 | 6/2002 | Xu et al. |
| 6,401,029 B1 | 6/2002 | Kubota et al. |
| 6,401,085 B1 | 6/2002 | Gershman et al. |
| 6,404,352 B1 | 6/2002 | Ichikawa et al. |
| 6,404,438 B1 | 6/2002 | Hatlelid et al. |
| 6,405,033 B1 | 6/2002 | Kennedy, III et al. |
| 6,405,132 B1 | 6/2002 | Breed et al. |
| 6,405,252 B1 | 6/2002 | Gupta et al. |
| 6,408,174 B1 | 6/2002 | Steijer |
| 6,408,257 B1 | 6/2002 | Harrington et al. |
| 6,408,437 B1 | 6/2002 | Hendricks et al. |
| 6,409,401 B1 | 6/2002 | Petteruti et al. |
| 6,411,254 B1 | 6/2002 | Moeglein et al. |
| 6,411,696 B1 | 6/2002 | Iverson et al. |
| 6,411,744 B1 | 6/2002 | Edwards |
| 6,411,936 B1 | 6/2002 | Sanders |
| 6,412,110 B1 | 6/2002 | Schein et al. |
| 6,414,671 B1 | 7/2002 | Gillespie et al. |
| 6,414,750 B2 | 7/2002 | Jung et al. |
| 6,414,955 B1 | 7/2002 | Clare et al. |
| 6,415,188 B1 | 7/2002 | Fernandez et al. |
| 6,415,210 B2 | 7/2002 | Hozuka et al. |
| 6,417,782 B1 | 7/2002 | Darnall |
| 6,417,797 B1 | 7/2002 | Cousins et al. |
| 6,418,324 B1 | 7/2002 | Doviak et al. |
| 6,418,380 B1 | 7/2002 | Pica |
| 6,418,424 B1 | 7/2002 | Hoffberg et al. |
| 6,418,433 B1 | 7/2002 | Chakrabarti et al. |
| 6,421,002 B2 | 7/2002 | Krasner |
| 6,421,429 B1 | 7/2002 | Merritt et al. |
| 6,421,453 B1 | 7/2002 | Kanevsky et al. |
| 6,421,606 B1 | 7/2002 | Asai et al. |
| 6,421,608 B1 | 7/2002 | Motoyama et al. |
| 6,421,675 B1 | 7/2002 | Ryan et al. |
| 6,421,726 B1 | 7/2002 | Kenner et al. |
| 6,421,738 B1 | 7/2002 | Ratan et al. |
| 6,424,912 B1 | 7/2002 | Correia et al. |
| 6,424,979 B1 | 7/2002 | Livingston et al. |
| 6,425,004 B1 | 7/2002 | Hardjono |
| 6,425,828 B2 | 7/2002 | Walker et al. |
| 6,427,032 B1 | 7/2002 | Irons et al. |
| 6,427,132 B1 | 7/2002 | Bowman-Amuah |
| 6,429,789 B1 | 8/2002 | Kiridena et al. |
| 6,429,812 B1 | 8/2002 | Hoffberg |
| 6,429,899 B1 | 8/2002 | Nio et al. |
| 6,430,164 B1 | 8/2002 | Jones et al. |
| 6,430,358 B1 | 8/2002 | Yuen et al. |
| 6,430,359 B1 | 8/2002 | Yuen et al. |
| 6,430,488 B1 | 8/2002 | Goldman et al. |
| 6,430,504 B1 | 8/2002 | Gilbert et al. |
| 6,430,539 B1 | 8/2002 | Lazarus et al. |
| 6,430,554 B1 | 8/2002 | Rothschild |
| 6,430,567 B2 | 8/2002 | Burridge |
| 6,430,997 B1 | 8/2002 | French et al. |
| 6,433,734 B1 | 8/2002 | Krasner |
| 6,433,784 B1 | 8/2002 | Merrick et al. |
| 6,434,400 B1 | 8/2002 | Villevieille et al. |
| 6,434,524 B1 | 8/2002 | Weber |
| 6,434,561 B1 | 8/2002 | Durst, Jr. et al. |
| 6,434,568 B1 | 8/2002 | Bowman-Amuah |
| 6,434,581 B1 | 8/2002 | Forcier |
| 6,434,614 B1 | 8/2002 | Blumenau |
| 6,434,621 B1 | 8/2002 | Pezzillo et al. |
| 6,436,049 B1 | 8/2002 | Kamiyama et al. |
| 6,437,692 B1 | 8/2002 | Petite et al. |
| 6,437,836 B1 | 8/2002 | Huang et al. |
| 6,438,523 B1 | 8/2002 | Oberteuffer et al. |
| 6,438,579 B1 | 8/2002 | Hosken |
| 6,441,832 B1 | 8/2002 | Tao et al. |
| 6,442,169 B1 | 8/2002 | Lewis |
| 6,442,332 B1 | 8/2002 | Knudson et al. |
| 6,442,391 B1 | 8/2002 | Johansson et al. |
| 6,442,485 B2 | 8/2002 | Evans |

(56) References Cited

U.S. PATENT DOCUMENTS

| | | |
|---|---|---|
| 6,442,571 B1 | 8/2002 | Haff et al. |
| 6,442,748 B1 | 8/2002 | Bowman-Amuah |
| 6,443,843 B1 | 9/2002 | Walker et al. |
| 6,445,308 B1 | 9/2002 | Koike |
| 6,445,398 B1 | 9/2002 | Gerba et al. |
| 6,446,065 B1 | 9/2002 | Nishioka et al. |
| 6,446,076 B1 | 9/2002 | Burkey et al. |
| 6,446,130 B1 | 9/2002 | Grapes |
| 6,446,261 B1 | 9/2002 | Rosser |
| 6,448,979 B1 | 9/2002 | Schena et al. |
| 6,449,041 B1 | 9/2002 | Jung et al. |
| 6,449,473 B1 | 9/2002 | Raivisto |
| 6,449,476 B1 | 9/2002 | Hutchison, IV et al. |
| 6,449,540 B1 | 9/2002 | Rayner |
| 6,449,616 B1 | 9/2002 | Walker et al. |
| 6,449,639 B1 | 9/2002 | Blumberg |
| 6,449,688 B1 | 9/2002 | Peters et al. |
| 6,450,407 B1 | 9/2002 | Freeman et al. |
| 6,452,484 B1 | 9/2002 | Drori |
| 6,452,535 B1 | 9/2002 | Rao et al. |
| 6,452,910 B1 | 9/2002 | Vij et al. |
| 6,453,471 B1 | 9/2002 | Klosterman |
| 6,454,626 B1 | 9/2002 | An |
| 6,456,234 B1 | 9/2002 | Johnson |
| 6,456,852 B2 | 9/2002 | Bar et al. |
| 6,457,010 B1 | 9/2002 | Eldering et al. |
| 6,457,025 B2 | 9/2002 | Judson |
| 6,459,425 B1 | 10/2002 | Holub et al. |
| 6,459,823 B2 | 10/2002 | Altunbasak et al. |
| 6,460,036 B1 | 10/2002 | Herz |
| 6,460,181 B1 | 10/2002 | Donnelly |
| 6,463,272 B1 | 10/2002 | Wallace et al. |
| 6,463,462 B1 | 10/2002 | Smith et al. |
| 6,463,585 B1 | 10/2002 | Hendricks et al. |
| 6,466,198 B1 | 10/2002 | Feinstein |
| 6,466,260 B1 | 10/2002 | Hatae et al. |
| 6,466,336 B1 | 10/2002 | Sturgeon et al. |
| 6,466,654 B1 | 10/2002 | Cooper et al. |
| 6,466,734 B2 | 10/2002 | Yuen et al. |
| 6,466,796 B1 | 10/2002 | Jacobson et al. |
| 6,468,155 B1 | 10/2002 | Zucker et al. |
| 6,469,639 B2 | 10/2002 | Tanenhaus et al. |
| 6,469,753 B1 | 10/2002 | Klosterman et al. |
| 6,470,138 B1 | 10/2002 | Um et al. |
| 6,470,263 B2 | 10/2002 | Ito et al. |
| 6,470,381 B2 | 10/2002 | De Boor et al. |
| 6,472,982 B2 | 10/2002 | Eida et al. |
| 6,473,559 B1 | 10/2002 | Knudson et al. |
| 6,473,609 B1 | 10/2002 | Schwartz et al. |
| 6,473,688 B2 | 10/2002 | Kohno et al. |
| 6,473,794 B1 | 10/2002 | Guheen et al. |
| 6,476,830 B1 | 11/2002 | Farmer et al. |
| 6,476,834 B1 | 11/2002 | Doval et al. |
| 6,477,143 B1 | 11/2002 | Ginossar |
| 6,477,150 B1 | 11/2002 | Maggenti et al. |
| 6,477,239 B1 | 11/2002 | Ohki et al. |
| 6,477,579 B1 | 11/2002 | Kunkel et al. |
| 6,477,705 B1 | 11/2002 | Yuen et al. |
| 6,480,144 B1 | 11/2002 | Miller et al. |
| 6,480,699 B1 | 11/2002 | Lovoi |
| 6,480,889 B1 | 11/2002 | Saito et al. |
| 6,480,900 B1 | 11/2002 | Habert |
| 6,483,094 B1 | 11/2002 | Yahav et al. |
| 6,483,513 B1 | 11/2002 | Haratsch et al. |
| 6,484,080 B2 | 11/2002 | Breed |
| 6,484,148 B1 | 11/2002 | Boyd |
| 6,484,149 B1 | 11/2002 | Jammes et al. |
| 6,484,156 B1 | 11/2002 | Gupta et al. |
| 6,486,874 B1 | 11/2002 | Muthuswamy et al. |
| 6,486,892 B1 | 11/2002 | Stern |
| 6,487,539 B1 | 11/2002 | Aggarwal et al. |
| 6,489,955 B1 | 12/2002 | Newhall, Jr. |
| 6,489,970 B1 | 12/2002 | Pazel |
| 6,490,525 B2 | 12/2002 | Baron, Sr. et al. |
| 6,490,553 B2 | 12/2002 | Van Thong et al. |
| 6,490,698 B1 | 12/2002 | Horvitz et al. |
| 6,491,217 B2 | 12/2002 | Catan |
| 6,493,338 B1 | 12/2002 | Preston et al. |
| 6,493,633 B2 | 12/2002 | Baron, Sr. et al. |
| 6,493,637 B1 | 12/2002 | Steeg |
| 6,493,707 B1 | 12/2002 | Dey et al. |
| 6,493,875 B1 | 12/2002 | Eames et al. |
| 6,496,107 B1 | 12/2002 | Himmelstein |
| 6,496,117 B2 | 12/2002 | Gutta et al. |
| 6,496,575 B1 | 12/2002 | Vasell et al. |
| 6,496,598 B1 | 12/2002 | Harman |
| 6,496,689 B1 | 12/2002 | Keller et al. |
| 6,496,778 B1 | 12/2002 | Lin |
| 6,496,826 B1 | 12/2002 | Chowdhury et al. |
| 6,498,895 B2 | 12/2002 | Young et al. |
| 6,498,970 B2 | 12/2002 | Colmenarez et al. |
| 6,498,972 B1 | 12/2002 | Rao et al. |
| 6,498,987 B1 | 12/2002 | Kelly et al. |
| 6,498,989 B1 | 12/2002 | Pisetski et al. |
| 6,499,027 B1 | 12/2002 | Weinberger |
| 6,502,033 B1 | 12/2002 | Phuyal |
| 6,502,125 B1 | 12/2002 | Kenner et al. |
| 6,503,195 B1 | 1/2003 | Keller et al. |
| 6,504,138 B1 | 1/2003 | Mangerson |
| 6,504,491 B1 | 1/2003 | Christians |
| 6,504,631 B1 | 1/2003 | Barry et al. |
| 6,505,046 B1 | 1/2003 | Baker |
| 6,505,086 B1 | 1/2003 | Dodd, Jr. et al. |
| 6,505,100 B1 | 1/2003 | Stuempfle et al. |
| 6,505,101 B1 | 1/2003 | Brill |
| 6,505,123 B1 | 1/2003 | Root et al. |
| 6,505,348 B1 | 1/2003 | Knowles et al. |
| 6,507,349 B1 | 1/2003 | Balassanian |
| 6,507,585 B1 * | 1/2003 | Dobson ................ 370/420 |
| 6,507,810 B2 | 1/2003 | Razavi et al. |
| 6,508,706 B2 | 1/2003 | Sitrick et al. |
| 6,509,707 B2 | 1/2003 | Yamashita et al. |
| 6,509,908 B1 | 1/2003 | Croy et al. |
| 6,509,912 B1 | 1/2003 | Moran et al. |
| 6,510,387 B2 | 1/2003 | Fuchs et al. |
| 6,510,417 B1 | 1/2003 | Woods et al. |
| 6,510,458 B1 | 1/2003 | Berstis et al. |
| 6,512,922 B1 | 1/2003 | Burg et al. |
| 6,512,930 B2 | 1/2003 | Sandegren |
| 6,513,160 B2 | 1/2003 | Dureau |
| 6,515,595 B1 | 2/2003 | Obradovich et al. |
| 6,515,623 B2 | 2/2003 | Johnson |
| 6,516,311 B1 | 2/2003 | Yacoby et al. |
| 6,516,338 B1 | 2/2003 | Landsman et al. |
| 6,516,467 B1 | 2/2003 | Schindler et al. |
| 6,516,664 B2 | 2/2003 | Lynam |
| 6,518,950 B1 | 2/2003 | Dougherty et al. |
| 6,519,037 B2 | 2/2003 | Jung et al. |
| 6,519,466 B2 | 2/2003 | Pande et al. |
| 6,519,571 B1 | 2/2003 | Guheen et al. |
| 6,519,646 B1 | 2/2003 | Gupta et al. |
| 6,520,407 B1 | 2/2003 | Nieswand et al. |
| 6,522,333 B1 | 2/2003 | Hatlelid et al. |
| 6,522,682 B1 | 2/2003 | Kohli et al. |
| 6,522,875 B1 | 2/2003 | Dowling et al. |
| 6,522,977 B2 | 2/2003 | Corrigan et al. |
| 6,523,172 B1 | 2/2003 | Martinez-Guerra et al. |
| 6,525,687 B2 | 2/2003 | Roy et al. |
| 6,525,688 B2 | 2/2003 | Chou et al. |
| 6,525,749 B1 | 2/2003 | Moran et al. |
| 6,526,041 B1 | 2/2003 | Shaffer et al. |
| 6,526,268 B1 | 2/2003 | Marrah et al. |
| 6,526,335 B1 | 2/2003 | Treyz et al. |
| 6,526,349 B2 | 2/2003 | Bullock et al. |
| 6,526,352 B1 | 2/2003 | Breed et al. |
| 6,526,395 B1 | 2/2003 | Morris |
| 6,526,411 B1 | 2/2003 | Ward |
| 6,526,423 B2 | 2/2003 | Zawadzki et al. |
| 6,526,449 B1 | 2/2003 | Philyaw et al. |
| 6,526,577 B1 | 2/2003 | Knudson et al. |
| 6,526,581 B1 | 2/2003 | Edson |
| 6,529,153 B1 | 3/2003 | Dijkstra |
| 6,529,159 B1 | 3/2003 | Fan et al. |
| 6,529,829 B2 | 3/2003 | Turetzky et al. |

(56) References Cited

U.S. PATENT DOCUMENTS

| | | |
|---|---|---|
| 6,529,909 B1 | 3/2003 | Bowman-Amuah |
| 6,529,940 B1 | 3/2003 | Humble |
| 6,530,083 B1 | 3/2003 | Liebenow |
| 6,530,840 B1 | 3/2003 | Cuomo et al. |
| 6,531,982 B1 | 3/2003 | White et al. |
| 6,532,007 B1 | 3/2003 | Matsuda |
| 6,532,448 B1 | 3/2003 | Higginson et al. |
| 6,532,469 B1 | 3/2003 | Feldman et al. |
| 6,532,494 B1 | 3/2003 | Frank et al. |
| 6,535,743 B1 | 3/2003 | Kennedy, III et al. |
| 6,536,037 B1 | 3/2003 | Guheen et al. |
| 6,537,324 B1 | 3/2003 | Tabata et al. |
| 6,538,187 B2 | 3/2003 | Beigi |
| 6,538,701 B1 | 3/2003 | Yuen |
| 6,538,757 B1 | 3/2003 | Sansone |
| 6,539,200 B1 | 3/2003 | Schiff |
| 6,539,232 B2 | 3/2003 | Hendrey et al. |
| 6,539,304 B1 | 3/2003 | Chansarkar |
| 6,539,336 B1 | 3/2003 | Vock et al. |
| 6,539,375 B2 | 3/2003 | Kawasaki |
| 6,539,544 B2 | 3/2003 | Ebisawa |
| 6,539,931 B2 | 4/2003 | Trajkovic et al. |
| 6,540,141 B1 | 4/2003 | Dougherty et al. |
| 6,542,076 B1 | 4/2003 | Joao |
| 6,542,077 B2 | 4/2003 | Joao |
| 6,542,464 B1 | 4/2003 | Takeda et al. |
| 6,542,734 B1 | 4/2003 | Abrol et al. |
| 6,542,743 B1 | 4/2003 | Soliman |
| 6,542,748 B2 | 4/2003 | Hendrey et al. |
| 6,542,749 B2 | 4/2003 | Tanaka et al. |
| 6,542,750 B2 | 4/2003 | Hendrey et al. |
| 6,542,758 B1 | 4/2003 | Chennakeshu et al. |
| 6,542,793 B2 | 4/2003 | Kojima et al. |
| 6,542,794 B2 | 4/2003 | Obradovich |
| 6,542,925 B2 | 4/2003 | Brown et al. |
| 6,542,933 B1 | 4/2003 | Durst, Jr. et al. |
| 6,543,052 B1 | 4/2003 | Ogasawara |
| 6,545,578 B2 | 4/2003 | Yoshiyama |
| 6,545,601 B1 | 4/2003 | Monroe |
| 6,545,669 B1 | 4/2003 | Kinawi et al. |
| 6,545,722 B1 | 4/2003 | Schultheiss et al. |
| 6,546,385 B1 | 4/2003 | Mao et al. |
| 6,546,399 B1 | 4/2003 | Reed et al. |
| 6,546,405 B2 | 4/2003 | Gupta et al. |
| 6,546,419 B1 | 4/2003 | Humpleman et al. |
| 6,549,130 B1 | 4/2003 | Joao |
| 6,549,145 B2 | 4/2003 | Hsu et al. |
| 6,549,612 B2 | 4/2003 | Gifford et al. |
| 6,549,719 B2 | 4/2003 | Mankovitz |
| 6,549,751 B1 | 4/2003 | Mandri |
| 6,549,776 B1 | 4/2003 | Joong |
| 6,549,844 B1 | 4/2003 | Egberts |
| 6,549,891 B1 | 4/2003 | Rauber et al. |
| 6,550,012 B1 | 4/2003 | Villa et al. |
| 6,550,057 B1 | 4/2003 | Bowman-Amuah |
| 6,552,682 B1 | 4/2003 | Fan |
| 6,553,129 B1 | 4/2003 | Rhoads |
| 6,553,178 B2 | 4/2003 | Abecassis |
| 6,553,436 B2 | 4/2003 | Ando et al. |
| 6,554,433 B1 | 4/2003 | Holler |
| 6,556,824 B1 | 4/2003 | Purnadi et al. |
| 6,556,832 B1 | 4/2003 | Soliman |
| 6,556,950 B1 | 4/2003 | Schwenke et al. |
| 6,557,031 B1 | 4/2003 | Mimura et al. |
| 6,559,773 B1 | 5/2003 | Berry |
| 6,560,281 B1 | 5/2003 | Black et al. |
| 6,560,461 B1 | 5/2003 | Fomukong et al. |
| 6,560,534 B2 | 5/2003 | Abraham et al. |
| 6,560,578 B2 | 5/2003 | Eldering |
| 6,563,418 B1 | 5/2003 | Moon |
| 6,563,505 B1 | 5/2003 | Mills et al. |
| 6,563,523 B1 | 5/2003 | Suchocki et al. |
| 6,563,796 B1 | 5/2003 | Saito |
| 6,564,144 B1 | 5/2003 | Cherveny |
| 6,564,217 B2 | 5/2003 | Bunney et al. |
| 6,564,379 B1 | 5/2003 | Knudson et al. |
| 6,564,383 B1 | 5/2003 | Combs et al. |
| 6,567,035 B1 | 5/2003 | Elliott |
| 6,567,533 B1 | 5/2003 | Rhoads |
| 6,567,536 B2 | 5/2003 | McNitt et al. |
| 6,567,606 B2 | 5/2003 | Milnes et al. |
| 6,568,754 B1 | 5/2003 | Norton et al. |
| 6,570,530 B2 | 5/2003 | Gaal et al. |
| 6,570,555 B1 | 5/2003 | Prevost et al. |
| 6,571,193 B1 | 5/2003 | Unuma et al. |
| 6,571,235 B1 | 5/2003 | Marpe et al. |
| 6,571,279 B1 | 5/2003 | Herz et al. |
| 6,572,662 B2 | 6/2003 | Manohar et al. |
| 6,573,831 B2 | 6/2003 | Ikeda et al. |
| 6,573,883 B1 | 6/2003 | Bartlett |
| 6,574,538 B2 | 6/2003 | Sasaki |
| 6,574,548 B2 | 6/2003 | DeKock et al. |
| 6,574,558 B2 | 6/2003 | Kohli |
| 6,574,617 B1 | 6/2003 | Immerman et al. |
| 6,577,329 B1 | 6/2003 | Flickner et al. |
| 6,577,716 B1 | 6/2003 | Minter et al. |
| 6,577,953 B1 | 6/2003 | Swope et al. |
| 6,580,373 B1 | 6/2003 | Ohashi |
| 6,580,390 B1 | 6/2003 | Hay |
| 6,580,808 B2 | 6/2003 | Rhoads |
| 6,580,904 B2 | 6/2003 | Cox et al. |
| 6,580,979 B2 | 6/2003 | Howard et al. |
| 6,583,866 B2 | 6/2003 | Jung et al. |
| 6,584,382 B2 | 6/2003 | Karem |
| 6,584,403 B2 | 6/2003 | Bunn |
| 6,584,552 B1 | 6/2003 | Kuno et al. |
| 6,586,968 B1 | 7/2003 | Schauer et al. |
| 6,587,046 B2 | 7/2003 | Joao |
| 6,587,127 B1 | 7/2003 | Leeke et al. |
| 6,587,835 B1 | 7/2003 | Treyz et al. |
| 6,588,013 B1 | 7/2003 | Lumley et al. |
| 6,590,507 B2 | 7/2003 | Burns |
| 6,590,529 B2 | 7/2003 | Schwoegler |
| 6,590,588 B2 | 7/2003 | Lincke et al. |
| 6,590,602 B1 | 7/2003 | Fernandez et al. |
| 6,590,660 B2 | 7/2003 | Jung et al. |
| 6,591,304 B1 | 7/2003 | Sitaraman et al. |
| 6,593,723 B1 | 7/2003 | Johnson |
| 6,594,500 B2 | 7/2003 | Bender et al. |
| 6,594,616 B2 | 7/2003 | Zhang et al. |
| 6,594,688 B2 | 7/2003 | Ludwig et al. |
| 6,594,705 B1 | 7/2003 | Philyaw |
| 6,595,859 B2 | 7/2003 | Lynn |
| 6,597,311 B2 | 7/2003 | Sheynblat et al. |
| 6,597,443 B2 | 7/2003 | Boman |
| 6,597,812 B1 | 7/2003 | Fallon et al. |
| 6,597,903 B1 | 7/2003 | Dahm et al. |
| 6,599,130 B2 | 7/2003 | Moehrle |
| 6,600,417 B2 | 7/2003 | Lerg et al. |
| 6,600,475 B2 | 7/2003 | Gutta et al. |
| 6,600,914 B2 | 7/2003 | Uhlik et al. |
| 6,601,012 B1 | 7/2003 | Horvitz et al. |
| 6,601,057 B1 | 7/2003 | Underwood et al. |
| 6,603,405 B2 | 8/2003 | Smith |
| 6,603,488 B2 | 8/2003 | Humpleman et al. |
| 6,603,973 B1 | 8/2003 | Foladare et al. |
| 6,606,495 B1 | 8/2003 | Korpi et al. |
| 6,606,554 B2 | 8/2003 | Edge |
| 6,606,744 B1 | 8/2003 | Mikurak |
| 6,606,746 B1 | 8/2003 | Zdepski et al. |
| 6,609,004 B1 | 8/2003 | Morse et al. |
| 6,610,936 B2 | 8/2003 | Gillespie et al. |
| 6,611,201 B1 | 8/2003 | Bishop et al. |
| 6,611,598 B1 | 8/2003 | Hayosh |
| 6,611,654 B1 | 8/2003 | Shteyn |
| 6,611,755 B1 | 8/2003 | Coffee et al. |
| 6,611,757 B2 | 8/2003 | Brodie |
| 6,611,813 B1 | 8/2003 | Bratton |
| 6,611,867 B1 | 8/2003 | Bowman-Amuah |
| 6,611,957 B2 | 8/2003 | Ebisawa |
| D479,228 S | 9/2003 | Sakaguchi et al. |
| 6,612,932 B2 | 9/2003 | Stern |
| 6,614,349 B1 | 9/2003 | Proctor et al. |
| 6,614,385 B2 | 9/2003 | Kuhn et al. |

(56) References Cited

U.S. PATENT DOCUMENTS

| | | |
|---|---|---|
| 6,615,039 B1 | 9/2003 | Eldering |
| 6,615,088 B1 | 9/2003 | Myer et al. |
| 6,615,099 B1 | 9/2003 | Muller et al. |
| 6,615,134 B2 | 9/2003 | Ando |
| 6,615,136 B1 | 9/2003 | Swope et al. |
| 6,615,137 B2 | 9/2003 | Lutter et al. |
| 6,615,166 B1 | 9/2003 | Guheen et al. |
| 6,615,208 B1 | 9/2003 | Behrens et al. |
| 6,615,268 B1 | 9/2003 | Philyaw et al. |
| 6,616,038 B1 | 9/2003 | Olschafskie et al. |
| 6,616,047 B2 | 9/2003 | Catan |
| 6,616,071 B2 | 9/2003 | Kitamura et al. |
| 6,616,533 B1 | 9/2003 | Rashkovskiy |
| 6,617,369 B2 | 9/2003 | Parfondry et al. |
| 6,618,504 B1 | 9/2003 | Yoshino |
| 6,618,593 B1 | 9/2003 | Drutman et al. |
| 6,618,670 B1 | 9/2003 | Chansarkar |
| 6,618,727 B1 | 9/2003 | Wheeler et al. |
| 6,618,732 B1 | 9/2003 | White et al. |
| 6,621,452 B2 | 9/2003 | Knockeart et al. |
| 6,622,083 B1 | 9/2003 | Knockeart et al. |
| 6,622,165 B1 | 9/2003 | Philyaw |
| 6,622,304 B1 | 9/2003 | Carhart |
| 6,624,833 B1 | 9/2003 | Kumar et al. |
| 6,624,881 B2 | 9/2003 | Waibel et al. |
| 6,625,335 B1 | 9/2003 | Kanai |
| 6,625,578 B2 | 9/2003 | Spaur et al. |
| 6,625,581 B1 | 9/2003 | Perkowski |
| 6,628,227 B1 | 9/2003 | Rao et al. |
| 6,628,233 B2 | 9/2003 | Knockeart et al. |
| 6,628,295 B2 | 9/2003 | Wilensky |
| 6,628,304 B2 | 9/2003 | Mitchell et al. |
| 6,628,928 B1 | 9/2003 | Crosby et al. |
| 6,629,033 B2 | 9/2003 | Preston et al. |
| 6,629,133 B1 | 9/2003 | Philyaw et al. |
| 6,630,884 B1 | 10/2003 | Shanmugam |
| 6,630,924 B1 | 10/2003 | Peck |
| 6,631,404 B1 | 10/2003 | Philyaw |
| 6,632,138 B1 | 10/2003 | Serizawa et al. |
| 6,633,238 B2 | 10/2003 | Lemelson et al. |
| 6,633,255 B2 | 10/2003 | Krasner |
| 6,633,294 B1 | 10/2003 | Rosenthal et al. |
| 6,636,763 B1 | 10/2003 | Junker et al. |
| 6,636,892 B1 | 10/2003 | Philyaw |
| 6,636,896 B1 | 10/2003 | Philyaw |
| 6,638,314 B1 | 10/2003 | Meyerzon et al. |
| 6,638,317 B2 | 10/2003 | Nakao |
| 6,640,097 B2 | 10/2003 | Corrigan et al. |
| 6,640,145 B2 | 10/2003 | Hoffberg et al. |
| 6,640,184 B1 | 10/2003 | Rabe |
| 6,640,202 B1 | 10/2003 | Dietz et al. |
| 6,640,335 B2 | 10/2003 | Ebisawa |
| 6,640,336 B1 | 10/2003 | Ebisawa |
| 6,641,037 B2 | 11/2003 | Williams |
| 6,641,087 B1 | 11/2003 | Nelson |
| 6,643,652 B2 | 11/2003 | Helgeson et al. |
| 6,643,661 B2 | 11/2003 | Polizzi et al. |
| 6,643,692 B1 | 11/2003 | Philyaw et al. |
| 6,643,696 B2 | 11/2003 | Davis et al. |
| 6,645,068 B1 | 11/2003 | Kelly et al. |
| 6,646,559 B2 | 11/2003 | Smith |
| 6,647,128 B1 | 11/2003 | Rhoads |
| 6,647,130 B2 | 11/2003 | Rhoads |
| 6,647,257 B2 | 11/2003 | Owensby |
| 6,647,269 B2 | 11/2003 | Hendrey et al. |
| 6,647,270 B1 | 11/2003 | Himmelstein |
| 6,647,328 B2 | 11/2003 | Walker |
| 6,647,371 B2 | 11/2003 | Shinohara |
| 6,650,288 B1 | 11/2003 | Pitt et al. |
| 6,650,761 B1 | 11/2003 | Rodriguez et al. |
| 6,650,983 B1 | 11/2003 | Rao et al. |
| 6,650,984 B1 | 11/2003 | Rao et al. |
| 6,651,053 B1 | 11/2003 | Rothschild |
| 6,654,689 B1 | 11/2003 | Kelly et al. |
| 6,654,725 B1 | 11/2003 | Langheinrich et al. |
| 6,656,050 B2 | 12/2003 | Busch et al. |
| 6,658,151 B2 | 12/2003 | Lee et al. |
| 6,659,861 B1 | 12/2003 | Faris et al. |
| 6,661,372 B1 | 12/2003 | Girerd et al. |
| 6,661,468 B2 | 12/2003 | Alten et al. |
| 6,661,773 B1 | 12/2003 | Pelissier et al. |
| 6,661,918 B2 | 12/2003 | Gordon et al. |
| 6,661,919 B2 | 12/2003 | Nicholson et al. |
| 6,662,091 B2 | 12/2003 | Wilson et al. |
| 6,662,106 B2 | 12/2003 | Evans |
| 6,662,195 B1 | 12/2003 | Langseth et al. |
| 6,662,642 B2 | 12/2003 | Breed et al. |
| 6,663,105 B1 | 12/2003 | Sullivan et al. |
| 6,664,969 B1 | 12/2003 | Emerson et al. |
| 6,664,978 B1 | 12/2003 | Kekic et al. |
| 6,664,991 B1 | 12/2003 | Chew et al. |
| 6,665,539 B2 | 12/2003 | Sih et al. |
| 6,665,541 B1 | 12/2003 | Krasner et al. |
| 6,665,640 B1 | 12/2003 | Bennett et al. |
| 6,665,659 B1 | 12/2003 | Logan |
| 6,665,706 B2 | 12/2003 | Kenner et al. |
| 6,668,133 B2 | 12/2003 | Yuen et al. |
| 6,669,088 B2 | 12/2003 | Veeneman |
| 6,669,562 B1 | 12/2003 | Shiino |
| 6,669,564 B1 | 12/2003 | Young et al. |
| 6,670,905 B1 | 12/2003 | Orr |
| 6,670,912 B2 | 12/2003 | Honda |
| 6,670,971 B1 | 12/2003 | Oral |
| 6,671,620 B1 | 12/2003 | Garin et al. |
| 6,671,684 B1 | 12/2003 | Hull et al. |
| 6,671,818 B1 | 12/2003 | Mikurak |
| 6,673,019 B2 | 1/2004 | Kamiyama |
| 6,674,877 B1 | 1/2004 | Jojic et al. |
| 6,675,081 B2 | 1/2004 | Shuman et al. |
| 6,675,204 B2 | 1/2004 | De Boor et al. |
| 6,675,385 B1 | 1/2004 | Wang |
| 6,675,386 B1 | 1/2004 | Hendricks et al. |
| 6,677,894 B2 | 1/2004 | Sheynblat et al. |
| 6,677,969 B1 | 1/2004 | Hongo |
| 6,678,004 B1 | 1/2004 | Schultheiss et al. |
| 6,678,075 B1 | 1/2004 | Tsai et al. |
| 6,678,250 B1 | 1/2004 | Grabelsky et al. |
| 6,678,516 B2 | 1/2004 | Nordman et al. |
| 6,678,612 B1 | 1/2004 | Khawam |
| 6,678,664 B1 | 1/2004 | Ganesan |
| 6,678,687 B2 | 1/2004 | Watanabe et al. |
| 6,680,674 B1 | 1/2004 | Park |
| 6,680,694 B1 | 1/2004 | Knockeart et al. |
| 6,680,695 B2 | 1/2004 | Turetzky et al. |
| 6,680,746 B2 | 1/2004 | Kawai et al. |
| 6,681,029 B1 | 1/2004 | Rhoads |
| 6,681,031 B2 | 1/2004 | Cohen et al. |
| 6,681,114 B2 | 1/2004 | Chang et al. |
| 6,681,121 B1 | 1/2004 | Preston et al. |
| 6,683,941 B2 | 1/2004 | Brown et al. |
| 6,684,137 B2 | 1/2004 | Takagi et al. |
| 6,684,194 B1 | 1/2004 | Eldering et al. |
| 6,684,250 B2 | 1/2004 | Anderson et al. |
| 6,686,844 B2 | 2/2004 | Watanabe et al. |
| 6,687,504 B1 | 2/2004 | Raith |
| 6,687,608 B2 | 2/2004 | Sugimoto et al. |
| 6,687,612 B2 | 2/2004 | Cherveny |
| 6,687,696 B2 | 2/2004 | Hofmann et al. |
| 6,687,745 B1 | 2/2004 | Franco et al. |
| 6,687,906 B1 | 2/2004 | Yuen et al. |
| 6,688,081 B2 | 2/2004 | Boyd |
| 6,688,522 B1 | 2/2004 | Philyaw et al. |
| 6,688,523 B1 | 2/2004 | Koenck |
| 6,688,525 B1 | 2/2004 | Nelson et al. |
| 6,690,017 B2 | 2/2004 | Remillard et al. |
| 6,690,294 B1 | 2/2004 | Zierden |
| 6,690,358 B2 | 2/2004 | Kaplan |
| 6,690,380 B1 | 2/2004 | Hussain et al. |
| 6,690,681 B1 | 2/2004 | Preston et al. |
| 6,690,918 B2 | 2/2004 | Evans et al. |
| 6,691,019 B2 | 2/2004 | Seeley et al. |
| 6,691,107 B1 | 2/2004 | Dockter et al. |
| 6,691,109 B2 | 2/2004 | Bjornson et al. |
| 6,691,123 B1 | 2/2004 | Gulliksen |

(56) References Cited

U.S. PATENT DOCUMENTS

| | | |
|---|---|---|
| 6,691,151 B1 | 2/2004 | Cheyer et al. |
| 6,691,194 B1 | 2/2004 | Ofer |
| 6,691,914 B2 | 2/2004 | Isherwood et al. |
| 6,692,259 B2 | 2/2004 | Kumar et al. |
| 6,694,258 B2 | 2/2004 | Johnson et al. |
| 6,694,316 B1 | 2/2004 | Langseth et al. |
| 6,694,356 B1 | 2/2004 | Philyaw |
| 6,697,103 B1 | 2/2004 | Fernandez et al. |
| 6,697,629 B1 | 2/2004 | Grilli et al. |
| 6,697,730 B2 | 2/2004 | Dickerson |
| 6,697,792 B2 | 2/2004 | Bunney et al. |
| 6,697,824 B1 | 2/2004 | Bowman-Amuah |
| 6,697,838 B1 | 2/2004 | Jakobson |
| 6,697,924 B2 | 2/2004 | Swank |
| 6,697,949 B1 | 2/2004 | Philyaw et al. |
| 6,698,020 B1 | 2/2004 | Zigmond et al. |
| 6,699,127 B1 | 3/2004 | Lobb et al. |
| 6,700,482 B2 | 3/2004 | Ververs et al. |
| 6,700,990 B1 | 3/2004 | Rhoads |
| 6,701,144 B2 | 3/2004 | Kirbas et al. |
| 6,701,311 B2 | 3/2004 | Biebesheimer et al. |
| 6,701,315 B1 | 3/2004 | Austin |
| 6,701,354 B1 | 3/2004 | Philyaw et al. |
| 6,701,363 B1 | 3/2004 | Chiu et al. |
| 6,701,369 B1 | 3/2004 | Philyaw |
| 6,701,523 B1 | 3/2004 | Hancock et al. |
| 6,703,971 B2 | 3/2004 | Pande et al. |
| 6,703,972 B2 | 3/2004 | van Diggelen |
| 6,704,024 B2 | 3/2004 | Robotham et al. |
| 6,704,028 B2 | 3/2004 | Wugofski |
| 6,704,651 B2 | 3/2004 | van Diggelen |
| 6,704,699 B2 | 3/2004 | Nir |
| 6,704,930 B1 | 3/2004 | Eldering et al. |
| 6,707,421 B1 | 3/2004 | Drury et al. |
| 6,707,581 B1 | 3/2004 | Browning |
| 6,708,100 B2 | 3/2004 | Russell et al. |
| 6,708,203 B1 | 3/2004 | Makar et al. |
| 6,708,208 B1 | 3/2004 | Philyaw |
| 6,709,335 B2 | 3/2004 | Bates et al. |
| 6,711,474 B1 | 3/2004 | Treyz et al. |
| 6,711,475 B2 | 3/2004 | Murphy |
| 6,711,660 B1 | 3/2004 | Milne et al. |
| 6,712,702 B2 | 3/2004 | Goldberg et al. |
| 6,714,139 B2 | 3/2004 | Saito et al. |
| 6,714,236 B1 | 3/2004 | Wada et al. |
| 6,714,665 B1 | 3/2004 | Hanna et al. |
| 6,714,677 B1 | 3/2004 | Stearns et al. |
| 6,714,723 B2 | 3/2004 | Abecassis |
| 6,714,793 B1 | 3/2004 | Carey et al. |
| 6,714,917 B1 | 3/2004 | Eldering et al. |
| 6,714,969 B1 | 3/2004 | Klein et al. |
| 6,715,077 B1 | 3/2004 | Vasudevan et al. |
| 6,716,103 B1 | 4/2004 | Eck et al. |
| 6,718,174 B2 | 4/2004 | Vayanos |
| 6,718,239 B2 | 4/2004 | Rayner |
| 6,718,263 B1 | 4/2004 | Glass et al. |
| 6,718,308 B1 | 4/2004 | Nolting |
| 6,718,551 B1 | 4/2004 | Swix et al. |
| 6,720,915 B2 | 4/2004 | Sheynblat |
| 6,720,920 B2 | 4/2004 | Breed et al. |
| 6,720,984 B1 | 4/2004 | Jorgensen et al. |
| 6,721,286 B1 | 4/2004 | Williams et al. |
| 6,721,578 B2 | 4/2004 | Minear et al. |
| 6,721,713 B1 | 4/2004 | Guheen et al. |
| 6,721,747 B2 | 4/2004 | Lipkin |
| 6,721,748 B1 | 4/2004 | Knight et al. |
| 6,721,871 B2 | 4/2004 | Piispanen et al. |
| 6,721,921 B1 | 4/2004 | Altman |
| 6,721,954 B1 | 4/2004 | Nickum |
| 6,724,342 B2 | 4/2004 | Bloebaum et al. |
| 6,725,031 B2 | 4/2004 | Watler et al. |
| 6,725,125 B2 | 4/2004 | Basson et al. |
| 6,725,139 B2 | 4/2004 | Miller et al. |
| 6,725,159 B2 | 4/2004 | Krasner |
| 6,725,203 B1 | 4/2004 | Seet et al. |
| 6,725,260 B1 | 4/2004 | Philyaw |
| 6,725,421 B1 | 4/2004 | Boucher et al. |
| 6,727,914 B1 | 4/2004 | Gutta |
| 6,728,000 B1 | 4/2004 | Lapstun et al. |
| 6,728,323 B1 | 4/2004 | Chen et al. |
| 6,728,514 B2 | 4/2004 | Bandeira et al. |
| 6,728,528 B1 | 4/2004 | Loke |
| 6,728,617 B2 | 4/2004 | Rao et al. |
| 6,730,913 B2 | 5/2004 | Remillard et al. |
| 6,731,238 B2 | 5/2004 | Johnson |
| 6,731,799 B1 | 5/2004 | Sun et al. |
| 6,731,940 B1 | 5/2004 | Nagendran |
| 6,732,369 B1 | 5/2004 | Schein et al. |
| 6,732,372 B2 | 5/2004 | Tomita et al. |
| 6,734,799 B2 | 5/2004 | Munch |
| 6,734,821 B2 | 5/2004 | van Diggelen |
| 6,735,506 B2 | 5/2004 | Breed et al. |
| 6,735,601 B1 | 5/2004 | Subrahmanyam |
| 6,735,630 B1 | 5/2004 | Gelvin et al. |
| 6,735,632 B1 | 5/2004 | Kiraly et al. |
| 6,738,013 B2 | 5/2004 | Orler et al. |
| 6,738,066 B1 | 5/2004 | Nguyen |
| 6,738,078 B1 | 5/2004 | Duncombe |
| 6,738,519 B1 | 5/2004 | Nishiwaki |
| 6,738,697 B2 | 5/2004 | Breed |
| 6,738,800 B1 | 5/2004 | Aquilon et al. |
| 6,738,814 B1 | 5/2004 | Cox et al. |
| 6,738,978 B1 | 5/2004 | Hendricks et al. |
| 6,741,188 B1 | 5/2004 | Miller et al. |
| 6,741,745 B2 | 5/2004 | Dance et al. |
| 6,741,842 B2 | 5/2004 | Goldberg et al. |
| 6,741,871 B1 | 5/2004 | Silverbrook et al. |
| 6,741,933 B1 | 5/2004 | Glass |
| 6,741,980 B1 | 5/2004 | Langseth et al. |
| 6,742,026 B1 | 5/2004 | Kraenzel et al. |
| 6,742,183 B1 | 5/2004 | Reynolds et al. |
| 6,744,938 B1 | 6/2004 | Rantze et al. |
| 6,744,967 B2 | 6/2004 | Kaminski et al. |
| 6,745,011 B1 | 6/2004 | Hendrickson et al. |
| 6,745,021 B1 | 6/2004 | Stevens |
| 6,745,038 B2 | 6/2004 | Callaway, Jr. et al. |
| 6,745,183 B2 | 6/2004 | Nishioka et al. |
| 6,745,234 B1 | 6/2004 | Philyaw et al. |
| 6,745,391 B1 | 6/2004 | Macrae et al. |
| 6,745,937 B2 | 6/2004 | Walsh et al. |
| 6,747,596 B2 | 6/2004 | Orler et al. |
| 6,747,632 B2 | 6/2004 | Howard |
| 6,748,195 B1 | 6/2004 | Phillips |
| 6,748,306 B2 | 6/2004 | Lipowicz |
| 6,748,318 B1 | 6/2004 | Jones |
| 6,750,852 B2 | 6/2004 | Gillespie et al. |
| 6,751,452 B1 | 6/2004 | Kupczyk et al. |
| 6,751,464 B1 | 6/2004 | Burg et al. |
| 6,751,574 B2 | 6/2004 | Shinohara |
| 6,752,317 B2 | 6/2004 | Dymetman et al. |
| 6,752,498 B2 | 6/2004 | Covannon et al. |
| 6,753,883 B2 | 6/2004 | Schena et al. |
| 6,754,485 B1 | 6/2004 | Obradovich et al. |
| 6,754,585 B2 | 6/2004 | Root et al. |
| 6,754,632 B1 | 6/2004 | Kalinowski et al. |
| 6,754,698 B1 | 6/2004 | Philyaw et al. |
| 6,754,710 B1 | 6/2004 | McAlear |
| 6,754,904 B1 | 6/2004 | Cooper et al. |
| 6,756,938 B2 | 6/2004 | Zhao et al. |
| 6,756,997 B1 | 6/2004 | Ward, III et al. |
| 6,757,362 B1 | 6/2004 | Cooper et al. |
| 6,757,544 B2 | 6/2004 | Rangarajan et al. |
| 6,757,574 B2 | 6/2004 | Gardner et al. |
| 6,757,611 B1 | 6/2004 | Rao et al. |
| 6,757,661 B1 | 6/2004 | Blaser et al. |
| 6,757,715 B1 | 6/2004 | Philyaw |
| 6,757,740 B1 | 6/2004 | Parekh et al. |
| 6,757,783 B2 | 6/2004 | Koh |
| 6,758,398 B1 | 7/2004 | Philyaw et al. |
| 6,758,746 B1 | 7/2004 | Hunter et al. |
| 6,758,754 B1 | 7/2004 | Lavanchy et al. |
| 6,758,755 B2 | 7/2004 | Kelly et al. |
| 6,759,970 B1 | 7/2004 | Horita et al. |
| 6,760,463 B2 | 7/2004 | Rhoads |

(56) References Cited

U.S. PATENT DOCUMENTS

| | | |
|---|---|---|
| 6,760,537 B2 | 7/2004 | Mankovitz |
| 6,760,661 B2 | 7/2004 | Klein et al. |
| 6,763,040 B1 | 7/2004 | Hite et al. |
| 6,763,386 B2 | 7/2004 | Davis et al. |
| 6,764,395 B1 | 7/2004 | Guyett |
| 6,764,403 B2 | 7/2004 | Gavin |
| 6,765,726 B2 | 7/2004 | French et al. |
| 6,766,494 B1 | 7/2004 | Price et al. |
| 6,766,956 B1 | 7/2004 | Boylan, III et al. |
| 6,768,944 B2 | 7/2004 | Breed et al. |
| 6,771,208 B2 | 8/2004 | Lutter et al. |
| 6,771,283 B2 | 8/2004 | Carro |
| 6,771,290 B1 | 8/2004 | Hoyle |
| 6,771,629 B1 | 8/2004 | Preston et al. |
| 6,772,047 B2 | 8/2004 | Butikofer |
| 6,772,330 B2 | 8/2004 | Merkin |
| 6,772,331 B1 | 8/2004 | Hind et al. |
| 6,772,338 B1 | 8/2004 | Hull |
| 6,772,340 B1 | 8/2004 | Peinado et al. |
| 6,772,433 B1 | 8/2004 | LaJoie et al. |
| 6,773,177 B2 | 8/2004 | Denoue et al. |
| 6,773,344 B1 | 8/2004 | Gabai et al. |
| 6,774,367 B2 | 8/2004 | Stephan et al. |
| 6,774,846 B2 | 8/2004 | Fullerton et al. |
| 6,775,392 B1 | 8/2004 | Rhoads |
| 6,775,422 B1 | 8/2004 | Altman |
| 6,775,605 B2 | 8/2004 | Rao et al. |
| 6,775,655 B1 | 8/2004 | Peinado et al. |
| 6,775,802 B2 | 8/2004 | Gaal |
| 6,778,073 B2 | 8/2004 | Lutter et al. |
| 6,778,136 B2 | 8/2004 | Gronemeyer |
| 6,778,885 B2 | 8/2004 | Agashe et al. |
| 6,778,924 B2 | 8/2004 | Hanse |
| 6,778,988 B2 | 8/2004 | Bengtson |
| 6,779,004 B1 | 8/2004 | Zintel |
| 6,781,920 B2 | 8/2004 | Bates et al. |
| 6,781,963 B2 | 8/2004 | Crockett et al. |
| 6,782,315 B2 | 8/2004 | Lu et al. |
| 6,783,071 B2 | 8/2004 | Levine et al. |
| 6,783,460 B2 | 8/2004 | Galyean, III et al. |
| 6,785,421 B1 | 8/2004 | Gindele et al. |
| 6,785,551 B1 | 8/2004 | Richard |
| 6,785,670 B1 | 8/2004 | Chiang et al. |
| 6,785,688 B2 | 8/2004 | Abajian et al. |
| 6,785,721 B1 | 8/2004 | Immerman et al. |
| 6,785,902 B1 | 8/2004 | Zigmond et al. |
| 6,786,793 B1 | 9/2004 | Wang |
| 6,788,249 B1 | 9/2004 | Farmer et al. |
| 6,788,315 B1 | 9/2004 | Kekic et al. |
| 6,788,809 B1 | 9/2004 | Grzeszczuk et al. |
| 6,788,815 B2 | 9/2004 | Lui et al. |
| 6,788,882 B1 | 9/2004 | Geer et al. |
| 6,789,073 B1 | 9/2004 | Lunenfeld |
| 6,789,252 B1 | 9/2004 | Burke et al. |
| 6,791,472 B1 | 9/2004 | Hoffberg |
| 6,791,536 B2 | 9/2004 | Keely et al. |
| 6,791,588 B1 | 9/2004 | Philyaw |
| 6,792,112 B1 | 9/2004 | Campbell et al. |
| 6,792,263 B1 | 9/2004 | Kite |
| 6,792,351 B2 | 9/2004 | Lutter |
| 6,792,452 B1 | 9/2004 | Philyaw |
| 6,792,607 B1 | 9/2004 | Burd et al. |
| 6,795,699 B1 | 9/2004 | McCraw et al. |
| 6,795,966 B1 | 9/2004 | Lim et al. |
| 6,798,429 B2 | 9/2004 | Bradski |
| 6,799,050 B1 | 9/2004 | Krasner |
| 6,799,221 B1 | 9/2004 | Kenner et al. |
| 6,799,326 B2 | 9/2004 | Boylan, III et al. |
| 6,799,327 B1 | 9/2004 | Reynolds et al. |
| 6,801,124 B2 | 10/2004 | Naitou |
| 6,801,159 B2 | 10/2004 | Swope et al. |
| 6,801,637 B2 | 10/2004 | Voronka et al. |
| 6,801,658 B2 | 10/2004 | Morita et al. |
| 6,801,662 B1 | 10/2004 | Owechko et al. |
| 6,801,843 B2 | 10/2004 | Rao et al. |
| 6,801,907 B1 | 10/2004 | Zagami |
| 6,804,396 B2 | 10/2004 | Higaki et al. |
| 6,804,524 B1 | 10/2004 | Vandermeijden |
| 6,804,659 B1 | 10/2004 | Graham et al. |
| 6,807,534 B1 | 10/2004 | Erickson |
| 6,807,558 B1 | 10/2004 | Hassett et al. |
| 6,809,653 B1 | 10/2004 | Mann et al. |
| 6,810,323 B1 | 10/2004 | Bullock et al. |
| 6,812,860 B1 | 11/2004 | Schwarzwalder, Jr. |
| 6,812,961 B1 | 11/2004 | Parulski et al. |
| 6,813,039 B1 | 11/2004 | Silverbrook et al. |
| 6,813,366 B1 | 11/2004 | Rhoads |
| 6,813,501 B2 | 11/2004 | Kinnunen et al. |
| 6,813,542 B2 | 11/2004 | Peshkin et al. |
| 6,813,560 B2 | 11/2004 | van Diggelen et al. |
| 6,813,777 B1 | 11/2004 | Weinberger et al. |
| 6,814,663 B2 | 11/2004 | Edwards et al. |
| 6,816,111 B2 | 11/2004 | Krasner |
| 6,816,458 B1 | 11/2004 | Kroon |
| 6,816,710 B2 | 11/2004 | Krasner |
| 6,816,719 B1 | 11/2004 | Heinonen et al. |
| 6,816,727 B2 | 11/2004 | Cox et al. |
| 6,816,734 B2 | 11/2004 | Wong et al. |
| 6,816,850 B2 | 11/2004 | Culliss |
| 6,816,878 B1 | 11/2004 | Zimmers et al. |
| 6,816,894 B1 | 11/2004 | Philyaw et al. |
| 6,816,904 B1 | 11/2004 | Ludwig et al. |
| 6,819,268 B2 | 11/2004 | Wakamatsu et al. |
| 6,819,919 B1 | 11/2004 | Tanaka |
| 6,819,991 B2 | 11/2004 | Rao et al. |
| 6,820,237 B1 | 11/2004 | Abu-Hakima et al. |
| 6,820,269 B2 | 11/2004 | Baucke et al. |
| 6,820,277 B1 | 11/2004 | Eldering et al. |
| 6,822,639 B1 | 11/2004 | Silverbrook et al. |
| 6,822,661 B2 | 11/2004 | Sai et al. |
| 6,823,075 B2 | 11/2004 | Perry |
| 6,823,244 B2 | 11/2004 | Breed |
| 6,823,388 B1 | 11/2004 | Philyaw et al. |
| 6,824,044 B1 | 11/2004 | Lapstun et al. |
| 6,824,057 B2 | 11/2004 | Rathus et al. |
| 6,825,956 B2 | 11/2004 | Silverbrook et al. |
| 6,826,592 B1 | 11/2004 | Philyaw et al. |
| 6,826,607 B1 | 11/2004 | Gelvin et al. |
| 6,826,775 B1 | 11/2004 | Howe et al. |
| 6,827,259 B2 | 12/2004 | Rathus et al. |
| 6,827,267 B2 | 12/2004 | Rathus et al. |
| 6,827,645 B2 | 12/2004 | Morita et al. |
| 6,828,993 B1 | 12/2004 | Hendricks et al. |
| 6,829,333 B1 | 12/2004 | Frazier |
| 6,829,437 B2 | 12/2004 | Kirby |
| 6,829,475 B1 | 12/2004 | Lee et al. |
| 6,829,606 B2 | 12/2004 | Ripley |
| 6,829,650 B1 | 12/2004 | Philyaw et al. |
| 6,830,187 B2 | 12/2004 | Rathus et al. |
| 6,830,188 B2 | 12/2004 | Rathus et al. |
| 6,831,637 B1 | 12/2004 | Mack |
| 6,832,116 B1 | 12/2004 | Tillgren et al. |
| 6,832,178 B1 | 12/2004 | Fernandez et al. |
| 6,832,251 B1 | 12/2004 | Gelvin et al. |
| 6,832,373 B2 | 12/2004 | O'Neill |
| 6,833,785 B2 | 12/2004 | Brown et al. |
| 6,833,936 B1 | 12/2004 | Seymour |
| 6,834,195 B2 | 12/2004 | Brandenberg et al. |
| 6,834,804 B2 | 12/2004 | Rathus et al. |
| 6,836,799 B1 | 12/2004 | Philyaw et al. |
| 6,837,436 B2 | 1/2005 | Swartz et al. |
| 6,839,020 B2 | 1/2005 | Geier et al. |
| 6,839,021 B2 | 1/2005 | Sheynblat et al. |
| 6,840,861 B2 | 1/2005 | Jordan et al. |
| 6,842,715 B1 | 1/2005 | Gaal |
| 6,842,761 B2 | 1/2005 | Diamond et al. |
| 6,842,774 B1 | 1/2005 | Piccioni |
| 6,845,370 B2 | 1/2005 | Burkey et al. |
| 6,845,383 B1 | 1/2005 | Kraenzel et al. |
| 6,845,913 B2 | 1/2005 | Madding et al. |
| 6,847,686 B2 | 1/2005 | Morad et al. |
| 6,847,822 B1 | 1/2005 | Dennison et al. |
| 6,847,872 B2 | 1/2005 | Bodin et al. |
| 6,850,252 B1 | 2/2005 | Hoffberg |

(56) References Cited

U.S. PATENT DOCUMENTS

| | | |
|---|---|---|
| 6,850,693 B2 | 2/2005 | Young et al. |
| 6,850,893 B2 | 2/2005 | Lipkin et al. |
| 6,851,063 B1 | 2/2005 | Boyle et al. |
| 6,853,849 B1 | 2/2005 | Tognazzini |
| 6,853,907 B2 | 2/2005 | Peterson et al. |
| 6,853,913 B2 | 2/2005 | Cherveny et al. |
| 6,853,916 B2 | 2/2005 | Fuchs et al. |
| 6,853,982 B2 | 2/2005 | Smith et al. |
| 6,854,016 B1 | 2/2005 | Kraenzel et al. |
| 6,854,035 B2 | 2/2005 | Dunham et al. |
| 6,854,642 B2 | 2/2005 | Metcalf et al. |
| 6,856,282 B2 | 2/2005 | Mauro et al. |
| 6,857,016 B1 | 2/2005 | Motoyama et al. |
| 6,859,212 B2 | 2/2005 | Kumar et al. |
| 6,859,799 B1 | 2/2005 | Yuen |
| 6,859,831 B1 | 2/2005 | Gelvin et al. |
| 6,861,980 B1 | 3/2005 | Rowitch et al. |
| 6,862,046 B2 | 3/2005 | Ko |
| 6,862,553 B2 | 3/2005 | Schwenke et al. |
| 6,863,612 B2 | 3/2005 | Willis |
| 6,865,171 B1 | 3/2005 | Nilsson |
| 6,865,284 B2 | 3/2005 | Mahoney et al. |
| 6,865,395 B2 | 3/2005 | Riley |
| 6,865,746 B1 | 3/2005 | Herrington et al. |
| 6,865,825 B2 | 3/2005 | Bailey, Sr. et al. |
| 6,867,734 B2 | 3/2005 | Voor et al. |
| 6,868,193 B1 | 3/2005 | Gharbia et al. |
| 6,868,331 B2 | 3/2005 | Hanebrink |
| 6,868,389 B1 | 3/2005 | Wilkins et al. |
| 6,870,616 B2 | 3/2005 | Jung et al. |
| 6,871,139 B2 | 3/2005 | Liu et al. |
| 6,871,146 B1 | 3/2005 | Kelly et al. |
| 6,871,186 B1 | 3/2005 | Tuzhilin et al. |
| 6,871,346 B1 | 3/2005 | Kumbalimutt et al. |
| 6,873,723 B1 | 3/2005 | Aucsmith et al. |
| 6,873,854 B2 | 3/2005 | Crockett et al. |
| 6,874,683 B2 | 4/2005 | Keronen et al. |
| 6,876,496 B2 | 4/2005 | French et al. |
| 6,876,926 B2 | 4/2005 | Kirkland et al. |
| 6,877,001 B2 | 4/2005 | Wolf et al. |
| 6,879,701 B1 | 4/2005 | Rhoads |
| 6,879,957 B1 | 4/2005 | Pechter et al. |
| 6,880,005 B1 | 4/2005 | Bell et al. |
| 6,880,113 B2 | 4/2005 | Anderson et al. |
| 6,880,122 B1 | 4/2005 | Lee et al. |
| 6,880,123 B1 | 4/2005 | Landsman et al. |
| 6,880,124 B1 | 4/2005 | Moore |
| 6,882,299 B1 | 4/2005 | Allport |
| 6,882,718 B1 | 4/2005 | Smith |
| 6,882,837 B2 | 4/2005 | Fernandez et al. |
| 6,882,905 B2 | 4/2005 | Hall et al. |
| 6,882,977 B1 | 4/2005 | Miller |
| 6,882,978 B2 | 4/2005 | Ebisawa |
| 6,883,747 B2 | 4/2005 | Ratkovic et al. |
| 6,885,920 B2 | 4/2005 | Yakes et al. |
| 6,885,940 B2 | 4/2005 | Brodie et al. |
| 6,886,104 B1 | 4/2005 | McClurg et al. |
| 6,888,497 B2 | 5/2005 | King et al. |
| 6,888,932 B2 | 5/2005 | Snip et al. |
| 6,889,896 B2 | 5/2005 | Silverbrook et al. |
| 6,890,256 B2 | 5/2005 | Walker et al. |
| 6,891,838 B1 | 5/2005 | Petite et al. |
| 6,891,953 B1 | 5/2005 | DeMello et al. |
| 6,892,264 B2 | 5/2005 | Lamb |
| 6,895,170 B1 | 5/2005 | Lambert et al. |
| 6,895,238 B2 | 5/2005 | Newell et al. |
| 6,895,240 B2 | 5/2005 | Laursen et al. |
| 6,895,249 B2 | 5/2005 | Gaal |
| 6,895,324 B2 | 5/2005 | Straub |
| 6,898,592 B2 | 5/2005 | Peltonen et al. |
| 6,898,762 B2 | 5/2005 | Ellis et al. |
| 6,900,758 B1 | 5/2005 | Mann et al. |
| 6,901,057 B2 | 5/2005 | Rune et al. |
| 6,903,684 B1 | 6/2005 | Simic et al. |
| 6,904,029 B2 | 6/2005 | Fors et al. |
| 6,904,160 B2 | 6/2005 | Burgess |
| 6,904,171 B2 | 6/2005 | van Zee |
| 6,906,619 B2 | 6/2005 | Williams et al. |
| 6,907,118 B2 | 6/2005 | Henderson et al. |
| 6,907,224 B2 | 6/2005 | Younis |
| 6,907,238 B2 | 6/2005 | Leung |
| 6,911,997 B1 | 6/2005 | Okamoto et al. |
| 6,912,395 B2 | 6/2005 | Benes et al. |
| 6,912,398 B1 | 6/2005 | Domnitz |
| 6,914,891 B2 | 7/2005 | Ha et al. |
| 6,915,126 B2 | 7/2005 | Mazzara, Jr. |
| 6,915,208 B2 | 7/2005 | Garin et al. |
| 6,915,955 B2 | 7/2005 | Jung et al. |
| 6,916,096 B2 | 7/2005 | Eberl et al. |
| 6,917,331 B2 | 7/2005 | Gronemeyer |
| 6,917,722 B1 | 7/2005 | Bloomfield |
| 6,917,724 B2 | 7/2005 | Seder et al. |
| 6,920,129 B2 | 7/2005 | Preston et al. |
| 6,920,431 B2 | 7/2005 | Showghi et al. |
| 6,920,494 B2 | 7/2005 | Heitman et al. |
| 6,922,664 B1 | 7/2005 | Fernandez et al. |
| 6,922,725 B2 | 7/2005 | Lamming et al. |
| 6,925,182 B1 | 8/2005 | Epstein |
| 6,925,368 B2 | 8/2005 | Funkhouser et al. |
| 6,925,567 B1 | 8/2005 | Hirata |
| 6,926,374 B2 | 8/2005 | Dudeck et al. |
| 6,927,806 B2 | 8/2005 | Chan |
| 6,928,396 B2 | 8/2005 | Thackston |
| 6,928,414 B1 | 8/2005 | Kim |
| 6,929,543 B1 | 8/2005 | Ueshima et al. |
| 6,930,634 B2 | 8/2005 | Peng et al. |
| 6,931,254 B1 | 8/2005 | Egner et al. |
| 6,931,454 B2 | 8/2005 | Deshpande et al. |
| 6,931,592 B1 | 8/2005 | Ramaley et al. |
| 6,933,837 B2 | 8/2005 | Gunderson et al. |
| 6,934,578 B2 | 8/2005 | Ramseth |
| 6,934,963 B1 | 8/2005 | Reynolds et al. |
| 6,934,964 B1 | 8/2005 | Schaffer et al. |
| 6,937,187 B2 | 8/2005 | van Diggelen et al. |
| 6,937,732 B2 | 8/2005 | Ohmura et al. |
| 6,937,742 B2 | 8/2005 | Roberts et al. |
| 6,937,872 B2 | 8/2005 | Krasner |
| 6,938,024 B1 | 8/2005 | Horvitz |
| 6,938,079 B1 | 8/2005 | Anderson et al. |
| 6,938,209 B2 | 8/2005 | Ogawa et al. |
| 6,939,155 B2 | 9/2005 | Postrel |
| 6,940,646 B2 | 9/2005 | Taniguchi et al. |
| 6,941,144 B2 | 9/2005 | Stein |
| 6,941,574 B1 | 9/2005 | Broadwin et al. |
| 6,942,575 B2 | 9/2005 | Mergler |
| 6,943,955 B2 | 9/2005 | Kaschke et al. |
| 6,944,315 B1 | 9/2005 | Zipperer et al. |
| 6,944,540 B2 | 9/2005 | King et al. |
| 6,947,571 B1 | 9/2005 | Rhoads et al. |
| 6,947,772 B2 | 9/2005 | Minear et al. |
| 6,947,922 B1 | 9/2005 | Glance |
| 6,947,930 B2 | 9/2005 | Anick et al. |
| 6,948,183 B1 | 9/2005 | Peterka |
| 6,950,058 B1 | 9/2005 | Davis et al. |
| 6,950,502 B1 | 9/2005 | Jenkins |
| 6,950,534 B2 | 9/2005 | Cohen et al. |
| 6,950,638 B2 | 9/2005 | Videtich et al. |
| 6,950,804 B2 | 9/2005 | Strietzel |
| 6,950,818 B2 | 9/2005 | Dennis et al. |
| 6,950,850 B1 | 9/2005 | Leff et al. |
| 6,950,990 B2 | 9/2005 | Rajarajan et al. |
| 6,952,155 B2 | 10/2005 | Himmelstein |
| 6,952,281 B1 | 10/2005 | Irons et al. |
| 6,952,698 B2 | 10/2005 | Delaire et al. |
| 6,954,728 B1 | 10/2005 | Kusumoto et al. |
| 6,955,605 B2 | 10/2005 | Young et al. |
| 6,956,467 B1 | 10/2005 | Mercado, Jr. |
| 6,957,073 B2 | 10/2005 | Bye |
| 6,957,186 B1 | 10/2005 | Guheen et al. |
| 6,957,384 B2 | 10/2005 | Jeffery et al. |
| 6,958,984 B2 | 10/2005 | Kotzin |
| 6,961,562 B2 | 11/2005 | Ross |
| 6,961,660 B2 | 11/2005 | Underbrink et al. |
| 6,961,731 B2 | 11/2005 | Holbrook |

(56) References Cited

U.S. PATENT DOCUMENTS

| | | |
|---|---|---|
| 6,963,899 B1 | 11/2005 | Fernandez et al. |
| 6,964,608 B1 | 11/2005 | Koza |
| 6,965,754 B2 | 11/2005 | King |
| 6,965,767 B2 | 11/2005 | Maggenti et al. |
| 6,965,816 B2 | 11/2005 | Walker |
| 6,965,912 B2 | 11/2005 | Friedman et al. |
| 6,967,566 B2 | 11/2005 | Weston et al. |
| 6,968,057 B2 | 11/2005 | Rhoads |
| 6,968,567 B1 | 11/2005 | Gordon et al. |
| 6,968,736 B2 | 11/2005 | Lynam |
| 6,969,183 B2 | 11/2005 | Okubo et al. |
| 6,970,102 B2 | 11/2005 | Ciolli |
| 6,970,462 B1 | 11/2005 | McRae |
| 6,970,834 B2 | 11/2005 | Martin et al. |
| 6,970,849 B1 | 11/2005 | DeMello et al. |
| 6,970,915 B1 | 11/2005 | Partovi et al. |
| 6,970,917 B1 | 11/2005 | Kushwaha et al. |
| 6,972,669 B2 | 12/2005 | Saito et al. |
| 6,973,030 B2 | 12/2005 | Pecen et al. |
| 6,973,166 B1 | 12/2005 | Tsumpes |
| 6,973,320 B2 | 12/2005 | Brown et al. |
| 6,973,378 B2 | 12/2005 | Yamada |
| 6,973,664 B2 | 12/2005 | Fries |
| 6,973,669 B2 | 12/2005 | Daniels |
| 6,975,266 B2 | 12/2005 | Abraham et al. |
| 6,976,071 B1 | 12/2005 | Donzis et al. |
| 6,978,297 B1 | 12/2005 | Piersol |
| 6,978,453 B2 | 12/2005 | Rao et al. |
| 6,980,816 B2 | 12/2005 | Rohles et al. |
| 6,981,262 B1 | 12/2005 | DeMello et al. |
| 6,983,200 B2 | 1/2006 | Bodin et al. |
| 6,983,483 B2 | 1/2006 | Maze et al. |
| 6,985,105 B1 | 1/2006 | Pitt et al. |
| 6,985,169 B1 | 1/2006 | Deng et al. |
| 6,985,839 B1 | 1/2006 | Motamedi et al. |
| 6,985,922 B1 | 1/2006 | Bashen et al. |
| 6,985,962 B2 | 1/2006 | Philyaw |
| 6,987,221 B2 | 1/2006 | Platt |
| 6,987,964 B2 | 1/2006 | Obradovich et al. |
| 6,987,987 B1 | 1/2006 | Vacanti et al. |
| 6,988,026 B2 | 1/2006 | Breed et al. |
| 6,988,034 B1 | 1/2006 | Marlatt et al. |
| 6,989,766 B2 | 1/2006 | Mese et al. |
| 6,989,822 B2 | 1/2006 | Pettiross et al. |
| 6,990,080 B2 | 1/2006 | Bahl et al. |
| 6,990,407 B1 | 1/2006 | Mbekeani et al. |
| 6,990,497 B2 | 1/2006 | O'Rourke et al. |
| 6,990,548 B1 | 1/2006 | Kaylor |
| 6,990,590 B2 | 1/2006 | Hanson et al. |
| 6,991,158 B2 | 1/2006 | Munte |
| 6,992,655 B2 | 1/2006 | Ericson et al. |
| 6,993,421 B2 | 1/2006 | Pillar et al. |
| 6,993,429 B2 | 1/2006 | Obradovich et al. |
| 6,993,456 B2 | 1/2006 | Brooks et al. |
| 6,993,511 B2 | 1/2006 | Himmelstein |
| 6,993,532 B1 | 1/2006 | Platt et al. |
| 6,993,570 B1 | 1/2006 | Irani |
| 6,993,580 B2 | 1/2006 | Isherwood et al. |
| 6,995,788 B2 | 2/2006 | James |
| 6,996,670 B2 | 2/2006 | Delaire et al. |
| 6,996,720 B1 | 2/2006 | DeMello et al. |
| 6,996,778 B2 | 2/2006 | Rajarajan et al. |
| 6,999,779 B1 | 2/2006 | Hashimoto |
| 6,999,782 B2 | 2/2006 | Shaughnessy et al. |
| 7,000,180 B2 | 2/2006 | Balthaser |
| 7,000,469 B2 | 2/2006 | Foxlin et al. |
| 7,001,681 B2 | 2/2006 | Wood |
| 7,002,942 B2 | 2/2006 | Kotzin |
| 7,003,134 B1 | 2/2006 | Covell et al. |
| 7,004,390 B2 | 2/2006 | Silverbrook et al. |
| 7,006,881 B1 | 2/2006 | Hoffberg et al. |
| 7,006,950 B1 | 2/2006 | Greiffenhagen et al. |
| RE39,038 E | 3/2006 | Fleming, III |
| 7,010,492 B1 | 3/2006 | Bassett et al. |
| 7,010,512 B1 | 3/2006 | Gillin et al. |
| 7,010,546 B1 | 3/2006 | Kolawa et al. |
| 7,010,616 B2 | 3/2006 | Carlson et al. |
| 7,010,681 B1 | 3/2006 | Fletcher et al. |
| 7,013,339 B2 | 3/2006 | Schwager |
| 7,013,478 B1 | 3/2006 | Hendricks et al. |
| 7,016,055 B2 | 3/2006 | Dodge et al. |
| 7,016,084 B2 | 3/2006 | Tsai |
| 7,016,532 B2 | 3/2006 | Boncyk et al. |
| 7,017,171 B1 | 3/2006 | Horlander et al. |
| 7,017,189 B1 | 3/2006 | DeMello et al. |
| 7,020,637 B2 | 3/2006 | Bratton |
| 7,020,651 B2 | 3/2006 | Ripley |
| 7,020,663 B2 | 3/2006 | Hay et al. |
| 7,020,701 B1 | 3/2006 | Gelvin et al. |
| 7,020,751 B2 | 3/2006 | Kershaw |
| 7,021,836 B2 | 4/2006 | Anderson et al. |
| 7,023,979 B1 | 4/2006 | Wu et al. |
| 7,024,321 B1 | 4/2006 | Deninger et al. |
| 7,024,363 B1 | 4/2006 | Comerford et al. |
| 7,024,393 B1 | 4/2006 | Peinado et al. |
| 7,024,549 B1 | 4/2006 | Luu et al. |
| 7,024,552 B1 | 4/2006 | Caswell et al. |
| 7,024,660 B2 | 4/2006 | Andrade et al. |
| 7,025,209 B2 | 4/2006 | Hawkins |
| 7,027,055 B2 | 4/2006 | Anderson et al. |
| 7,027,660 B2 | 4/2006 | Hersch et al. |
| 7,027,773 B1 | 4/2006 | McMillin |
| 7,027,801 B1 | 4/2006 | Hall et al. |
| 7,027,975 B1 | 4/2006 | Pazandak et al. |
| 7,028,082 B1 | 4/2006 | Rosenberg et al. |
| 7,028,269 B1 | 4/2006 | Cohen-Solal et al. |
| 7,035,427 B2 | 4/2006 | Rhoads |
| 7,035,907 B1 | 4/2006 | Decasper et al. |
| 7,036,094 B1 | 4/2006 | Cohen et al. |
| 7,038,855 B2 | 5/2006 | French et al. |
| 7,039,393 B1 | 5/2006 | Kite |
| 7,039,676 B1 | 5/2006 | Day et al. |
| 7,039,935 B2 | 5/2006 | Knudson et al. |
| 7,042,345 B2 | 5/2006 | Ellis |
| 7,042,363 B2 | 5/2006 | Katrak et al. |
| 7,042,440 B2 | 5/2006 | Pryor et al. |
| 7,042,454 B1 | 5/2006 | Seligman |
| 7,043,489 B1 | 5/2006 | Kelley |
| 7,047,411 B1 | 5/2006 | DeMello et al. |
| 7,047,491 B2 | 5/2006 | Schubert et al. |
| 7,047,498 B2 | 5/2006 | Lui et al. |
| 7,049,953 B2 | 5/2006 | Monroe |
| 7,050,606 B2 | 5/2006 | Paul et al. |
| 7,050,988 B2 | 5/2006 | Atcheson et al. |
| 7,051,080 B1 | 5/2006 | Paul et al. |
| 7,051,352 B1 | 5/2006 | Schaffer |
| 7,051,353 B2 | 5/2006 | Yamashita et al. |
| 7,051,943 B2 | 5/2006 | Leone et al. |
| 7,054,465 B2 | 5/2006 | Rhoads |
| 7,054,818 B2 | 5/2006 | Sharma et al. |
| 7,055,169 B2 | 5/2006 | Delpuch et al. |
| 7,057,607 B2 | 6/2006 | Mayoraz et al. |
| 7,058,204 B2 | 6/2006 | Hildreth et al. |
| 7,058,223 B2 | 6/2006 | Cox |
| 7,058,508 B2 | 6/2006 | Combs et al. |
| 7,058,626 B1 | 6/2006 | Pan et al. |
| 7,058,635 B1 | 6/2006 | Shah-Nazaroff et al. |
| 7,058,697 B2 | 6/2006 | Rhoads |
| 7,060,957 B2 | 6/2006 | Lange et al. |
| 7,062,379 B2 | 6/2006 | Videtich |
| 7,062,437 B2 | 6/2006 | Kovales et al. |
| 7,062,510 B1 | 6/2006 | Eldering |
| 7,062,527 B1 | 6/2006 | Tyrrell, III |
| 7,062,706 B2 | 6/2006 | Maxwell et al. |
| 7,064,656 B2 | 6/2006 | Belcher et al. |
| 7,064,681 B2 | 6/2006 | Horstemeyer |
| 7,065,345 B2 | 6/2006 | Carlton et al. |
| 7,065,351 B2 | 6/2006 | Carter et al. |
| 7,065,483 B2 | 6/2006 | Decary et al. |
| 7,065,507 B2 | 6/2006 | Mohammed et al. |
| 7,066,391 B2 | 6/2006 | Tsikos et al. |
| 7,069,186 B2 | 6/2006 | Jung et al. |
| 7,069,188 B2 | 6/2006 | Roberts |
| 7,069,240 B2 | 6/2006 | Spero et al. |

(56) References Cited

U.S. PATENT DOCUMENTS

| | | |
|---|---|---|
| 7,069,272 B2 | 6/2006 | Snyder |
| 7,069,308 B2 | 6/2006 | Abrams |
| 7,069,395 B2 | 6/2006 | Camacho et al. |
| 7,069,562 B2 | 6/2006 | Kushnirskiy et al. |
| 7,069,576 B1 | 6/2006 | Knudson et al. |
| 7,069,582 B2 | 6/2006 | Philyaw et al. |
| 7,070,098 B1 | 7/2006 | Lapstun et al. |
| 7,072,846 B1 | 7/2006 | Robinson |
| 7,072,849 B1 | 7/2006 | Filepp et al. |
| 7,072,934 B2 | 7/2006 | Helgeson et al. |
| 7,072,963 B2 | 7/2006 | Anderson et al. |
| 7,073,129 B1 | 7/2006 | Robarts et al. |
| 7,075,643 B2 | 7/2006 | Holub |
| 7,079,639 B2 | 7/2006 | Smith |
| 7,079,713 B2 | 7/2006 | Simmons |
| 7,079,857 B2 | 7/2006 | Maggenti et al. |
| 7,079,993 B2 | 7/2006 | Stephenson et al. |
| 7,080,140 B2 | 7/2006 | Heitman et al. |
| 7,082,359 B2 | 7/2006 | Breed |
| 7,082,407 B1 | 7/2006 | Bezos et al. |
| 7,084,780 B2 | 8/2006 | Nguyen et al. |
| 7,084,859 B1 | 8/2006 | Pryor |
| 7,085,637 B2 | 8/2006 | Breed et al. |
| 7,085,683 B2 | 8/2006 | Anderson et al. |
| 7,085,755 B2 | 8/2006 | Bluhm et al. |
| 7,085,845 B2 | 8/2006 | Woodward et al. |
| 7,086,187 B2 | 8/2006 | Bandak |
| 7,089,206 B2 | 8/2006 | Martin |
| 7,089,330 B1 | 8/2006 | Mason |
| 7,089,583 B2 | 8/2006 | Mehra et al. |
| 7,092,723 B2 | 8/2006 | Himmelstein |
| 7,093,759 B2 | 8/2006 | Walsh |
| 7,095,401 B2 | 8/2006 | Liu et al. |
| 7,096,218 B2 | 8/2006 | Schirmer et al. |
| 7,096,234 B2 | 8/2006 | Plastina et al. |
| 7,096,486 B2 | 8/2006 | Ukai et al. |
| 7,098,891 B1 | 8/2006 | Pryor |
| 7,100,195 B1 | 8/2006 | Underwood |
| 7,103,018 B1 | 9/2006 | Hansen et al. |
| 7,103,197 B2 | 9/2006 | Rhoads |
| 7,103,460 B1 | 9/2006 | Breed |
| 7,103,511 B2 | 9/2006 | Petite |
| 7,103,574 B1 | 9/2006 | Peinado et al. |
| 7,103,848 B2 | 9/2006 | Barsness et al. |
| 7,104,890 B2 | 9/2006 | Tsuda et al. |
| 7,104,955 B2 | 9/2006 | Bardy |
| 7,106,717 B2 | 9/2006 | Rousseau et al. |
| 7,107,285 B2 | 9/2006 | von Kaenel et al. |
| 7,107,309 B1 | 9/2006 | Geddes et al. |
| 7,107,706 B1 | 9/2006 | Bailey, Sr. et al. |
| 7,109,859 B2 | 9/2006 | Peeters |
| 7,110,525 B1 | 9/2006 | Heller et al. |
| 7,110,576 B2 | 9/2006 | Norris, Jr. et al. |
| 7,110,776 B2 | 9/2006 | Sambin |
| 7,110,880 B2 | 9/2006 | Breed et al. |
| 7,110,982 B2 | 9/2006 | Feldman et al. |
| 7,111,240 B2 | 9/2006 | Crow et al. |
| 7,111,787 B2 | 9/2006 | Ehrhart |
| 7,113,110 B2 | 9/2006 | Horstemeyer |
| 7,113,596 B2 | 9/2006 | Rhoads |
| 7,113,614 B2 | 9/2006 | Rhoads |
| 7,113,771 B2 | 9/2006 | Kotzin |
| 7,113,779 B1 | 9/2006 | Fujisaki |
| 7,113,860 B2 | 9/2006 | Wang |
| 7,113,918 B1 | 9/2006 | Ahmad et al. |
| 7,116,781 B2 | 10/2006 | Rhoads |
| 7,116,894 B1 | 10/2006 | Chatterton |
| 7,117,170 B1 | 10/2006 | Bennett et al. |
| 7,117,374 B2 | 10/2006 | Hill et al. |
| 7,117,504 B2 | 10/2006 | Smith et al. |
| 7,117,518 B1 | 10/2006 | Takahashi et al. |
| 7,119,716 B2 | 10/2006 | Horstemeyer |
| 7,120,129 B2 | 10/2006 | Ayyagari et al. |
| 7,120,248 B2 | 10/2006 | Hopkins et al. |
| 7,120,508 B2 | 10/2006 | Peshkin et al. |
| 7,120,619 B2 | 10/2006 | Drucker et al. |
| 7,120,872 B2 | 10/2006 | Thacker |
| 7,121,469 B2 | 10/2006 | Dorai et al. |
| 7,121,946 B2 | 10/2006 | Paul et al. |
| 7,123,926 B2 | 10/2006 | Himmelstein |
| 7,124,004 B2 | 10/2006 | Obradovich |
| 7,124,093 B1 | 10/2006 | Graham et al. |
| 7,124,101 B1 | 10/2006 | Mikurak |
| 7,126,583 B1 | 10/2006 | Breed |
| 7,127,143 B2 | 10/2006 | Elkins, II et al. |
| 7,127,525 B2 | 10/2006 | Coleman et al. |
| 7,130,807 B1 | 10/2006 | Mikurak |
| 7,130,885 B2 | 10/2006 | Chandra et al. |
| 7,131,061 B2 | 10/2006 | MacLean et al. |
| 7,131,062 B2 | 10/2006 | Nguyen et al. |
| 7,133,862 B2 | 11/2006 | Hubert et al. |
| 7,134,131 B1 | 11/2006 | Hendricks et al. |
| 7,136,530 B2 | 11/2006 | Lee et al. |
| 7,136,710 B1 | 11/2006 | Hoffberg et al. |
| 7,136,814 B1 | 11/2006 | McConnell |
| 7,136,838 B1 | 11/2006 | Peinado et al. |
| 7,136,866 B2 | 11/2006 | Springer, Jr. et al. |
| 7,136,871 B2 | 11/2006 | Ozer et al. |
| 7,137,077 B2 | 11/2006 | Iwema et al. |
| 7,137,124 B2 | 11/2006 | Lamb et al. |
| 7,139,445 B2 | 11/2006 | Pilu et al. |
| 7,139,723 B2 | 11/2006 | Conkwright et al. |
| 7,139,983 B2 | 11/2006 | Kelts |
| 7,142,099 B2 | 11/2006 | Ross et al. |
| 7,142,844 B2 | 11/2006 | Obradovich et al. |
| 7,143,091 B2 | 11/2006 | Charnock et al. |
| 7,146,260 B2 | 12/2006 | Preston et al. |
| 7,147,246 B2 | 12/2006 | Breed et al. |
| 7,147,558 B2 | 12/2006 | Giobbi |
| 7,149,696 B2 | 12/2006 | Shimizu et al. |
| 7,149,698 B2 | 12/2006 | Guheen et al. |
| 7,149,741 B2 | 12/2006 | Burkey et al. |
| 7,151,768 B2 | 12/2006 | Preston et al. |
| 7,151,864 B2 | 12/2006 | Henry et al. |
| 7,151,946 B2 | 12/2006 | Maggenti et al. |
| 7,152,207 B1 | 12/2006 | Underwood et al. |
| 7,152,236 B1 | 12/2006 | Wugofski et al. |
| 7,154,638 B1 | 12/2006 | Lapstun et al. |
| 7,155,335 B2 | 12/2006 | Rennels |
| 7,155,676 B2 | 12/2006 | Land et al. |
| 7,158,758 B2 | 1/2007 | Lim et al. |
| 7,158,953 B1 | 1/2007 | DeMello et al. |
| 7,158,956 B1 | 1/2007 | Himmelstein |
| 7,161,926 B2 | 1/2007 | Elson et al. |
| 7,162,433 B1 | 1/2007 | Foroutan |
| 7,164,662 B2 | 1/2007 | Preston et al. |
| 7,165,040 B2 | 1/2007 | Ehrman et al. |
| 7,165,041 B1 | 1/2007 | Guheen et al. |
| 7,165,098 B1 | 1/2007 | Boyer et al. |
| 7,165,268 B1 | 1/2007 | Moore et al. |
| 7,167,586 B2 | 1/2007 | Braun et al. |
| 7,170,492 B2 | 1/2007 | Bell |
| 7,171,016 B1 | 1/2007 | Rhoads |
| 7,171,189 B2 | 1/2007 | Bianconi et al. |
| 7,171,381 B2 | 1/2007 | Ehrman et al. |
| 7,171,468 B2 | 1/2007 | Yeung et al. |
| 7,171,624 B2 | 1/2007 | Baldwin et al. |
| 7,173,538 B2 | 2/2007 | Pedraza et al. |
| 7,174,054 B2 | 2/2007 | Manber et al. |
| 7,174,126 B2 | 2/2007 | McElhatten et al. |
| 7,174,253 B2 | 2/2007 | Videtich |
| 7,174,286 B2 | 2/2007 | Martin et al. |
| 7,174,332 B2 | 2/2007 | Baxter et al. |
| 7,176,791 B2 | 2/2007 | Sakaki et al. |
| 7,177,623 B2 | 2/2007 | Baldwin |
| 7,177,935 B2 | 2/2007 | Bradshaw et al. |
| 7,178,049 B2 | 2/2007 | Lutter |
| 7,178,106 B2 | 2/2007 | Lamkin et al. |
| 7,180,473 B2 | 2/2007 | Horie et al. |
| 7,181,017 B1 | 2/2007 | Nagel et al. |
| 7,181,438 B1 | 2/2007 | Szabo |
| 7,181,488 B2 | 2/2007 | Martin et al. |
| 7,181,744 B2 | 2/2007 | Shultz et al. |
| 7,181,761 B2 | 2/2007 | Davis et al. |

(56) References Cited

U.S. PATENT DOCUMENTS

| | | |
|---|---|---|
| 7,184,048 B2 | 2/2007 | Hunter |
| 7,184,866 B2 | 2/2007 | Squires et al. |
| 7,185,275 B2 | 2/2007 | Roberts et al. |
| 7,185,286 B2 | 2/2007 | Zondervan et al. |
| 7,185,355 B1 | 2/2007 | Ellis et al. |
| 7,187,847 B2 | 3/2007 | Young et al. |
| 7,187,947 B1 | 3/2007 | White et al. |
| 7,188,216 B1 | 3/2007 | Rajkumar et al. |
| 7,188,307 B2 | 3/2007 | Ohsawa |
| 7,190,480 B2 | 3/2007 | Sturgeon et al. |
| 7,191,447 B1 | 3/2007 | Ellis et al. |
| 7,194,421 B2 | 3/2007 | Conkwright et al. |
| 7,194,512 B1 | 3/2007 | Creemer et al. |
| 7,194,755 B1 | 3/2007 | Nakata et al. |
| 7,197,234 B1 | 3/2007 | Chatterton |
| 7,197,465 B1 | 3/2007 | Hu et al. |
| 7,197,472 B2 | 3/2007 | Conkwright et al. |
| 7,197,716 B2 | 3/2007 | Newell et al. |
| 7,199,885 B2 | 4/2007 | Dodge et al. |
| 7,202,776 B2 | 4/2007 | Breed |
| 7,202,898 B1 | 4/2007 | Braun et al. |
| 7,203,158 B2 | 4/2007 | Oshima et al. |
| 7,203,300 B2 | 4/2007 | Shaffer et al. |
| 7,203,597 B2 | 4/2007 | Sato et al. |
| 7,203,721 B1 | 4/2007 | Ben-Efraim et al. |
| 7,204,041 B1 | 4/2007 | Bailey, Sr. et al. |
| 7,206,305 B2 | 4/2007 | Preston et al. |
| 7,207,041 B2 | 4/2007 | Elson et al. |
| 7,207,042 B2 | 4/2007 | Smith et al. |
| 7,209,915 B1 | 4/2007 | Taboada et al. |
| 7,209,969 B2 | 4/2007 | Lahti et al. |
| 7,210,100 B2 | 4/2007 | Berger et al. |
| 7,212,296 B2 | 5/2007 | Dodge et al. |
| 7,212,661 B2 | 5/2007 | Samara et al. |
| 7,212,811 B2 | 5/2007 | Dowling et al. |
| 7,215,965 B2 | 5/2007 | Fournier et al. |
| 7,216,121 B2 | 5/2007 | Bachman et al. |
| 7,216,145 B2 | 5/2007 | Collings, III |
| 7,216,224 B2 | 5/2007 | Lapstun et al. |
| 7,218,779 B2 | 5/2007 | Dodge et al. |
| 7,218,940 B2 | 5/2007 | Niemenmaa et al. |
| 7,219,013 B1 | 5/2007 | Young et al. |
| 7,219,123 B1 | 5/2007 | Fiechter et al. |
| 7,219,304 B1 | 5/2007 | Kraenzel et al. |
| 7,221,669 B2 | 5/2007 | Preston et al. |
| 7,221,959 B2 | 5/2007 | Lindqvist et al. |
| 7,222,078 B2 | 5/2007 | Abelow |
| 7,222,780 B2 | 5/2007 | Lapstun et al. |
| 7,224,282 B2 | 5/2007 | Terauchi et al. |
| 7,224,480 B2 | 5/2007 | Tanaka et al. |
| 7,224,820 B2 | 5/2007 | Inomata et al. |
| 7,224,886 B2 | 5/2007 | Akamatsu et al. |
| 7,225,040 B2 | 5/2007 | Eller et al. |
| 7,225,979 B2 | 6/2007 | Silverbrook et al. |
| 7,227,526 B2 | 6/2007 | Hildreth et al. |
| 7,227,842 B1 | 6/2007 | Ji et al. |
| 7,228,340 B2 | 6/2007 | De Boor et al. |
| 7,231,357 B1 | 6/2007 | Shanman et al. |
| 7,234,645 B2 | 6/2007 | Silverbrook et al. |
| 7,236,493 B1 | 6/2007 | McRae |
| 7,236,941 B2 | 6/2007 | Conkwright et al. |
| 7,236,969 B1 | 6/2007 | Skillen et al. |
| 7,239,747 B2 | 7/2007 | Bresler et al. |
| 7,239,949 B2 | 7/2007 | Lu et al. |
| 7,240,843 B2 | 7/2007 | Paul et al. |
| 7,242,492 B2 | 7/2007 | Currans et al. |
| 7,242,988 B1 | 7/2007 | Hoffberg et al. |
| 7,246,118 B2 | 7/2007 | Chastain et al. |
| 7,249,266 B2 | 7/2007 | Margalit et al. |
| 7,254,581 B2 | 8/2007 | Johnson et al. |
| 7,256,341 B2 | 8/2007 | Plastina et al. |
| 7,257,426 B1 | 8/2007 | Witkowski et al. |
| 7,257,545 B1 | 8/2007 | Hung |
| 7,257,567 B2 | 8/2007 | Toshima |
| 7,257,570 B2 | 8/2007 | Riise et al. |
| 7,259,747 B2 | 8/2007 | Bell |
| 7,260,534 B2 | 8/2007 | Gandhi et al. |
| 7,262,798 B2 | 8/2007 | Stavely et al. |
| 7,263,367 B1 | 8/2007 | Sabot |
| 7,263,521 B2 | 8/2007 | Carpentier et al. |
| 7,268,700 B1 | 9/2007 | Hoffberg |
| 7,269,188 B2 | 9/2007 | Smith |
| 7,269,289 B2 | 9/2007 | Wu et al. |
| 7,271,737 B1 | 9/2007 | Hoffberg |
| 7,272,497 B2 | 9/2007 | Koshiji et al. |
| 7,272,637 B1 | 9/2007 | Himmelstein |
| 7,274,800 B2 | 9/2007 | Nefian et al. |
| 7,274,988 B2 | 9/2007 | Mukaiyama |
| 7,275,049 B2 | 9/2007 | Clausner et al. |
| 7,277,693 B2 | 10/2007 | Chen et al. |
| 7,277,925 B2 | 10/2007 | Warnock |
| 7,283,567 B2 | 10/2007 | Preston et al. |
| 7,283,904 B2 | 10/2007 | Benjamin et al. |
| 7,283,974 B2 | 10/2007 | Katz et al. |
| 7,283,992 B2 | 10/2007 | Liu et al. |
| 7,284,192 B2 | 10/2007 | Kashi et al. |
| 7,286,522 B2 | 10/2007 | Preston et al. |
| 7,289,806 B2 | 10/2007 | Morris et al. |
| 7,295,101 B2 | 11/2007 | Ward et al. |
| 7,295,925 B2 | 11/2007 | Breed et al. |
| 7,298,248 B2 | 11/2007 | Finley et al. |
| 7,298,289 B1 | 11/2007 | Hoffberg |
| 7,299,186 B2 | 11/2007 | Kuzunuki et al. |
| 7,299,969 B2 | 11/2007 | Paul et al. |
| 7,301,494 B2 | 11/2007 | Waters |
| 7,302,339 B2 | 11/2007 | Gray |
| 7,302,419 B2 | 11/2007 | Conkwright et al. |
| 7,302,468 B2 | 11/2007 | Wijeratne |
| 7,305,442 B1 | 12/2007 | Lundy |
| 7,305,445 B2 | 12/2007 | Singh et al. |
| 7,305,467 B2 | 12/2007 | Kaiser et al. |
| 7,308,112 B2 | 12/2007 | Fujimura et al. |
| 7,308,483 B2 | 12/2007 | Philyaw |
| 7,317,696 B2 | 1/2008 | Preston et al. |
| 7,317,723 B1 | 1/2008 | Guru |
| 7,317,836 B2 | 1/2008 | Fujimura et al. |
| 7,318,106 B2 | 1/2008 | Philyaw |
| 7,320,025 B1 | 1/2008 | Steinberg et al. |
| 7,328,450 B2 | 2/2008 | Macrae et al. |
| 7,330,693 B1 | 2/2008 | Goss |
| 7,331,523 B2 | 2/2008 | Meier et al. |
| 7,339,467 B2 | 3/2008 | Lamb |
| 7,340,469 B1 | 3/2008 | Alghathbar et al. |
| 7,343,160 B2 | 3/2008 | Morton |
| 7,343,317 B2 | 3/2008 | Jokinen et al. |
| 7,343,364 B2 | 3/2008 | Bram et al. |
| 7,343,614 B1 | 3/2008 | Hendricks et al. |
| 7,343,616 B1 | 3/2008 | Takahashi et al. |
| 7,348,963 B2 | 3/2008 | Bell |
| 7,349,552 B2 | 3/2008 | Levy et al. |
| 7,349,976 B1 | 3/2008 | Glaser et al. |
| 7,350,204 B2 | 3/2008 | Lambert et al. |
| 7,352,358 B2 | 4/2008 | Zalewski et al. |
| 7,353,199 B1 | 4/2008 | DiStefano, III |
| 7,353,533 B2 | 4/2008 | Wright et al. |
| 7,358,434 B2 | 4/2008 | Plastina et al. |
| 7,359,121 B2 | 4/2008 | French et al. |
| 7,359,782 B2 | 4/2008 | Breed |
| 7,362,902 B1 | 4/2008 | Baker et al. |
| 7,362,999 B2 | 4/2008 | Petschke et al. |
| 7,363,314 B2 | 4/2008 | Picker et al. |
| 7,363,347 B2 | 4/2008 | Thomas |
| 7,363,643 B2 | 4/2008 | Drake et al. |
| 7,363,645 B1 | 4/2008 | Hendricks |
| 7,367,887 B2 | 5/2008 | Watabe et al. |
| 7,370,002 B2 | 5/2008 | Heckerman et al. |
| 7,373,243 B2 | 5/2008 | Tengler et al. |
| 7,373,345 B2 | 5/2008 | Carpentier et al. |
| 7,375,728 B2 | 5/2008 | Donath et al. |
| 7,376,581 B2 | 5/2008 | DeRose et al. |
| 7,377,421 B2 | 5/2008 | Rhoads |
| 7,379,563 B2 | 5/2008 | Shamaie |
| 7,379,566 B2 | 5/2008 | Hildreth |
| 7,379,707 B2 | 5/2008 | DiFonzo et al. |

(56) References Cited

U.S. PATENT DOCUMENTS

| | | | |
|---|---|---|---|
| 7,383,263 B2 | 6/2008 | Goger | |
| 7,383,341 B1 | 6/2008 | Saito et al. | |
| 7,385,501 B2 | 6/2008 | Miller et al. | |
| 7,385,736 B2 | 6/2008 | Tseng et al. | |
| 7,386,127 B2 | 6/2008 | Bar-On | |
| 7,386,477 B2 | 6/2008 | Fano | |
| 7,389,591 B2 | 6/2008 | Jaiswal et al. | |
| 7,392,212 B2 | 6/2008 | Hancock et al. | |
| 7,392,287 B2 | 6/2008 | Ratcliff, III | |
| 7,392,475 B1 | 6/2008 | Leban et al. | |
| 7,395,507 B2 | 7/2008 | Robarts et al. | |
| 7,401,140 B2 | 7/2008 | Goulden et al. | |
| 7,403,693 B2 | 7/2008 | Shteyn | |
| 7,403,769 B2 | 7/2008 | Kopra et al. | |
| 7,404,084 B2 | 7/2008 | Fransdonk | |
| 7,404,520 B2 | 7/2008 | Vesuna | |
| 7,409,434 B2 | 8/2008 | Lamming et al. | |
| 7,409,707 B2 | 8/2008 | Swander et al. | |
| 7,411,982 B2 | 8/2008 | Smith | |
| 7,412,077 B2 | 8/2008 | Li et al. | |
| 7,412,158 B2 | 8/2008 | Kakkori | |
| 7,415,181 B2 | 8/2008 | Greenwood et al. | |
| 7,415,670 B2 | 8/2008 | Hull et al. | |
| 7,418,346 B2 | 8/2008 | Breed et al. | |
| 7,418,476 B2 | 8/2008 | Salesky et al. | |
| 7,421,093 B2 | 9/2008 | Hildreth et al. | |
| 7,421,155 B2 | 9/2008 | King et al. | |
| 7,421,454 B2 | 9/2008 | DeShan et al. | |
| 7,424,543 B2 | 9/2008 | Rice, III | |
| 7,424,618 B2 | 9/2008 | Roy et al. | |
| 7,426,438 B1 | 9/2008 | Robertsson | |
| 7,426,486 B2 | 9/2008 | Treibach-Heck et al. | |
| 7,430,312 B2 | 9/2008 | Gu | |
| 7,433,068 B2 | 10/2008 | Stevens et al. | |
| 7,433,885 B2 | 10/2008 | Jones | |
| 7,433,893 B2 | 10/2008 | Lowry | |
| 7,436,496 B2 | 10/2008 | Kawahito | |
| 7,437,023 B2 | 10/2008 | King et al. | |
| 7,437,312 B2 | 10/2008 | Bhatia et al. | |
| 7,437,351 B2 | 10/2008 | Page | |
| 7,437,368 B1 | 10/2008 | Kolluri et al. | |
| 7,437,475 B2 | 10/2008 | Philyaw | |
| 7,437,751 B2 | 10/2008 | Daniels | |
| 7,450,736 B2 | 11/2008 | Yang et al. | |
| 7,450,955 B2 | 11/2008 | Himmelstein | |
| 7,451,005 B2 | 11/2008 | Hoffberg et al. | |
| 7,451,102 B2 | 11/2008 | Nowak | |
| 7,452,275 B2 | 11/2008 | Kuraishi | |
| 7,457,862 B2 | 11/2008 | Hepworth et al. | |
| 7,460,690 B2 | 12/2008 | Cohen et al. | |
| 7,461,168 B1 | 12/2008 | Wan | |
| 7,463,896 B2 | 12/2008 | Himmelstein | |
| 7,466,823 B2 | 12/2008 | Vestergaard et al. | |
| 7,471,236 B1 | 12/2008 | Pitt et al. | |
| 7,477,780 B2 | 1/2009 | Boncyk et al. | |
| 7,477,783 B2 | 1/2009 | Nakayama | |
| 7,477,909 B2 | 1/2009 | Roth | |
| 7,478,323 B2 | 1/2009 | Dowdy | |
| 7,480,929 B2 | 1/2009 | Klosterman et al. | |
| 7,484,008 B1 | 1/2009 | Gelvin et al. | |
| 7,484,237 B2 | 1/2009 | Joly et al. | |
| 7,487,107 B2 | 2/2009 | Blanchard et al. | |
| 7,487,112 B2 | 2/2009 | Barnes, Jr. | |
| 7,487,424 B2 | 2/2009 | Nam et al. | |
| 7,487,529 B1 | 2/2009 | Orlick | |
| 7,489,812 B2 | 2/2009 | Fox et al. | |
| 7,490,045 B1 | 2/2009 | Flores et al. | |
| 7,490,333 B2 | 2/2009 | Grimaud et al. | |
| 7,492,367 B2 | 2/2009 | Mahajan et al. | |
| 7,493,487 B2 | 2/2009 | Phillips et al. | |
| 7,493,572 B2 | 2/2009 | Card et al. | |
| 7,493,641 B2 | 2/2009 | Klosterman et al. | |
| 7,496,548 B1 | 2/2009 | Ershov | |
| 7,496,638 B2 | 2/2009 | Philyaw | |
| 7,496,757 B2 | 2/2009 | Abbott et al. | |
| 7,496,943 B1 | 2/2009 | Goldberg et al. | |
| RE40,653 E | 3/2009 | Fleming, III | |
| 7,499,630 B2 | 3/2009 | Koch et al. | |
| 7,504,983 B2 | 3/2009 | Chen et al. | |
| 7,505,772 B2 | 3/2009 | Himmelstein | |
| 7,505,785 B2 | 3/2009 | Callaghan et al. | |
| 7,505,956 B2 | 3/2009 | Ibbotson | |
| 7,505,959 B2 | 3/2009 | Kaiser et al. | |
| 7,506,020 B2 | 3/2009 | Ellis | |
| 7,506,250 B2 | 3/2009 | Hull et al. | |
| 7,506,265 B1 | 3/2009 | Traut et al. | |
| 7,508,810 B2 | 3/2009 | Moinzadeh et al. | |
| 7,509,134 B2 | 3/2009 | Fournier et al. | |
| 7,509,673 B2 | 3/2009 | Swander et al. | |
| 7,512,254 B2 | 3/2009 | Vollkommer et al. | |
| 7,518,605 B2 | 4/2009 | Lin et al. | |
| 7,519,397 B2 | 4/2009 | Fournier et al. | |
| 7,522,995 B2 | 4/2009 | Nortrup | |
| 7,523,067 B1 | 4/2009 | Nakajima | |
| 7,523,126 B2 | 4/2009 | Rivette et al. | |
| 7,525,450 B2 | 4/2009 | Miller et al. | |
| 7,529,811 B2 | 5/2009 | Thompson | |
| 7,533,040 B2 | 5/2009 | Perkowski | |
| 7,536,032 B2 | 5/2009 | Bell | |
| 7,536,189 B2 | 5/2009 | Himmelstein | |
| 7,536,547 B2 | 5/2009 | Van Den Tillaart | |
| 7,542,966 B2 | 6/2009 | Wolf et al. | |
| 7,546,254 B2 | 6/2009 | Bednarek | |
| 7,548,961 B1 | 6/2009 | Fernandez et al. | |
| 7,549,159 B2 | 6/2009 | Shay | |
| 7,552,075 B1 | 6/2009 | Walsh | |
| 7,552,381 B2 | 6/2009 | Barrus | |
| 7,555,142 B2 | 6/2009 | Hildreth et al. | |
| 7,560,701 B2 | 7/2009 | Oggier et al. | |
| 7,561,312 B1 | 7/2009 | Proudfoot et al. | |
| 7,562,122 B2 | 7/2009 | Oliver et al. | |
| 7,568,213 B2 | 7/2009 | Carhart et al. | |
| 7,569,269 B2 | 8/2009 | Takada et al. | |
| 7,570,805 B2 | 8/2009 | Gu | |
| 7,571,121 B2 | 8/2009 | Bezos et al. | |
| 7,574,020 B2 | 8/2009 | Shamaie | |
| 7,574,407 B2 | 8/2009 | Carro et al. | |
| 7,574,422 B2 | 8/2009 | Guan et al. | |
| 7,574,434 B2 | 8/2009 | Galuten | |
| 7,574,513 B2 | 8/2009 | Dunning et al. | |
| 7,576,679 B1 | 8/2009 | Orr et al. | |
| 7,576,727 B2 | 8/2009 | Bell | |
| 7,577,665 B2 | 8/2009 | Ramer et al. | |
| 7,577,722 B1 | 8/2009 | Khandekar et al. | |
| 7,577,828 B2 | 8/2009 | Sammer et al. | |
| 7,577,872 B2 | 8/2009 | DiBartolomeo et al. | |
| 7,580,932 B2 | 8/2009 | Plastina et al. | |
| 7,584,215 B2 | 9/2009 | Saari et al. | |
| 7,587,370 B2 | 9/2009 | Himmelstein | |
| 7,587,412 B2 | 9/2009 | Weyl et al. | |
| 7,590,262 B2 | 9/2009 | Fujimura et al. | |
| 7,591,597 B2 | 9/2009 | Pasqualini et al. | |
| 7,593,552 B2 | 9/2009 | Higaki et al. | |
| 7,593,605 B2 | 9/2009 | King et al. | |
| 7,594,000 B2 | 9/2009 | Himmelstein | |
| 7,594,185 B2 | 9/2009 | Anderson et al. | |
| 7,594,189 B1 | 9/2009 | Walker et al. | |
| 7,596,269 B2 | 9/2009 | King et al. | |
| 7,596,391 B2 | 9/2009 | Himmelstein | |
| 7,598,942 B2 | 10/2009 | Underkoffler et al. | |
| 7,599,580 B2 | 10/2009 | King et al. | |
| 7,599,715 B2 | 10/2009 | Himmelstein | |
| 7,599,844 B2 | 10/2009 | King et al. | |
| 7,599,855 B2 | 10/2009 | Sussman | |
| 7,606,741 B2 | 10/2009 | King et al. | |
| 7,607,147 B1 | 10/2009 | Lu et al. | |
| 7,607,509 B2 | 10/2009 | Schmiz et al. | |
| 7,613,634 B2 | 11/2009 | Siegel et al. | |
| 7,614,055 B2 | 11/2009 | Buskens et al. | |
| 7,616,840 B2 | 11/2009 | Erol et al. | |
| 7,619,623 B2 | 11/2009 | Hoppe et al. | |
| 7,620,202 B2 | 11/2009 | Fujimura et al. | |
| 7,624,104 B2 | 11/2009 | Berkhin et al. | |
| 7,624,146 B1 | 11/2009 | Brogne et al. | |

(56) References Cited

U.S. PATENT DOCUMENTS

| | | |
|---|---|---|
| 7,624,424 B2 | 11/2009 | Morita et al. |
| 7,629,899 B2 | 12/2009 | Breed |
| 7,630,986 B1 | 12/2009 | Herz et al. |
| 7,634,407 B2 | 12/2009 | Chelba et al. |
| 7,634,465 B2 | 12/2009 | Sareen et al. |
| 7,634,468 B2 | 12/2009 | Stephan |
| 7,640,268 B2 | 12/2009 | Gotoh et al. |
| 7,647,329 B1 | 1/2010 | Fischman et al. |
| 7,647,349 B2 | 1/2010 | Hubert et al. |
| 7,650,319 B2 | 1/2010 | Hoffberg et al. |
| 7,657,907 B2 | 2/2010 | Fennan et al. |
| 7,660,813 B2 | 2/2010 | Milic-Frayling et al. |
| 7,664,315 B2 | 2/2010 | Woodfill et al. |
| 7,664,734 B2 | 2/2010 | Lawrence et al. |
| 7,665,109 B2 | 2/2010 | Matthews, III et al. |
| 7,668,340 B2 | 2/2010 | Cohen et al. |
| 7,672,543 B2 | 3/2010 | Hull et al. |
| 7,672,931 B2 | 3/2010 | Hurst-Hiller et al. |
| 7,680,067 B2 | 3/2010 | Prasad et al. |
| 7,680,298 B2 | 3/2010 | Roberts et al. |
| 7,681,147 B2 | 3/2010 | Richardson-Bunbury et al. |
| 7,683,954 B2 | 3/2010 | Ichikawa et al. |
| 7,684,592 B2 | 3/2010 | Paul et al. |
| 7,689,712 B2 | 3/2010 | Lee et al. |
| 7,689,832 B2 | 3/2010 | Talmor et al. |
| 7,698,344 B2 | 4/2010 | Sareen et al. |
| 7,698,545 B1 | 4/2010 | Campbell et al. |
| 7,701,439 B2 | 4/2010 | Hillis et al. |
| 7,702,130 B2 | 4/2010 | Im et al. |
| 7,702,624 B2 | 4/2010 | King et al. |
| 7,704,135 B2 | 4/2010 | Harrison, Jr. |
| 7,706,611 B2 | 4/2010 | King et al. |
| 7,707,039 B2 | 4/2010 | King et al. |
| 7,710,391 B2 | 5/2010 | Bell et al. |
| 7,710,598 B2 | 5/2010 | Harrison, Jr. |
| 7,712,113 B2 | 5/2010 | Yoon et al. |
| 7,721,307 B2 | 5/2010 | Hendricks et al. |
| 7,725,492 B2 | 5/2010 | Sittig et al. |
| 7,729,530 B2 | 6/2010 | Antonov et al. |
| 7,729,901 B2 | 6/2010 | Richardson-Bunbury et al. |
| 7,730,190 B2 | 6/2010 | Coile et al. |
| 7,733,853 B2 | 6/2010 | Moinzadeh et al. |
| 7,742,953 B2 | 6/2010 | King et al. |
| 7,746,345 B2 | 6/2010 | Hunter |
| 7,747,281 B2 | 6/2010 | Preston et al. |
| 7,747,291 B2 | 6/2010 | Himmelstein |
| 7,757,254 B2 | 7/2010 | Shoff et al. |
| 7,760,182 B2 | 7/2010 | Ahmad et al. |
| 7,761,451 B2 | 7/2010 | Cunningham |
| 7,764,219 B2 | 7/2010 | Pitt et al. |
| 7,769,633 B2 | 8/2010 | Jokinen et al. |
| 7,769,740 B2 | 8/2010 | Martinez et al. |
| 7,769,745 B2 | 8/2010 | Naaman et al. |
| 7,779,002 B1 | 8/2010 | Gomes et al. |
| 7,783,304 B2 | 8/2010 | Himmelstein |
| 7,783,617 B2 | 8/2010 | Lu et al. |
| 7,783,622 B1 | 8/2010 | Vandermolen et al. |
| 7,788,248 B2 | 8/2010 | Forstall et al. |
| 7,792,040 B2 | 9/2010 | Nair et al. |
| 7,793,136 B2 | 9/2010 | Lutter |
| 7,793,326 B2 | 9/2010 | McCoskey et al. |
| 7,796,116 B2 | 9/2010 | Salsman et al. |
| 7,802,084 B2 | 9/2010 | Fitzgerald et al. |
| 7,802,724 B2 | 9/2010 | Nohr |
| 7,804,440 B1 | 9/2010 | Orr |
| 7,806,322 B2 | 10/2010 | Brundage et al. |
| 7,809,167 B2 | 10/2010 | Bell |
| 7,809,367 B2 | 10/2010 | Hellaker |
| 7,812,860 B2 | 10/2010 | King et al. |
| 7,818,178 B2 | 10/2010 | Overend et al. |
| 7,818,215 B2 | 10/2010 | King et al. |
| 7,822,871 B2 | 10/2010 | Stolorz et al. |
| 7,830,388 B1 | 11/2010 | Lu |
| 7,831,586 B2 | 11/2010 | Reitter et al. |
| 7,831,912 B2 | 11/2010 | King et al. |
| 7,834,846 B1 | 11/2010 | Bell |
| 7,844,907 B2 | 11/2010 | Watler et al. |
| 7,844,996 B2 | 11/2010 | Chen et al. |
| 7,847,685 B2 | 12/2010 | Miller et al. |
| 7,848,763 B2 | 12/2010 | Fournier et al. |
| 7,852,262 B2 | 12/2010 | Namineni et al. |
| 7,859,402 B2 | 12/2010 | Miller et al. |
| 7,865,308 B2 | 1/2011 | Athsani et al. |
| 7,870,199 B2 | 1/2011 | Galli et al. |
| 7,872,669 B2 | 1/2011 | Darrell et al. |
| 7,891,004 B1 | 2/2011 | Gelvin et al. |
| 7,894,670 B2 | 2/2011 | King et al. |
| RE42,256 E | 3/2011 | Edwards |
| 7,898,522 B2 | 3/2011 | Hildreth et al. |
| 7,904,187 B2 | 3/2011 | Hoffberg et al. |
| 7,904,569 B1 | 3/2011 | Gelvin et al. |
| 7,907,976 B2 | 3/2011 | Himmelstein |
| 7,912,645 B2 | 3/2011 | Breed et al. |
| 7,920,714 B2 | 4/2011 | O'Neil |
| 7,925,708 B2 | 4/2011 | Davis et al. |
| 7,941,433 B2 | 5/2011 | Benson |
| 7,949,191 B1 | 5/2011 | Ramkumar et al. |
| 7,965,222 B2 | 6/2011 | Pitt et al. |
| 7,966,078 B2 | 6/2011 | Hoffberg et al. |
| 7,971,157 B2 | 6/2011 | Markovic et al. |
| 7,983,835 B2 | 7/2011 | Lagassey |
| 7,987,003 B2 | 7/2011 | Hoffberg et al. |
| 7,990,556 B2 | 8/2011 | King et al. |
| 7,996,793 B2 | 8/2011 | Latta et al. |
| 7,999,721 B2 | 8/2011 | Orr |
| 8,005,713 B1 | 8/2011 | Sanz-Pastor et al. |
| 8,005,720 B2 | 8/2011 | King et al. |
| 8,006,263 B2 | 8/2011 | Ellis et al. |
| 8,018,467 B2 | 9/2011 | Solanki et al. |
| 8,019,648 B2 | 9/2011 | King et al. |
| 8,020,028 B1 | 9/2011 | Lutter |
| 8,024,766 B2 | 9/2011 | Addington |
| 8,031,060 B2 | 10/2011 | Hoffberg et al. |
| 8,032,477 B1 | 10/2011 | Hoffberg et al. |
| 8,035,612 B2 | 10/2011 | Bell et al. |
| 8,035,614 B2 | 10/2011 | Bell et al. |
| 8,035,624 B2 | 10/2011 | Bell et al. |
| 8,046,801 B2 | 10/2011 | Ellis et al. |
| 8,072,470 B2 | 12/2011 | Marks |
| 8,073,821 B2 | 12/2011 | Zahavi et al. |
| 8,073,921 B2 | 12/2011 | Thomas et al. |
| 8,074,076 B2 | 12/2011 | Courtois |
| 8,081,849 B2 | 12/2011 | King et al. |
| 8,082,258 B2 | 12/2011 | Kumar et al. |
| 8,117,445 B2 | 2/2012 | Werner et al. |
| 8,146,156 B2 | 3/2012 | King et al. |
| 8,165,916 B2 | 4/2012 | Hoffberg et al. |
| 8,169,436 B2 | 5/2012 | Rivera et al. |
| 8,173,634 B2 | 5/2012 | Liu et al. |
| 8,175,921 B1 | 5/2012 | Kopra |
| 8,191,088 B2 | 5/2012 | Edwards et al. |
| 8,214,387 B2 | 7/2012 | King et al. |
| 8,234,641 B2 | 7/2012 | Fitzgerald et al. |
| 8,267,783 B2 | 9/2012 | van Datta et al. |
| 8,272,964 B2 | 9/2012 | van Datta et al. |
| 8,302,030 B2 | 10/2012 | Soroca et al. |
| 8,332,406 B2 | 12/2012 | Donaldson |
| 8,347,357 B2 | 1/2013 | Chen et al. |
| 8,352,400 B2 | 1/2013 | Hoffberg et al. |
| 8,361,987 B2 | 1/2013 | Cohen et al. |
| 8,364,136 B2 | 1/2013 | Hoffberg et al. |
| 8,369,967 B2 | 2/2013 | Hoffberg et al. |
| 8,402,356 B2 | 3/2013 | Martinez et al. |
| 8,402,490 B2 | 3/2013 | Hoffberg-Borghesani et al. |
| 8,405,654 B2 | 3/2013 | Rivera et al. |
| 8,458,695 B2 | 6/2013 | Fitzgerald et al. |
| 8,473,836 B2 | 6/2013 | Flake et al. |
| 8,483,546 B2 | 7/2013 | Borghesani et al. |
| 8,505,090 B2 | 8/2013 | King et al. |
| 8,516,266 B2 | 8/2013 | Hoffberg et al. |
| RE44,566 E | 10/2013 | Goldberg et al. |
| 8,554,623 B2 | 10/2013 | Higgins et al. |
| 8,560,390 B2 | 10/2013 | Higgins et al. |
| 8,574,074 B2 | 11/2013 | van Datta et al. |

(56) References Cited

U.S. PATENT DOCUMENTS

| | | |
|---|---|---|
| 8,578,413 B2 | 11/2013 | Ellis et al. |
| 8,578,423 B2 | 11/2013 | Ellis et al. |
| 2001/0001854 A1 | 5/2001 | Schena et al. |
| 2001/0003099 A1 | 6/2001 | Von Kohorn |
| 2001/0003176 A1 | 6/2001 | Schena et al. |
| 2001/0003177 A1 | 6/2001 | Schena et al. |
| 2001/0003193 A1 | 6/2001 | Woodring et al. |
| 2001/0005804 A1 | 6/2001 | Rayner |
| 2001/0007086 A1 | 7/2001 | Rogers et al. |
| 2001/0009855 A1 | 7/2001 | l'Anson |
| 2001/0011226 A1 | 8/2001 | Greer et al. |
| 2001/0013009 A1 | 8/2001 | Greening et al. |
| 2001/0014915 A1 | 8/2001 | Blumenau |
| 2001/0018628 A1 | 8/2001 | Jenkins et al. |
| 2001/0025245 A1 | 9/2001 | Flickinger et al. |
| 2001/0025254 A1 | 9/2001 | Park |
| 2001/0025274 A1 | 9/2001 | Zehr et al. |
| 2001/0026533 A1 | 10/2001 | Schwager |
| 2001/0027412 A1 | 10/2001 | Son |
| 2001/0029610 A1 | 10/2001 | Corvin et al. |
| 2001/0032125 A1 | 10/2001 | Bhan et al. |
| 2001/0032132 A1 | 10/2001 | Moran |
| 2001/0032133 A1 | 10/2001 | Moran |
| 2001/0032137 A1 | 10/2001 | Bennett et al. |
| 2001/0032252 A1 | 10/2001 | Durst, Jr. et al. |
| 2001/0032333 A1 | 10/2001 | Flickinger |
| 2001/0034237 A1 | 10/2001 | Garahi |
| 2001/0034643 A1 | 10/2001 | Acres |
| 2001/0034762 A1 | 10/2001 | Jacobs et al. |
| 2001/0035880 A1 | 11/2001 | Musatov et al. |
| 2001/0037232 A1 | 11/2001 | Miller |
| 2001/0039210 A1 | 11/2001 | ST-Denis |
| 2001/0042001 A1 | 11/2001 | Goto et al. |
| 2001/0042002 A1 | 11/2001 | Koopersmith |
| 2001/0044309 A1 | 11/2001 | Bar et al. |
| 2001/0044809 A1 | 11/2001 | Parasnis et al. |
| 2001/0045104 A1 | 11/2001 | Bailey, Sr. et al. |
| 2001/0047297 A1 | 11/2001 | Wen |
| 2001/0047298 A1 | 11/2001 | Moore et al. |
| 2001/0047384 A1 | 11/2001 | Croy |
| 2001/0049620 A1 | 12/2001 | Blasko |
| 2001/0049636 A1 | 12/2001 | Hudda et al. |
| 2001/0052058 A1 | 12/2001 | Ohran |
| 2001/0052123 A1 | 12/2001 | Kawai |
| 2001/0052847 A1 | 12/2001 | Auerbach |
| 2001/0053252 A1 | 12/2001 | Creque |
| 2001/0054181 A1 | 12/2001 | Corvin |
| 2001/0055411 A1 | 12/2001 | Black |
| 2001/0056434 A1 | 12/2001 | Kaplan et al. |
| 2001/0056463 A1 | 12/2001 | Grady et al. |
| 2001/0056540 A1 | 12/2001 | Ober et al. |
| 2001/0056544 A1 | 12/2001 | Walker |
| 2002/0001317 A1 | 1/2002 | Herring |
| 2002/0002504 A1 | 1/2002 | Engel et al. |
| 2002/0002899 A1 | 1/2002 | Gjerdingen et al. |
| 2002/0004743 A1 | 1/2002 | Kutaragi et al. |
| 2002/0004744 A1 | 1/2002 | Muyres et al. |
| 2002/0007307 A1 | 1/2002 | Miller et al. |
| 2002/0007310 A1 | 1/2002 | Long |
| 2002/0008619 A1 | 1/2002 | Lerg et al. |
| 2002/0008637 A1 | 1/2002 | Lemelson et al. |
| 2002/0010626 A1 | 1/2002 | Agmoni |
| 2002/0010628 A1 | 1/2002 | Burns |
| 2002/0010757 A1 | 1/2002 | Granik et al. |
| 2002/0012065 A1 | 1/2002 | Watanabe |
| 2002/0012329 A1 | 1/2002 | Atkinson et al. |
| 2002/0013174 A1 | 1/2002 | Murata |
| 2002/0013781 A1 | 1/2002 | Petersen |
| 2002/0013941 A1 | 1/2002 | Ward, III et al. |
| 2002/0014742 A1 | 2/2002 | Conte et al. |
| 2002/0014976 A1 | 2/2002 | Yoshida |
| 2002/0016171 A1 | 2/2002 | Doganata et al. |
| 2002/0016750 A1 | 2/2002 | Attia |
| 2002/0018076 A1 | 2/2002 | Gianola |
| 2002/0018982 A1 | 2/2002 | Conroy |
| 2002/0019774 A1 | 2/2002 | Kanter |
| 2002/0019849 A1 | 2/2002 | Tuvey et al. |
| 2002/0019857 A1 | 2/2002 | Harjanto |
| 2002/0022476 A1 | 2/2002 | Go |
| 2002/0022516 A1 | 2/2002 | Forden |
| 2002/0022924 A1 | 2/2002 | Begin |
| 2002/0022927 A1 | 2/2002 | Lemelson et al. |
| 2002/0022993 A1 | 2/2002 | Miller et al. |
| 2002/0023000 A1 | 2/2002 | Bollay |
| 2002/0023091 A1 | 2/2002 | Silberberg et al. |
| 2002/0023215 A1 | 2/2002 | Wang et al. |
| 2002/0023230 A1 | 2/2002 | Bolnick et al. |
| 2002/0023957 A1 | 2/2002 | Michaelis et al. |
| 2002/0023959 A1 | 2/2002 | Miller et al. |
| 2002/0026345 A1 | 2/2002 | Juels |
| 2002/0026355 A1 | 2/2002 | Mitsuoka et al. |
| 2002/0026496 A1 | 2/2002 | Boyer et al. |
| 2002/0026638 A1 | 2/2002 | Eldering et al. |
| 2002/0029350 A1 | 3/2002 | Cooper et al. |
| 2002/0032608 A1 | 3/2002 | Kanter |
| 2002/0032626 A1 | 3/2002 | DeWolf et al. |
| 2002/0032906 A1 | 3/2002 | Grossman |
| 2002/0032907 A1 | 3/2002 | Daniels |
| 2002/0033844 A1 | 3/2002 | Levy et al. |
| 2002/0034757 A1 | 3/2002 | Cubicciotti |
| 2002/0035596 A1 | 3/2002 | Yang et al. |
| 2002/0035605 A1 | 3/2002 | McDowell et al. |
| 2002/0036750 A1 | 3/2002 | Eberl et al. |
| 2002/0037735 A1 | 3/2002 | Maggenti et al. |
| 2002/0038182 A1 | 3/2002 | Wong et al. |
| 2002/0038456 A1 | 3/2002 | Hansen et al. |
| 2002/0040475 A1 | 4/2002 | Yap et al. |
| 2002/0042914 A1 | 4/2002 | Walker et al. |
| 2002/0044042 A1* | 4/2002 | Christensen et al. ........ 340/3.54 |
| 2002/0044687 A1 | 4/2002 | Federman |
| 2002/0046084 A1 | 4/2002 | Steele et al. |
| 2002/0046087 A1 | 4/2002 | Hey |
| 2002/0046095 A1 | 4/2002 | Wallace |
| 2002/0046102 A1 | 4/2002 | Dohring et al. |
| 2002/0046262 A1 | 4/2002 | Heilig et al. |
| 2002/0049389 A1 | 4/2002 | Abreu |
| 2002/0049527 A1 | 4/2002 | Kohno et al. |
| 2002/0049781 A1 | 4/2002 | Bengtson |
| 2002/0049788 A1 | 4/2002 | Lipkin et al. |
| 2002/0049968 A1 | 4/2002 | Wilson et al. |
| 2002/0051262 A1 | 5/2002 | Nuttall et al. |
| 2002/0051521 A1 | 5/2002 | Patrick |
| 2002/0052214 A1 | 5/2002 | Maggenti et al. |
| 2002/0052747 A1 | 5/2002 | Sarukkai |
| 2002/0052785 A1 | 5/2002 | Tenenbaum |
| 2002/0052786 A1 | 5/2002 | Kim et al. |
| 2002/0052875 A1 | 5/2002 | Smith et al. |
| 2002/0054059 A1 | 5/2002 | Schneiderman |
| 2002/0054089 A1 | 5/2002 | Nicholas et al. |
| 2002/0055833 A1 | 5/2002 | Sterling |
| 2002/0055876 A1 | 5/2002 | Gabler |
| 2002/0055906 A1 | 5/2002 | Katz et al. |
| 2002/0055919 A1 | 5/2002 | Mikheev |
| 2002/0056107 A1 | 5/2002 | Schlack |
| 2002/0057892 A1 | 5/2002 | Mano et al. |
| 2002/0059094 A1 | 5/2002 | Hosea et al. |
| 2002/0059577 A1 | 5/2002 | Lu et al. |
| 2002/0059590 A1 | 5/2002 | Kitsukawa et al. |
| 2002/0059599 A1 | 5/2002 | Schein et al. |
| 2002/0059610 A1 | 5/2002 | Ellis |
| 2002/0061760 A1 | 5/2002 | Maggenti et al. |
| 2002/0061778 A1 | 5/2002 | Acres |
| 2002/0065844 A1 | 5/2002 | Robinson et al. |
| 2002/0067308 A1 | 6/2002 | Robertson |
| 2002/0067475 A1 | 6/2002 | Waibel et al. |
| 2002/0067730 A1 | 6/2002 | Hinderks et al. |
| 2002/0069218 A1 | 6/2002 | Sull et al. |
| 2002/0069240 A1 | 6/2002 | Berk |
| 2002/0069405 A1 | 6/2002 | Chapin et al. |
| 2002/0069529 A1 | 6/2002 | Wieres |
| 2002/0070852 A1 | 6/2002 | Trauner et al. |
| 2002/0072965 A1 | 6/2002 | Merriman et al. |
| 2002/0072966 A1 | 6/2002 | Eldering et al. |
| 2002/0073000 A1 | 6/2002 | Sage |

(56) References Cited

U.S. PATENT DOCUMENTS

| | | |
|---|---|---|
| 2002/0073235 A1 | 6/2002 | Chen et al. |
| 2002/0073236 A1 | 6/2002 | Helgeson et al. |
| 2002/0073424 A1 | 6/2002 | Ward, III et al. |
| 2002/0077906 A1 | 6/2002 | Remler |
| 2002/0078441 A1 | 6/2002 | Drake et al. |
| 2002/0082048 A1 | 6/2002 | Toyoshima |
| 2002/0082077 A1 | 6/2002 | Johnson et al. |
| 2002/0082901 A1 | 6/2002 | Dunning et al. |
| 2002/0082910 A1 | 6/2002 | Kontogouris |
| 2002/0082913 A1 | 6/2002 | Li |
| 2002/0082941 A1 | 6/2002 | Bird |
| 2002/0083435 A1 | 6/2002 | Blasko et al. |
| 2002/0083439 A1 | 6/2002 | Eldering |
| 2002/0083441 A1 | 6/2002 | Flickinger et al. |
| 2002/0083442 A1 | 6/2002 | Eldering |
| 2002/0083443 A1 | 6/2002 | Eldering et al. |
| 2002/0083444 A1 | 6/2002 | Blasko et al. |
| 2002/0083445 A1 | 6/2002 | Flickinger et al. |
| 2002/0083451 A1 | 6/2002 | Gill et al. |
| 2002/0087401 A1 | 7/2002 | Leapman et al. |
| 2002/0087402 A1 | 7/2002 | Zustak et al. |
| 2002/0087403 A1 | 7/2002 | Meyers et al. |
| 2002/0087887 A1 | 7/2002 | Busam et al. |
| 2002/0087973 A1 | 7/2002 | Hamilton et al. |
| 2002/0087975 A1 | 7/2002 | Schlack |
| 2002/0087980 A1 | 7/2002 | Eldering et al. |
| 2002/0090203 A1 | 7/2002 | Mankovitz |
| 2002/0091569 A1 | 7/2002 | Kitaura et al. |
| 2002/0091928 A1 | 7/2002 | Bouchard et al. |
| 2002/0094868 A1 | 7/2002 | Tuck et al. |
| 2002/0095411 A1 | 7/2002 | Caldwell et al. |
| 2002/0095501 A1 | 7/2002 | Chiloyan et al. |
| 2002/0095673 A1 | 7/2002 | Leung et al. |
| 2002/0095676 A1 | 7/2002 | Knee et al. |
| 2002/0098891 A1 | 7/2002 | Graham et al. |
| 2002/0099600 A1 | 7/2002 | Merriman et al. |
| 2002/0099611 A1 | 7/2002 | De Souza et al. |
| 2002/0099653 A1 | 7/2002 | De Souza et al. |
| 2002/0099695 A1 | 7/2002 | Abajian et al. |
| 2002/0099738 A1 | 7/2002 | Grant |
| 2002/0099812 A1 | 7/2002 | Davis et al. |
| 2002/0099952 A1 | 7/2002 | Lambert et al. |
| 2002/0100040 A1 | 7/2002 | Bull |
| 2002/0100044 A1 | 7/2002 | Daniels |
| 2002/0100052 A1 | 7/2002 | Daniels |
| 2002/0102966 A1 | 8/2002 | Lev et al. |
| 2002/0102999 A1 | 8/2002 | Maggenti et al. |
| 2002/0103870 A1 | 8/2002 | Shouji |
| 2002/0105423 A1 | 8/2002 | Rast |
| 2002/0107073 A1 | 8/2002 | Binney |
| 2002/0107075 A1 | 8/2002 | Stephan |
| 2002/0107730 A1 | 8/2002 | Bernstein |
| 2002/0109680 A1 | 8/2002 | Orbanes et al. |
| 2002/0111154 A1 | 8/2002 | Eldering et al. |
| 2002/0111172 A1 | 8/2002 | DeWolf et al. |
| 2002/0111213 A1 | 8/2002 | McEntee et al. |
| 2002/0111825 A1 | 8/2002 | Martin et al. |
| 2002/0111865 A1 | 8/2002 | Middleton, III et al. |
| 2002/0111956 A1 | 8/2002 | Yeo et al. |
| 2002/0111960 A1 | 8/2002 | Irons et al. |
| 2002/0112035 A1 | 8/2002 | Carey et al. |
| 2002/0112047 A1 | 8/2002 | Kushwaha et al. |
| 2002/0112233 A1 | 8/2002 | Cantu Bonilla et al. |
| 2002/0112240 A1 | 8/2002 | Bacso et al. |
| 2002/0112249 A1 | 8/2002 | Hendricks et al. |
| 2002/0112250 A1 | 8/2002 | Koplar et al. |
| 2002/0113815 A1 | 8/2002 | DeGross |
| 2002/0114004 A1 | 8/2002 | Ferlitsch |
| 2002/0114466 A1 | 8/2002 | Tanaka et al. |
| 2002/0116284 A1 | 8/2002 | Steelman et al. |
| 2002/0116582 A1 | 8/2002 | Copeland et al. |
| 2002/0118676 A1 | 8/2002 | Tonnby et al. |
| 2002/0118880 A1 | 8/2002 | Liu et al. |
| 2002/0120589 A1 | 8/2002 | Aoki |
| 2002/0121969 A1 | 9/2002 | Joao |
| 2002/0122040 A1 | 9/2002 | Noyle |
| 2002/0122052 A1 | 9/2002 | Reich et al. |
| 2002/0123928 A1 | 9/2002 | Eldering et al. |
| 2002/0124255 A1 | 9/2002 | Reichardt et al. |
| 2002/0125411 A1 | 9/2002 | Christy |
| 2002/0129368 A1 | 9/2002 | Schlack et al. |
| 2002/0133398 A1 | 9/2002 | Geller et al. |
| 2002/0133400 A1 | 9/2002 | Terry et al. |
| 2002/0135504 A1 | 9/2002 | Singer |
| 2002/0135815 A1 | 9/2002 | Finn |
| 2002/0136407 A1 | 9/2002 | Denning et al. |
| 2002/0138331 A1 | 9/2002 | Hosea et al. |
| 2002/0138493 A1 | 9/2002 | Shapiro et al. |
| 2002/0138840 A1 | 9/2002 | Schein et al. |
| 2002/0143639 A1 | 10/2002 | Beckett et al. |
| 2002/0143652 A1 | 10/2002 | Beckett |
| 2002/0143901 A1 | 10/2002 | Lupo et al. |
| 2002/0144010 A1 | 10/2002 | Younis et al. |
| 2002/0144262 A1 | 10/2002 | Plotnick et al. |
| 2002/0144263 A1 | 10/2002 | Eldering et al. |
| 2002/0147633 A1 | 10/2002 | Rafizadeh |
| 2002/0147638 A1 | 10/2002 | Banerjee et al. |
| 2002/0147645 A1 | 10/2002 | Alao et al. |
| 2002/0147766 A1 | 10/2002 | Vanska et al. |
| 2002/0147982 A1 | 10/2002 | Naidoo et al. |
| 2002/0151992 A1 | 10/2002 | Hoffberg et al. |
| 2002/0152117 A1 | 10/2002 | Cristofalo et al. |
| 2002/0152267 A1 | 10/2002 | Lennon |
| 2002/0154631 A1 | 10/2002 | Makansi et al. |
| 2002/0154817 A1 | 10/2002 | Katsuyama et al. |
| 2002/0155878 A1 | 10/2002 | Lert, Jr. et al. |
| 2002/0155891 A1 | 10/2002 | Okada et al. |
| 2002/0157002 A1 | 10/2002 | Messerges et al. |
| 2002/0161625 A1 | 10/2002 | Brito-Valladares et al. |
| 2002/0161639 A1 | 10/2002 | Goldstein |
| 2002/0163579 A1 | 11/2002 | Patel et al. |
| 2002/0164977 A1 | 11/2002 | Link, II et al. |
| 2002/0164999 A1 | 11/2002 | Johnson |
| 2002/0165026 A1 | 11/2002 | Perkins et al. |
| 2002/0165764 A1 | 11/2002 | Wade et al. |
| 2002/0169840 A1 | 11/2002 | Sheldon et al. |
| 2002/0170685 A1 | 11/2002 | Weik, III et al. |
| 2002/0173317 A1 | 11/2002 | Nykanen et al. |
| 2002/0173349 A1 | 11/2002 | Ach, III |
| 2002/0173359 A1 | 11/2002 | Gallo et al. |
| 2002/0173907 A1 | 11/2002 | Ando |
| 2002/0173971 A1 | 11/2002 | Stirpe et al. |
| 2002/0174073 A1 | 11/2002 | Nordman et al. |
| 2002/0174185 A1 | 11/2002 | Rawat et al. |
| 2002/0174424 A1 | 11/2002 | Chang et al. |
| 2002/0175936 A1 | 11/2002 | Tenembaum |
| 2002/0178153 A1 | 11/2002 | Nishioka et al. |
| 2002/0178161 A1 | 11/2002 | Brezin et al. |
| 2002/0178211 A1 | 11/2002 | Singhal et al. |
| 2002/0178223 A1 | 11/2002 | Bushkin |
| 2002/0178442 A1 | 11/2002 | Williams |
| 2002/0178445 A1 | 11/2002 | Eldering et al. |
| 2002/0178447 A1 | 11/2002 | Plotnick et al. |
| 2002/0181501 A1 | 12/2002 | Nova et al. |
| 2002/0184047 A1 | 12/2002 | Plotnick et al. |
| 2002/0184086 A1 | 12/2002 | Linde |
| 2002/0184088 A1 | 12/2002 | Rosenberg |
| 2002/0184130 A1 | 12/2002 | Blasko |
| 2002/0184224 A1 | 12/2002 | Haff et al. |
| 2002/0184626 A1 | 12/2002 | Darbee et al. |
| 2002/0184642 A1 | 12/2002 | Lude et al. |
| 2002/0185590 A1 | 12/2002 | Yahav et al. |
| 2002/0191847 A1 | 12/2002 | Newman et al. |
| 2002/0193066 A1 | 12/2002 | Connelly |
| 2002/0193938 A1 | 12/2002 | DeKock et al. |
| 2002/0194058 A1 | 12/2002 | Eldering |
| 2002/0194143 A1 | 12/2002 | Banerjee et al. |
| 2002/0194215 A1 | 12/2002 | Cantrell et al. |
| 2002/0194585 A1 | 12/2002 | Connelly |
| 2002/0194590 A1 | 12/2002 | Pong |
| 2002/0194596 A1 | 12/2002 | Srivastava |
| 2002/0194598 A1 | 12/2002 | Connelly |
| 2002/0194607 A1 | 12/2002 | Connelly |
| 2002/0196254 A1 | 12/2002 | Suzuki et al. |

(56) References Cited

U.S. PATENT DOCUMENTS

| | | |
|---|---|---|
| 2002/0198632 A1 | 12/2002 | Breed et al. |
| 2002/0198633 A1 | 12/2002 | Weimper |
| 2002/0198786 A1 | 12/2002 | Tripp et al. |
| 2002/0199198 A1 | 12/2002 | Stonedahl |
| 2003/0001018 A1 | 1/2003 | Hussey et al. |
| 2003/0001816 A1 | 1/2003 | Badarneh |
| 2003/0001849 A1 | 1/2003 | Devins et al. |
| 2003/0001854 A1 | 1/2003 | Jade et al. |
| 2003/0004724 A1 | 1/2003 | Kahn et al. |
| 2003/0004810 A1 | 1/2003 | Eldering |
| 2003/0004991 A1 | 1/2003 | Keskar et al. |
| 2003/0005445 A1 | 1/2003 | Schein et al. |
| 2003/0008661 A1 | 1/2003 | Joyce et al. |
| 2003/0009367 A1 | 1/2003 | Morrison |
| 2003/0009495 A1 | 1/2003 | Adjaoute |
| 2003/0009602 A1 | 1/2003 | Jacobs et al. |
| 2003/0009752 A1 | 1/2003 | Gupta |
| 2003/0009762 A1 | 1/2003 | Hooper et al. |
| 2003/0011684 A1 | 1/2003 | Narayanaswami et al. |
| 2003/0012555 A1 | 1/2003 | Yuen et al. |
| 2003/0014307 A1 | 1/2003 | Heng |
| 2003/0014312 A1 | 1/2003 | Fleisher |
| 2003/0014414 A1 | 1/2003 | Newman |
| 2003/0014659 A1 | 1/2003 | Zhu |
| 2003/0014754 A1 | 1/2003 | Chang |
| 2003/0016005 A1 | 1/2003 | Leibowitz et al. |
| 2003/0018430 A1 | 1/2003 | Ladetto et al. |
| 2003/0018527 A1 | 1/2003 | Filepp et al. |
| 2003/0018797 A1 | 1/2003 | Dunning et al. |
| 2003/0019939 A1 | 1/2003 | Sellen |
| 2003/0022953 A1 | 1/2003 | Zampini et al. |
| 2003/0027558 A1 | 2/2003 | Eisinger |
| 2003/0028433 A1 | 2/2003 | Merriman et al. |
| 2003/0031465 A1 | 2/2003 | Blake |
| 2003/0032409 A1 | 2/2003 | Hutcheson et al. |
| 2003/0032476 A1 | 2/2003 | Walker et al. |
| 2003/0033321 A1 | 2/2003 | Schrempp et al. |
| 2003/0033331 A1 | 2/2003 | Sena et al. |
| 2003/0033394 A1 | 2/2003 | Stine |
| 2003/0033405 A1 | 2/2003 | Perdon et al. |
| 2003/0034462 A1 | 2/2003 | Remillard et al. |
| 2003/0035075 A1 | 2/2003 | Butler et al. |
| 2003/0036881 A1 | 2/2003 | Remillard et al. |
| 2003/0036944 A1 | 2/2003 | Lesandrini et al. |
| 2003/0037163 A1 | 2/2003 | Kitada et al. |
| 2003/0037181 A1 | 2/2003 | Freed |
| 2003/0037336 A1 | 2/2003 | Leftwich |
| 2003/0039411 A1 | 2/2003 | Nada |
| 2003/0040957 A1 | 2/2003 | Rodriguez et al. |
| 2003/0040962 A1 | 2/2003 | Lewis |
| 2003/0041267 A1 | 2/2003 | Fee et al. |
| 2003/0041329 A1 | 2/2003 | Bassett |
| 2003/0043042 A1 | 3/2003 | Moores, Jr. et al. |
| 2003/0045998 A1 | 3/2003 | Medl |
| 2003/0046148 A1 | 3/2003 | Rizzi et al. |
| 2003/0048293 A1 | 3/2003 | Werkhoven |
| 2003/0053536 A1 | 3/2003 | Ebrami |
| 2003/0054888 A1 | 3/2003 | Walker et al. |
| 2003/0055689 A1 | 3/2003 | Block et al. |
| 2003/0055722 A1 | 3/2003 | Perreault et al. |
| 2003/0055883 A1 | 3/2003 | Wiles, Jr. |
| 2003/0055896 A1 | 3/2003 | Hu et al. |
| 2003/0056219 A1 | 3/2003 | Reichardt et al. |
| 2003/0059208 A1 | 3/2003 | Ando et al. |
| 2003/0060188 A1 | 3/2003 | Gidron et al. |
| 2003/0060247 A1 | 3/2003 | Goldberg et al. |
| 2003/0060956 A1 | 3/2003 | Rao et al. |
| 2003/0060980 A1 | 3/2003 | Prakah-Asante et al. |
| 2003/0062997 A1 | 4/2003 | Naidoo et al. |
| 2003/0065762 A1 | 4/2003 | Stolorz et al. |
| 2003/0065788 A1 | 4/2003 | Salomaki |
| 2003/0065982 A1 | 4/2003 | Grimaud et al. |
| 2003/0066092 A1 | 4/2003 | Wagner et al. |
| 2003/0067542 A1 | 4/2003 | Monroe |
| 2003/0069877 A1 | 4/2003 | Grefenstette et al. |
| 2003/0069880 A1 | 4/2003 | Harrison et al. |
| 2003/0070087 A1 | 4/2003 | Gryaznov |
| 2003/0070091 A1 | 4/2003 | Loveland |
| 2003/0070167 A1 | 4/2003 | Holtz et al. |
| 2003/0073496 A1 | 4/2003 | D'Amico et al. |
| 2003/0074252 A1 | 4/2003 | Chandler-Pepelnjak et al. |
| 2003/0076347 A1 | 4/2003 | Barrett et al. |
| 2003/0076367 A1 | 4/2003 | Bencze et al. |
| 2003/0078064 A1 | 4/2003 | Chan |
| 2003/0078978 A1 | 4/2003 | Lardin et al. |
| 2003/0079224 A1 | 4/2003 | Komar et al. |
| 2003/0079226 A1 | 4/2003 | Barrett |
| 2003/0079227 A1 | 4/2003 | Knowles et al. |
| 2003/0080878 A1 | 5/2003 | Kirmuss |
| 2003/0080992 A1 | 5/2003 | Haines |
| 2003/0081121 A1 | 5/2003 | Kirmuss |
| 2003/0081122 A1 | 5/2003 | Kirmuss |
| 2003/0081127 A1 | 5/2003 | Kirmuss |
| 2003/0081128 A1 | 5/2003 | Kirmuss |
| 2003/0081557 A1 | 5/2003 | Mettala et al. |
| 2003/0081784 A1 | 5/2003 | Kallahalla et al. |
| 2003/0081934 A1 | 5/2003 | Kirmuss |
| 2003/0081935 A1 | 5/2003 | Kirmuss |
| 2003/0084449 A1 | 5/2003 | Chane et al. |
| 2003/0084456 A1 | 5/2003 | Ryan et al. |
| 2003/0084461 A1 | 5/2003 | Hoang |
| 2003/0088786 A1 | 5/2003 | Moran et al. |
| 2003/0093187 A1 | 5/2003 | Walker |
| 2003/0093311 A1 | 5/2003 | Knowlson |
| 2003/0093329 A1 | 5/2003 | Gutta |
| 2003/0093384 A1 | 5/2003 | Durst, Jr. et al. |
| 2003/0093400 A1 | 5/2003 | Santosuosso |
| 2003/0093545 A1 | 5/2003 | Liu et al. |
| 2003/0093792 A1 | 5/2003 | Labeeb et al. |
| 2003/0097227 A1 | 5/2003 | Bloch et al. |
| 2003/0098352 A1 | 5/2003 | Schnee et al. |
| 2003/0098800 A1 | 5/2003 | Jambhekar et al. |
| 2003/0099375 A1 | 5/2003 | Sefcik |
| 2003/0100375 A1 | 5/2003 | Wakae et al. |
| 2003/0100965 A1 | 5/2003 | Sitrick et al. |
| 2003/0100982 A1 | 5/2003 | Rao et al. |
| 2003/0101292 A1 | 5/2003 | Fisher et al. |
| 2003/0101329 A1 | 5/2003 | Lahti et al. |
| 2003/0101341 A1 | 5/2003 | Kettler, III et al. |
| 2003/0101449 A1 | 5/2003 | Bentolila et al. |
| 2003/0101451 A1 | 5/2003 | Bentolila et al. |
| 2003/0101454 A1 | 5/2003 | Ozer et al. |
| 2003/0103484 A1 | 6/2003 | Oommen et al. |
| 2003/0103644 A1 | 6/2003 | Klayh |
| 2003/0104867 A1 | 6/2003 | Kobayashi et al. |
| 2003/0107578 A1 | 6/2003 | Willis et al. |
| 2003/0110171 A1 | 6/2003 | Ozer et al. |
| 2003/0110495 A1 | 6/2003 | Bennington et al. |
| 2003/0110499 A1 | 6/2003 | Knudson et al. |
| 2003/0114157 A1 | 6/2003 | Spitz et al. |
| 2003/0115074 A1 | 6/2003 | Freeman et al. |
| 2003/0115318 A1 | 6/2003 | Wueste |
| 2003/0115417 A1 | 6/2003 | Corrigan |
| 2003/0115587 A1 | 6/2003 | Kendall et al. |
| 2003/0115599 A1 | 6/2003 | Bennington et al. |
| 2003/0115602 A1 | 6/2003 | Knee et al. |
| 2003/0119528 A1 | 6/2003 | Pew et al. |
| 2003/0120630 A1 | 6/2003 | Tunkelang |
| 2003/0125853 A1 | 7/2003 | Takagi et al. |
| 2003/0126150 A1 | 7/2003 | Chan |
| 2003/0126250 A1 | 7/2003 | Jhanji |
| 2003/0131356 A1 | 7/2003 | Proehl et al. |
| 2003/0135513 A1 | 7/2003 | Quinn et al. |
| 2003/0139966 A1 | 7/2003 | Sirota et al. |
| 2003/0144044 A1 | 7/2003 | Pisarsky |
| 2003/0144048 A1 | 7/2003 | Silva |
| 2003/0144865 A1 | 7/2003 | Lin et al. |
| 2003/0149528 A1 | 8/2003 | Lin |
| 2003/0149574 A1 | 8/2003 | Rudman |
| 2003/0149618 A1 | 8/2003 | Sender et al. |
| 2003/0149623 A1 | 8/2003 | Chen |
| 2003/0149678 A1 | 8/2003 | Cook |
| 2003/0149975 A1 | 8/2003 | Eldering et al. |
| 2003/0151507 A1 | 8/2003 | Andre et al. |

(56) References Cited

U.S. PATENT DOCUMENTS

| | | |
|---|---|---|
| 2003/0153340 A1 | 8/2003 | Crockett et al. |
| 2003/0153341 A1 | 8/2003 | Crockett et al. |
| 2003/0153342 A1 | 8/2003 | Crockett et al. |
| 2003/0153343 A1 | 8/2003 | Crockett et al. |
| 2003/0154010 A1 | 8/2003 | Rao et al. |
| 2003/0154011 A1 | 8/2003 | Rao et al. |
| 2003/0154293 A1 | 8/2003 | Zmolek |
| 2003/0155513 A1 | 8/2003 | Remillard et al. |
| 2003/0158872 A1 | 8/2003 | Adams |
| 2003/0159157 A1 | 8/2003 | Chan |
| 2003/0160975 A1 | 8/2003 | Skurdal et al. |
| 2003/0161298 A1 | 8/2003 | Bergman et al. |
| 2003/0163369 A1 | 8/2003 | Arr |
| 2003/0163482 A1 | 8/2003 | Bunney et al. |
| 2003/0163524 A1 | 8/2003 | Gotoh et al. |
| 2003/0163813 A1 | 8/2003 | Klosterman et al. |
| 2003/0164858 A1 | 9/2003 | Klosterman et al. |
| 2003/0165241 A1 | 9/2003 | Fransdonk |
| 2003/0169181 A1 | 9/2003 | Taylor |
| 2003/0169185 A1 | 9/2003 | Taylor |
| 2003/0171910 A1 | 9/2003 | Abir |
| 2003/0171988 A1 | 9/2003 | Sugihara |
| 2003/0171990 A1 | 9/2003 | Rao et al. |
| 2003/0172050 A1 | 9/2003 | Decime et al. |
| 2003/0172376 A1 | 9/2003 | Coffin, III |
| 2003/0173405 A1 | 9/2003 | Wilz, Sr. et al. |
| 2003/0177278 A1 | 9/2003 | DeNatale |
| 2003/0177490 A1 | 9/2003 | Hoshino et al. |
| 2003/0182053 A1 | 9/2003 | Swope et al. |
| 2003/0182254 A1 | 9/2003 | Plastina et al. |
| 2003/0182315 A1 | 9/2003 | Plastina et al. |
| 2003/0182375 A1 | 9/2003 | Zhu et al. |
| 2003/0182399 A1 | 9/2003 | Silber |
| 2003/0182567 A1 | 9/2003 | Barton et al. |
| 2003/0182663 A1 | 9/2003 | Gudorf et al. |
| 2003/0187719 A1 | 10/2003 | Brocklebank |
| 2003/0187751 A1 | 10/2003 | Watson et al. |
| 2003/0187886 A1 | 10/2003 | Hull et al. |
| 2003/0188310 A1 | 10/2003 | Klosterman et al. |
| 2003/0188311 A1 | 10/2003 | Yuen et al. |
| 2003/0189499 A1 | 10/2003 | Stricklin et al. |
| 2003/0190961 A1 | 10/2003 | Seidman |
| 2003/0191690 A1 | 10/2003 | McIntyre et al. |
| 2003/0191742 A1 | 10/2003 | Yonezawa et al. |
| 2003/0191799 A1 | 10/2003 | Araujo et al. |
| 2003/0191816 A1 | 10/2003 | Landress et al. |
| 2003/0193409 A1 | 10/2003 | Crank |
| 2003/0195021 A1 | 10/2003 | Yamashita et al. |
| 2003/0195801 A1 | 10/2003 | Takakura et al. |
| 2003/0195837 A1 | 10/2003 | Kostic et al. |
| 2003/0195851 A1 | 10/2003 | Ong |
| 2003/0196201 A1 | 10/2003 | Schein et al. |
| 2003/0198462 A1 | 10/2003 | Bumgardner et al. |
| 2003/0199292 A1 | 10/2003 | Greenberg |
| 2003/0200152 A1 | 10/2003 | Divekar |
| 2003/0200452 A1 | 10/2003 | Tagawa et al. |
| 2003/0204620 A1 | 10/2003 | Cheng |
| 2003/0204632 A1 | 10/2003 | Willebeek-LeMair et al. |
| 2003/0204640 A1 | 10/2003 | Sahinoja et al. |
| 2003/0204847 A1 | 10/2003 | Ellis et al. |
| 2003/0206100 A1 | 11/2003 | Richman et al. |
| 2003/0208756 A1 | 11/2003 | Macrae et al. |
| 2003/0208758 A1 | 11/2003 | Schein et al. |
| 2003/0212527 A1 | 11/2003 | Moore et al. |
| 2003/0212608 A1 | 11/2003 | Cliff |
| 2003/0212710 A1 | 11/2003 | Guy |
| 2003/0212760 A1 | 11/2003 | Chen et al. |
| 2003/0212996 A1 | 11/2003 | Wolzien |
| 2003/0214405 A1 | 11/2003 | Lerg et al. |
| 2003/0214528 A1 | 11/2003 | Pierce et al. |
| 2003/0215211 A1 | 11/2003 | Coffin, III |
| 2003/0216961 A1 | 11/2003 | Barry |
| 2003/0220835 A1 | 11/2003 | Barnes, Jr. |
| 2003/0221030 A1 | 11/2003 | Pontius et al. |
| 2003/0222819 A1 | 12/2003 | Karr et al. |
| 2003/0222981 A1 | 12/2003 | Kisak et al. |
| 2003/0223381 A1 | 12/2003 | Schroderus |
| 2003/0223637 A1 | 12/2003 | Simske et al. |
| 2003/0225516 A1 | 12/2003 | DeKock et al. |
| 2003/0225547 A1 | 12/2003 | Paradies |
| 2003/0226141 A1 | 12/2003 | Krasnow et al. |
| 2003/0226142 A1 | 12/2003 | Rand |
| 2003/0229537 A1 | 12/2003 | Dunning et al. |
| 2003/0229718 A1 | 12/2003 | Tock et al. |
| 2003/0229893 A1 | 12/2003 | Sgaraglino |
| 2003/0229900 A1 | 12/2003 | Reisman |
| 2004/0001217 A1 | 1/2004 | Wu |
| 2004/0002326 A1 | 1/2004 | Maher |
| 2004/0002348 A1 | 1/2004 | Fraccaroli |
| 2004/0002380 A1 | 1/2004 | Brosnan et al. |
| 2004/0003392 A1 | 1/2004 | Trajkovic et al. |
| 2004/0003396 A1 | 1/2004 | Babu |
| 2004/0003413 A1 | 1/2004 | Boston et al. |
| 2004/0006424 A1 | 1/2004 | Joyce et al. |
| 2004/0006509 A1 | 1/2004 | Mannik et al. |
| 2004/0006740 A1 | 1/2004 | Krohn et al. |
| 2004/0008651 A1 | 1/2004 | Ahmed |
| 2004/0009813 A1 | 1/2004 | Wind |
| 2004/0010492 A1 | 1/2004 | Zhao et al. |
| 2004/0010591 A1 | 1/2004 | Sinn et al. |
| 2004/0010601 A1 | 1/2004 | Afergan et al. |
| 2004/0010806 A1 | 1/2004 | Yuen et al. |
| 2004/0014454 A1 | 1/2004 | Burgess et al. |
| 2004/0014457 A1 | 1/2004 | Stevens |
| 2004/0015397 A1 | 1/2004 | Barry et al. |
| 2004/0015437 A1 | 1/2004 | Choi et al. |
| 2004/0015478 A1 | 1/2004 | Pauly |
| 2004/0015588 A1 | 1/2004 | Cotte |
| 2004/0015608 A1 | 1/2004 | Ellis et al. |
| 2004/0019420 A1 | 1/2004 | Rao et al. |
| 2004/0019521 A1 | 1/2004 | Birmingham |
| 2004/0022416 A1 | 2/2004 | Lemelson et al. |
| 2004/0023200 A1 | 2/2004 | Blume |
| 2004/0025174 A1 | 2/2004 | Cerrato |
| 2004/0028295 A1 | 2/2004 | Allen et al. |
| 2004/0029895 A1 | 2/2004 | Takeuchi et al. |
| 2004/0030595 A1 | 2/2004 | Park |
| 2004/0030670 A1 | 2/2004 | Barton |
| 2004/0030798 A1 | 2/2004 | Andersson et al. |
| 2004/0031050 A1 | 2/2004 | Klosterman |
| 2004/0031058 A1 | 2/2004 | Reisman |
| 2004/0034536 A1 | 2/2004 | Hughes |
| 2004/0034686 A1 | 2/2004 | Guthrie |
| 2004/0034697 A1 | 2/2004 | Fairhurst et al. |
| 2004/0034752 A1 | 2/2004 | Ohran |
| 2004/0036718 A1 | 2/2004 | Warren et al. |
| 2004/0039648 A1 | 2/2004 | Candelore et al. |
| 2004/0039796 A1 | 2/2004 | Watkins |
| 2004/0039827 A1 | 2/2004 | Thomas et al. |
| 2004/0043758 A1 | 3/2004 | Sorvari et al. |
| 2004/0043817 A1 | 3/2004 | Willis |
| 2004/0043819 A1 | 3/2004 | Willis |
| 2004/0044567 A1 | 3/2004 | Willis |
| 2004/0044569 A1 | 3/2004 | Roberts et al. |
| 2004/0044571 A1 | 3/2004 | Bronnimann et al. |
| 2004/0044574 A1 | 3/2004 | Cochran et al. |
| 2004/0044576 A1 | 3/2004 | Kurihara et al. |
| 2004/0044623 A1 | 3/2004 | Wake et al. |
| 2004/0044627 A1 | 3/2004 | Russell et al. |
| 2004/0044736 A1 | 3/2004 | Austin-Lane et al. |
| 2004/0044952 A1 | 3/2004 | Jiang et al. |
| 2004/0045025 A1 | 3/2004 | Ward, III et al. |
| 2004/0049428 A1 | 3/2004 | Soehnlen et al. |
| 2004/0049515 A1 | 3/2004 | Haff et al. |
| 2004/0054264 A1 | 3/2004 | Ogura |
| 2004/0054589 A1 | 3/2004 | Nicholas et al. |
| 2004/0057348 A1 | 3/2004 | Shteyn et al. |
| 2004/0059625 A1 | 3/2004 | Schrader |
| 2004/0064453 A1 | 4/2004 | Ruiz et al. |
| 2004/0064550 A1 | 4/2004 | Sakata et al. |
| 2004/0067752 A1 | 4/2004 | Himmelstein |
| 2004/0068409 A1 | 4/2004 | Tanaka et al. |
| 2004/0068483 A1 | 4/2004 | Sakurai et al. |
| 2004/0068552 A1 | 4/2004 | Kotz et al. |

(56) References Cited

U.S. PATENT DOCUMENTS

| | | |
|---|---|---|
| 2004/0068724 A1 | 4/2004 | Gardner, III et al. |
| 2004/0070538 A1 | 4/2004 | Horie et al. |
| 2004/0070602 A1 | 4/2004 | Kobuya et al. |
| 2004/0073361 A1 | 4/2004 | Tzamaloukas et al. |
| 2004/0073482 A1 | 4/2004 | Wiggins et al. |
| 2004/0073483 A1 | 4/2004 | Cohen et al. |
| 2004/0073630 A1 | 4/2004 | Copeland et al. |
| 2004/0073642 A1 | 4/2004 | Iyer |
| 2004/0073874 A1 | 4/2004 | Poibeau et al. |
| 2004/0073899 A1 | 4/2004 | Luk et al. |
| 2004/0073924 A1 | 4/2004 | Pendakur |
| 2004/0078263 A1 | 4/2004 | Altieri |
| 2004/0078266 A1 | 4/2004 | Kim |
| 2004/0078292 A1 | 4/2004 | Blumenau |
| 2004/0078621 A1 | 4/2004 | Talaugon et al. |
| 2004/0078809 A1 | 4/2004 | Drazin |
| 2004/0078815 A1 | 4/2004 | Lemmons et al. |
| 2004/0078820 A1 | 4/2004 | Nickum |
| 2004/0083133 A1 | 4/2004 | Nicholas et al. |
| 2004/0084109 A1 | 5/2004 | Piccinino, Jr. et al. |
| 2004/0088558 A1 | 5/2004 | Candelore |
| 2004/0088583 A1 | 5/2004 | Yoon et al. |
| 2004/0090121 A1 | 5/2004 | Simonds et al. |
| 2004/0093141 A1 | 5/2004 | Rao et al. |
| 2004/0098165 A1 | 5/2004 | Butikofer |
| 2004/0098744 A1 | 5/2004 | Gutta |
| 2004/0102248 A1 | 5/2004 | Young et al. |
| 2004/0103024 A1 | 5/2004 | Patel et al. |
| 2004/0103429 A1 | 5/2004 | Carlucci et al. |
| 2004/0103439 A1 | 5/2004 | Macrae et al. |
| 2004/0107033 A1 | 6/2004 | Rao et al. |
| 2004/0107136 A1 | 6/2004 | Nemirofsky et al. |
| 2004/0107437 A1 | 6/2004 | Reichardt et al. |
| 2004/0110565 A1 | 6/2004 | Levesque |
| 2004/0111200 A1 | 6/2004 | Rao et al. |
| 2004/0111317 A1 | 6/2004 | Ebisawa |
| 2004/0111484 A1 | 6/2004 | Young et al. |
| 2004/0116183 A1 | 6/2004 | Prindle |
| 2004/0117091 A1 | 6/2004 | Prakah-Asante et al. |
| 2004/0117272 A1 | 6/2004 | Shehab |
| 2004/0121835 A1 | 6/2004 | Willis et al. |
| 2004/0121842 A1 | 6/2004 | Willis et al. |
| 2004/0122856 A1 | 6/2004 | Clearwater |
| 2004/0126747 A1 | 7/2004 | Fujisawa et al. |
| 2004/0128286 A1 | 7/2004 | Yasushi et al. |
| 2004/0128514 A1 | 7/2004 | Rhoads |
| 2004/0128670 A1 | 7/2004 | Robinson et al. |
| 2004/0130550 A1 | 7/2004 | Blanco et al. |
| 2004/0133480 A1 | 7/2004 | Domes |
| 2004/0133518 A1 | 7/2004 | Dryall |
| 2004/0137929 A1 | 7/2004 | Jones et al. |
| 2004/0137980 A1 | 7/2004 | Aenlle |
| 2004/0139025 A1 | 7/2004 | Coleman |
| 2004/0139047 A1 | 7/2004 | Rechsteiner et al. |
| 2004/0139064 A1 | 7/2004 | Chevallier et al. |
| 2004/0139106 A1 | 7/2004 | Bachman et al. |
| 2004/0139107 A1 | 7/2004 | Bachman et al. |
| 2004/0139400 A1 | 7/2004 | Allam et al. |
| 2004/0139465 A1 | 7/2004 | Matthews, III et al. |
| 2004/0140352 A1 | 7/2004 | Walker et al. |
| 2004/0143478 A1 | 7/2004 | Ward |
| 2004/0143495 A1 | 7/2004 | Koenig |
| 2004/0145459 A1 | 7/2004 | Himmelstein |
| 2004/0145496 A1 | 7/2004 | Ellis |
| 2004/0147265 A1 | 7/2004 | Kelley et al. |
| 2004/0148221 A1 | 7/2004 | Chu |
| 2004/0148341 A1 | 7/2004 | Cotte |
| 2004/0148424 A1 | 7/2004 | Berkson et al. |
| 2004/0148625 A1 | 7/2004 | Eldering et al. |
| 2004/0152477 A1 | 8/2004 | Wu et al. |
| 2004/0152517 A1 | 8/2004 | Hardisty et al. |
| 2004/0152518 A1 | 8/2004 | Kogo |
| 2004/0153360 A1 | 8/2004 | Schumann |
| 2004/0153363 A1 | 8/2004 | Stehling |
| 2004/0153385 A1 | 8/2004 | Allibhoy et al. |
| 2004/0153453 A1 | 8/2004 | Brodie et al. |
| 2004/0158492 A1 | 8/2004 | Lopez et al. |
| 2004/0158858 A1 | 8/2004 | Paxton et al. |
| 2004/0162064 A1 | 8/2004 | Himmelstein |
| 2004/0162758 A1 | 8/2004 | Willis |
| 2004/0162759 A1 | 8/2004 | Willis |
| 2004/0163101 A1 | 8/2004 | Swix et al. |
| 2004/0163134 A1 | 8/2004 | Willis |
| 2004/0164228 A1 | 8/2004 | Fogg et al. |
| 2004/0168063 A1 | 8/2004 | Revital et al. |
| 2004/0168188 A1 | 8/2004 | Bennington et al. |
| 2004/0168189 A1 | 8/2004 | Reynolds et al. |
| 2004/0168202 A1 | 8/2004 | Ebihara |
| 2004/0169678 A1 | 9/2004 | Oliver |
| 2004/0172324 A1 | 9/2004 | Merriman et al. |
| 2004/0172331 A1 | 9/2004 | Merriman et al. |
| 2004/0172332 A1 | 9/2004 | Merriman et al. |
| 2004/0172343 A1 | 9/2004 | Allibhoy et al. |
| 2004/0172550 A1 | 9/2004 | Sai |
| 2004/0176170 A1 | 9/2004 | Eck et al. |
| 2004/0176995 A1 | 9/2004 | Fusz |
| 2004/0177001 A1 | 9/2004 | Salinas |
| 2004/0181688 A1 | 9/2004 | Wittkotter |
| 2004/0181808 A1 | 9/2004 | Schaefer et al. |
| 2004/0183829 A1 | 9/2004 | Kontny et al. |
| 2004/0186766 A1 | 9/2004 | Fellenstein et al. |
| 2004/0186771 A1 | 9/2004 | Squires |
| 2004/0186859 A1 | 9/2004 | Butcher |
| 2004/0189512 A1 | 9/2004 | Takashima et al. |
| 2004/0189691 A1 | 9/2004 | Jojic et al. |
| 2004/0193371 A1 | 9/2004 | Koshiji et al. |
| 2004/0193413 A1 | 9/2004 | Wilson et al. |
| 2004/0193488 A1 | 9/2004 | Khoo et al. |
| 2004/0194123 A1 | 9/2004 | Fredlund et al. |
| 2004/0194128 A1 | 9/2004 | McIntyre et al. |
| 2004/0194138 A1 | 9/2004 | Boylan, III et al. |
| 2004/0199575 A1 | 10/2004 | Geller |
| 2004/0201500 A1 | 10/2004 | Miller et al. |
| 2004/0201629 A1 | 10/2004 | Bates et al. |
| 2004/0201683 A1 | 10/2004 | Murashita et al. |
| 2004/0203851 A1 | 10/2004 | Vetro et al. |
| 2004/0203909 A1 | 10/2004 | Koster |
| 2004/0203931 A1 | 10/2004 | Karaoguz |
| 2004/0204238 A1 | 10/2004 | Aoki |
| 2004/0204247 A1 | 10/2004 | Walker et al. |
| 2004/0204266 A1 | 10/2004 | Owens et al. |
| 2004/0204806 A1 | 10/2004 | Chen et al. |
| 2004/0204953 A1 | 10/2004 | Muir et al. |
| 2004/0205101 A1 | 10/2004 | Radhakrishnan |
| 2004/0205151 A1 | 10/2004 | Sprigg et al. |
| 2004/0205157 A1 | 10/2004 | Bibelnieks et al. |
| 2004/0205508 A1 | 10/2004 | Wecker et al. |
| 2004/0205534 A1 | 10/2004 | Koelle |
| 2004/0205807 A1 | 10/2004 | Wilcoxson et al. |
| 2004/0206809 A1 | 10/2004 | Wood et al. |
| 2004/0209602 A1 | 10/2004 | Joyce et al. |
| 2004/0210472 A1 | 10/2004 | Lew et al. |
| 2004/0210489 A1 | 10/2004 | Jackson et al. |
| 2004/0210653 A1 | 10/2004 | Kanoor et al. |
| 2004/0210661 A1 | 10/2004 | Thompson |
| 2004/0210824 A1 | 10/2004 | Shoff et al. |
| 2004/0210935 A1 | 10/2004 | Schein et al. |
| 2004/0215931 A1 | 10/2004 | Ellis |
| 2004/0219977 A1 | 11/2004 | Ebisawa |
| 2004/0220850 A1 | 11/2004 | Ferrer et al. |
| 2004/0220858 A1 | 11/2004 | Maggio |
| 2004/0221018 A1 | 11/2004 | Ji |
| 2004/0221310 A1 | 11/2004 | Herrington et al. |
| 2004/0224772 A1 | 11/2004 | Canessa et al. |
| 2004/0225562 A1 | 11/2004 | Turner |
| 2004/0225715 A1 | 11/2004 | Gottfried |
| 2004/0229194 A1 | 11/2004 | Yang |
| 2004/0229632 A1 | 11/2004 | Flynn et al. |
| 2004/0230593 A1 | 11/2004 | Rudin et al. |
| 2004/0230994 A1 | 11/2004 | Urdang et al. |
| 2004/0234932 A1 | 11/2004 | Hughes et al. |
| 2004/0236585 A1 | 11/2004 | Kohnke et al. |
| 2004/0236791 A1 | 11/2004 | Kinjo |
| 2004/0243455 A1 | 12/2004 | Smith |

(56) References Cited

U.S. PATENT DOCUMENTS

| | | |
|---|---|---|
| 2004/0243466 A1 | 12/2004 | Trzybinski et al. |
| 2004/0243470 A1 | 12/2004 | Ozer et al. |
| 2004/0243623 A1 | 12/2004 | Ozer et al. |
| 2004/0248569 A1 | 12/2004 | Kondou et al. |
| 2004/0248649 A1 | 12/2004 | Arai et al. |
| 2004/0249786 A1 | 12/2004 | Dabney et al. |
| 2004/0250131 A1 | 12/2004 | Swander et al. |
| 2004/0250201 A1 | 12/2004 | Caspi |
| 2004/0252051 A1 | 12/2004 | Johnson |
| 2004/0252679 A1 | 12/2004 | Williams et al. |
| 2004/0254795 A1 | 12/2004 | Fujii et al. |
| 2004/0254831 A1 | 12/2004 | Dean |
| 2004/0254957 A1 | 12/2004 | Hyotyniemi et al. |
| 2004/0255148 A1 | 12/2004 | Monteiro et al. |
| 2004/0256454 A1 | 12/2004 | Kocher |
| 2004/0258274 A1 | 12/2004 | Brundage et al. |
| 2004/0259553 A1 | 12/2004 | Delaney et al. |
| 2004/0260470 A1 | 12/2004 | Rast |
| 2004/0260609 A1 | 12/2004 | Loeb et al. |
| 2004/0260618 A1 | 12/2004 | Larson |
| 2004/0260669 A1 | 12/2004 | Fernandez |
| 2004/0260804 A1 | 12/2004 | Grabarnik et al. |
| 2004/0261098 A1 | 12/2004 | Macrae et al. |
| 2004/0261125 A1 | 12/2004 | Ellis et al. |
| 2004/0263337 A1 | 12/2004 | Terauchi et al. |
| 2004/0266535 A1 | 12/2004 | Reeves |
| 2004/0266537 A1 | 12/2004 | Morris |
| 2004/0267611 A1 | 12/2004 | Hoerenz |
| 2004/0267715 A1 | 12/2004 | Polson et al. |
| 2004/0267734 A1 | 12/2004 | Toshima |
| 2004/0267880 A1 | 12/2004 | Patiejunas |
| 2004/0267952 A1 | 12/2004 | He et al. |
| 2004/0268237 A1 | 12/2004 | Jones et al. |
| 2004/0268347 A1 | 12/2004 | Knauerhase et al. |
| 2005/0000213 A1 | 1/2005 | Cameron |
| 2005/0003797 A1 | 1/2005 | Baldwin |
| 2005/0005168 A1 | 1/2005 | Dick |
| 2005/0005242 A1 | 1/2005 | Hoyle |
| 2005/0005246 A1 | 1/2005 | Card et al. |
| 2005/0009506 A1 | 1/2005 | Smolentzov et al. |
| 2005/0010765 A1 | 1/2005 | Swander et al. |
| 2005/0010949 A1 | 1/2005 | Ward et al. |
| 2005/0011012 A1 | 1/2005 | Sun et al. |
| 2005/0011013 A1 | 1/2005 | Schrott et al. |
| 2005/0011014 A1 | 1/2005 | Schrott et al. |
| 2005/0011015 A1 | 1/2005 | Schmidt et al. |
| 2005/0011016 A1 | 1/2005 | Pasquier et al. |
| 2005/0011017 A1 | 1/2005 | Legrand et al. |
| 2005/0011026 A1 | 1/2005 | Hafliger et al. |
| 2005/0011042 A1 | 1/2005 | Hupp et al. |
| 2005/0011043 A1 | 1/2005 | Comstock |
| 2005/0011084 A1 | 1/2005 | Stephenson |
| 2005/0011085 A1 | 1/2005 | Swigart et al. |
| 2005/0011088 A1 | 1/2005 | Theurer et al. |
| 2005/0011089 A1 | 1/2005 | Duke |
| 2005/0011090 A1 | 1/2005 | Bedretdinov |
| 2005/0011533 A1 | 1/2005 | Ruben |
| 2005/0011534 A1 | 1/2005 | Kampel |
| 2005/0012510 A1 | 1/2005 | Thibedeau et al. |
| 2005/0013114 A1 | 1/2005 | Ha |
| 2005/0013297 A1 | 1/2005 | Eriksson |
| 2005/0013586 A1 | 1/2005 | Bhatia et al. |
| 2005/0015267 A1 | 1/2005 | Barringer et al. |
| 2005/0015451 A1 | 1/2005 | Sheldon et al. |
| 2005/0015599 A1 | 1/2005 | Wang et al. |
| 2005/0015804 A1 | 1/2005 | LaJoie et al. |
| 2005/0015815 A1 | 1/2005 | Shoff et al. |
| 2005/0017333 A1 | 1/2005 | Bohr |
| 2005/0021387 A1 | 1/2005 | Gottfurcht |
| 2005/0021396 A1 | 1/2005 | Pearch et al. |
| 2005/0021397 A1 | 1/2005 | Cui et al. |
| 2005/0021403 A1 | 1/2005 | Ozer et al. |
| 2005/0021465 A1 | 1/2005 | Segerstrom |
| 2005/0021470 A1 | 1/2005 | Martin et al. |
| 2005/0021666 A1 | 1/2005 | Dinnage et al. |
| 2005/0021853 A1 | 1/2005 | Parekh et al. |
| 2005/0021980 A1 | 1/2005 | Kanai |
| 2005/0022010 A1 | 1/2005 | Swander et al. |
| 2005/0022114 A1 | 1/2005 | Shanahan et al. |
| 2005/0025242 A1 | 2/2005 | Ma et al. |
| 2005/0025732 A1 | 2/2005 | Ansmann et al. |
| 2005/0026569 A1 | 2/2005 | Lim et al. |
| 2005/0027587 A1 | 2/2005 | Latona et al. |
| 2005/0027595 A1 | 2/2005 | Ha et al. |
| 2005/0027699 A1 | 2/2005 | Awadallah et al. |
| 2005/0028034 A1 | 2/2005 | Gantman et al. |
| 2005/0028188 A1 | 2/2005 | Latona et al. |
| 2005/0028195 A1 | 2/2005 | Feinleib et al. |
| 2005/0028201 A1 | 2/2005 | Klosterman et al. |
| 2005/0028208 A1 | 2/2005 | Ellis et al. |
| 2005/0028218 A1 | 2/2005 | Blake |
| 2005/0029534 A1 | 2/2005 | Ochiai et al. |
| 2005/0029536 A1 | 2/2005 | Sugitatsu et al. |
| 2005/0029537 A1 | 2/2005 | D'Evelyn et al. |
| 2005/0029539 A1 | 2/2005 | Toda et al. |
| 2005/0029680 A1 | 2/2005 | Jung et al. |
| 2005/0030007 A1 | 2/2005 | Sakata |
| 2005/0032577 A1 | 2/2005 | Blackburn et al. |
| 2005/0033700 A1 | 2/2005 | Vogler et al. |
| 2005/0033713 A1 | 2/2005 | Bala et al. |
| 2005/0033970 A1 | 2/2005 | Anson et al. |
| 2005/0034319 A1 | 2/2005 | Terrazas |
| 2005/0034734 A1 | 2/2005 | Tweardy |
| 2005/0038698 A1 | 2/2005 | Lukose et al. |
| 2005/0038702 A1 | 2/2005 | Merriman et al. |
| 2005/0039178 A1 | 2/2005 | Marolia et al. |
| 2005/0041578 A1 | 2/2005 | Huotari et al. |
| 2005/0050027 A1 | 3/2005 | Yeh et al. |
| 2005/0050043 A1 | 3/2005 | Pyhalammi et al. |
| 2005/0050070 A1 | 3/2005 | Sheldon |
| 2005/0050222 A1 | 3/2005 | Packer |
| 2005/0055321 A1 | 3/2005 | Fratkina et al. |
| 2005/0055345 A1 | 3/2005 | Ripley |
| 2005/0055725 A1 | 3/2005 | Stewart |
| 2005/0060264 A1 | 3/2005 | Schrock et al. |
| 2005/0060350 A1 | 3/2005 | Baum et al. |
| 2005/0060365 A1 | 3/2005 | Robinson et al. |
| 2005/0060381 A1 | 3/2005 | Huynh et al. |
| 2005/0065950 A1 | 3/2005 | Chaganti et al. |
| 2005/0065980 A1 | 3/2005 | Hyatt et al. |
| 2005/0070221 A1 | 3/2005 | Upton |
| 2005/0071665 A1 | 3/2005 | Zimmer et al. |
| 2005/0075155 A1 | 4/2005 | Sitrick |
| 2005/0075172 A1 | 4/2005 | Coleman |
| 2005/0075908 A1 | 4/2005 | Stevens |
| 2005/0076051 A1 | 4/2005 | Carobus et al. |
| 2005/0076060 A1 | 4/2005 | Finn et al. |
| 2005/0076095 A1 | 4/2005 | Mathew et al. |
| 2005/0086187 A1 | 4/2005 | Grosser et al. |
| 2005/0086467 A1 | 4/2005 | Asokan et al. |
| 2005/0091107 A1 | 4/2005 | Blum |
| 2005/0091108 A1 | 4/2005 | Frost |
| 2005/0091111 A1 | 4/2005 | Green et al. |
| 2005/0091118 A1 | 4/2005 | Fano |
| 2005/0091146 A1 | 4/2005 | Levinson |
| 2005/0091184 A1 | 4/2005 | Seshadri et al. |
| 2005/0091302 A1 | 4/2005 | Soin et al. |
| 2005/0091578 A1 | 4/2005 | Madan et al. |
| 2005/0091626 A1 | 4/2005 | Okano et al. |
| 2005/0096750 A1 | 5/2005 | Kagan et al. |
| 2005/0096755 A1 | 5/2005 | Heizmann et al. |
| 2005/0096975 A1 | 5/2005 | Moshe |
| 2005/0096983 A1 | 5/2005 | Werkhoven |
| 2005/0097008 A1 | 5/2005 | Ehring et al. |
| 2005/0097335 A1 | 5/2005 | Shenoy et al. |
| 2005/0097599 A1 | 5/2005 | Plotnick et al. |
| 2005/0097622 A1 | 5/2005 | Zigmond et al. |
| 2005/0098596 A1 | 5/2005 | Yano et al. |
| 2005/0098597 A1 | 5/2005 | Cottrell et al. |
| 2005/0098598 A1 | 5/2005 | Kuhn |
| 2005/0098599 A1 | 5/2005 | von Foerster |
| 2005/0098600 A1 | 5/2005 | Yeh et al. |
| 2005/0098601 A1 | 5/2005 | Dragov |
| 2005/0098602 A1 | 5/2005 | Mintzer |

(56) References Cited

U.S. PATENT DOCUMENTS

| | | |
|---|---|---|
| 2005/0098603 A1 | 5/2005 | Mochizuki et al. |
| 2005/0098604 A1 | 5/2005 | Marks |
| 2005/0098605 A1 | 5/2005 | Edelstein et al. |
| 2005/0098606 A1 | 5/2005 | Takeuchi et al. |
| 2005/0098607 A1 | 5/2005 | Bartley et al. |
| 2005/0098609 A1 | 5/2005 | Greenhut et al. |
| 2005/0098610 A1 | 5/2005 | Onobori et al. |
| 2005/0101192 A1 | 5/2005 | Foskey |
| 2005/0101193 A1 | 5/2005 | Godard |
| 2005/0101386 A1 | 5/2005 | Lavanchy et al. |
| 2005/0102177 A1 | 5/2005 | Takayama |
| 2005/0102202 A1 | 5/2005 | Linden et al. |
| 2005/0102610 A1 | 5/2005 | Jie |
| 2005/0105552 A1 | 5/2005 | Osterling |
| 2005/0106643 A1 | 5/2005 | Saatcioglu |
| 2005/0107158 A1 | 5/2005 | Kanisawa et al. |
| 2005/0108001 A1 | 5/2005 | Aarskog |
| 2005/0108095 A1 | 5/2005 | Perlmutter |
| 2005/0108195 A1 | 5/2005 | Yalovsky et al. |
| 2005/0108213 A1 | 5/2005 | Riise et al. |
| 2005/0108322 A1 | 5/2005 | Kline et al. |
| 2005/0112030 A1 | 5/2005 | Gaus |
| 2005/0113170 A1 | 5/2005 | McHugh |
| 2005/0114357 A1 | 5/2005 | Chengalvarayan et al. |
| 2005/0114375 A1 | 5/2005 | Frieder et al. |
| 2005/0114380 A1 | 5/2005 | Eldar et al. |
| 2005/0114526 A1 | 5/2005 | Aoyama |
| 2005/0120003 A1 | 6/2005 | Drury et al. |
| 2005/0120006 A1 | 6/2005 | Nye |
| 2005/0125117 A1 | 6/2005 | Breed |
| 2005/0125286 A1 | 6/2005 | Crippen et al. |
| 2005/0125513 A1 | 6/2005 | Sin-Ling Lam et al. |
| 2005/0125823 A1 | 6/2005 | McCoy et al. |
| 2005/0130656 A1 | 6/2005 | Chen |
| 2005/0130725 A1 | 6/2005 | Creamer et al. |
| 2005/0131727 A1 | 6/2005 | Sezan et al. |
| 2005/0132281 A1 | 6/2005 | Pan et al. |
| 2005/0135366 A1 | 6/2005 | Trappeniers et al. |
| 2005/0136949 A1 | 6/2005 | Barnes, Jr. |
| 2005/0137765 A1 | 6/2005 | Hein et al. |
| 2005/0138660 A1 | 6/2005 | Boyer et al. |
| 2005/0139649 A1 | 6/2005 | Metcalf et al. |
| 2005/0141709 A1 | 6/2005 | Bratton |
| 2005/0143174 A1 | 6/2005 | Goldman et al. |
| 2005/0144063 A1 | 6/2005 | Spector |
| 2005/0144073 A1 | 6/2005 | Morrisroe et al. |
| 2005/0144074 A1 | 6/2005 | Fredregill et al. |
| 2005/0144475 A1 | 6/2005 | Sakaki et al. |
| 2005/0148377 A1 | 7/2005 | Goldberg et al. |
| 2005/0149396 A1 | 7/2005 | Horowitz et al. |
| 2005/0149397 A1 | 7/2005 | Morgenstern et al. |
| 2005/0149538 A1 | 7/2005 | Singh et al. |
| 2005/0149726 A1 | 7/2005 | Joshi et al. |
| 2005/0149964 A1 | 7/2005 | Thomas et al. |
| 2005/0151849 A1 | 7/2005 | Fitzhugh et al. |
| 2005/0153654 A1 | 7/2005 | Anderson et al. |
| 2005/0153760 A1 | 7/2005 | Varley |
| 2005/0154608 A1 | 7/2005 | Paulson et al. |
| 2005/0154640 A1 | 7/2005 | Kolluri et al. |
| 2005/0154699 A1 | 7/2005 | Lipkin et al. |
| 2005/0154717 A1 | 7/2005 | Watson et al. |
| 2005/0154760 A1 | 7/2005 | Bhakta et al. |
| 2005/0155056 A1 | 7/2005 | Knee et al. |
| 2005/0155083 A1 | 7/2005 | Oh et al. |
| 2005/0159220 A1 | 7/2005 | Wilson et al. |
| 2005/0159970 A1 | 7/2005 | Buyukkokten et al. |
| 2005/0160080 A1 | 7/2005 | Dawson |
| 2005/0160442 A1 | 7/2005 | Kaplowitz |
| 2005/0164757 A1 | 7/2005 | Ebisawa |
| 2005/0165640 A1 | 7/2005 | Kotorov |
| 2005/0165644 A1 | 7/2005 | Beyda et al. |
| 2005/0165699 A1 | 7/2005 | Hahn-Carlson |
| 2005/0166240 A1 | 7/2005 | Kim |
| 2005/0171865 A1 | 8/2005 | Beardow |
| 2005/0171955 A1 | 8/2005 | Hull et al. |
| 2005/0177385 A1 | 8/2005 | Hull et al. |
| 2005/0177413 A1 | 8/2005 | Blumberg et al. |
| 2005/0177430 A1 | 8/2005 | Willis |
| 2005/0177431 A1 | 8/2005 | Willis et al. |
| 2005/0177461 A1 | 8/2005 | Rosefelt et al. |
| 2005/0178940 A1 | 8/2005 | Granick |
| 2005/0179685 A1 | 8/2005 | Kake et al. |
| 2005/0180330 A1 | 8/2005 | Shapiro |
| 2005/0182693 A1 | 8/2005 | Alivandi |
| 2005/0182737 A1 | 8/2005 | Brown |
| 2005/0182824 A1 | 8/2005 | Cotte |
| 2005/0183110 A1 | 8/2005 | Anderson |
| 2005/0185825 A1 | 8/2005 | Hoshino et al. |
| 2005/0187786 A1 | 8/2005 | Tsai |
| 2005/0192025 A1 | 9/2005 | Kaplan |
| 2005/0192071 A1 | 9/2005 | Matsuno et al. |
| 2005/0192864 A1 | 9/2005 | Ganz |
| 2005/0193014 A1 | 9/2005 | Prince |
| 2005/0193054 A1 | 9/2005 | Wilson et al. |
| 2005/0193075 A1 | 9/2005 | Haff et al. |
| 2005/0193396 A1 | 9/2005 | Stafford-Fraser et al. |
| 2005/0193411 A1 | 9/2005 | Funston |
| 2005/0193414 A1 | 9/2005 | Horvitz et al. |
| 2005/0193425 A1 | 9/2005 | Sull et al. |
| 2005/0195157 A1 | 9/2005 | Kramer et al. |
| 2005/0195696 A1 | 9/2005 | Rekimoto |
| 2005/0197977 A1 | 9/2005 | Buck et al. |
| 2005/0198075 A1 | 9/2005 | Plastina et al. |
| 2005/0202385 A1 | 9/2005 | Coward et al. |
| 2005/0203801 A1 | 9/2005 | Morgenstern et al. |
| 2005/0203804 A1 | 9/2005 | Suzuki et al. |
| 2005/0203807 A1 | 9/2005 | Bezos et al. |
| 2005/0203811 A1 | 9/2005 | David |
| 2005/0204381 A1 | 9/2005 | Ludvig et al. |
| 2005/0204388 A1 | 9/2005 | Knudson et al. |
| 2005/0205671 A1 | 9/2005 | Gelsomini et al. |
| 2005/0209995 A1 | 9/2005 | Aksu et al. |
| 2005/0210101 A1 | 9/2005 | Janik |
| 2005/0216295 A1 | 9/2005 | Abrahamsohn |
| 2005/0216300 A1 | 9/2005 | Appelman et al. |
| 2005/0216346 A1 | 9/2005 | Kusumoto et al. |
| 2005/0216348 A1 | 9/2005 | Martin et al. |
| 2005/0216581 A1 | 9/2005 | Blumenau et al. |
| 2005/0216855 A1 | 9/2005 | Kopra et al. |
| 2005/0216936 A1 | 9/2005 | Knudson et al. |
| 2005/0219375 A1 | 10/2005 | Hasegawa et al. |
| 2005/0220359 A1 | 10/2005 | Sun et al. |
| 2005/0222801 A1 | 10/2005 | Wulff et al. |
| 2005/0222908 A1 | 10/2005 | Altberg et al. |
| 2005/0223039 A1 | 10/2005 | Kim et al. |
| 2005/0227749 A1 | 10/2005 | Bender et al. |
| 2005/0228683 A1 | 10/2005 | Saylor et al. |
| 2005/0228797 A1 | 10/2005 | Koningstein et al. |
| 2005/0229215 A1 | 10/2005 | Schein et al. |
| 2005/0231746 A1 | 10/2005 | Parry et al. |
| 2005/0233741 A1 | 10/2005 | Zamani et al. |
| 2005/0234781 A1 | 10/2005 | Morgenstern et al. |
| 2005/0234851 A1 | 10/2005 | King et al. |
| 2005/0234907 A1 | 10/2005 | Yamagishi et al. |
| 2005/0235030 A1 | 10/2005 | Lauckhart et al. |
| 2005/0235199 A1 | 10/2005 | Adams |
| 2005/0235310 A1 | 10/2005 | Bies |
| 2005/0235318 A1 | 10/2005 | Grauch et al. |
| 2005/0235320 A1 | 10/2005 | Maze et al. |
| 2005/0235338 A1 | 10/2005 | AbiEzzi et al. |
| 2005/0235811 A1 | 10/2005 | Dukane |
| 2005/0240476 A1 | 10/2005 | Bigott |
| 2005/0240962 A1 | 10/2005 | Cooper et al. |
| 2005/0246314 A1 | 11/2005 | Eder |
| 2005/0246436 A1 | 11/2005 | Day et al. |
| 2005/0246736 A1 | 11/2005 | Beyda et al. |
| 2005/0247769 A1 | 11/2005 | Potter et al. |
| 2005/0251448 A1 | 11/2005 | Gropper |
| 2005/0251539 A1 | 11/2005 | Parekh et al. |
| 2005/0251822 A1 | 11/2005 | Knowles et al. |
| 2005/0251824 A1 | 11/2005 | Thomas et al. |
| 2005/0251827 A1 | 11/2005 | Ellis et al. |
| 2005/0254366 A1 | 11/2005 | Amar |
| 2005/0256768 A1 | 11/2005 | Robinson |

(56) References Cited

U.S. PATENT DOCUMENTS

| | | |
|---|---|---|
| 2005/0256867 A1 | 11/2005 | Walther et al. |
| 2005/0256923 A1 | 11/2005 | Adachi |
| 2005/0259675 A1 | 11/2005 | Tuohino et al. |
| 2005/0260984 A1 | 11/2005 | Karabinis |
| 2005/0261062 A1 | 11/2005 | Lewin et al. |
| 2005/0261962 A1 | 11/2005 | Chuah |
| 2005/0262058 A1 | 11/2005 | Chandrasekar et al. |
| 2005/0262101 A1 | 11/2005 | Halpern et al. |
| 2005/0262132 A1 | 11/2005 | Morita et al. |
| 2005/0262569 A1 | 11/2005 | Shay |
| 2005/0262570 A1 | 11/2005 | Shay |
| 2005/0264417 A1 | 12/2005 | Miller et al. |
| 2005/0265169 A1 | 12/2005 | Yoshimaru et al. |
| 2005/0266858 A1 | 12/2005 | Miller et al. |
| 2005/0266906 A1 | 12/2005 | Stevens |
| 2005/0266907 A1 | 12/2005 | Weston et al. |
| 2005/0267638 A1 | 12/2005 | Peshkin et al. |
| 2005/0267819 A1 | 12/2005 | Kaplan |
| 2005/0268342 A1 | 12/2005 | Shay |
| 2005/0270358 A1 | 12/2005 | Kuchen et al. |
| 2005/0270537 A1 | 12/2005 | Mian et al. |
| 2005/0272442 A1 | 12/2005 | Miller et al. |
| 2005/0273510 A1 | 12/2005 | Schuh |
| 2005/0275505 A1 | 12/2005 | Himmelstein |
| 2005/0276570 A1 | 12/2005 | Reed et al. |
| 2005/0278314 A1 | 12/2005 | Buchheit |
| 2005/0278333 A1 | 12/2005 | Daniels et al. |
| 2005/0278483 A1 | 12/2005 | Andruszkiewicz et al. |
| 2005/0278712 A1 | 12/2005 | Buskens et al. |
| 2005/0278741 A1 | 12/2005 | Robarts et al. |
| 2005/0283395 A1 | 12/2005 | Lesandrini et al. |
| 2005/0283401 A1 | 12/2005 | Swix et al. |
| 2005/0283640 A1 | 12/2005 | Cheston et al. |
| 2005/0288954 A1 | 12/2005 | McCarthy et al. |
| 2005/0288999 A1 | 12/2005 | Lerner et al. |
| 2005/0289054 A1 | 12/2005 | Silverbrook et al. |
| 2005/0289542 A1 | 12/2005 | Uhlig et al. |
| 2006/0003795 A1 | 1/2006 | Yamanaka et al. |
| 2006/0004667 A1 | 1/2006 | Neil |
| 2006/0007108 A1 | 1/2006 | Utsumi et al. |
| 2006/0007312 A1 | 1/2006 | James |
| 2006/0010400 A1 | 1/2006 | Dehlin et al. |
| 2006/0010440 A1 | 1/2006 | Anderson et al. |
| 2006/0011728 A1 | 1/2006 | Frantz et al. |
| 2006/0014727 A1 | 1/2006 | Karsan et al. |
| 2006/0015571 A1 | 1/2006 | Fukuda et al. |
| 2006/0015904 A1 | 1/2006 | Marcus |
| 2006/0018198 A1 | 1/2006 | McDonald et al. |
| 2006/0018208 A1 | 1/2006 | Nathan et al. |
| 2006/0018209 A1 | 1/2006 | Drakoulis et al. |
| 2006/0019676 A1 | 1/2006 | Miller et al. |
| 2006/0020062 A1 | 1/2006 | Bloom |
| 2006/0020631 A1 | 1/2006 | Cheong Wan et al. |
| 2006/0020662 A1 | 1/2006 | Robinson |
| 2006/0023715 A1 | 2/2006 | Chen et al. |
| 2006/0023717 A1 | 2/2006 | Trachtman et al. |
| 2006/0023718 A1 | 2/2006 | Joly |
| 2006/0023806 A1 | 2/2006 | Huang et al. |
| 2006/0023937 A1 | 2/2006 | Tessadro |
| 2006/0023945 A1 | 2/2006 | King et al. |
| 2006/0025985 A1 | 2/2006 | Vinberg et al. |
| 2006/0026013 A1 | 2/2006 | Kraft |
| 2006/0026067 A1 | 2/2006 | Nicholas et al. |
| 2006/0026188 A1 | 2/2006 | Najork et al. |
| 2006/0026219 A1 | 2/2006 | Orenstein et al. |
| 2006/0026263 A1 | 2/2006 | Raghavan et al. |
| 2006/0029259 A1 | 2/2006 | Harrington et al. |
| 2006/0030334 A1 | 2/2006 | Hashimoto |
| 2006/0031108 A1 | 2/2006 | Oran |
| 2006/0031505 A1 | 2/2006 | Ashley |
| 2006/0031551 A1 | 2/2006 | Agresta et al. |
| 2006/0031883 A1 | 2/2006 | Ellis et al. |
| 2006/0034218 A1 | 2/2006 | Ozluturk et al. |
| 2006/0036462 A1 | 2/2006 | King et al. |
| 2006/0036570 A1 | 2/2006 | Schaefer et al. |
| 2006/0036853 A1 | 2/2006 | Chen et al. |
| 2006/0037011 A1 | 2/2006 | Shi et al. |
| 2006/0037044 A1 | 2/2006 | Daniels |
| 2006/0040719 A1 | 2/2006 | Plimi |
| 2006/0041484 A1 | 2/2006 | King et al. |
| 2006/0041538 A1 | 2/2006 | King et al. |
| 2006/0041590 A1 | 2/2006 | King et al. |
| 2006/0041605 A1 | 2/2006 | King et al. |
| 2006/0041635 A1 | 2/2006 | Alexander et al. |
| 2006/0045374 A1 | 3/2006 | Kim et al. |
| 2006/0047563 A1 | 3/2006 | Wardell |
| 2006/0047615 A1 | 3/2006 | Ravin et al. |
| 2006/0047663 A1 | 3/2006 | Rail |
| 2006/0048046 A1 | 3/2006 | Joshi et al. |
| 2006/0048330 A1 | 3/2006 | Rust et al. |
| 2006/0052837 A1 | 3/2006 | Kim et al. |
| 2006/0053058 A1 | 3/2006 | Hotchkiss et al. |
| 2006/0053077 A1 | 3/2006 | Mourad et al. |
| 2006/0053097 A1 | 3/2006 | King et al. |
| 2006/0053225 A1 | 3/2006 | Poikselka et al. |
| 2006/0059091 A1 | 3/2006 | Wang et al. |
| 2006/0059253 A1 | 3/2006 | Goodman et al. |
| 2006/0062094 A1 | 3/2006 | Nathan et al. |
| 2006/0067296 A1 | 3/2006 | Bershad et al. |
| 2006/0069612 A1 | 3/2006 | Hurt et al. |
| 2006/0069616 A1 | 3/2006 | Bau |
| 2006/0069749 A1 | 3/2006 | Herz et al. |
| 2006/0072724 A1 | 4/2006 | Cohen et al. |
| 2006/0074750 A1 | 4/2006 | Clark et al. |
| 2006/0074853 A1 | 4/2006 | Liu et al. |
| 2006/0075032 A1 | 4/2006 | Jain et al. |
| 2006/0075252 A1 | 4/2006 | Kallahalla et al. |
| 2006/0075327 A1 | 4/2006 | Sriver |
| 2006/0075508 A1 | 4/2006 | Guo et al. |
| 2006/0080356 A1 | 4/2006 | Burges et al. |
| 2006/0081714 A1 | 4/2006 | King et al. |
| 2006/0082591 A1 | 4/2006 | Emerson et al. |
| 2006/0083217 A1 | 4/2006 | Bae |
| 2006/0085392 A1 | 4/2006 | Wang et al. |
| 2006/0085408 A1 | 4/2006 | Morsa |
| 2006/0085419 A1 | 4/2006 | Rosen |
| 2006/0085477 A1 | 4/2006 | Phillips et al. |
| 2006/0085517 A1 | 4/2006 | Kaurila |
| 2006/0085816 A1 | 4/2006 | Funk et al. |
| 2006/0085825 A1 | 4/2006 | Istvan et al. |
| 2006/0089876 A1 | 4/2006 | Boys |
| 2006/0090084 A1 | 4/2006 | Buer |
| 2006/0090186 A1 | 4/2006 | Santangelo et al. |
| 2006/0093971 A1 | 5/2006 | Liu et al. |
| 2006/0095516 A1 | 5/2006 | Wijeratne |
| 2006/0095538 A1 | 5/2006 | Rehman et al. |
| 2006/0098900 A1 | 5/2006 | King et al. |
| 2006/0100978 A1 | 5/2006 | Heller et al. |
| 2006/0101285 A1 | 5/2006 | Chen et al. |
| 2006/0101514 A1 | 5/2006 | Milener et al. |
| 2006/0103665 A1 | 5/2006 | Opala et al. |
| 2006/0103893 A1 | 5/2006 | Azimi et al. |
| 2006/0104515 A1 | 5/2006 | King et al. |
| 2006/0109266 A1 | 5/2006 | Itkowitz et al. |
| 2006/0111970 A1 | 5/2006 | Hill et al. |
| 2006/0112098 A1 | 5/2006 | Renshaw et al. |
| 2006/0112410 A1 | 5/2006 | Poli et al. |
| 2006/0114451 A1 | 6/2006 | Wang et al. |
| 2006/0116924 A1 | 6/2006 | Angles et al. |
| 2006/0119900 A1 | 6/2006 | King et al. |
| 2006/0122983 A1 | 6/2006 | King et al. |
| 2006/0123053 A1 | 6/2006 | Scannell, Jr. |
| 2006/0124496 A1 | 6/2006 | Gasque |
| 2006/0129313 A1 | 6/2006 | Becker et al. |
| 2006/0129605 A1 | 6/2006 | Doshi |
| 2006/0132349 A1 | 6/2006 | Stern et al. |
| 2006/0136629 A1 | 6/2006 | King et al. |
| 2006/0136720 A1 | 6/2006 | Armstrong et al. |
| 2006/0136910 A1 | 6/2006 | Brickell et al. |
| 2006/0136911 A1 | 6/2006 | Robinson et al. |
| 2006/0136966 A1 | 6/2006 | Folk |
| 2006/0138219 A1 | 6/2006 | Brzezniak et al. |
| 2006/0143650 A1 | 6/2006 | Tanikawa et al. |
| 2006/0146169 A1 | 7/2006 | Segman |

(56) References Cited

U.S. PATENT DOCUMENTS

| | | |
|---|---|---|
| 2006/0146766 A1 | 7/2006 | Nakajima et al. |
| 2006/0150249 A1 | 7/2006 | Gassen et al. |
| 2006/0155398 A1 | 7/2006 | Hoffberg et al. |
| 2006/0155735 A1 | 7/2006 | Traut et al. |
| 2006/0156336 A1 | 7/2006 | Knudson et al. |
| 2006/0161671 A1 | 7/2006 | Ryman et al. |
| 2006/0161829 A1 | 7/2006 | Kobayashi |
| 2006/0161894 A1 | 7/2006 | Oustiougov et al. |
| 2006/0165571 A1 | 7/2006 | Seon |
| 2006/0167747 A1 | 7/2006 | Goodman et al. |
| 2006/0167784 A1 | 7/2006 | Hoffberg |
| 2006/0168591 A1 | 7/2006 | Hunsinger et al. |
| 2006/0173838 A1 | 8/2006 | Garg et al. |
| 2006/0173859 A1 | 8/2006 | Kim et al. |
| 2006/0173910 A1 | 8/2006 | McLaughlin |
| 2006/0173916 A1 | 8/2006 | Verbeck Sibley et al. |
| 2006/0173985 A1 | 8/2006 | Moore |
| 2006/0178822 A1 | 8/2006 | Lee |
| 2006/0179476 A1 | 8/2006 | Challener et al. |
| 2006/0184508 A1 | 8/2006 | Fuselier et al. |
| 2006/0184579 A1 | 8/2006 | Mills et al. |
| 2006/0184937 A1 | 8/2006 | Abels et al. |
| 2006/0193471 A1 | 8/2006 | Stehle |
| 2006/0195438 A1 | 8/2006 | Galuten |
| 2006/0195462 A1 | 8/2006 | Rogers |
| 2006/0195513 A1 | 8/2006 | Rogers et al. |
| 2006/0195514 A1 | 8/2006 | Rogers et al. |
| 2006/0195515 A1 | 8/2006 | Beaupre et al. |
| 2006/0195516 A1 | 8/2006 | Beaupre |
| 2006/0195521 A1 | 8/2006 | New et al. |
| 2006/0195695 A1 | 8/2006 | Keys |
| 2006/0195789 A1 | 8/2006 | Rogers et al. |
| 2006/0195790 A1 | 8/2006 | Beaupre et al. |
| 2006/0195859 A1 | 8/2006 | Konig et al. |
| 2006/0195860 A1 | 8/2006 | Eldering et al. |
| 2006/0200253 A1 | 9/2006 | Hoffberg et al. |
| 2006/0200258 A1 | 9/2006 | Hoffberg et al. |
| 2006/0200259 A1 | 9/2006 | Hoffberg et al. |
| 2006/0200260 A1 | 9/2006 | Hoffberg et al. |
| 2006/0200780 A1 | 9/2006 | Iwema et al. |
| 2006/0206259 A1 | 9/2006 | Stiller et al. |
| 2006/0206576 A1 | 9/2006 | Obradovich et al. |
| 2006/0206715 A1 | 9/2006 | Cowan et al. |
| 2006/0206811 A1 | 9/2006 | Dowdy |
| 2006/0206900 A1 | 9/2006 | Ooyama et al. |
| 2006/0206931 A1 | 9/2006 | Dillaway et al. |
| 2006/0209021 A1 | 9/2006 | Yoo et al. |
| 2006/0209957 A1 | 9/2006 | Riemens et al. |
| 2006/0212330 A1 | 9/2006 | Savilampi |
| 2006/0212347 A1 | 9/2006 | Fang et al. |
| 2006/0212350 A1 | 9/2006 | Ellis et al. |
| 2006/0212401 A1 | 9/2006 | Ameerally et al. |
| 2006/0212558 A1 | 9/2006 | Sahinoja et al. |
| 2006/0212562 A1 | 9/2006 | Kushwaha et al. |
| 2006/0212894 A1 | 9/2006 | Knudson et al. |
| 2006/0218187 A1 | 9/2006 | Plastina et al. |
| 2006/0218536 A1 | 9/2006 | Kirilline et al. |
| 2006/0218544 A1 | 9/2006 | Chakraborty et al. |
| 2006/0224895 A1 | 10/2006 | Mayer |
| 2006/0225065 A1 | 10/2006 | Chandhok et al. |
| 2006/0227945 A1 | 10/2006 | Runge et al. |
| 2006/0229940 A1 | 10/2006 | Grossman |
| 2006/0230141 A1 | 10/2006 | Willis |
| 2006/0234639 A1 | 10/2006 | Kushwaha et al. |
| 2006/0234698 A1 | 10/2006 | Fok et al. |
| 2006/0235816 A1 | 10/2006 | Yang et al. |
| 2006/0236257 A1 | 10/2006 | Othmer et al. |
| 2006/0236408 A1 | 10/2006 | Yan |
| 2006/0239579 A1 | 10/2006 | Ritter |
| 2006/0242139 A1 | 10/2006 | Butterfield et al. |
| 2006/0242178 A1 | 10/2006 | Butterfield et al. |
| 2006/0242259 A1 | 10/2006 | Vallabh et al. |
| 2006/0242667 A1 | 10/2006 | Petersen et al. |
| 2006/0242703 A1 | 10/2006 | Abeni |
| 2006/0248209 A1 | 11/2006 | Chiu et al. |
| 2006/0253323 A1 | 11/2006 | Phan et al. |
| 2006/0253330 A1 | 11/2006 | Maggio et al. |
| 2006/0253874 A1 | 11/2006 | Stark et al. |
| 2006/0256371 A1 | 11/2006 | King et al. |
| 2006/0258368 A1 | 11/2006 | Granito et al. |
| 2006/0259240 A1 | 11/2006 | Hashimoto |
| 2006/0259592 A1 | 11/2006 | Angeline |
| 2006/0259783 A1 | 11/2006 | Work et al. |
| 2006/0259889 A1 | 11/2006 | Crosetto |
| 2006/0265503 A1 | 11/2006 | Jones et al. |
| 2006/0265733 A1 | 11/2006 | Chen et al. |
| 2006/0265734 A1 | 11/2006 | Chen et al. |
| 2006/0266839 A1 | 11/2006 | Yavid et al. |
| 2006/0268667 A1 | 11/2006 | Jellison, Jr. et al. |
| 2006/0271395 A1 | 11/2006 | Harris et al. |
| 2006/0274060 A1 | 12/2006 | Ni et al. |
| 2006/0274828 A1 | 12/2006 | Siemens et al. |
| 2006/0277098 A1 | 12/2006 | Chung et al. |
| 2006/0277574 A1 | 12/2006 | Schein et al. |
| 2006/0282311 A1 | 12/2006 | Jiang |
| 2006/0282455 A1 | 12/2006 | Lee et al. |
| 2006/0283952 A1 | 12/2006 | Wang |
| 2006/0288044 A1 | 12/2006 | Kashiwagi et al. |
| 2006/0288366 A1 | 12/2006 | Boylan, III et al. |
| 2006/0288367 A1 | 12/2006 | Swix et al. |
| 2006/0294421 A1 | 12/2006 | Schneider |
| 2006/0294566 A1 | 12/2006 | Zlattner |
| 2006/0294575 A1 | 12/2006 | Rogers |
| 2007/0009245 A1 | 1/2007 | Ito |
| 2007/0013560 A1 | 1/2007 | Casey |
| 2007/0014536 A1 | 1/2007 | Hellman |
| 2007/0015519 A1 | 1/2007 | Casey |
| 2007/0016476 A1 | 1/2007 | Hoffberg et al. |
| 2007/0016507 A1 | 1/2007 | Tzara |
| 2007/0016926 A1 | 1/2007 | Ward, III et al. |
| 2007/0026854 A1 | 2/2007 | Nath et al. |
| 2007/0027771 A1 | 2/2007 | Collins et al. |
| 2007/0030539 A1 | 2/2007 | Nath et al. |
| 2007/0033613 A1 | 2/2007 | Ward, III et al. |
| 2007/0038931 A1 | 2/2007 | Allaire et al. |
| 2007/0042765 A1 | 2/2007 | Bailin et al. |
| 2007/0043766 A1 | 2/2007 | Nicholas et al. |
| 2007/0043829 A1 | 2/2007 | Dua |
| 2007/0043860 A1 | 2/2007 | Pabari |
| 2007/0050254 A1 | 3/2007 | Driscoll |
| 2007/0050409 A1 | 3/2007 | Bugir et al. |
| 2007/0050673 A1 | 3/2007 | DiBartolomeo et al. |
| 2007/0050712 A1 | 3/2007 | Hull et al. |
| 2007/0050842 A1 | 3/2007 | Smith et al. |
| 2007/0051217 A1 | 3/2007 | Weber |
| 2007/0053513 A1 | 3/2007 | Hoffberg |
| 2007/0054677 A1 | 3/2007 | Himmelstein |
| 2007/0055980 A1 | 3/2007 | Megeid et al. |
| 2007/0060056 A1 | 3/2007 | Whitaker et al. |
| 2007/0061022 A1 | 3/2007 | Hoffberg-Borghesani et al. |
| 2007/0061023 A1 | 3/2007 | Hoffberg et al. |
| 2007/0061146 A1 | 3/2007 | Jaramillo et al. |
| 2007/0061487 A1 | 3/2007 | Moore et al. |
| 2007/0061735 A1 | 3/2007 | Hoffberg et al. |
| 2007/0063875 A1 | 3/2007 | Hoffberg |
| 2007/0066287 A1 | 3/2007 | Papulov |
| 2007/0067104 A1 | 3/2007 | Mays |
| 2007/0067267 A1 | 3/2007 | Ives |
| 2007/0067775 A1 | 3/2007 | Shultz et al. |
| 2007/0068708 A1 | 3/2007 | Marks |
| 2007/0070038 A1 | 3/2007 | Hoffberg et al. |
| 2007/0072591 A1 | 3/2007 | McGary et al. |
| 2007/0073583 A1 | 3/2007 | Grouf et al. |
| 2007/0073641 A1 | 3/2007 | Perry et al. |
| 2007/0073756 A1 | 3/2007 | Manhas et al. |
| 2007/0074214 A1 | 3/2007 | Ueno et al. |
| 2007/0075622 A1 | 4/2007 | Guo et al. |
| 2007/0078706 A1 | 4/2007 | Datta et al. |
| 2007/0078712 A1 | 4/2007 | Ott, IV et al. |
| 2007/0078714 A1 | 4/2007 | Ott, IV et al. |
| 2007/0078989 A1 | 4/2007 | van Datta et al. |
| 2007/0079326 A1 | 4/2007 | van Datta et al. |
| 2007/0079331 A1 | 4/2007 | van Datta et al. |
| 2007/0079335 A1 | 4/2007 | McDonough |

(56) References Cited

U.S. PATENT DOCUMENTS

| | | |
|---|---|---|
| 2007/0082678 A1 | 4/2007 | Himmelstein |
| 2007/0083611 A1 | 4/2007 | Farago et al. |
| 2007/0084807 A1 | 4/2007 | Holmes et al. |
| 2007/0086061 A1 | 4/2007 | Robbins |
| 2007/0087756 A1 | 4/2007 | Hoffberg |
| 2007/0088852 A1 | 4/2007 | Levkovitz |
| 2007/0089151 A1 | 4/2007 | Moore et al. |
| 2007/0092053 A1 | 4/2007 | Sato |
| 2007/0094081 A1 | 4/2007 | Yruski et al. |
| 2007/0094082 A1 | 4/2007 | Yruski et al. |
| 2007/0094083 A1 | 4/2007 | Yruski et al. |
| 2007/0094363 A1 | 4/2007 | Yruski et al. |
| 2007/0100690 A1 | 5/2007 | Hopkins |
| 2007/0100956 A1 | 5/2007 | Kumar |
| 2007/0101360 A1 | 5/2007 | Gutta et al. |
| 2007/0106681 A1 | 5/2007 | Haot et al. |
| 2007/0107010 A1 | 5/2007 | Jolna et al. |
| 2007/0112762 A1 | 5/2007 | Brubaker |
| 2007/0115868 A1 | 5/2007 | Chen et al. |
| 2007/0115897 A1 | 5/2007 | Chen et al. |
| 2007/0118425 A1 | 5/2007 | Yruski et al. |
| 2007/0118546 A1 | 5/2007 | Acharya |
| 2007/0121843 A1 | 5/2007 | Atazky et al. |
| 2007/0126874 A1 | 6/2007 | Kake |
| 2007/0130012 A1 | 6/2007 | Yruski et al. |
| 2007/0130137 A1 | 6/2007 | Oliver et al. |
| 2007/0130232 A1 | 6/2007 | Therrien et al. |
| 2007/0130594 A1 | 6/2007 | Hidary et al. |
| 2007/0134193 A1 | 6/2007 | Pauly et al. |
| 2007/0136048 A1 | 6/2007 | Richardson-Bunbury et al. |
| 2007/0136235 A1 | 6/2007 | Hess |
| 2007/0136256 A1 | 6/2007 | Kapur et al. |
| 2007/0136264 A1 | 6/2007 | Tran |
| 2007/0136689 A1 | 6/2007 | Richardson-Bunbury et al. |
| 2007/0141020 A1 | 6/2007 | Barritault et al. |
| 2007/0143345 A1 | 6/2007 | Jones et al. |
| 2007/0146812 A1 | 6/2007 | Lawton |
| 2007/0150168 A1 | 6/2007 | Balcom et al. |
| 2007/0150359 A1 | 6/2007 | Lim et al. |
| 2007/0150919 A1 | 6/2007 | Morishita |
| 2007/0155411 A1 | 7/2007 | Morrison |
| 2007/0156677 A1 | 7/2007 | Szabo |
| 2007/0157242 A1 | 7/2007 | Cordray et al. |
| 2007/0159455 A1 | 7/2007 | Lin |
| 2007/0161382 A1 | 7/2007 | Melinger et al. |
| 2007/0162850 A1 | 7/2007 | Adler et al. |
| 2007/0162945 A1 | 7/2007 | Mills |
| 2007/0167226 A1 | 7/2007 | Kelly et al. |
| 2007/0168430 A1 | 7/2007 | Brun et al. |
| 2007/0169121 A1 | 7/2007 | Hunt et al. |
| 2007/0173266 A1 | 7/2007 | Barnes, Jr. |
| 2007/0174471 A1 | 7/2007 | Van Rossum |
| 2007/0179792 A1 | 8/2007 | Kramer |
| 2007/0179987 A1 | 8/2007 | Lim |
| 2007/0180493 A1 | 8/2007 | Croft et al. |
| 2007/0185599 A1 | 8/2007 | Robinson et al. |
| 2007/0190506 A1 | 8/2007 | Jeng et al. |
| 2007/0192299 A1 | 8/2007 | Zuckerberg et al. |
| 2007/0192329 A1 | 8/2007 | Croft et al. |
| 2007/0192839 A1 | 8/2007 | Fee et al. |
| 2007/0194119 A1 | 8/2007 | Vinogradov et al. |
| 2007/0198506 A1 | 8/2007 | Attaran Rezaei et al. |
| 2007/0198563 A1 | 8/2007 | Apparao et al. |
| 2007/0198612 A1 | 8/2007 | Prahlad et al. |
| 2007/0198656 A1 | 8/2007 | Mazzaferri et al. |
| 2007/0203591 A1 | 8/2007 | Bowerman |
| 2007/0203790 A1 | 8/2007 | Torrens et al. |
| 2007/0204266 A1 | 8/2007 | Beaty et al. |
| 2007/0204308 A1 | 8/2007 | Nicholas et al. |
| 2007/0207797 A1 | 9/2007 | Pitt et al. |
| 2007/0208561 A1 | 9/2007 | Choi et al. |
| 2007/0208685 A1 | 9/2007 | Blumenau |
| 2007/0208732 A1 | 9/2007 | Flowers et al. |
| 2007/0214133 A1 | 9/2007 | Liberty et al. |
| 2007/0214408 A1 | 9/2007 | Straub et al. |
| 2007/0219708 A1 | 9/2007 | Brasche et al. |
| 2007/0219940 A1 | 9/2007 | Mueller et al. |
| 2007/0228306 A1 | 10/2007 | Gannon et al. |
| 2007/0233585 A1 | 10/2007 | Ben Simon et al. |
| 2007/0233806 A1 | 10/2007 | Asadi |
| 2007/0238076 A1 | 10/2007 | Burstein et al. |
| 2007/0239348 A1 | 10/2007 | Cheung |
| 2007/0239517 A1 | 10/2007 | Chung et al. |
| 2007/0240079 A1 | 10/2007 | Flynt et al. |
| 2007/0244760 A1 | 10/2007 | Bodnar et al. |
| 2007/0244880 A1 | 10/2007 | Martin et al. |
| 2007/0249406 A1 | 10/2007 | Andreasson |
| 2007/0250761 A1 | 10/2007 | Bradley et al. |
| 2007/0259653 A1 | 11/2007 | Tang et al. |
| 2007/0259716 A1 | 11/2007 | Mattice et al. |
| 2007/0260508 A1 | 11/2007 | Barry et al. |
| 2007/0260604 A1 | 11/2007 | Haeuser et al. |
| 2007/0263932 A1 | 11/2007 | Bernardin et al. |
| 2007/0271286 A1 | 11/2007 | Purang et al. |
| 2007/0271297 A1 | 11/2007 | Jaffe et al. |
| 2007/0271340 A1 | 11/2007 | Goodman et al. |
| 2007/0271582 A1 | 11/2007 | Ellis et al. |
| 2007/0271610 A1 | 11/2007 | Grobman |
| 2007/0273758 A1 | 11/2007 | Mendoza et al. |
| 2007/0276940 A1 | 11/2007 | Abraham et al. |
| 2007/0279494 A1 | 12/2007 | Aman et al. |
| 2007/0279711 A1 | 12/2007 | King et al. |
| 2007/0282621 A1 | 12/2007 | Altman et al. |
| 2007/0282675 A1 | 12/2007 | Varghese |
| 2007/0288228 A1 | 12/2007 | Taillefer et al. |
| 2007/0288278 A1 | 12/2007 | Alexander et al. |
| 2007/0288310 A1 | 12/2007 | Boos et al. |
| 2007/0288589 A1 | 12/2007 | Chen et al. |
| 2007/0294096 A1 | 12/2007 | Randall et al. |
| 2007/0294689 A1 | 12/2007 | Garney |
| 2007/0294740 A1 | 12/2007 | Drake et al. |
| 2007/0299935 A1 | 12/2007 | Plastina et al. |
| 2007/0300142 A1 | 12/2007 | King et al. |
| 2008/0002074 A1 | 1/2008 | Lee et al. |
| 2008/0004802 A1 | 1/2008 | Horvitz |
| 2008/0004948 A1 | 1/2008 | Flake et al. |
| 2008/0004990 A1 | 1/2008 | Flake et al. |
| 2008/0005264 A1 | 1/2008 | Brunell et al. |
| 2008/0005313 A1 | 1/2008 | Flake et al. |
| 2008/0005651 A1 | 1/2008 | Grefenstette et al. |
| 2008/0010206 A1 | 1/2008 | Coleman |
| 2008/0010655 A1 | 1/2008 | Ellis et al. |
| 2008/0011829 A1 | 1/2008 | Roth |
| 2008/0013429 A1 | 1/2008 | Chen et al. |
| 2008/0014255 A1 | 1/2008 | Tagawa et al. |
| 2008/0015748 A1 | 1/2008 | Nagy |
| 2008/0016187 A1 | 1/2008 | Neil et al. |
| 2008/0021957 A1 | 1/2008 | Medved et al. |
| 2008/0022054 A1 | 1/2008 | Hertzberg et al. |
| 2008/0023550 A1 | 1/2008 | Yu et al. |
| 2008/0026804 A1 | 1/2008 | Baray et al. |
| 2008/0026838 A1 | 1/2008 | Dunstan et al. |
| 2008/0027881 A1 | 1/2008 | Bisse |
| 2008/0028031 A1 | 1/2008 | Bailey et al. |
| 2008/0028674 A1 | 2/2008 | Jackson et al. |
| 2008/0031213 A1 | 2/2008 | Kaiser et al. |
| 2008/0031625 A1 | 2/2008 | Okuda et al. |
| 2008/0033897 A1 | 2/2008 | Lloyd |
| 2008/0040283 A1 | 2/2008 | Morris |
| 2008/0040749 A1 | 2/2008 | Hoffberg et al. |
| 2008/0046298 A1 | 2/2008 | Ben-Yehuda et al. |
| 2008/0046317 A1 | 2/2008 | Christianson et al. |
| 2008/0046417 A1 | 2/2008 | Jeffery et al. |
| 2008/0046592 A1 | 2/2008 | Gilhuly et al. |
| 2008/0046948 A1 | 2/2008 | Verosub |
| 2008/0065471 A1 | 3/2008 | Reynolds et al. |
| 2008/0070588 A1 | 3/2008 | Morin |
| 2008/0071136 A1 | 3/2008 | Oohashi et al. |
| 2008/0071775 A1 | 3/2008 | Gross |
| 2008/0072134 A1 | 3/2008 | Balakrishnan et al. |
| 2008/0072874 A1 | 3/2008 | Baeuerle |
| 2008/0077264 A1 | 3/2008 | Irvin et al. |
| 2008/0082467 A1 | 4/2008 | Meijer et al. |
| 2008/0082903 A1 | 4/2008 | McCurdy et al. |

(56) References Cited

U.S. PATENT DOCUMENTS

| | | |
|---|---|---|
| 2008/0085135 A1 | 4/2008 | Rieck |
| 2008/0085915 A1 | 4/2008 | Becker et al. |
| 2008/0086356 A1 | 4/2008 | Glassman et al. |
| 2008/0086431 A1 | 4/2008 | Robinson et al. |
| 2008/0086948 A1 | 4/2008 | Schussler et al. |
| 2008/0088228 A1 | 4/2008 | Noguchi et al. |
| 2008/0090591 A1 | 4/2008 | Miller et al. |
| 2008/0091528 A1 | 4/2008 | Rampell et al. |
| 2008/0091537 A1 | 4/2008 | Miller et al. |
| 2008/0091796 A1 | 4/2008 | Story et al. |
| 2008/0091954 A1 | 4/2008 | Morris et al. |
| 2008/0092140 A1 | 4/2008 | Doninger et al. |
| 2008/0093460 A1 | 4/2008 | Frantz et al. |
| 2008/0096664 A1 | 4/2008 | Baray et al. |
| 2008/0097872 A1 | 4/2008 | Peckover |
| 2008/0102911 A1 | 5/2008 | Campbell et al. |
| 2008/0104061 A1 | 5/2008 | Rezaei |
| 2008/0104106 A1 | 5/2008 | Rosenberg et al. |
| 2008/0104227 A1 | 5/2008 | Birnie et al. |
| 2008/0109761 A1 | 5/2008 | Stambaugh |
| 2008/0109843 A1 | 5/2008 | Ullah |
| 2008/0109844 A1 | 5/2008 | Baldeschwieler et al. |
| 2008/0114642 A1 | 5/2008 | Goldberg et al. |
| 2008/0114751 A1 | 5/2008 | Cramer et al. |
| 2008/0117202 A1 | 5/2008 | Martinez et al. |
| 2008/0119212 A1 | 5/2008 | Himmelstein |
| 2008/0120183 A1 | 5/2008 | Park |
| 2008/0120308 A1 | 5/2008 | Martinez et al. |
| 2008/0120690 A1 | 5/2008 | Norlander et al. |
| 2008/0126415 A1 | 5/2008 | Chaudhury et al. |
| 2008/0126439 A1 | 5/2008 | Kaminsky |
| 2008/0126565 A1 | 5/2008 | Osano et al. |
| 2008/0126960 A1 | 5/2008 | Naaman et al. |
| 2008/0126961 A1 | 5/2008 | Naaman et al. |
| 2008/0127121 A1 | 5/2008 | Fenton et al. |
| 2008/0127244 A1 | 5/2008 | Zhang |
| 2008/0133540 A1 | 6/2008 | Hubbard et al. |
| 2008/0133601 A1 | 6/2008 | Martin Cervera et al. |
| 2008/0133750 A1 | 6/2008 | Grabarnik et al. |
| 2008/0134239 A1 | 6/2008 | Knowles et al. |
| 2008/0137971 A1 | 6/2008 | King et al. |
| 2008/0140239 A1 | 6/2008 | Rosenberg et al. |
| 2008/0140717 A1 | 6/2008 | Rosenberg et al. |
| 2008/0141117 A1 | 6/2008 | King et al. |
| 2008/0141372 A1 | 6/2008 | Massey et al. |
| 2008/0146248 A1 | 6/2008 | Himmelstein |
| 2008/0147655 A1 | 6/2008 | Sinha et al. |
| 2008/0147743 A1 | 6/2008 | Taylor et al. |
| 2008/0148175 A1 | 6/2008 | Naaman et al. |
| 2008/0152191 A1 | 6/2008 | Fujimura et al. |
| 2008/0153564 A1 | 6/2008 | Baerlocher et al. |
| 2008/0154720 A1 | 6/2008 | Gounares et al. |
| 2008/0155588 A1 | 6/2008 | Roberts et al. |
| 2008/0155602 A1 | 6/2008 | Collet et al. |
| 2008/0161018 A1 | 7/2008 | Miller et al. |
| 2008/0163284 A1 | 7/2008 | Martinez et al. |
| 2008/0170674 A1 | 7/2008 | Ozden et al. |
| 2008/0172365 A1 | 7/2008 | Ozden et al. |
| 2008/0172632 A1 | 7/2008 | Stambaugh |
| 2008/0177706 A1 | 7/2008 | Yuen |
| 2008/0177825 A1 | 7/2008 | Dubinko et al. |
| 2008/0178221 A1 | 7/2008 | Schein et al. |
| 2008/0184225 A1 | 7/2008 | Fitzgerald et al. |
| 2008/0184304 A1 | 7/2008 | Ellis et al. |
| 2008/0184308 A1 | 7/2008 | Herrington et al. |
| 2008/0184312 A1 | 7/2008 | Schein et al. |
| 2008/0184313 A1 | 7/2008 | Knudson et al. |
| 2008/0184322 A1 | 7/2008 | Blake |
| 2008/0189742 A1 | 8/2008 | Ellis et al. |
| 2008/0189743 A1 | 8/2008 | Ellis et al. |
| 2008/0192005 A1 | 8/2008 | Elgoyhen et al. |
| 2008/0195664 A1 | 8/2008 | Maharajh et al. |
| 2008/0199042 A1 | 8/2008 | Smith |
| 2008/0207137 A1 | 8/2008 | Maharajh et al. |
| 2008/0219502 A1 | 9/2008 | Shamaie |
| 2008/0220855 A1 | 9/2008 | Chen et al. |
| 2008/0221487 A1 | 9/2008 | Zohar et al. |
| 2008/0222166 A1 | 9/2008 | Hultgren et al. |
| 2008/0225041 A1 | 9/2008 | El Dokor et al. |
| 2008/0235093 A1 | 9/2008 | Uland |
| 2008/0235725 A1 | 9/2008 | Hendricks |
| 2008/0244579 A1 | 10/2008 | Muller |
| 2008/0255989 A1 | 10/2008 | Altberg et al. |
| 2008/0261529 A1 | 10/2008 | Rosenblatt |
| 2008/0263600 A1 | 10/2008 | Olague et al. |
| 2008/0270221 A1 | 10/2008 | Clemens et al. |
| 2008/0270579 A1 | 10/2008 | Herz et al. |
| 2008/0274804 A1 | 11/2008 | Harrison et al. |
| 2008/0285807 A1 | 11/2008 | Lee et al. |
| 2008/0285886 A1 | 11/2008 | Allen |
| 2008/0288980 A1 | 11/2008 | Schein et al. |
| 2008/0289023 A1 | 11/2008 | Wardrop |
| 2008/0301250 A1 | 12/2008 | Hardy et al. |
| 2008/0307066 A1 | 12/2008 | Amidon et al. |
| 2008/0313172 A1 | 12/2008 | King et al. |
| 2008/0320001 A1 | 12/2008 | Gaddam |
| 2009/0003796 A1 | 1/2009 | Borghesani et al. |
| 2009/0005987 A1 | 1/2009 | Vengroff et al. |
| 2009/0006336 A1 | 1/2009 | Forstall et al. |
| 2009/0012806 A1 | 1/2009 | Ricordi et al. |
| 2009/0012934 A1 | 1/2009 | Yerigan |
| 2009/0012965 A1 | 1/2009 | Franken |
| 2009/0015461 A1 | 1/2009 | Pitt et al. |
| 2009/0017919 A1 | 1/2009 | Brennan |
| 2009/0018990 A1 | 1/2009 | Moraleda |
| 2009/0024504 A1 | 1/2009 | Lerman et al. |
| 2009/0024510 A1 | 1/2009 | Chen et al. |
| 2009/0024592 A1 | 1/2009 | Lazarski et al. |
| 2009/0027337 A1 | 1/2009 | Hildreth |
| 2009/0030405 A1 | 1/2009 | Quick et al. |
| 2009/0030406 A1 | 1/2009 | Hickingbotham |
| 2009/0032173 A1 | 2/2009 | Nakamura |
| 2009/0034444 A1 | 2/2009 | Wang et al. |
| 2009/0034445 A1 | 2/2009 | Prakash et al. |
| 2009/0043844 A1 | 2/2009 | Zimmet et al. |
| 2009/0044132 A1 | 2/2009 | Combel et al. |
| 2009/0044226 A1 | 2/2009 | Ellis et al. |
| 2009/0046258 A1 | 2/2009 | Schnuckle et al. |
| 2009/0051247 A1 | 2/2009 | Kakehi et al. |
| 2009/0051648 A1 | 2/2009 | Shamaie et al. |
| 2009/0055503 A1 | 2/2009 | Crivella et al. |
| 2009/0060374 A1 | 3/2009 | Wang |
| 2009/0060379 A1 | 3/2009 | Manabe |
| 2009/0060476 A1 | 3/2009 | Iwamoto et al. |
| 2009/0063254 A1 | 3/2009 | Paul et al. |
| 2009/0070186 A1 | 3/2009 | Buiten et al. |
| 2009/0070817 A1 | 3/2009 | Ellis et al. |
| 2009/0073174 A1 | 3/2009 | Berg et al. |
| 2009/0073191 A1 | 3/2009 | Smith et al. |
| 2009/0076889 A1 | 3/2009 | Jhanji |
| 2009/0076939 A1 | 3/2009 | Berg et al. |
| 2009/0076974 A1 | 3/2009 | Berg et al. |
| 2009/0077504 A1 | 3/2009 | Bell et al. |
| 2009/0077658 A1 | 3/2009 | King et al. |
| 2009/0079614 A1 | 3/2009 | Pitt et al. |
| 2009/0079813 A1 | 3/2009 | Hildreth |
| 2009/0082701 A1 | 3/2009 | Zohar et al. |
| 2009/0082950 A1 | 3/2009 | Vorona |
| 2009/0083307 A1 | 3/2009 | Martin Cervera et al. |
| 2009/0083788 A1 | 3/2009 | Russell et al. |
| 2009/0089222 A1 | 4/2009 | Ferreira De Castro et al. |
| 2009/0100052 A1 | 4/2009 | Stern et al. |
| 2009/0102838 A1 | 4/2009 | Bullard et al. |
| 2009/0103902 A1 | 4/2009 | Matsuura et al. |
| 2009/0106085 A1 | 4/2009 | Raimbeault |
| 2009/0106356 A1 | 4/2009 | Brase et al. |
| 2009/0122723 A1 | 5/2009 | Hirano et al. |
| 2009/0125517 A1 | 5/2009 | Krishnaswamy et al. |
| 2009/0132941 A1 | 5/2009 | Pilskalns et al. |
| 2009/0141933 A1 | 6/2009 | Wagg |
| 2009/0144141 A1 | 6/2009 | Dominowska et al. |
| 2009/0149046 A1 | 6/2009 | Nakamura |
| 2009/0150501 A1 | 6/2009 | Davis et al. |
| 2009/0150507 A1 | 6/2009 | Davis et al. |

(56) References Cited

U.S. PATENT DOCUMENTS

| | | |
|---|---|---|
| 2009/0156125 A1 | 6/2009 | Himmelstein |
| 2009/0156203 A1 | 6/2009 | Himmelstein |
| 2009/0164924 A1 | 6/2009 | Flake et al. |
| 2009/0164992 A1 | 6/2009 | Flake et al. |
| 2009/0164993 A1 | 6/2009 | Flake et al. |
| 2009/0165051 A1 | 6/2009 | Armaly |
| 2009/0165134 A1 | 6/2009 | Flake et al. |
| 2009/0170604 A1 | 7/2009 | Mueller et al. |
| 2009/0171939 A1 | 7/2009 | Athsani et al. |
| 2009/0177603 A1 | 7/2009 | Honisch |
| 2009/0183081 A1 | 7/2009 | Rodriguez et al. |
| 2009/0184849 A1 | 7/2009 | Nasiri et al. |
| 2009/0186704 A1 | 7/2009 | Goldberg et al. |
| 2009/0187637 A1 | 7/2009 | Wu et al. |
| 2009/0189892 A1 | 7/2009 | Desai et al. |
| 2009/0198354 A1 | 8/2009 | Wilson |
| 2009/0204481 A1 | 8/2009 | Navar et al. |
| 2009/0204484 A1 | 8/2009 | Johnson |
| 2009/0204672 A1 | 8/2009 | Jetha et al. |
| 2009/0204676 A1 | 8/2009 | Parkinson et al. |
| 2009/0210415 A1 | 8/2009 | Martin et al. |
| 2009/0216606 A1 | 8/2009 | Coffman et al. |
| 2009/0221275 A1 | 9/2009 | Trip |
| 2009/0221368 A1 | 9/2009 | Yen et al. |
| 2009/0222302 A1 | 9/2009 | Higgins et al. |
| 2009/0222303 A1 | 9/2009 | Higgins et al. |
| 2009/0222304 A1 | 9/2009 | Higgins et al. |
| 2009/0228841 A1 | 9/2009 | Hildreth |
| 2009/0231278 A1 | 9/2009 | St. Hilaire et al. |
| 2009/0234814 A1 | 9/2009 | Boerries et al. |
| 2009/0234909 A1 | 9/2009 | Strandell et al. |
| 2009/0241144 A1 | 9/2009 | LaJoie et al. |
| 2009/0247219 A1 | 10/2009 | Lin et al. |
| 2009/0249482 A1 | 10/2009 | Sarathy |
| 2009/0265431 A1 | 10/2009 | Jania et al. |
| 2009/0276369 A1 | 11/2009 | Mabry et al. |
| 2009/0281997 A1 | 11/2009 | Jain |
| 2009/0282458 A1 | 11/2009 | Hjelm |
| 2009/0297124 A1 | 12/2009 | Ng |
| 2009/0299837 A1 | 12/2009 | Steelberg et al. |
| 2009/0304009 A1 | 12/2009 | Kolhi et al. |
| 2009/0311994 A1 | 12/2009 | Himmelstein |
| 2009/0311995 A1 | 12/2009 | Himmelstein |
| 2009/0313461 A1 | 12/2009 | Klug |
| 2009/0313546 A1 | 12/2009 | Katpelly et al. |
| 2009/0319462 A1 | 12/2009 | Tirpak et al. |
| 2009/0320047 A1 | 12/2009 | Khan et al. |
| 2009/0323519 A1 | 12/2009 | Pun |
| 2009/0324008 A1 | 12/2009 | Kongqiao et al. |
| 2009/0328087 A1 | 12/2009 | Higgins et al. |
| 2010/0000497 A1 | 1/2010 | Lee et al. |
| 2010/0000498 A1 | 1/2010 | Middlebrook et al. |
| 2010/0000499 A1 | 1/2010 | Braun et al. |
| 2010/0002635 A1 | 1/2010 | Eklund |
| 2010/0014444 A1 | 1/2010 | Ghanadan et al. |
| 2010/0020797 A1 | 1/2010 | Casey et al. |
| 2010/0022310 A1 | 1/2010 | van Datta et al. |
| 2010/0026063 A1 | 2/2010 | Mosler et al. |
| 2010/0027254 A1 | 2/2010 | Nakayama |
| 2010/0027255 A1 | 2/2010 | Chang et al. |
| 2010/0027256 A1 | 2/2010 | Kinoshita |
| 2010/0028066 A1 | 2/2010 | Thomson |
| 2010/0030640 A1 | 2/2010 | van Datta et al. |
| 2010/0043022 A1 | 2/2010 | Kaftan |
| 2010/0057290 A1 | 3/2010 | Brillhart et al. |
| 2010/0063993 A1 | 3/2010 | Higgins et al. |
| 2010/0070368 A1 | 3/2010 | Choi et al. |
| 2010/0076642 A1 | 3/2010 | Hoffberg et al. |
| 2010/0082688 A1 | 4/2010 | Davis et al. |
| 2010/0088273 A1 | 4/2010 | Donaldson |
| 2010/0092095 A1 | 4/2010 | King et al. |
| 2010/0096191 A1 | 4/2010 | Lassoie et al. |
| 2010/0096192 A1 | 4/2010 | Kawanishi |
| 2010/0096193 A1 | 4/2010 | Yilmaz et al. |
| 2010/0105244 A1 | 4/2010 | Keith et al. |
| 2010/0105245 A1 | 4/2010 | Good et al. |
| 2010/0105246 A1 | 4/2010 | Burris et al. |
| 2010/0108159 A1 | 5/2010 | Williamson |
| 2010/0115413 A1 | 5/2010 | Schein et al. |
| 2010/0115541 A1 | 5/2010 | Schein et al. |
| 2010/0118025 A1 | 5/2010 | Smith et al. |
| 2010/0121848 A1 | 5/2010 | Yaroslavskiy et al. |
| 2010/0125563 A1 | 5/2010 | Nair et al. |
| 2010/0125569 A1 | 5/2010 | Nair et al. |
| 2010/0125604 A1 | 5/2010 | Martinez et al. |
| 2010/0125605 A1 | 5/2010 | Nair et al. |
| 2010/0169910 A1 | 7/2010 | Collins et al. |
| 2010/0177970 A1 | 7/2010 | King et al. |
| 2010/0182631 A1 | 7/2010 | King et al. |
| 2010/0183246 A1 | 7/2010 | King et al. |
| 2010/0185538 A1 | 7/2010 | King et al. |
| 2010/0185620 A1 | 7/2010 | Schiller |
| 2010/0185642 A1 | 7/2010 | Higgins et al. |
| 2010/0203969 A1 | 8/2010 | Takahashi et al. |
| 2010/0211969 A1 | 8/2010 | Schein et al. |
| 2010/0214148 A1 | 8/2010 | Kuhn |
| 2010/0214149 A1 | 8/2010 | Kuhn |
| 2010/0214214 A1 | 8/2010 | Corson et al. |
| 2010/0224457 A1 | 9/2010 | Majeau |
| 2010/0228619 A1 | 9/2010 | Goldberg et al. |
| 2010/0228620 A1 | 9/2010 | Goldberg et al. |
| 2010/0235233 A1 | 9/2010 | Goldberg et al. |
| 2010/0238065 A1 | 9/2010 | Pitt et al. |
| 2010/0266210 A1 | 10/2010 | Markovic et al. |
| 2010/0269138 A1 | 10/2010 | Krikorian et al. |
| 2010/0278453 A1 | 11/2010 | King |
| 2010/0291874 A1 | 11/2010 | Himmelstein |
| 2010/0312433 A1 | 12/2010 | Preston et al. |
| 2010/0318797 A1 | 12/2010 | King et al. |
| 2011/0004669 A1 | 1/2011 | Navar et al. |
| 2011/0010545 A1 | 1/2011 | Kill et al. |
| 2011/0015975 A1 | 1/2011 | Yruski et al. |
| 2011/0016468 A1 | 1/2011 | Singh |
| 2011/0019020 A1 | 1/2011 | King et al. |
| 2011/0019919 A1 | 1/2011 | King et al. |
| 2011/0022940 A1 | 1/2011 | King et al. |
| 2011/0025842 A1 | 2/2011 | King et al. |
| 2011/0026838 A1 | 2/2011 | King et al. |
| 2011/0029383 A1 | 2/2011 | Engel et al. |
| 2011/0029443 A1 | 2/2011 | King et al. |
| 2011/0029504 A1 | 2/2011 | King et al. |
| 2011/0030027 A1 | 2/2011 | Nishioka et al. |
| 2011/0033080 A1 | 2/2011 | King et al. |
| 2011/0035289 A1 | 2/2011 | King et al. |
| 2011/0035656 A1 | 2/2011 | King et al. |
| 2011/0035662 A1 | 2/2011 | King et al. |
| 2011/0041084 A1 | 2/2011 | Karam |
| 2011/0043652 A1 | 2/2011 | King et al. |
| 2011/0044547 A1 | 2/2011 | King et al. |
| 2011/0072012 A1 | 3/2011 | Ah-Pine et al. |
| 2011/0072395 A1 | 3/2011 | King et al. |
| 2011/0072490 A1 | 3/2011 | Chen et al. |
| 2011/0075228 A1 | 3/2011 | King et al. |
| 2011/0078585 A1 | 3/2011 | King et al. |
| 2011/0085211 A1 | 4/2011 | King et al. |
| 2011/0096174 A1 | 4/2011 | King et al. |
| 2011/0102443 A1 | 5/2011 | Dror et al. |
| 2011/0125582 A1 | 5/2011 | Datta et al. |
| 2011/0131005 A1 | 6/2011 | Ueshima et al. |
| 2011/0142371 A1 | 6/2011 | King et al. |
| 2011/0145068 A1 | 6/2011 | King et al. |
| 2011/0145102 A1 | 6/2011 | King et al. |
| 2011/0150335 A1 | 6/2011 | King et al. |
| 2011/0153653 A1 | 6/2011 | King et al. |
| 2011/0154507 A1 | 6/2011 | King et al. |
| 2011/0156896 A1 | 6/2011 | Hoffberg et al. |
| 2011/0167075 A1 | 7/2011 | King et al. |
| 2011/0173660 A1 | 7/2011 | Schein et al. |
| 2011/0197069 A9 | 8/2011 | Rodgers et al. |
| 2011/0209191 A1 | 8/2011 | Shah |
| 2011/0228791 A1 | 9/2011 | Flinta et al. |
| 2011/0234490 A1 | 9/2011 | Markovic et al. |
| 2011/0242617 A1 | 10/2011 | King et al. |
| 2011/0295842 A1 | 12/2011 | King et al. |

(56) References Cited

U.S. PATENT DOCUMENTS

| | | |
|---|---|---|
| 2011/0299125 A1 | 12/2011 | King et al. |
| 2011/0307339 A1 | 12/2011 | Russell et al. |
| 2012/0017232 A1 | 1/2012 | Hoffberg et al. |
| 2012/0036016 A1 | 2/2012 | Hoffberg et al. |
| 2012/0036532 A1 | 2/2012 | Ellis et al. |
| 2012/0041941 A1 | 2/2012 | King et al. |
| 2012/0054367 A1 | 3/2012 | Ramakrishnan et al. |
| 2012/0072274 A1 | 3/2012 | King et al. |
| 2012/0078729 A1 | 3/2012 | Goldberg et al. |
| 2012/0135805 A1 | 5/2012 | Miller, IV |
| 2012/0151577 A1 | 6/2012 | King et al. |
| 2012/0196660 A1 | 8/2012 | El Dokor et al. |
| 2012/0208510 A1 | 8/2012 | Engstrom et al. |
| 2012/0218260 A1 | 8/2012 | Rivera et al. |
| 2012/0272270 A1 | 10/2012 | Boyer et al. |
| 2013/0232000 A1 | 9/2013 | van Datta et al. |
| 2013/0232001 A1 | 9/2013 | van Datta et al. |

FOREIGN PATENT DOCUMENTS

| | | | | |
|---|---|---|---|---|
| CA | 1298903 | | 4/1992 | |
| CA | 2245963 | | 2/2000 | |
| DE | 3125161 | | 1/1983 | |
| DE | 3310111 | | 9/1984 | |
| DE | 3419156 | | 11/1985 | |
| DE | 4035979 | | 6/1991 | |
| DE | 4123097 | | 1/1992 | |
| DE | 4237987 | | 5/1994 | |
| DE | 19743137 | | 4/1999 | |
| DE | 19922608 | | 11/2000 | |
| DE | 19931161 | | 1/2001 | |
| EP | 0059120 | | 9/1982 | |
| EP | 0155776 | | 9/1985 | |
| EP | 0158214 | | 10/1985 | |
| EP | 0181012 | | 5/1986 | |
| EP | 0290725 | | 11/1988 | |
| EP | 0295678 | | 12/1988 | |
| EP | 0323230 | | 7/1989 | |
| EP | 0323246 | | 7/1989 | |
| EP | 0348528 | | 1/1990 | |
| EP | 0379198 | | 7/1990 | |
| EP | 0441576 | | 8/1991 | |
| EP | 0444738 | | 9/1991 | |
| EP | 0501058 | | 9/1992 | |
| EP | 0512789 | | 11/1992 | |
| EP | 0718614 | | 6/1996 | |
| EP | 0748727 | | 12/1996 | |
| EP | 0750406 | | 12/1996 | |
| EP | 0785535 | | 7/1997 | |
| EP | 0814393 | | 12/1997 | |
| EP | 0841648 | | 5/1998 | |
| EP | 0921411 | | 6/1999 | |
| EP | 1099341 | | 5/2001 | |
| EP | 1213919 | | 6/2002 | |
| FR | 2554612 | | 5/1985 | |
| FR | 2717251 A1 * | | 9/1995 | ............. F24D 19/10 |
| GB | 2079453 | | 1/1982 | |
| GB | 2126040 | | 3/1984 | |
| GB | 2238870 | | 6/1991 | |
| GB | 2256987 | | 12/1992 | |
| GB | 2261977 | | 6/1993 | |
| JP | 07294405 A * | | 11/1995 | ............... G01N 5/02 |
| JP | 2000207691 | | 7/2000 | |
| JP | 2000267564 | | 9/2000 | |
| JP | 2001041753 | | 2/2001 | |
| JP | 2001089414 | | 4/2001 | |
| JP | 2001127047 | | 5/2001 | |
| JP | 2001173815 | | 6/2001 | |
| JP | 2002004285 | | 1/2002 | |
| JP | 2002103584 | | 4/2002 | |
| JP | 2002212713 | | 7/2002 | |
| JP | 2003137679 | | 5/2003 | |
| JP | 2003150699 | | 5/2003 | |
| JP | 2003245075 | | 9/2003 | |
| JP | 2003245076 | | 9/2003 | |
| JP | 2005010775 | | 1/2005 | |
| JP | 2008287386 | | 11/2008 | |
| JP | 2010243438 | | 10/2010 | |
| JP | 2011030299 | | 2/2011 | |
| JP | 2011036300 | | 2/2011 | |
| JP | 2012072656 | | 4/2012 | |
| WO | WO9214215 | | 8/1992 | |
| WO | WO9219078 | | 10/1992 | |
| WO | WO9221001 | | 11/1992 | |
| WO | WO9500860 | | 1/1995 | |
| WO | WO9522131 | | 8/1995 | |
| WO | WO 9620369 A1 * | | 7/1996 | ............... F21S 9/00 |
| WO | WO9624229 | | 8/1996 | |
| WO | WO9722066 | | 6/1997 | |
| WO | WO9723973 | | 7/1997 | |
| WO | WO9726061 | | 7/1997 | |
| WO | WO9729373 | | 8/1997 | |
| WO | WO9917477 | | 4/1999 | |
| WO | WO9957662 | | 11/1999 | |
| WO | WO9965183 | | 12/1999 | |
| WO | WO0029948 | | 5/2000 | |
| WO | WO0040038 | | 7/2000 | |
| WO | WO0054237 | | 9/2000 | |
| WO | WO0130061 | | 4/2001 | |
| WO | WO2004054264 | | 6/2004 | |
| WO | WO2005091626 | | 9/2005 | |
| WO | WO2005122013 | | 12/2005 | |
| WO | WO2006074305 | | 7/2006 | |
| WO | WO2006116196 | | 11/2006 | |
| WO | WO2007022137 | | 2/2007 | |
| WO | WO2007041022 | | 4/2007 | |
| WO | WO2007070358 | | 6/2007 | |
| WO | WO2007113546 | | 10/2007 | |
| WO | WO2007130681 | | 11/2007 | |
| WO | WO2009059065 | | 5/2009 | |

OTHER PUBLICATIONS

"The Smart House: Human Factors in Home Automation", Human Factors in Practice, Dec. 1990, 7-15.

Bulkeley, Debra, "The Smartest House in America", Design News, Oct. 19, 1987, 56-61.

Moore, T. G. and Dartnall, "Human Factors of a Microelectronic Product: The Central Heating Timer/Programmer", Applied Ergonomics, [1982], vol. 13, No. 1, 15-23.

* cited by examiner

Existing Interface

New Interface

ADAPTIVE PATTERN RECOGNITION BASED CONTROLLER APPARATUS AND METHOD AND HUMAN-INTERFACE THEREFORE

CROSS REFERENCE TO RELATED APPLICATIONS

This application is a Continuation of Ser. No. 13/244,152 filed Sep. 23, 2011, now U.S. Pat. No. 8,352,400, issued Jan. 8, 2013, which is a Division of Ser. No. 10/389,865 filed Mar. 14, 2003, now U.S. Pat. No. 8,032,477, issued Oct. 4, 2011. U.S. patent application Ser. No. 10/389,865 is a Continuation-in-part of: Ser. No. 10/189,832 filed Jul. 3, 2002 now Abandoned, which is a Continuation of Ser. No. 09/241,135, filed Feb. 1, 1999, now U.S. Pat. No. 6,400,996, issued Jun. 4, 2002; Ser. No. 10/162,079, filed Jun. 3, 2002, now U.S. Pat. No. 6,640,145, issued Oct. 28, 2003, which is a Continuation of Ser. No. 09/241,135, filed Feb. 1, 1999, now U.S. Pat. No. 6,400,996 issued Jun. 4, 2007; Ser. No. 09/680,049, filed Oct. 5, 2000, now U.S. Pat. No. 6,850,252, issued Feb. 1, 2005, which claims benefit of priority from 60/157,829, filed Oct. 5, 1999; Ser. No. 09/304,536, filed May 4, 1999, now U.S. Pat. No. 6,418,424, issued Jul. 9, 2002; Ser. No. 09/260,802, filed Mar. 2, 1999, now U.S. Pat. No. 7,242,988, issued Jul. 10, 2007; and Ser. No. 09/497,071, filed Feb. 2, 2000 now Pending, each of which is expressly incorporated herein by reference in its entirety.

COPYRIGHT RESERVATION NOTICE

A portion of the disclosure of this patent document and appendices contain material which is subject to copyright protection. The copyright owner has no objection to the facsimile reproduction by anyone of this patent document or the patent disclosure, as it appears in the patent and Trademark Office patent file or records, but otherwise reserves all copyright rights whatsoever.

FIELD OF THE INVENTION

The present invention relates to the field of programmable sequencing devices, or, more particularly, the field of remote controls for consumer electronic devices. The present invention provides an enhanced interface for facilitating human input of a desired control sequence in a programmable device by employing specialized visual feedback. Some of the most popular programmable products include VCRs, answering machines, microwave ovens, alarm clocks, thermostats, cameras, home security systems, lighting systems, and automobiles.

BACKGROUND OF THE INVENTION

Significant difficulties are experienced by users when programmable complex devices are infrequently used or programmed, or when a user attempts to use uncommon functions of these devices, such as, for example video cassette recorders (hereinafter "VCRs"). Studies have concluded that 80% of users cannot correctly program their VCRs. This has been due, in part, to the fact that manufacturers continue to add more features to existing devices, without simplifying those which already exist.

People learn most efficiently through the interactive experiences of doing, thinking, and knowing. For ease-of-use, efficiency, and lack of frustration of the user, utilizing the device should be intuitive. Users should be able to operate the device without referring to an instruction manual. Well-designed products should contain visual clues which prompt and convey their meanings, however, prior art devices do not always live up to this ideal. This problem is accentuated by various manufacturers and designers who focus on the production and design of feature-rich systems, rather than on ones which are also "User Friendly" and thus easier to use. Therefore, many products are extremely complex and thus difficult to use, thereby preventing all but the most technically advanced people from using them.

The act of programming, or determining a sequence of operations to be performed by, for example, a VCR, several steps are required. In addition to setting the clock, the user must assign a is program number, set the current date and current time, select the start and stop times, choose the channel from which to record, and choose a tape speed. These actions require a minimum of four actuators ("Program", "+", "−", and "Enter"). Presently, some VCR controls contain up to 123 buttons, double function keys, and symbols which are not immediately recognized by the user.

In order to simplify commonly-used functions, a number of methods have been devised. Certain VCRs employ a bar-code reader in order to allow entry of programming steps from a menu of functions, or from an encoded description of an event to be programmed. However, this method suffers from the limitation that the channel, time and duration must be available in encoded form, otherwise the use of the device will not simplify the use or programming of the VCR. These machines come with a laminated sheet of bar codes. In order to program the VCR, the user must press a button on a wand, which lights its tip, and then run or pass the tip over a bar-code, to set each step separately. Finally, when all the information has been scanned in, the user must press the "Transmit" button. The "VCRplus+" is a device which allows the entry of a code representing a channel, time, date and duration of a program to be recorded, which when entered into the remote control device, is translated into commands for programming the VCR, and transmitted through an infrared link to the VCR, thus programming the VCR. This system has the limitations that the published codes must be available, and manually entered, which may be thus be erroneously entered, and the system does not allow for rescheduled programs, so that any variation in schedule will result in a defective recording. The time and date in the VCR device must also be set accurately for this system to operate.

On-screen programming systems exist; however, these generally require the user to scroll through menus and option choices without allowing direct entry of programming information. Direct-entry systems are available with, for example, programmable controllers with keypad entry. However, these do not generally have full information visual displays, meaning that all vital information is not or cannot be simultaneously displayed, and must be "multiplexed", meaning that data must share display space with other data, displayed at different times. In a VCR with on-screen programming, all programming information feedback is displayed on the television screen, and prompts are provided to guide the user through the necessary steps. Some VCRs have numeric keypads to enter the information, while others allow choices to be entered by the selection method, which depends on the use of "up" and "down" arrow keys to select a desired option.

The other major presently used method, which is available on most VCRs, as well as other types of programmable devices, is Display Panel Programming. This method is generally inadequate because full instructions are not normally available on the display panel, and the amount of information simultaneously displayed is limited. Users do not need a television set to see the displayed information, but they might have trouble reading the small, usually multifunctional multiplexed display and keypad. When programming the VCR, information may be entered on the display panel using the selection method, with either the "up" key or both "up" and "down" keys, or by direct entry in devices that support such a system.

The remote control device of a VCR is often the primary input device, and it sometimes has control functions not accessible from a keypad input present on the VCR itself. Remote controls often contain many buttons, which may be found overwhelming and confusing by the user. This results in under-utilization of the various actuators or buttons, and consequently, various useful features are unused or inaccessible, or the programming operation is inefficient. The extra clutter results in a greater "search time", the time needed to locate and execute a desired function, and thus it takes longer to program the VCR. The general structure of the search time in programming a VCR is shown diagrammatically in FIG. 1. Other problems arise from the layout and coding of the buttons. A study performed by Kamran Abedini and George Hadad in 1987 entitled "Guidelines for Designing Better VCRs", Report No. IME 462, Feb. 4, 1987, California State Polytechnic University, incorporated herein by reference, has shown that varying the shape of the remote control device is more effective than varying its size. In addition, they found that color coding and adequate contrast can effect a significant improvement in programming performance. Abedini and Kamran, in "An Ergonomically-improved Remote Control Unit Design", Interface '87 Proceedings, 375-380 (1987), incorporated herein by reference, found that 78% of the people surveyed favored direct entry numbers (0-9) in addition to labels, symbols, discrete volume switches, and channel up/down buttons for casual searching. In addition, the people surveyed preferred remote controls which fit comfortably into their hand.

Many techniques have been used to facilitate the programming of devices such as VCRs, including:

Display Panels (1982)—Programmed with the aid of an LED display panel on the front of the machine.

Programming Via Remote Control (1983)—Programmed using a remote control device with keys for input.

On-Screen Displays (1984)—Programmed by a series of menus on the television screen.

Bar Code Scanners (1987)—Programmed by a wand passing over a series of lines, which are decoded and then transmitted to the VCR.

Light Pens (1987)—Programmed by aiming a pointing device with a light beam sensor at the television screen, which allows timing signals to be extracted to determine the position of the device with respect to the screen, and hence, the intended instruction.

Video Program System Signal Transmitters (1988)—The VCR is programmed by entering the unique code number of a desired program to record, which is emitted by television stations in West Germany as videotext digital signals associated with each program.

Phone Lines (1989)—Programmed over a telephone line at from a remote location. The numeric keys on the phone are the input keys.

Video Memories (1989)—Programmed by a computer from a remote location. For example, a user contacts a service, who then records certain programs at a user's request. These can be characterized in a number of ways, e.g. comedies, movies, etc. and the service will then manually scan the broadcast schedules for these provided characterizations and record the desired programs.

Voice Coaches (1990)—Programmed by responding to voice instructions, e.g. speech prompts, from the remote control.

As the technology becomes more mature, and VCRs and other types of programmable consumer electronic devices become less expensive, a proportionally less-educated segment of society will be confronted with these devices. While education and ability to program a VCR are not necessarily correlated, the present invention is directed toward improving the interface to allow all segments of the population to effectively interface with these programmable devices. By making the user interface more intuitive, and facilitating program entry by all levels of users, the present method and apparatus allow a manufacturer to produce a single device, without regard to the ability of the user to learn the programming steps. It is also noted that, because of their previous inability to provide a programmable consumer electronic device with various user interface levels, manufacturers have had to compromise the programming power of their user interface to allow less than advanced users to program it, or to compromise the usability of the device in order to make the full programming power available.

TECHNOLOGY FOR IMPLEMENTING THE HUMAN INTERFACE, IMAGE PROCESSING AND DECISION MAKING METHODS OF THE PRESENT INVENTION

The following references are relevant to the interface aspects of the present invention, are contained in the appendix hereto, and are expressly incorporated herein by reference:

Hoffberg, Linda I, "AN IMPROVED HUMAN FACTORED INTERFACE FOR PROGRAMMABLE DEVICES: A CASE STUDY OF THE VCR" Master's Thesis, Tufts University (Master of Sciences in Engineering Design, November, 1990); "Bar Code Programs VCR", Design News, Feb. 1, 1988, 26; "The Highs and Lows of Nielsen Homevideo Index", Marketing & Media Decisions, November 1985, 84-86+; "The Quest for 'User Friendly'", U.S. News & World Report, Jun. 13, 1988. 54-56; "The Smart House: Human Factors in Home Automation", Human Factors in Practice, December 1990, 1-36; "VCR, Camcorder Trends", Television Digest, Vol. 29:16 (Mar. 20, 1989); Abedini, Kamran, "An Ergonomically-improved Remote Control Unit Design", Interface '87 Proceedings, 375-380; Abedini, Kamran, and Hadad, George, "Guidelines For Designing Better VCRs", Report No. IME 462, Feb. 4, 1987; Bensch, U., "VPV—VIDEOTEXT PROGRAMS VIDEORECORDER", IEEE Transactions on Consumer Electronics, 34(3):788-792; Berger, Ivan, "Secrets of the Universals", Video, February 1989, 45-47+; Beringer, D. B., "A Comparative Evaluation of Calculator Watch Data Entry Technologies: Keyboards to Chalkboards", Applied Ergonomics, December 1985, 275-278; Bishop, Edward W., and Guinness, G. Victor Jr., "Human Factors Interaction with Industrial Design", Human Factors, 8(4):279-289 (August 1966); Brown, Edward, "Human Factors Concepts For Management", Proceedings of the Human Factors Society, 1973, 372-375; Bulkeley, Debra, "The Smartest House in America", Design News, Oct. 19, 1987, 56-61; Card, Stuart K., "A Method for Calculating Performance times for Users of Interactive Computing Systems", IEEE, 1979, 653-658; Carlson, Mark A., "Design Goals for an Effective User Interface", Electro/82 Proceedings, 3/1/1-3/1/4; Carlson, Mark A., "Design Goals for an Effective User Interface", Human Interfacing with Instruments, Session 3; Carroll, Paul B., "High Tech Gear Draws Cries of "Uncle", Wall Street Journal, Apr. 27, 1988, 29;

Cobb, Nathan, "I don't get it", Boston Sunday Globe Magazine, Mar. 25, 1990, 23-29; Davis, Fred, "The Great Look-and-Feel Debate", A+, 5:9-11 (July 1987); Dehning, Waltraud, Essig Heidrun, and Maass, Susanne, The Adaptation of Virtual Man-Computer Interfaces to User Requirements in Dialogs, Germany: Springer-Verlag, 1981; Ehrenreich, S. L., "Computer Abbreviations—Evidence and Synthesis", Human Factors, 27(2):143-155 (April 1985); Friedman, M. B., "An Eye Gaze Controlled Keyboard", Proceedings of the 2nd International Conference on Rehabilitation Engineering, 1984, 446-447; Gilfoil, D., and Mauro, C. L., "Integrating Human Factors and Design: Matching Human Factors Methods up to Product Development", C. L. Mauro Assoc., Inc., 1-7; Gould, John D., Boies, Stephen J., Meluson, Antonia, Rasammy, Marwan, and Vosburgh, Ann Marie, "Entry and Selection Methods For Specifying Dates". Human Factors, 32(2):199-214 (April 1989); Green, Lee, "Thermo Tech: Here's a common sense guide to the new thinking thermostats", Popular Mechanics, is October 1985, 155-159; Grudin, Jonathan, "The Case Against User Interface Consistency", MCC Technical Report Number ACA-HI-002-89, January 1989; Harvey, Michael G., and Rothe, James T., "VideoCassette Recorders: Their Impact on Viewers and Advertisers", Journal of Advertising, 25:19-29 (December/January 1985); Hawkins, William J., "Super Remotes", Popular Science, February 1989, 76-77; Henke, Lucy L., and Donohue, Thomas R., "Functional Displacement of Traditional TV Viewing by VCR Owners", Journal of Advertising Research, 29:18-24 (April-May 1989); Hoban, Phoebe, "Stacking the Decks", New York, Feb. 16, 1987, 20:14; "How to find the best value in VCRs", Consumer Reports, March 1988, 135-141; Howard, Bill, "Point and Shoot Devices", PC Magazine, 6:95-97 (August 1987); Jane Pauley Special, NBC TV News Transcript, Jul. 17, 1990, 10:00 PM; Kolson, Ann, "Computer wimps drown in a raging sea of technology", The Hartford Courant, May 24, 1989, B1; Kreifeldt, J. G., "A Methodology For Consumer Product Safety Analysis", The 3rd National Symposium on Human Factors in Industrial Design in Consumer Products, August 1982, 175-184; Kreifeldt, John, "Human Factors Approach to Medical Instrument Design", Electro/82 Proceedings, 3/3/1-3/3/6; Kuocheng, Andy Poing, and Ellingstad, Vernon S., "Touch Tablet and Touch Input", Interface '87, 327; Ledgard, Henry, Singer, Andrew, and Whiteside, John, Directions in Human Factors for Interactive Systems, New York, Springer-Verlag, 1981; Lee, Eric, and MacGregor, James, "Minimizing User Search Time Menu Retrieval Systems", Human Factors, 27(2):157-162 (April 1986); Leon, Carol Boyd, "Selling Through the VCR", American Demographics, December 1987, 40-43; Long, John, "The Effect of Display Format on the Direct Entry of Numerical Information by Pointing", Human Factors, 26(1):3-17 (February 1984); "Low-Cost VCRs: More For Less", Consumer Reports, March 1990, 168-172; Mantei, Marilyn M., and Teorey, Toby J., "Cost/Benefit Analysis for Incorporating Human Factors in the Software Lifecycle", Association for Computing Machinery, 1988; Meads, Jon A., "Friendly or Frivolous", Datamation, Apr. 1, 1988, 98-100; Moore, T. G. and Dartnall, "Human Factors of a Microelectronic Product: The Central Heating Timer/Programmer", Applied Ergonomics, 1983, 13(1):15-23; "Nielsen Views VCRs", Television Digest, Jun. 23, 1988, 15; Norman, Donald A., "Infuriating By Design", Psychology Today, 22(3):52-56 (March 1988); Norman, Donald A., The Psychology of Everyday Things, New York, Basic Book, Inc. 1988; Platte, Hans-Joachim, Oberjatzas, Gunter, and Voessing, Walter, "A New Intelligent Remote Control Unit for Consumer Electronic Device", IEEE Transactions on Consumer Electronics, Vol. CE-31(1):59-68 (February 1985); Rogus, John G. and Armstrong, Richard, "Use of Human Engineering Standards in Design", Human Factors, 19(1):15-23 (February 1977); Rosch, Winn L., "Voice Recognition: Understanding the Master's Voice", PC Magazine, Oct. 27, 1987, 261-308; Sarver, Carleton, "A Perfect Friendship", High Fidelity, 39:42-49 (May 1989); Schmitt, Lee, "Let's Discuss Programmable Controllers", Modern Machine Shop, May 1987, 90-99; Schniederman, Ben, Designing the User Interface: Strategies for Effective Human-Computer Interaction, Reading, Mass., Addison-Wesley, 1987; Smith, Sidney J., and Mosier, Jane N., Guidelines for Designing User Interface Software, Bedford, Mass., MITRE, 1986; Sperling, Barbara Bied, Tullis Thomas S., "Are You a Better 'Mouser' or 'Trackballer'? A Comparison of Cursor—Positioning Performance", An Interactive/Poster Session at the CHI+GI'87 Graphics Interface and Human Factors in Computing Systems Conference; Streeter, L. A., Ackroff, J. M., and Taylor, G. A. "On Abbreviating Command Names", The Bell System Technical Journal, 62(6):1807-1826 (July/August 1983); Swanson, David, and Klopfenstein, Bruce, "How to Forecast VCR Penetration", American Demographic, December 1987, 44-45; Tello, Ernest R., "Between Man And Machine", Byte, September 1988, 288-293; Thomas, John, C., and Schneider, Michael L., Human Factors in Computer Systems, New Jersey, Ablex Publ. Co., 1984; Trachtenberg, Jeffrey A., "How do we confuse thee? Let us count the ways", Forbes, Mar. 21, 1988, 159-160; Tyldesley, D. A., "Employing Usability Engineering in the Development of Office Products", The Computer Journal", 31(5):431-436 (1988); "VCR's: A Look At The Top Of The Line", Consumer Reports, March 1989, 167-170; Verplank, William L., "Graphics in Human-Computer Communication: Principles of Graphical User-Interface Design", Xerox Office Systems; "VHS Videocassette Recorders", Consumer Guide, 1990, 17-20; Voyt, Carlton F., "PLC's Learn New Languages", Design News, Jan. 2, 1989, 78; Whitefield, A. "Human Factors Aspects of Pointing as an Input Technique in Interactive Computer Systems", Applied Ergonomics, June 1986, 97-104; Wiedenbeck, Susan, Lambert, Robin, and Scholtz, Jean, "Using Protocol Analysis to Study the User Interface", Bulletin of the American Society for Information Science, June/July 1989, 25-26; Wilke, William, "Easy Operation of Instruments by Both Man and Machine". Electro/82 Proceedings, 3/2/1-3/2/4; Yoder, Stephen Kreider, "U.S. Inventors Thrive at Electronics Show", The Wall Street Journal, Jan. 10, 1990, B1; Zeisel, Gunter, Tomas, Philippe, Tomaszewski, Peter, "An Interactive Menu-Driven Remote Control Unit for TV-Receivers and VC-Recorders", IEEE Transactions on Consumer Electronics, 34(3):814-818;

The following cited patents and publications are relevant to pattern recognition and control aspects of the present invention, and are herein expressly incorporated by reference:

U.S. Pat. No. 5,067,163, incorporated herein by reference, discloses a method for determining a desired image signal range from an image having a single background, in particular a radiation image such is as a medical X-ray. This reference teaches basic image enhancement techniques.

U.S. Pat. No. 5,068,664, incorporated herein by reference, discloses a method and device for recognizing a target among a plurality of known targets, by using a probability based recognition system. This patent document cites a number of other references, each incorporated herein by reference, which are relevant to the problem of image recognition: Vannicola et al, "Applications of Knowledge based Systems to Surveillance", Proceedings of the 1988 IEEE National Radar Conference, 20-21 Apr. 1988, pp. 157-164; Ksienski et al., "Low Frequency Approach to Target Identification", Proc. of the IEEE, 63(12):1651-1660 (December 1975); Appriou, A., "Interet des theories de l'incertain en fusion de donnees", Colloque International sur le Radar Paris, Apr. 24-28, 1989; Appriou, A., "Procedure d'aide a la decision multi-informateurs. Applications a la classification multi-capteurs de cibles", Symposium de ('Avionics Panel (AGARD) Turquie, Apr. 25-29, 1988; Arrow, K. J., "Social choice and individual valves", John Wiley and Sons Inc. (1963); Blair, D., R. Pollack, "La logique du choix collectif" Pour la Science (1983); Scharlic, A., "Decider sur plusieurs criteres. Panorama de l'aide a la decision multicritere" Presses Polytechniques Romandes (1985); Keeney, R. L., B. Raiffa, "Decisions with multiple objectives: Preferences and value tradeoffs", John Wiley and Sons, New York (1976); Jeffrey, R. J., "The logic of decision", The University of Chicago Press, Ltd., London (1983)(2nd Ed.); Roy, B., "Classements et choix en presence de points de vue multiples", R.I.R.O.-2eme annee-no. 8, pp. 57-75 (1968); Roy, B., "Electre III: un algorithme de classements fonde sur une representation floue des preferences en presence de criteres multiples", Cahiers du CERO, 20(1):3-24 (1978); Duda, R. O., P. E. Hart, M. J. Nilsson, "Subjective Bayesian methods for rule-based inference systems", Technical Note 124-Artificial Intelligence Center-SRI International; Bhatnagar, R. K., L. N. Kamal, "Handling uncertain information: a review of numeric and non-numeric methods", Uncertainty in Artificial Intelligence, L. N. Kamal and J. F. Lemmer, Eds. (1986); Dempster, A. P., "Upper and lower probabilities induced by a multivalued mapping", Annals of mathematical Statistics, no. 38 (1967); Dempster, A. P., "A generalization of Bayesian inference", Journal of the Royal Statistical Society, Vol. 30, Series B (1968); Shafer, G., "A mathematical theory of evidence", Princeton University Press, Princeton, N.J. (1976); Dubois, D., N. Prade, "Combination of uncertainty with belief functions: a reexamination", Proceedings 9th International Joint Conference on Artificial Intelligence, Los Angeles (1985); Kyburg, H. E., "Bayesian and non Bayesian evidential updating", Artificial Intelligence 31:271-293 (1987); Fua, P. V., "Using probability density functions in the framework of evidential reasoning Uncertainty in knowledge based systems", B. Bouchon, R. R. Yager, Eds. Springer Verlag (1987); Chao, J. J., E. Drakopoulos, C. C. Lee, "An evidential reasoning approach to distributed multiple hypothesis detection", Proceedings of the 20th Conference on decision and control, Los Angeles, Calif., December 1987; Yager, R. R., "Entropy and specificity in a mathematical theory of Evidence", Int. J. General Systems, 9:249-260 (1983); Ishizuka, M., "Inference methods based on extended Dempster and Shafer's theory for problems with uncertainty/fuzziness", New Generation Computing, 1:159-168 (1983), Ohmsha, Ltd, and Springer Verlag; Zadeh, L. A., "Fuzzy sets", Information and Control, 8:338-353 (1965); Zadeh, L. A., "Probability measures of fuzzy events", Journal of Mathematical Analysis and Applications, 23:421-427 (1968); Kaufmann, A., "Introduction a la theorie des sous-ensembles flous", Vol. 1, 2 et 3-Masson-Paris (1975); Sugeno, M., "Theory of fuzzy integrals and its applications", Tokyo Institute of Technology (1974); Bellman, R. E., L. A. Zadeh, "Decision making in a fuzzy environment", Management Science, 17(4) (December 1970); Dubois, D., N. Prade, "Fuzzy sets and systems-Theory and applications", Academic Press, New York (1980); Zadeh, L. A., "Fuzzy sets as a basis for a theory of possibility", Fuzzy sets and Systems 1:3-28 (1978); Dubois, D., "Modeles mathematiques de l'imprecis et de l'incertain en vue d'applications aux techniques d'aide a la decision", Doctoral Thesis, University of Grenoble (1983); Dubois, D., N. Prade, "Theorie des possibilites: application a la representation des connaissances en informatique", Masson, Paris (1985).

Thus, the image or object recognition feature of the present invention may be implemented in the manner of U.S. Pat. No. 5,068,664. Further, it is clear that this recognition feature may form an integral part of certain embodiments of the present invention. It is also clear that the various features of the present invention would be applicable as an adjunct to the various elements of the system disclosed in U.S. Pat. No. 5,068,664.

U.S. Pat. Nos. 5,065,447, and 4,941,193, both incorporated herein by reference, relate to the compression of image data by using fractal transforms. These are discussed in detail below. U.S. Pat. No. 5,065,447 cites a number of references, all incorporated herein by reference, relevant to the use of fractals in image processing: U.S. Pat. No. 4,831,659; Barnsley et al., "Hidden Variable Fractal Interpolation Functions", School of Mathematics, Georgia Institute of Technology, Atlanta, Ga. 30332, July, 1986; Barnsley, M. F., and Demko, S., "Iterated Function Systems and The Global Construction of Fractals", Proc. R. Soc. Lond., A399:243-275 (1985); Barnsley, M. F., Ervin, V., Hardin, D., Lancaster, J., "Solution of an Inverse Problem for Fractals and Other Sets", Proc. Natl. Acad. Sci. U.S.A., 83:1975-1977 (April 1986); "A New Class of Markov Processes for Image Encoding", School of Mathematics, Georgia Inst. of Technology (1988), pp. 14-32; "Fractal Modelling of Biological Structures", Perspectives in Biological Dynamics and Theoretical Medicine, Koslow, Mandell, Shlesinger, eds., Annals of New York Academy of Sciences, vol. 504, 179-194 (date unknown); Elton, J., "An Ergodic Theorem for Iterated Maps", Journal of Ergodic Theory and Dynamical Systems, 7 (1987); "Construction of Fractal Objects with Iterated Function Systems", Siggraph '85 Proceedings, 19(3):271-278 (1985); "Fractal Modelling of Real World Images, Lecture Notes for Fractals: Introduction, Basics and Perspectives", Siggraph (1987); Peterson, Ivars, "Packing It In-Fractals . . . ", Science News, 131(18): 283-285 (May 2, 1987); "Fractal Geometry-Understanding Chaos", Georgia Tech Alumni Magazine, p. 16 (Spring 1986); "Fractals—A Geometry of Nature", Georgia Institute of Technology Research Horizons, p. 9 (Spring 1986); Fractal Modelling of Biological Structures, School of Mathematics, Georgia Institute of Technology (date unknown); Barnsley et al., "A Better Way to Compress Images", Byte Magazine, January 1988, pp. 213-225; Derra, Skip, "Researchers Use Fractal Geometry, . . . ", Research and Development Magazine, March 1988; "Data Compression: Pntng by Numbrs", The Economist, May 21, 1988; Baldwin, William, "Just the Bare Facts, Please", Forbes Magazine, Dec. 12, 1988; Barnsley et al., "Harnessing Chaos For Images Synthesis", Computer Graphics, 22(4):131-140 (August, 1988); Barnsley et al., "Chaotic Compression", Computer Graphics World, November 1987; Gleick, James, "Making a New Science", pp. 215, 239, date unknown.

Byte Magazine, January 1988, supra, cites: Mandelbrot, B., "The Fractal Geometry of Nature", W.H. Freeman & Co., San Francisco, Calif., 1982, 1977; and Barnsley, M. F., "Fractals Everywhere", Academic Press, Boston, Mass., 1988, both of which are also incorporated herein by reference.

U.S. Pat. No. 5,063,603, incorporated herein by reference, relates to a dynamic method for recognizing objects and image processing system therefor. This reference discloses a method of distinguishing between different members of a class of images, such as human beings. A time series of successive relatively high-resolution frames of image data, any frame of which may or may not include a graphical representation of one or more predetermined specific members (e.g., particular known persons) of a given generic class (e.g. human beings), is examined in order to recognize the identity of a specific member; if that member's image is included in the time series. The frames of image data may be examined in real time at various resolutions, starting with a relatively low resolution, to detect whether some earlier-occurring frame includes any of a group of image features possessed by an image of a member of the given class. The image location of a detected image feature is stored and then used in a later-occurring, higher resolution frame to direct the examination only to the image region of the stored location in order to (1) verify the detection of the aforesaid image feature, and (2) detect one or more other of the group of image features, if any is present in that image region of the frame being examined. By repeating this type of examination for later and later occurring frames, the accumulated detected features can first reliably recognize the detected image region to be an image of a generic object of the given class, and later can reliably recognize the detected image region to be an image of a certain specific member of the given class. Thus, the personae recognition feature of the present invention may be implemented in this manner. Further, it is clear that this recognition feature may form an integral part of certain embodiments of the present invention. It is also clear that the various features of the present invention would be applicable as an adjunct to the various elements of the system disclosed in U.S. Pat. No. 5,063,603.

U.S. Pat. No. 5,055,658, incorporated herein by reference, relates to a security system employing digitized personal characteristics, such as voice. The following cited references are incorporated herein by reference: Naik et al., "High Performance Speaker Verification . . . ", ICASSP 86, Tokyo, CH2243-4/86/0000-0881, IEEE 1986, pp. 881-884; "Voice Recognition and Speech Processing", Elektor Electronics, September 1985, pp. 56-57; Shinan et al., "The Effects of Voice Disguise . . . ", ICASSP 86, Tokyo, CH2243-4/86/0000-0885, IEEE 1986, pp. 885-888.

Parts of this system relating to speaker recognition may be used to implement a voice recognition system of the present invention for determining an actor or performer in a broadcast.

U.S. Pat. No. 5,067,164, incorporated herein by reference, relates to a hierarchical constrained automatic learning neural network for character recognition, and thus represents an example of a trainable neural network for pattern recognition, which discloses methods which are useful for the present invention. This patent cites various references of interest, which are incorporated herein by reference: U.S. Pat. Nos. 4,760,604, 4,774,677 and 4,897,811; Rumelhart, D. E., et al., Parallel Distr. Proc.: Explorations in Microstructure of Cognition, vol. 1, 1986, "Learning Internal Representations by Error Propagation", pp. 318-362; Lippmann, R. P., "An Introduction to Computing with Neural Nets", IEEE ASSP Magazine, 4(2):4-22 (April 1987); LeCun, Y., Connectionism in Perspective, R. Pfeifer, Z. Schreter, F. Fogelman, L. Steels, (Eds.), 1989, "Generalization and Network Design Strategies", pp. 143-55; LeCun, Y., et al., "Handwritten Digit Recognition Applications of Neural . . . ", IEEE Comm. Magazine, pp. 41-46 (November 1989).

U.S. Pat. Nos. 5,048,100, 5,063,601 and 5,060,278, all incorporated herein by reference, also relate to neural network adaptive pattern recognition methods and apparatuses. It is clear that the methods of U.S. Pat. Nos. 5,048,100, 5,060,278 and 5,063,601 may be used to perform the adaptive pattern recognition functions of the present invention. More general neural networks are disclosed in U.S. Pat. Nos. 5,040,134 and 5,058,184, both incorporated herein by reference, which provide background on the use of neural networks. In particular, U.S. Pat. No. 5,058,184 relates to the use of the apparatus in information processing and feature detection applications.

U.S. Pat. No. 5,058,180, incorporated herein by reference, relates to neural network apparatus and method for pattern recognition, and is thus relevant to the intelligent pattern recognition functions of the present invention. This patent cites the following documents of interest, which are incorporated herein by reference: U.S. Pat. Nos. 4,876,731 and 4,914,708; Computer Visions, Graphics, and Image Processing 1987, 37:54-115; Jackel, L. D., H. P. Graf, J. S. Denker, D. Henderson and I. Guyon, "An Application of Neural Net Chips: Handwritten Digit Recognition," ICNN Proceeding, 1988, pp. II-107-15; Carpenter, G. A., S. Grossberg, "The Art of Adaptive Pattern Recognition by a Self-Organizing Neural Network," IEEE Computer, March 1988, pp. 77-88; Pawlicki, T. F., D. S. Lee, J. J. Hull and S. N. Srihari, "Neural Network Models and their Application to Handwritten Digit Recognition," ICNN Proceeding, 1988, pp. II-63-70; Gullichsen E., E. Chang, "Pattern Classification by Neural Network: An Experiment System for Icon Recognition," ICNN Proceeding on Neural Networks, March 1987, pp. IV-725-32; Grossberg, S., G. Carpenter, "A Massively Parallel Architecture for a Self-Organizing Neural Pattern Recognition Machine," Computer Vision, Graphics, and Image Processing (1987, 37, 54-115), pp. 252-315; Lippman, R. P., "An Introduction to Computing with Neural Nets," IEEE ASSP Magazine, April 1987, pp. 4-22.

U.S. Pat. No. 5,067,161, incorporated herein by reference, relates to a video image pattern recognition system, which recognizes objects in near real time.

U.S. Pat. Nos. 4,817,176 and 4,802,230, both incorporated herein by reference, relate to harmonic transform methods of pattern matching of an undetermined pattern to known patterns, and are useful in the pattern recognition method of the present invention. U.S. Pat. No. 4,998,286, incorporated herein by reference, relates to a harmonic transform method for comparing multidimensional images, such as color images, and is useful in the present pattern recognition methods.

U.S. Pat. No. 5,060,282, incorporated herein by reference, relates to an optical pattern recognition architecture implementing the mean-square error correlation algorithm. This method allows an optical computing function to perform pattern recognition functions. U.S. Pat. No. 5,060,282 cites the following references, incorporated herein by reference, which are relevant to optical pattern recognition: is Psaltis, D., "Incoherent Electro-Optic Image Correlator", Optical Engineering, 23(1):12-15 (January/February 1984); Kellman, P., "Time Integrating Optical Signal Processing", Ph. D. Dissertation, Stanford University, 1979, pp. 51-55; Molley, P., "Implementing the Difference-Squared Error Algorithm Using An Acousto-Optic Processor", SPIE, 1098:232-239, (1989); Rhodes, W., "Acousto-Optic Signal Processing: Convolution and Correlation", Proc. of the IEEE, 69(1):65-79 (January 1981); Vander Lugt, A., "Signal Detection By Complex Spatial Filtering", IEEE Transactions On Information Theory, IT-10, 2:139-145 (April 1964); Psaltis, D., "Two-Dimensional Optical Processing Using One-Dimensional Input Devices", Proceedings of the IEEE, 72(7):962-974 (July 1984); Molley, P., et al., "A High Dynamic Range Acousto-Optic Image Correlator for Real-Time Pattern Recognition", SPIE, 938:55-65 (1988).

U.S. Pat. No. 5,063,602, incorporated herein by reference, also relates to an optical image correlators.

U.S. Pat. No. 5,067,160, incorporated herein by reference, relates to a motion-pattern recognition apparatus. The apparatus recognizes a motion of an object which is moving and is hidden in an image signal, and discriminates the object from the background within the signal. The apparatus has an image forming unit comprising non-linear oscillators, which forms an image of the motion of the object in accordance with an adjacent-mutual-interference-rule, on the basis of the image signal. A memory unit, comprising non-linear oscillators, stores conceptualized meanings of several motions. A retrieval unit retrieves a conceptualized meaning close to the motion image of the object. An altering unit alters the rule, on the basis of the conceptualized meaning. The image forming unit, memory unit, retrieval unit and altering unit form a holonic-loop. Successive alterations of the rules by the altering unit within the holonic loop change an ambiguous image formed in the image forming unit into a distinct image. U.S. Pat. No. 5,067,160 cites the following references, incorporated herein by reference, which are relevant to the task of discriminating a moving object in a background: U.S. Pat. No. 4,710,964; Shimizu et al, "Principle of Holonic Computer and Holovision", Journal of the Institute of Electronics, Information and Communication, 70(9):921-930 (1987); Omata et al, "Holonic Model of Motion Perception", IEICE Technical Reports, Mar. 26, 1988, pp. 339-346; Ohsuga et al, "Entrainment of Two Coupled van der Pol Oscillators by an External Oscillation", Biological Cybernetics, 51:225-239 (1985).

It is clear that U.S. Pat. No. 5,067,160 discloses an adaptive pattern recognition system that may be useful in various embodiments of the present invention. It is also clear that the interface and control systems of the present invention provide useful adjuncts to the elements disclosed in U.S. Pat. No. 5,067,160.

U.S. Pat. No. 5,065,440, incorporated herein by reference, relates to a pattern recognition apparatus, which compensates for, and is thus insensitive to pattern shifting, thus being useful for decomposing an image into its structural features and recognizing the features. U.S. Pat. No. 5,065,440 cites the following references, incorporated herein by reference, which are also relevant to the present invention: U.S. Pat. Nos. 4,543,660, 4,630,308, 4,677,680, 4,809,341, 4,864,629, 4,872,024 and 4,905,296.

U.S. Pat. No. 5,067,166, incorporated herein by reference, relates to a pattern recognition system, in which a local optimum match between subsets of candidate reference label sequences and candidate templates. It is clear that this method is useful in the pattern recognition aspects of the present invention. It is also clear that the interface and control system of the present invention are useful adjuncts to the method disclosed in U.S. Pat. No. 5,067,166.

U.S. Pat. No. 5,048,095, incorporated herein by reference, relates to the use of a genetic learning algorithm to adaptively segment images, which is an initial stage in image recognition. This patent has a software listing for this method. It is clear that this method is useful in the pattern recognition aspects of the present invention. It is also clear that the interface and control system of the present invention are useful adjuncts to the method disclosed in U.S. Pat. No. 5,048,095.

In addition, the following patents are considered relevant to the data compression and pattern recognition functions of the apparatus and interface of the present invention and are incorporated herein by reference: U.S. Pat. Nos. 3,950,733; 4,044,243; 4,254,474; 4,326,259; 4,442,544; 4,449,240; 4,468,704; 4,491,962; 4,501,016; 4,543,660; 4,547,811; 4,630,308; 4,656,665; 4,658,429; 4,660,166; 4,677,680; 4,682,365; 4,685,145; 4,710,822; 4,710,964; 4,719,591; 4,731,863; 4,736,439; 4,742,557; 4,752,890; 4,760,604; 4,764,971; 4,771,467; 4,773,099; 4,774,677; 4,790,025; 4,799,270; 4,803,736; 4,805,224; 4,805,255; 4,809,341; 4,817,171; 4,821,333; 4,823,194; 4,831,659; 4,833,637; 4,837,842; 4,845,610; 4,864,629; 4,872,024; 4,876,731; 4,887,304; 4,888,814; 4,891,762; 4,897,811; 4,905,296; 4,906,099; 4,914,708; 4,926,491; 4,932,065; 4,933,872; 4,941,193; 4,944,023; 4,958,375; 4,958,375; 4,965,725; 4,972,499; 4,979,222; 4,987,604; 4,989,258; 5,014,219; 5,014,327; 5,018,218; 5,018,219; 5,020,112; 5,022,062; 5,034,991; 5,038,379; 5,040,134; 5,046,121; 5,046,122; 5,046,179; 5,048,112; 5,050,223; 5,051,840; 5,052,043; 5,052,045; 5,052,046; 5,053,974; 5,054,093; 5,054,095; 5,054,101; 5,054,103; 5,055,658; 5,055,926; 5,056,147; 5,058,179; 5,058,180; 5,058,186; 5,059,126; 5,060,276; 5,060,277; 5,060,279; 5,060,282; 5,060,285; 5,061,063; 5,063,524; 5,063,525; 5,063,603; 5,063,605; 5,063,608; 5,065,439; 5,065,440; 5,065,447; 5,067,160; 5,067,161; 5,067,162; 5,067,163; 5,067,164; 5,068,664; 5,068,723; 5,068,724; 5,068,744; 5,068,909; 5,068,911; H 331; and Re. 33,316. The aforementioned patents, some of which are mentioned elsewhere in this disclosure, and which form a part of this disclosure, may be applied in known manner by those skilled in the art in order to practice various embodiments of the present invention.

The following scientific articles, some of which are discussed elsewhere herein, are incorporated by reference, and their relevance is understood by those skilled in the art and relate to the pattern recognition and image compression functions of the apparatus and interface of the present invention: Liepins, G. E., M. R. Hilliard, "Genetic Algorithms: Foundations & Applications", Annals of Operations Research, 21:31-58 (1989); Fitzpatrick, J. M., J. J. Grefenstette, D. Van Gucht, "Image Registration by Genetic Search", Conf. Proc., IEEE Southeastcon 1984, pp. 460-464; McAulay, A. D., J. C. Oh, "Image Learning Classifier System Using Genetic Algorithms", IEEE Proc. of the National Aerospace & Electronics Conference, 2:705-710 (1989); Wasserman, Philip D., "Neural Computing-Theory & Practice", 1989, pp. 128-129; Nilsson, N.J., The Mathematical Foundations of Learning Machines ((c) 1990: Morgan Kaufmann Publishers, San Mateo, Calif.) and particularly section 2.6 "The Threshold Logic Unit (TLU)", pp. 21-23 and Chapter 6, "Layered Machines" pp. 95-114; Martin, G. L. et al., "Recognizing Hand-Printed Letters and Digits Using Backpropagation Learning", Technical Report of the MCC, Human Interface Laboratory, Austin, Tex., January 1990, pp. 1-9; Jean, J. S. N., et al., "Input Representation and Output Voting Considerations for Handwritten Numeral Recognition with Backpropagation", International Joint Conference on Neural Networks, Washington, D.C., January 1990, pp. I-408 to I-411; Zhu, X., et al., "Feature Detector and Application to Handwritten Character Recognition", International Joint Conference on Neural Networks, Washington, D.C., January 1990, pp. II-457 to II-460; Haruki, K. et al., "Pattern Recognition of Handwritten Phonetic Japanese Alphabet Characters", International Joint Conference on Neural Networks, Washington, D.C., January 1990, pp. II-515 to II-518; Miller, R. K., Neural Networks ((c) 1989: Fairmont Press, Lilburn, Ga.), pp. 2-12 and Chapter 4, "Implementation of Neural Networks", pp. 4-1 to 4-26; Hayashi, Y., et al., "Alphanumeric Character Recognition Using a Connectionist Model with the Pocket Algorithm", Proceedings of the International Joint Conference on Neural Networks, Washington, D.C. Jun. 18-22, 1989, vol. 2, pp. 606-613; Caudill, M., "Neural Networks Primer-Part III", AI Expert, June 1988, pp. 53-59; Burr, D. J., "A Neural Network Digit Recognizer", Proceedings of the 1986 IEEE International Conference of Systems, Man and Cybernetics, Atlanta, Ga., pp. 1621-1625; Rumelhart, D. E., et al., Parallel Distributed Processing, ((c) 1986: MIT Press, Cambridge, Mass.), and specifically Chapter 8 thereof, "Learning Internal Representations by Error Propagation", pp. 318-362; Danielsson, Erik, et al., "Computer Architectures for Pictorial Inf. Systems", IEEE Computer, November, 1981, pp. 53-67; Hopfield et al., "Computing with Neural Circuits: A Model", Science, 233:625-633 (8 Aug. 1986); Hinton et al., "Boltzmann Machines: Constraint Satisfaction Networks that Learn", Tech. Report CMU-CS-85-119, Carnegie-Mellon Univ, 5/84; Hopfield, "Neurons with graded response have collective computational properties like those of two-state neurons", Proc. Natl. Acad. Sci. USA, 81:3088-3092 (May 1984); Willshaw et al., "Non-Holographic Associative Memory", Nature, 222:960-962 (Jun. 7, 1969); Cooper, L. N., "A Possible Organization of Animal Memory and Learning", Nobel 24, (1973), Collective Properties of Physical Systems, pp. 252-264; Hopfield, "Neural Networks and Physical Systems with Emergent Collective Computational Abilities", Proc. Natl. Acad. Sci. USA, 79:2554-2558 (April 1982); Batchelor, B. G., "Practical Approach to Pattern Classification", Plenum Press, London and New York, (1974); Batchelor, B. G., "Pattern Recognition, Ideas in Practice", Plenum Press, London and New York, (1978); Udagawa, K., et al, "A Parallel Two-Stage Decision Method for Statistical Character Recognition . . . ", Electronics and Communications in Japan (1965); Schurmann, J., "Zur Zeichen and Worterkennung beim Automatischen Anschriftenlesen", Wissenschaftlichl, Berichte, 52(1/2) (1979); Computers and Biomedical Research 5, 388-410 (1972); Proceedings, 6th International Conference on Pattern Recognition 1982, pp. 152-136; Information Processing 71, North-Holland Publishing Company (1972) pp. 1530-1533; Scientific American, "Not Just a Pretty Face", March 1990, pp. 77-78; Farrelle, Paul M. and Jain, Anil K., "Recursive Block Coding—A New Approach to Transform Coding", IEEE Transactions on Communications, Com. 34(2) (February 1986); Yamane et al., "An Image Data Compression Method Using Two-Dimensional Extrapolative Prediction-Discrete Sine Transform", Oct. 29-31, 1986, pp. 311-316; Chen et al., "Adaptive Coding of Monochrome and Color Images", November 1977, pp. 1285-1292; O'Neal et al., "Coding Isotropic Images", November 1977, pp. 697-707; Anderson, F., W. Christiansen, B. Kortegaard, "Real Time, Video Image Centroid Tracker", Apr. 16-20, 1990; Kortegaard, B. L., "PAC-MAN, a Precision Alignment Control System for Multiple Laser Beams Self-Adaptive Through the Use of Noise", Los Alamos National Laboratory, date unknown; Kortegaard, B. L., "Superfine Laser Position Control Using Statistically Enhanced Resolution in Real Time", Los Alamos National Laboratory, SPIE-Los Angeles Technical Symposium, Jan. 23-25, 1985; Aleksander, I., "Guide to Pattern Recognition Using Random-Access Memories", Computers and Digital Techniques, 2(1): 29-40 (February 1979); Rumelhart, D. E., et al., "Learning Internal Representations by Error Propagation", Parallel Distr. Proc.: Explorations in Microstructure of Cognition, 1:318-362 (1986); Lippmann, R. P., "An Introduction to Computing with Neural Nets", IEEE ASSP Magazine, vol. 4(2):4-22 (April 1987); LeCun, Y., "Connectionism in Perspective", in R. Pfeifer, Z. Schreter, F. Fogelman, L. Steels (Eds.), 1989, "Generalization and Network Design Strategies", pp. 143-155; LeCun, Y. et al., "Handwritten Digit Recognition: Applications of Neural . . . ", IEEE Comm. Magazine, November 1989, pp. 41-46; Denker, 1984 International Test Conf., October 1984, Philadelphia, Pa., pp. 558-563; Gogoussis et al., Proc. SPIE Intl. Soc. Opt. Eng., November 1984, Cambridge, Mass., pp. 121-127; Svetkoff et al., Hybrid Circuits (GB), No. 13, May 1987, pp. 5-8; Kohonen, "Self-Organization & Memory", Second Ed., 1988, Springer-Verlag, pp. 199-209; Specht, IEEE Internatl. Conf. Neural Networks, 1:I525-I532 (July 1988), San Diego, Calif.; Wald, Sequential Analysis, Dover Publications Inc., 1947, pp. 34-43; Rosenfeld, Azriel and Avinash C. Kak, Digital Picture Processing, Second Edition, Volume 2, Academic Press, 1982; Mori, "Towards the construction of a large-scale neural network", Electronics Information Communications Association Bulletin PRU 88-59, pp. 87-94; Yamada et. al., "Character recognition system using a neural network", Electronics Information Communications Association Bulletin PRU 88-58, pp. 79-86; Crawford et al., "Adaptive Pattern Recognition Applied To An Expert System For Fault Diagnosis In Telecommunications Equipment", pp. 10/1-8 (Inspec. Abstract No. 86C010699, Inspec IEE (London) & IEE Coll. on "Adaptive Filters", Digest No. 76, Oct. 10, 1985); Rutter et al., "The Timed Lattice—A New Approach To Fast Converging Equalizer Design", pp. VIII/1-5 (Inspec. Abstract No. 84C044315, Inspec IEE (London) & IEE Saraga Colloquium on Electronic Filters, May 21, 1984); Simpson, W. R., C. S. Dowling, "WRAPLE: The Weighted Repair Assistance Program Learning Extension", IEEE Design & Test, 2:66-73 (April 1986); Dunning, B. B., "Self-Learning Data-Base For Automated Fault Localization", IEEE, 1979, pp. 155-157; Stewart, R. M., "Expert Systems For Mechanical Fault Diagnosis", IEEE, 1985, pp. 295-300; Lin, H. K., et al., "Real-Time Screen-Aided Multiple-Image Optical Holographic Matched-Filter Correlator", Applied Optics, 21(18):3278-3286 (Sep. 15, 1982); Vander Lugt, A., et al., "The Use of Film Nonlinearites in Optical Spatial Filtering", Applied Optics, 9(1):215-222 (January 1970); Vander Lugt, A., "Practical Considerations for the Use of Spatial Carrier-Frequency Filters", Applied Optics, 5(11):1760-1765 (November 1966); Silverston et al., "Spectral Feature Classification and Spatial Pattern Rec.", SPIE 201:17-26, Optical Pattern Recognition (1979); Perry et al., "Auto-Indexing Storage Device", IBM Tech. Disc. Bulletin, 12(8):1219 (January 1970); Vitols, "Hologram Memory for Storing Digital Data", IBM Tech. Disc. Bulletin 8(11):1581-1583 (April 1966); Stanley R. Sternberg, "Biomedical Image Processing", IEEE Computer, 1983, pp. 22-34; Rutherford, H. G., F. Taub and B. Williams, "Object Identification and Measurement from Images with Access to the Database to Select Specific Subpopulations of Special Interest", May 1986; Ney, H., et al., "A Data Driven Organization of the Dynamic Programming Beam Search for Continuous Speech Recognition", Proc. ICASSP 87, pp. 833-836, 1987; Sakoe, H., "A Generalization of Dynamic Programming Based Pattern Matching Algorithm Stack DP-Matching", Transactions of the Committee on Speech Research, The Acoustic Society of Japan, p. S83-23, 1983; Sakoe, H., "A Generalized Two-Level DP-Matching Algorithm for Continuous Speech Recognition", Transactions of the IECE of Japan, E65(11):649-656 (November 1982); Mahalanobis, A., et al., "Minimum Average Correlation Energy Filters", Applied Optics, 26(17):3633-40 (Sep. 1, 1987); Sprageu, R. A., "A Review of Acousto-Optic Signal Correlators", Optical Engineering, 16(5):467-74 (September/October 1977); Casasent, D., et al., "General I and Q Data Processing on a Multichannel AO System", Applied Optics, 25(18):3217-24 (Sep. 15, 1986); Vannicola et al., "Applications of Knowledge Based Systems to Surveillance", Proceedings of the 1988 IEEE National Radar Conference, 20-21 Apr. 1988, pp. 157-164; Ksienski et al., "Low Frequency Approach to Target Identification", Proc. of the IEEE, 63(12): 1651-1660 (December 1975); Appriou, A., "Interet des theories de l'incertain en fusion de donnees", Colloque International sur le Radar Paris, Apr. 24-28, 1989; Appriou, A., "Procedure d'aide a la decision multi-informateurs. Applications a la classification multi-capteurs de cibles", Symposium de ('Avionics Panel (AGARD) Turquie, Apr. 25-29, 1988; Arrow, K. J., "Social choice and individual valves", John Wiley and Sons Inc. (1963); Blair, D., R. Pollack, "La logique du choix collectif", Pour la Science (1983); Scharlic, A., "Decider sur plusieurs criteres. Panorama de l'aide a la decision multicritere", Presses Polytechniques Romandes (1985); Keeney, R. L., B. Raiffa, "Decisions with multiple objectives: Preferences and value tradeoffs", John Wiley and Sons, New York (1976); Jeffrey, R. J., "The logic of decision", The University of Chicago Press, Ltd., London (1983)(2nd Ed.); Roy, B., "Classements et choix en presence de points de vue multiples", R.I.R.O.-2eme annee-no. 8, pp. 57-75 (1968); Roy, B., "Electre III: un algorithme de classements fonde sur une representation floue des preferences en presence de criteres multiples", Cahiers du CERO, 20(1):3-24 (1978); Duda, R. O., P. E. Hart, M. J. Nilsson, "Subjective Bayesian methods for rule-based inference systems", Technical Note 124, Artificial Intelligence Center, SRI International; Bhatnagar, R. K., L. N. Kamal, "Handling uncertain information: a review of numeric and non-numeric methods", Uncertainty in Artificial Intelligence, L. N. Kamal and J. F. Lemmer, Eds. (1986); Dempster, A. P., "Upper and lower probabilities induced by a multivalued mapping", Annals of is mathematical Statistics, no. 38 (1967); Dempster, A. P., "A generalization of Bayesian inference", Journal of the Royal Statistical Society, Vol. 30, Series B (1968); Shafer, G., "A mathematical theory of evidence", Princeton University Press, Princeton, N.J. (1976); Dubois, D., N. Prade, "Combination of uncertainty with belief functions: a reexamination", Proceedings 9th International Joint Conference on Artificial Intelligence, Los Angeles (1985); Kyburg, H. E., "Bayesian and non Bayesian evidential updating", Artificial Intelligence 31:271-293 (1987); Fua, P. V., "Using probability density functions in the framework of evidential reasoning Uncertainty in knowledge based systems", B. Bouchon, R. R. Yager, Eds. Springer Verlag (1987); Chao, J. J., E. Drakopoulos, C. C. Lee, "An evidential reasoning approach to distributed multiple hypothesis detection", Proceedings of the 20th Conference on decision and control, Los Angeles, Calif., December 1987; Yager, R. R., "Entropy and specificity in a mathematical theory of Evidence", Int. J. General Systems, 9:249-260 (1983); Ishizuka, M., "Inference methods based on extended Dempster and Shafer's theory for problems with uncertainty/fuzziness", New Generation Computing, Ohmsha, Ltd, and Springer Verlag, 1:159-168 (1983); Zadeh, L. A., "Fuzzy sets", Information and Control, 8:338-353 (1965); Zadeh, L. A., "Probability measures of fuzzy events", Journal of Mathematical Analysis and Applications, 23:421-427 (1968); Kaufmann, A., "Introduction a la theorie des sous-ensembles flous", Vol. 1, 2 et 3, Masson, Paris (1975); Sugeno, M., "Theory of fuzzy integrals and its applications", Tokyo Institute of Technology (1974); Bellman, R. E., L. A. Zadeh, "Decision making in a fuzzy environment", Management Science, 17(4) (December 1970); Dubois, D., N. Prade, "Fuzzy sets and systems-Theory and applications", Academic Press, New York (1980); Zadeh, L. A., "Fuzzy sets as a basis for a theory of possibility", Fuzzy sets and Systems, 1:3-28 (1978); Dubois, D., "Modeles mathematiques de l'imprecis et de l'incertain en vue d'applications aux techniques d'aide a la decision", Doctoral Thesis, University of Grenoble (1983); Dubois, D., N. Prade, "Theorie des possibilites: application a la representation des connaissances en informatique", Masson, Paris (1985); Barnsley et al., "Hidden Variable Fractal Interpolation Functions", School of Mathematics, Georgia Institute of Technology, Atlanta, Ga. 30332, July, 1986; Anson, L., M. Barnsley, "Graphics Compression Technology", SunWorld, pp. 43-52 (October 1991); Caffery, B., "Fractal Compression Breakthrough for Multimedia Applications", Inside, Oct. 9, 1991; "Fractal Modelling of Real World Images", Lecture Notes for Fractals: Introduction, Basics and Perspectives, Siggraph (1987); "Fractal Geometry-Understanding Chaos", Georgia Tech Alumni Magazine, p. 16 (Spring 1986); "Fractals Yield High Compression", Electronic Engineering Times, Sep. 30, 1991, p. 39; "Fractals—A Geometry of Nature", Georgia Institute of Technology Research Horizons, p. 9 (Spring 1986); "Fractal Modelling of Biological Structures", School of Mathematics, Georgia Institute of Technology (date unknown); Peterson, Ivars, "Packing It In", Science News, 131(18):283-285 (May 2, 1987); Barnsley et al., "A Better Way to Compress Images", Byte Magazine, January 1988; Barnsley et al., "Harnessing Chaos For Images Systhesis", Computer Graphics, 22(4) (8/1988); Naik et al., "High Performance Speaker Verification . . . ", ICASSP 86, Tokyo, CH2243-4/86/0000-0881, IEEE 1986, pp. 881-884; "Voice Recognition and Speech Processing", Elektor Electronics, September 1985, pp. 56-57; Shinan et al., "The Effects of Voice Disguise . . . ", ICASSP 86, Tokyo, CH2243-4/86/0000-0885, IEEE 1986, pp. 885-888; Computer Visions, Graphics, and Image Processing, 1987, 37:54-115; Jackel, L. D., H. P. Graf, J. S. Denker, D. Henderson and I. Guyon, "An Application of Neural Net Chips: Handwritten Digit Recognition", ICNN Proceeding, 1988, pp. II-107-15; Carpenter, G. A., S. Grossberg, "The Art of Adaptive Pattern Recognition by a Self-Organizing Neural Network", IEEE Computer, March 1988, pp. 77-88; Pawlicki, T. F., D. S. Lee, J. J. Hull and S. N. Srihari, "Neural Network Models and their Application to Handwritten Digit Recognition", ICNN Proceeding, 1988, pp. II-63-70; Gullichsen, E., E. Chang, "Pattern Classification by Neural Network: An Experiment System for Icon Recognition", ICNN Proceeding on Neural Networks, March 1987, pp. IV-725-32; Grossberg, S., G. Carpenter, "A Massively Parallel Architecture for a Self-Organizing Neural Pattern Recognition Machine", Computer Vision, Graphics, and Image Processing, 1987, 37, 54-115, 252-315; Lippman, R. P., "An Introduction to Computing with Neural Nets", IEEE ASSP Magazine, April 1987, pp. 4-22; Psaltis, D., "Incoherent Electro-Optic Image Correlator", Optical Engineering, 23(1):12-15 (January/February 1984); Kellman, P., "Time Integrating Optical Signal Processing", Ph. D. Dissertation, Stanford University, 1979, pp. 51-55; Molley, P., "Implementing the Difference-Squared Error Algorithm Using An Acousto-Optic Processor", SPIE, 1098:232-239 (1989); Rhodes, W., "Acousto-Optic Signal Processing: Convolution and Correlation", Proc. of the IEEE, 69(1):65-79 (January 1981); Vander Lugt, A., "Signal Detection By Complex Spatial Filtering", IEEE Transactions On Information Theory, IT-10, 2:139-145 (April 1964); Psaltis, D., "Two-Dimensional Optical Processing Using One-Dimensional Input Devices", Proceedings of the IEEE, 72(7):962-974 (July 1984); Molley, P., et al., "A High Dynamic Range Acousto-Optic Image Correlator for Real-Time Pattern Recognition", SPIE, 938:55-65 (1988); Shimizu et al., "Principle of Holonic Computer and Holovision", Journal of the Institute of Electronics, Information and Communication, 70(9):921-930 (1987); Omata et al., "Holonic Model of Motion Perception", IEICE Technical Reports, Mar. 26, 1988, pp. 339-346; Ohsuga et al., "Entrainment of Two Coupled van der Pol Oscillators by an External Oscillation", Biological Cybernetics, 51:225-239 (1985);

The above-mentioned references are exemplary, and are not meant to be limiting in respect to the resources available to those skilled in the art. Of course it should be realized that the hardware available and the choice of specific method or software algorithm are interactive, and therefore must be specified together, however, it is noted that in view of the present disclosure, it is obvious to combine compatible technologies to achieve the advanced interface and control system of the present invention.

SUMMARY OF THE INVENTION

A new mechanism for easing the programming process is disclosed. The interface of the present invention serves to minimize the learning and searching times, better reflect users' expectations, provide better matching to human memory limits, be usable by both novices and experienced users, reduce intimidation of novice users by the device, and simplify the entering of programming data. The present invention optimizes the input scheme for programming an event-driven device, and can also be applied to many types of programmable devices. Thus, certain human factors design concepts, heretofore unexploited in the design of consumer electronics devices and industrial controls, have been incorporated. Background and theory of various aspects of the present invention is disclosed in "An Improved Human Factored Interface For Programmable Devices: A Case Study Of The Vcr", Master's Thesis, Tufts University (Master of Sciences in Engineering Design, November, 1990, publicly available January, 1991), by Linda I. Hoffberg, [an inventor of the present invention]. This thesis, and cited references, are incorporated herein by reference. (This thesis publication, and references cited therein, are attached as an appendix hereto.) Also incorporated by reference are: Hoffberg, Linda I., "Designing User Interface Guidelines For Time-Shift Programming of a Video Cassette Recorder (VCR)", Proc. of the Human Factors Soc. 35th Ann. Mtg. pp. 501-504 (1991); and Hoffberg, Linda I., "Designing a Programmable Interface for a Video Cassette Recorder (VCR) to Meet a User's Needs", Interface 91 pp. 346-351 (1991).

One aspect of the present invention relates to a programmable device that comprises a menu-driven interface in which the user enters information using a direct manipulation input device. Such a type of interface scheme is disclosed in Verplank, William L., "Graphics in Human-Computer Communication: Principles of Graphical User-Interface Design", Xerox Office Systems, which is incorporated herein by reference; the references cited therein: Foley, J. D., Wallace, V. L., Chan, P., "The Human Factor of Computer Graphics Interaction Techniques", IEEE CG&A, November 1984, pp. 13-48; Koch, H., "Ergonomische Betrachtung von Schreibtastaturen", Humane Production, 1, pp. 12-15 (1985); Norman, D. A., Fisher, D., "Why Alphabetic Keyboards Are Not Easy To Use: Keyboard Layout Doesn't Much Matter", Human Factors 24(5), pp. 509-519 (1982); Perspectives: High Technology 2, 1985; Knowlton, K., "Virtual Pushbuttons as a Means of Person-Machine Interaction", Proc of Conf. Computer Graphics, Pattern Recognition and Data Structure, Beverly Hills, Calif., May 1975, pp. 350-352; "Machine Now Reads, enters Information 25 Times Faster Than Human Keyboard Operators", Information Display 9, p. 18 (1981); "Scanner Converts Materials to Electronic Files for PCs", IEEE CG&A, December 1984, p. 76; "New Beetle Cursor Director Escapes All Surface Constraints", Information Display 10, p. 12, 1984; Lu, C., "Computer Pointing Devices: Living With Mice", High Technology, January 1984, pp. 61-65; "Finger Painting", Information Display 12, p. 18, 1981; Kraiss, K. F., "Neuere Methoden der lnteraktion an der Schnittstelle Mensch-Maschine", Z. F. Arbeitswissenschaft, 2, pp. 65-70, 1978; Hirzinger, G., Landzettel, K., "Sensory Feedback Structures for Robots with Supervised Learning", IEEE Conf. on Robotics and Automation, St. Louis, March 1985; Horgan, H., "Medical Electronics", IEEE Spectrum, January 1984, pp. 90-93, are also incorporated herein by reference.

The apparatus typically involves a remote control entry device, and the interface of the present invention contains a displayed graphical interface for programming programmable devices. The present invention seeks more accurate programming through the use of program verification to ensure that the input program is both valid and executable. Thus, it has a mechanism to store and check to verify that there are no conflicting programs. An apparatus according to the present invention can be connected, for example, to any infrared programmable device in order to simplify the programming process. By way of example only, an improved video cassette recorder (VCR) interface forms the basis of a disclosed is example. It is, of course, realized that the present method and apparatus may be applied to any programmable controller, i.e., any device which monitors an event or sensor and causes an event when certain conditions or parameters are met, and may also be used in other programming environments, which are not event driven.

A directional sensor based infrared remote control is disclosed in Zeisel, Tomas, Tomaszewski, "An Interactive Menu-Driven Remote Control Unit for TV-Receivers and VC-Recorders", IEEE Transactions on Consumer Electronics, Vol. 34, No. 3, 814-818, incorporated herein by reference, which relates to a control for programming with the West German Videotext system. This is a different implementation of the Videotext programming system than described in Bensch, U., "VPV—VIDEOTEXT PROGRAMS VIDEORECORDER", IEEE Transactions on Consumer Electronics, Vol. 34, No. 3, 788-792 (1988), incorporated herein by reference, which describes the system of Video Program System Signal Transmitters, in which the VCR is programmed by entering a code for the Video Program System signal, which is emitted by television stations in West Germany. Each separate program has a unique identifier code, transmitted at the beginning of the program, so that a user need only enter the code for the program, and the VCR will monitor the channel for the code transmission, and begin recording when the code is received. The VPV disclosed does not intelligently interpret the transmission, rather the system reads the transmitted code as a literal label, without any analysis or determination of a classification of the program type. The present invention incorporates an intelligent program recognition and characterization system, making use of any of the available cues, which allows an intelligent determination of the true nature of the broadcast and therefore is able to make a determination of whether parameters should be deemed met even with an inexact match to the specified parameters. Additionally, VPV also does not incorporate the interface of the present invention, and is much more like the "VCRPlus+" device.

The videotext signal of the prior art includes a digitally encoded text message which may be displayed in conjunction with the displayed image, similar to the closed caption system. The West German system demonstrates how the signal may be received by a computer and interpreted. However, the prior art does not disclose how this signal may be used to index and catalog the contents of a tape, nor does it disclose how this signal may be used to classify or interpret the character of the broadcast. In other words, in one embodiment of the present invention, the videotext or closed caption signal is not only interpreted as a literal label, as in the prior art, but is also further processed and analyzed to yield data about the content of the broadcast, other than merely the simultaneously broadcast information.

Beyond the visible region of an NTSC broadcast video frame are a number of scan lines which are dedicated to presenting digital information, rather than analog picture information. These are normally coded as modulating the luminance signal only, with a bit timing which is far below the available bandwidth. It is therefore possible to use this area for transmitting additional information relating to the broadcast information, in particular, the characteristics of the video broadcast, and doing so could provide significant advantages, used in conjunction with the interface and intelligent pattern recognition controller of the present invention. If this information were directly available, there would be a significantly reduced need for advanced image recognition functions, which require costly hardware devices, while still maintaining the advantages of the present invention. It is noted, however, that this requires the cooperation of broadcasters, as well as possibly the FCC, which would be difficult to obtain. Further, governmental regulation of even private commercial broadcasting is likely, e.g. the Justice Department and the F.T.C., so that it remains likely that the implementation of the system of the present invention will require the user to maintain the image recognition and characterization system, rather than rely on a broadcast of the characterization along with the source material. It is nevertheless within the skill of the art to implement such a broadcast system. It should be noted that both are included within the scope of the present invention.

According to the present invention, if such characterizations are broadcast, they may, as stated above, make use of unused available spectrum bandwidth within the NTSC channel space, or other broadcast system channel space, or may be "simulcast" on a separate channel, such as an FM sideband or separate transmission channel. Use of a separate channel would allow a separate organization, other than the network broadcasters, to provide the characterization data for distribution to users of devices that make use of the present intelligent system for controlling a VCR. Thus, the characterization generating means need not be directly linked to the local user machine in order to fall within the scope of the present invention.

A menu based remote control-contained display device is disclosed in Platte, Oberjatzas, and Voessing, "A New Intelligent Remote Control Unit for Consumer Electronic Device", IEEE Transactions on Consumer Electronics, Vol. CE-31, No. 1, February 1985, 59-68, incorporated herein by reference. This system does not incorporate on-screen programming, nor various aspects of the display of the present invention.

Research has been performed on video cassette recorder ("VCR") usability, technology, is implementation, programming steps, current technology, input devices, and human mental capacity. This research has resulted in a new paradigm for the entry of programming data into a sequential program execution device, such as a VCR, by casual users.

Four major problems in the interfaces of VCRs were found to exist. The first is that users spend far too much time searching for necessary information, which is necessary in order to complete the programming process. Second, people do not program the VCR to record at a later time (time-shift) frequently, and thus forget the programming steps in the interim. Third, the number of buttons on many remote control devices has become overwhelming. Fourth, people have become reluctant to operate or program VCRs because of their difficult operation. It was found that, by minimizing the learning and searching times, the user's programming time and frustration level can be greatly reduced. These concepts are easily applied to other special purpose programmable devices, and also to general purpose programmable devices wherein the programming paradigm is event-driven, as well as other programming systems. It should also be noted that it is within the scope of the present invention to provide an improved interface and programming environment for all types of programmable devices, and in this regard, the present invention incorporates adaptive features which optimize the programming environment for both the level of the user and the task to be programmed.

In optimizing the interface, four elements are most important: the input device, the display format, the sequence of the programming operation, and the ability of the device to properly interpret the input as the desired program sequence.

The present invention proceeds from an understanding that an absence of user frustration with respect to a programmable consumer or industrial device or interface, may be as important as the potential functionality thereof. The interface must be designed to minimize the user's frustration level. This can be accomplished by clearly furnishing the possible choices, presenting the data in a logical sequence, and leading the user through the steps necessary to program the device.

Research has indicated that survey respondents liked color coding and on-screen programming, while they disliked small print, blinking displays, confusing menus and too much information on the display. They also liked remote control access, with provisions for programming the VCR from the front panel, if desired, with large, well labelled single function buttons, keypad entry, natural layout of functions, "up" and "down" keys, an uncluttered display panel, a "help" key, simplified programming with fewer steps, one-touch recording, and an "OK" or "ready" indicator. Finally, they desired step-by-step instructions, the is ability to backtrack to correct mistakes, a well ordered programming sequence, automatic completion of strings which must be entered, automatic compensation for lack of leading "0", and feedback of correct or erroneous inputs or status conditions.

Other objects and features of the present invention will become apparent from the following detailed description considered in conjunction with the accompanying drawings. It is to be understood, however, that the drawings are designed solely for the purposes of illustration and not as a definition of the limits of the invention, for which reference should be made to the appended claims.

OBJECTS OF THE PRESENT INVENTION

It is therefore an object of the present invention to provide a programmable apparatus for receiving instructions from a programmer and causing an action to occur on the happening of an event, comprising: an input device, producing an input instruction signal; a control means for receiving said input instruction signal, and storing a program instruction associated with said input instruction signal, said control means storing sufficient program instructions to perform an action on the occurrence of an event, said control means monitoring a status of said apparatus to determine the occurrence of various events, comparing the determined events with the program instructions, and performing said action on the occurrence of said event; a display means for interactively displaying information related to the instructions to be received, and responsive thereto, controlled by said control means, so that the programmer is presented with feedback on a current state of the apparatus and said program instruction; wherein said control means further comprises means for detecting one or more characteristics of said input instruction signal independent of said program instruction selected from the group consisting of a velocity component, an efficiency of input, an accuracy of input, an interruption of input, a high frequency component of input and a past history of input by the programmer, whereby when said control means detects a characteristic indicating that said display means is displaying information in a suboptimal fashion, said control means controls said display means to display information in a more optimal fashion.

It is also an object of the present invention to provide a programmable apparatus for receiving instructions from a programmer and causing an action to occur on the happening of an event, comprising: an input device, producing an input instruction signal; a control means for receiving said input instruction signal, and storing a program instruction associated with said input instruction signal, said control means storing sufficient program instructions to perform an action on the occurrence of an event, said control means monitoring a status of said apparatus to determine the occurrence of various events, comparing the determined events with the program instructions, and performing said action on the occurrence of said event; a display means for interactively displaying information related to the instructions to be received, and responsive thereto, controlled by said control means, so that the programmer is presented with feedback on a current state of the apparatus and said program instruction; wherein said control means further comprises means for detecting a need by the programmer for more detailed information displayed on said display means, by detecting one or more characteristics of said input instruction signal independent of said program instruction selected from the group consisting of a velocity component, an efficiency of input, an accuracy of input, an interruption of input, a high frequency component of input and a past history of input by the programmer, whereby when said control means detects a characteristic indicating that said display means is insufficiently detailed information, said control means controls said display means to display more detailed information.

It is a further object of the present invention to provide a programmable apparatus having a data input, said apparatus receiving instructions from a programmer and causing an action to occur on the receipt of data indicating an event, comprising: an input device, producing an input instruction signal; a control means for receiving said input instruction signal, and storing a program instruction associated with said input instruction signal, said control means storing sufficient program instructions to perform an action on the receipt of data indicating an event, said control means monitoring the data input; a display means for interactively displaying information related to the instructions to be received, and responsive thereto, controlled by said control means, so that the programmer is presented with feedback on a current state of the apparatus and said program instruction; wherein said control means receives a programming preference indicating a desired event from said input device which does not unambiguously define said event, and said control means monitors said data and causes the occurrence of the action when a correlation between said programming preference and said monitored data is above a predetermined threshold, indicating a likely occurrence of said desired event.

It is also object of the present invention to provide the programmable aforementioned apparatus, wherein said input device is remote from said display means, and provides a direct manipulation of display information of said display means, further comprising means for verifying said program instructions so that said program instructions are executable by said control means. The control means may further comprise a calendar.

It is also an object of the present invention to provide a programmable apparatus, wherein said control means provides an option, selectable by said input means in conjunction with said display means, for changing an input program instruction prior to execution by said control means, so that said apparatus enters a state wherein a new program instruction may be input to substitute for said changed input step, wherein said control means verifies said program instructions so that said program instructions are executable by said control means.

It is still another object of the present invention to provide a programmable apparatus, wherein said control means further causes said display means to display a confirmation screen after said program instructions are input, so that the programmer may confirm said program instructions.

Another object of the present invention provides a programmable information storage apparatus having a data input, for receiving data to be stored, said apparatus receiving instructions from a programmer and causing an action to occur on the receipt of data indicating an event, comprising: means for storing data from said data input; an input device, producing an input instruction signal; a control means for receiving said input instruction signal, and storing a program instruction associated with said input instruction signal, said control means storing sufficient program instructions to perform an action on the receipt of data from said data input indicating an event, said control means monitoring the data input to determine the occurrence of various events, comparing the determined events with the program instructions, and performing for storing the data said action on the occurrence of said event; wherein said control means receives identifying data from at least one of said input device and the data input, said identifying data being stored separately from said input data on a storage medium. The programmable information storage apparatus may also include means for reading said identifying data stored separately on said storage medium, and may also receive as an input said identifying data.

Another object of the present invention is to provide a programmable information storage apparatus, wherein said control means further comprises means for recognizing character data present in a data stream of said input data, said identifying data comprising said recognized character data.

It is a still further object of the present invention to provide a video tape recording apparatus, comprising a video signal receiving device, a recording device for recording said video signal, wherein said control analyzes said video signal for the presence of a symbol, and recognizes said symbol as one of a group of recognized symbols, and said control stores said recognized symbol separately from said video signal.

Another object of the present invention is to provide a recording device for recording an analog signal sequentially on a recording medium, comprising means for characterizing the analog signal, wherein data representing said characterization and a location of the analog signal on the recording medium are stored in a directory location on the recording medium separately from the analog signal.

It is a further object of the present invention to provide an interface for a programmable control for input of a program for a controller to execute, which performs an action based on an external signal, comprising an input device, a controller for receiving data from said input device and from an external stimulus, a plant being controlled by said controller based on an input from said input device and said external stimulus, and a display device being controlled by said controller, for providing visual feedback to a user operating said input device, wherein: a predetermined logical sequence of programming options is presented to the user on said display device, in a plurality of display screens, each of said display screens differing in available programming choices; said logical sequence including a correct sequence of choices to set an operable control program, so that no necessary steps are omitted; said external stimulus comprises a timing device, and said display comprises a display option for programming said plant to perform an action at a time which is input through said input device as a relative position on said display device, said relative position including a means for displaying an absolute time entry and means for displaying a relative time entry, said display also comprising a display option means for performing an action at a time; said control comprises means for presenting the user, on said display device, with a most probable action, which may be selected by the user through activation of said input device without entering data into said controller through said input device relating to both said action and said event; said display also comprising means for indicating completion of a programming step after entry of data, which means will not allow the user to indicate to said controller that said programming step is completed if information necessary for execution of said step is not available to said controller; and said controller being capable of controlling said display device to present information to the user relating to the use of the apparatus if necessary for use of the device by the user.

Another object of the present invention provides a system for presenting a program to a viewer, comprising: a source of program material; means for determining a viewer preference; means for receiving the program material from said source; means for characterizing the program material based on its content; means for correlating said characterized content of the program material with said determined viewer preference to produce a correlation index; and means for presenting the program material to the viewer, if said correlation index indicates a probable high correlation between said characterization of the program material and said viewer preference.

Still another object of the present invention is to provide a system, wherein said program material is encrypted, further comprising: means for decrypting the program material to produce a decryption event; and means for charging an account of the viewer based on the occurrence of a decryption event.

Another object of the present invention is to allow said means for characterizing the program material to operate without causing a decryption event. Further, the system may comprise a memory for storing the program material while said characterizing means produces characterized content and said correlating means produces said correlation index. The characterizing means may also characterize the program material stored in memory, and the program material stored in memory may be compressed.

Another object of the present invention is to provide a system for presenting a program to a viewer, comprising: a source of program material; means for determining a viewer preference; means for receiving the program material from said source; means for storing the program material; means for preprocessing the program material to produce a reduced data flow information signal retaining information relating to a character of the program material and eliminating data not necessary to characterize the program material; means for characterizing said information signal based on its content; means for correlating said characterized content of said information signal with said determined viewer preference to produce a correlation index; and means for presenting said stored program material to the viewer, if said correlation index indicates a probable high correlation between said characterization of said information signal and said viewer preference. The system may also include a means for storing said information signal, wherein said characterizing means characterizes said stored information signal, and also a memory for storing the program material while said characterizing means produces characterized content and said correlating means produces said correlation index.

It is a still further object of the present invention to provide a system, further comprising means for storing a characterization of the program material, further comprising feedback means for inputting a feedback signal from the viewer indicating a degree of agreement with said presented stored program material, wherein said feedback signal and said stored characterization are used by said viewer preference determining means to determine a new viewer preference.

Another object of the present invention is to provide a controller for controlling a plant, having a sensor for sensing an external event and producing a sensor signal, an actuator, responsive to an actuator signal, for influencing said external event, and a control means for receiving said sensor signal and producing an actuator signal, comprising: means for inputting a program; means for storing said program; means for characterizing said sensor signal to produce a characterized signal; and means for comparing said characterized signal with a pattern stored in a memory to produce a comparison index, wherein said actuator signal is produced on the basis of said comparison index and said program, wherein said characterization comprises an Affine transformation of said sensor signal. The characterization may comprise both an Affine transformation and a Fourier transformation.

It is another object of the present invention to provide a method for automatically recognizing digital image data consisting of image information, the method comprising the steps performed by a data processor of: storing a plurality of templates; storing the image data in the data processor; generating a plurality of addressable domains from the stored image data, each of the domains representing a portion of the image information; creating, from the stored image data, a plurality of addressable mapped ranges corresponding to different subsets of the stored image data, the creating step including the substep of: executing, for each of the mapped ranges, a corresponding procedure upon the one of the subsets of the stored image data which corresponds to the mapped ranges; assigning identifiers to corresponding ones of the mapped ranges, each of the identifiers specifying for the corresponding mapped range a procedure and a address of the corresponding subset of the stored image data; optionally subjecting a domain to a transform selected from the group consisting of a predetermined rotation, an inversion, a predetermined scaling, and a predetermined frequency domain preprocessing; selecting, for each of the domains or transformed domains, the one of the mapped ranges which most closely corresponds according to predetermined criteria; representing the image information as a set of the identifiers of the selected mapped ranges; and selecting, from the stored templates, a template which most closely corresponds to the set of identifiers representing the image information. The step of selecting the mapped ranges may also include the substep of selecting, for each domain, a most closely corresponding one of the mapped ranges.

It is another object of the present invention to provide a method wherein the step of selecting the most closely corresponding one of the mapped ranges includes the step of selecting, for each domain, the mapped range which is the most similar, by a method selected from one or more of the group consisting of selecting minimum Hausdorff distance from the domain, selecting the highest cross-correlation with the domain, selecting the highest fuzzy correlation with the domain and selecting the minimum mean square error with the domain.

Another object of the present invention provides a method wherein the step of selecting the most closely corresponding one of mapped ranges includes the step of selecting, for each domain, the mapped range with the minimum modified Hausdorff distance calculated as $D[db,mrb]+D[1-db,1-mrb]$, where D is a distance calculated between a pair of sets of data each representative of an image, db is a domain, mrb is a mapped range, $1-db$ is the inverse of a domain, and $1-mrb$ is an inverse of a mapped range.

Another object of the present invention provides a method wherein the digital image data consists of a plurality of pixels each having one of a plurality of associated color map values, further comprising the steps of: optionally transforming the color map values of the pixels of each domain by a function including at least one scaling function for each axis of the color map, each of which may be the same or different, and selected to maximize the correspondence between the domains and ranges to which they are to be matched; selecting, for each of the domains, the one of the mapped ranges having color map pixel values which most closely correspond to the color map pixel values of the domain according to a predetermined criteria, wherein the step of representing the image color map information includes the substep of representing the image color map information as a set of values each including an identifier of the selected mapped range and the scaling functions; and selecting a most closely corresponding stored template, based on the identifier of the color map mapped range, the scaling functions and the set of identifiers representing the image information. The first criteria may comprise minimizing the Hausdorff distance between each domain and the selected range.

Another object of the present invention is to provide a method further comprising the steps of: storing delayed image data, which represents an image of a moving object differing in time from the image data in the data processor; generating a plurality of addressable further domains from the stored delayed image data, each of the further domains representing a portion of the delayed image information, and corresponding to a domain; creating, from the stored delayed image data, a plurality of addressable mapped ranges corresponding to different subsets of the stored delayed image data; matching the further domain and the domain by subjecting a further domain to one or both of a corresponding transform selected from the group consisting of a null transform, a predetermined rotation, an inversion, a predetermined scaling, and a predetermined frequency domain preprocessing, which corresponds to a transform applied to a corresponding domain, and a noncorresponding transform selected from the group consisting of a predetermined rotation, an inversion, a predetermined scaling, a translation and a predetermined frequency domain preprocessing, which does not correspond to a transform applied to a corresponding domain; computing a motion vector between one of the domain and the further domain, or the set of identifiers representing the image information and the set of identifiers representing the delayed image information, and storing the motion vector; compensating the further domain with the motion vector and computing a difference between the compensated further domain and the domain; selecting, for each of the delayed domains, the one of the mapped ranges which most closely corresponds according to predetermined criteria; representing the difference between the compensated further domain and the domain as a set of difference identifiers of a set of selected mapping ranges and an associated motion vector and representing the further domain as a set of identifiers of the selected mapping ranges; determining a complexity of the difference based on a density of representation; and when the difference has a complexity below a predetermined threshold, selecting, from the stored templates, a template which most closely corresponds to the set of identifiers of the image data and the set of identifiers of the delayed image data.

Another object of the present invention provides an apparatus for automatically recognizing digital image data consisting of image information, comprising: means for storing template data; means for storing the image data; means for generating a plurality of addressable domains from the stored image data, each of the domains representing a different portion of the image information; means for creating, from the stored image data, a plurality of addressable mapped ranges corresponding to different subsets of the stored image data, the creating means including means for executing, for each of the mapped ranges, a procedure upon the one of the subsets of the stored image data which corresponds to the mapped range; means for assigning identifiers to corresponding ones of the mapped ranges, each of the identifiers specifying for the corresponding mapped range an address of the corresponding subset of stored image data; means for selecting, for each of the domains, the one of the mapped ranges which most closely corresponds according to predetermined criteria; means for representing the image information as a set of the identifiers of the selected mapped ranges; and means for selecting, from the stored templates, a template which most closely corresponds to the set of identifiers representing the image information.

BRIEF DESCRIPTION OF THE DRAWINGS

Embodiments of the present invention are shown in the figures in the drawings, in which.

DETAILED DESCRIPTION OF THE PREFERRED EMBODIMENT

Figure 1:
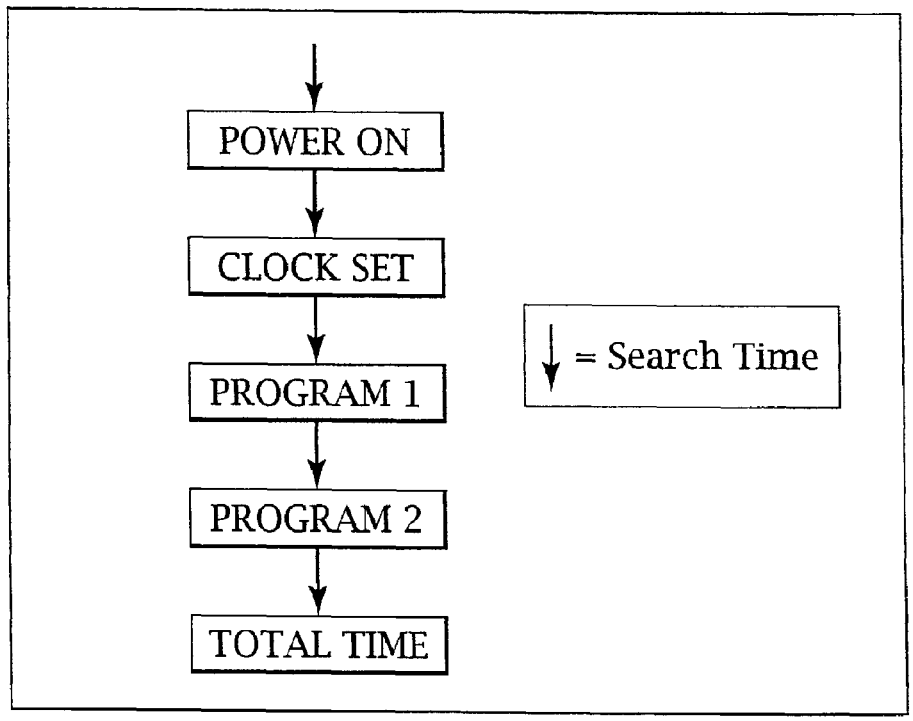
FIG. 1 is a flow chart of the steps required to set a VCR.

Many design considerations were found to be important in the improved interface of the present invention:

The interface should preferably employ only minimal amounts of abbreviations and the use of complete words is especially preferred. However, standard abbreviations and symbols are acceptable, and displayed character strings may be shortened or truncated in order to reduce the amount of information that is to be displayed, where necessary or desirable. An option may be provided to the user to allow full words, which may decrease the information which may be conveyed on each screen and increase the number of screens that must be displayed, or abbreviations and symbols, which may minimize the number of displayed screens of information, thus allowing the user to make the compromise. This aspect of the system may also be linked to the adaptive user level function of the present invention, wherein abstract symbols and abbreviations are presented to advanced users, while novices are presented with full words, based on an implicit indication of user level. These abstract symbols and abbreviations may be standard elements of the system, or user designated icons. Of course, the user could explicitly indicate his preference for the display type, thus deactivating the automatic adaptive user level function.

Some display systems have a higher available resolution than others, and the interface is preferably arranged to optimize the intended display for the resolution limits and display format of the intended or available display device. Further, even with sufficient resolution, certain displays are of small size, and thus the visibility of the information may also be optimized by taking into consideration the size, resolution, contrast, brightness of the display, ambient conditions, characteristics of the human visual system, factors specific for a known user, and the available options of the apparatus. Thus, the interface may employ a number of methods to optimize the visibility of the information for a variety of display devices, storage formats and transmission standards, which may include: NTSC, PAL, SECAM, CCIR-601, HDTV, MUSE, IDTV, VHS, S-VHS, Beta, SuperBeta, Hi-8 mm, videotel or picturephone (Px64), computer display standards (CGA, HGC, EGA, VGA, SVGA, XGA, Macintosh™, 8514, Private Eye™, LCD, etc.), etc., over a number of size ranges, e.g. about 1 $cm^2$ to about 10 $m^2$, with a resolution range including displays having about 16 dot matrix characters or about 16 by 64 dots to about 2,048 by 2,048 dots. Techniques such as antialiasing, font substitution, hinting, precompensating for expected distortion, etc., may all be employed to improve the readability of the display under various circumstances.

A preferred embodiment of the interface of the present invention, by automatic sequencing of steps, leads the user through the correct sequence of actions to set a program on the screen, so that no necessary steps are omitted, and no optional steps are accidentally omitted. These steps are shown diagrammatically in FIG. 15 of the present invention. In addition, such a system does not burden the user with the necessity of inputting superfluous information, nor overwhelm the user with the display of unnecessary data.

A built-in calendar menu screen is employed so that the user cannot set the device with a program step that relies on a non-existent date. Technology that will help eliminate the human problem of setting the wrong (yet existing) date may also be employed. Such technology might include accessing an on-line or other type of database containing media programming information, and prompting the user regarding the selected choice. In situations where it is applicable, the interface should prompt the user as to how many characters the interface is expecting, such as when entering the year.

Figure 16:
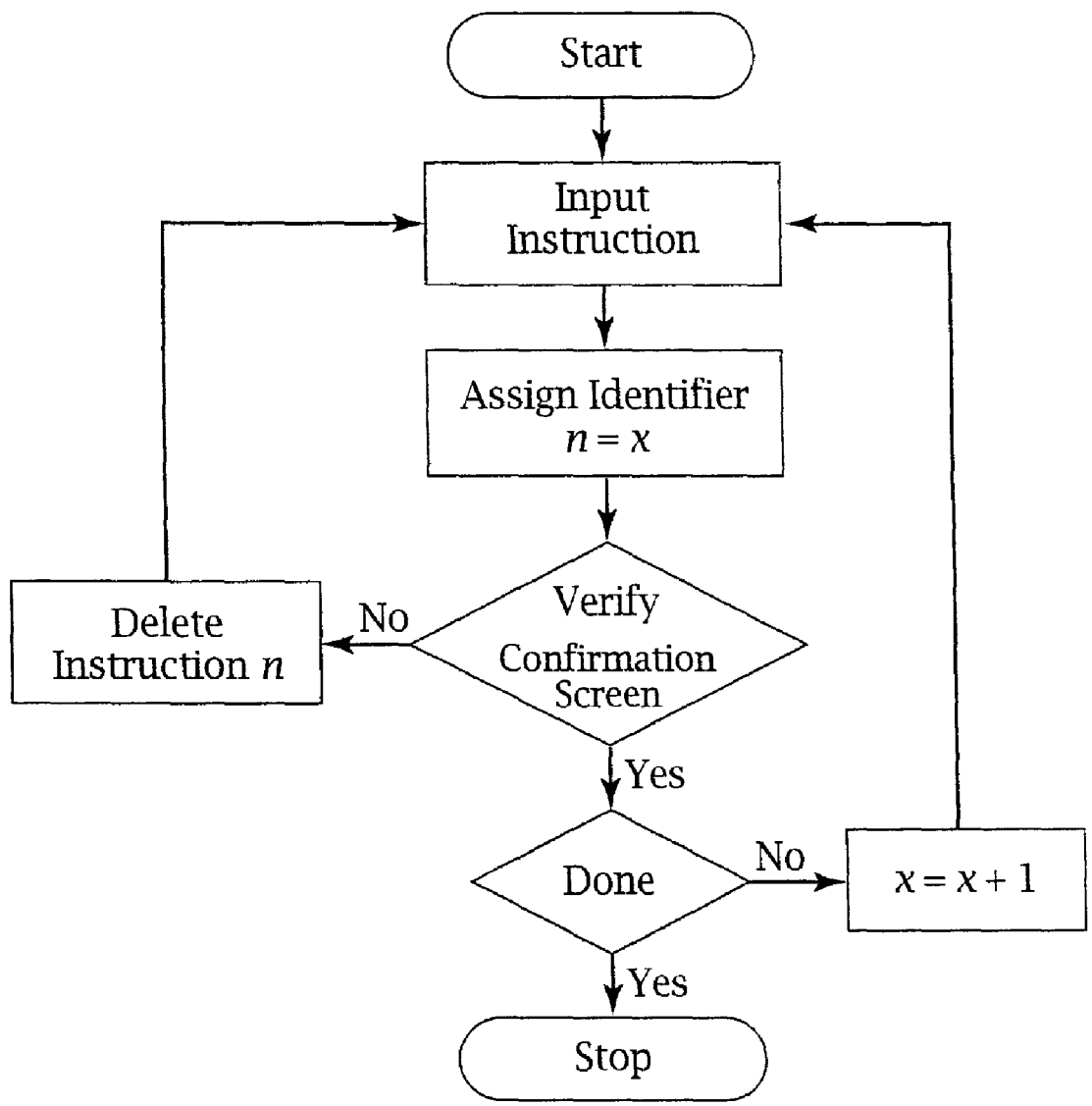
FIG. 16 is a flow diagram of the program input verification system of the present invention.

A preferred embodiment of the present invention has an easily accessible CHANGE or CANCEL feature, which facilitates backtracking or reprogramming the immediately previously entered information rather than forcing the user to repeat all or a substantial portion of the programming steps. A method of the is type described is shown in FIG. 16 of the present invention. User input is also facilitated by the provision of frequently used settings as explicit choices, such as "Record today", "Record tomorrow", "Noon", and "Midnight", so that the user does not have to specify a date in these cases. This will eliminate extra keypresses, and reduce the programming time. In addition, this could eliminate user errors. Frequently used choices for program selections are also provided to the user to reduce the number of programming steps necessary and provide the user with all the frequently used selections. The especially preferred choices are "Once On . . . ", "Once a Week on . . . ", "Monday-Friday at . . . ", "Everyday at . . . ". These redundant, complex instructions reduce the number of keystrokes required for data entry, and reduce the amount of programming time required.

A preferred embodiment of the present invention provides, in the event that a color screen is available, conservatively used color coding, which allows the user to effectively and quickly acknowledge the function of each aspect of the screen. The preferred colors are royal blue for "help," red for mistakes, light blue for information previously entered, and yellow for current information being entered. Of course, other colors could be used, according to the user's or designer's preference, cultural differences, and display parameters.

Figure 15:
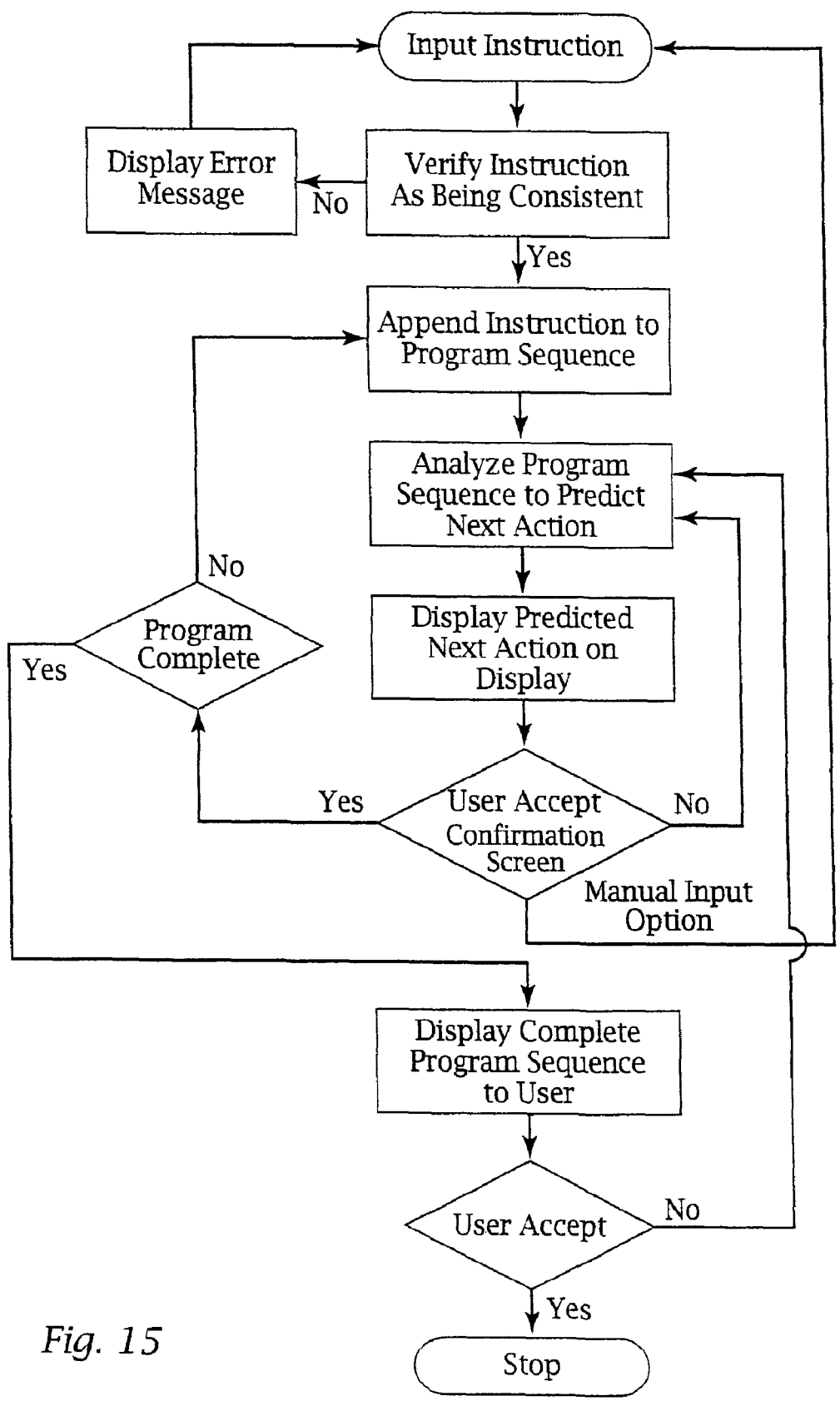
FIG. 15 is a flow diagram of a predictive user interface of the present invention.

A preferred embodiment of the interface contains a confirmation screen which displays to the user all of the categories and selections previously explicitly entered or otherwise inferred, and should be easily understandable. This is shown in FIG. 15 of the present invention. All of the necessary information is displayed on this screen, in addition to the change and cancel options, if possible.

The entering of information on each screen is preferably consistent throughout the program. All of the screens preferably have similar layouts. "Buttons" or screen locations which are keyed to a particular function, which appear on multiple screens, should appear in approximately the same location on all screens. However, in certain cases, relatively more important information on a given screen may be displayed more prominently, and possibly in a different screen location, in order to reduce the search time. Further, when other factors dictate, each screen may be independently optimized for the prescribed function. For example, a representation of an analog clock dial may be used to set time information. However, even if the format does change, a standard scheme should be maintained, such as the use of a particular color to indicate that a particular program aspect has been changed.

The interface should display data consistent with standards and conventions familiar to users. For, e.g., when entering dates, users are most familiar with calendars. However, this type of presentation of choices does not eliminate the human problem of entering incorrect information, e.g., setting a wrong, but existing, date. The problem of ensuring the accuracy of user input may be addressed by an intelligent interface which stores data concerning programming, user preferences, and by means of some logical method, such as Boolean logic, fuzzy logic, neural network theory, or any other predictive system, determines if an entry is likely in error. Of course, these predictive systems would also provide an initial default entry, so that the a priori most probably action or actions are initially presented to the user. In addition to following conventions of information presentation to the user, the interface of the present invention may also provide emulations of other user interfaces of which a particular user may be familiar, even if these are not optimized according to the presently preferred embodiments of the present invention, or not otherwise well known. These emulations need not be of the same type of device, so that a broad based standard for entry of information into programmable controls, regardless of their type, may be implemented. By allowing emulation, the interface of the present invention could provide compatibility with a standard or proprietary interface, with enhanced functionality provided by the features of the present interface. These enhanced functional intelligent aspects of the controller may be implemented by means of software programming of a simple microcomputer, or by use of more specialized processors, such as a Fuzzy Set Processor (FSP) or Neural Network Processor. Of these, FSP's are preferred because they have the advantage of being easier to program through the use of presumptions or rules for making the fuzzy inferences, while Neural Networks are less easily programmed and their network weighing values are not easily understood in the abstract. Thus, neural networks tend to require extensive "training", while Fuzzy Set Processors may be explicitly programmed without the need of duplicating or simulating actual operating conditions.

The most frequently used choices preferably should be displayed as the default setting. The screen cursor preferably appears at the "accept" screen button, when the screen is displayed. This default can either be set in advance, or acquired by the system. In the case of acquired defaults, these may be explicitly set by the user or adaptively acquired by the system through use. The interface of the present invention may be taught, in a "teach" mode, the preferences of the user, or may also acquire this information by analyzing the actual choices made by the user during operation of the interface and associated controller. This type of operation is shown schematically in FIG. 15 of the present invention. The options of "Midnight" (12:00 AM) and "Noon" (12:00 PM) should preferably be present, as some people often become confused when distinguishing between them. Icons, such as those indicative of the "sun" and the "moon", may also be used to facilitate data entry for AM and PM. The interface should preferably utilize an internal clock and calendar so that the user cannot set the time or program to record on a nonexistent date. Such a system could also compensate for daylight-savings time seasonal adjustments.

The cursor is preferably distinctive and readily distinguished from other parts of the screen. This may be by color, attribute (i.e. blinking), size, font change of underlying text, or by other means.

The user can preferably exit the programming sequence at any time by selecting a "Main Menu" button which may be on the lower left-hand corner of every screen. The user is preferably provided with an adequate amount of feedback, and error messages should be directive in nature. An acknowledgement is preferably displayed after each entry. The user should preferably not be able to go to the next programming step until the current step has been completed. A message to convey why the user can not continue should appear when an attempt to prematurely continue is recognized.

The "help" function is available for when the subject does not know what to do. The "help" screen(s) preferably explains the functions of each of the available buttons or functions, but may also be limited to those that are ambiguous. The "help" screen may also be used to indicate a current status of the interface and the controller. Further, the "help" function may also provide access to various other functions, such as advanced options and configurations, and thus need not be limited to merely providing information on the display. The help system may incorporate a hypertext-type system, wherein text or information relating to concepts that are conceptually linked may be easily accessed from one another, and in a logical sequence. To eliminate the possibility of the user trying to make selections on merely informative help screens, the cursor, in these cases, should be locked to a choice which returns the user to where they left off in the programming sequence, and this choice should be highlighted. The "help" function may also comprise "balloon help" similar to the system adopted by Apple Computer, Inc. in Macintosh Operating System 7.0 and later versions.

The interface preferably initiates the programming sequence where the user wants to be, so that the interface has so-called "smart screens". For example, when a VCR is first powered up, and the time and date are not stored in the machine, the "set date" and "set time" screens should appear. The sequence of screens may also vary depending on the system predicted requirements of the user and various aspects of the improved interface of the present invention. This is shown schematically in FIG. 17 of the present invention.

The preferable input device for the interface of the present invention provides as few buttons as possible to achieve the required functionality, thus reducing potential user intimidation, focusing the user's attention on the interactive display screen, where the available choices are minimized to that number necessary to efficiently allow the user to program the discrete task presented. A computer mouse with 1 to 3 buttons is the preferred input device, for use with a general purpose computer as a controller, while a trackball on a remote control device is especially preferred for limited purpose controllers because it does not require a flat surface for operation. Other stationary or movement sensitive input devices may, of course be used, such as joysticks, gyroscopes, sonic echo-location, magnetic or electrostatic location devices, RF phase location devices, etc. The present interface minimizes the number of necessary keys present on an input screen, while maintaining the functionality of the interface. It is noted that a strict minimization without consideration of functionality, might lead to inefficiency. For example, if the user wants to record a program which airs Monday-Friday, he would have to set five separate programs, rather than one program if a "weeknights" choice is made available.

Figure 17:
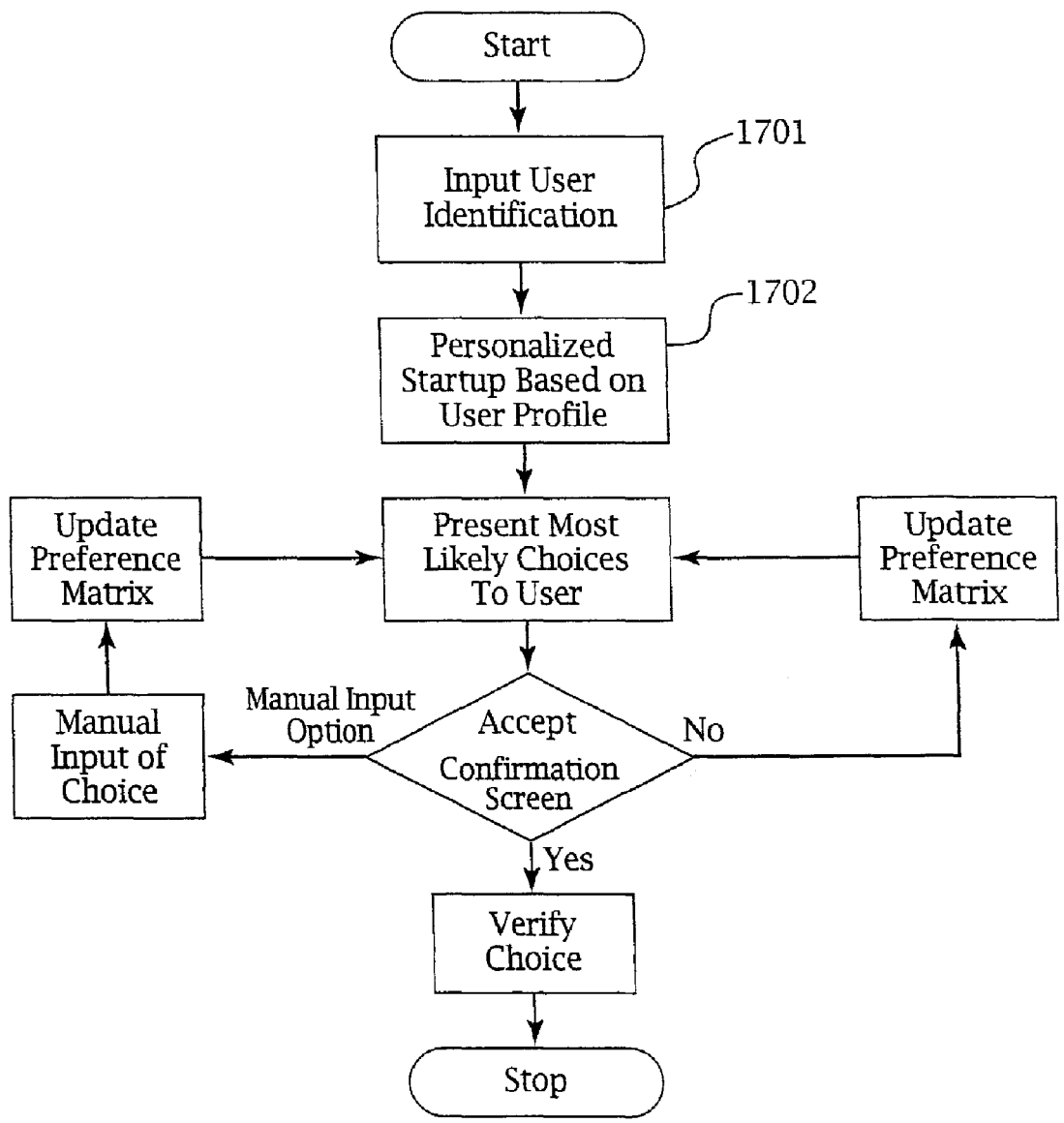
FIG. 17 is a flow diagram of a predictive user preference aware interface of the present invention.
Figure 18:
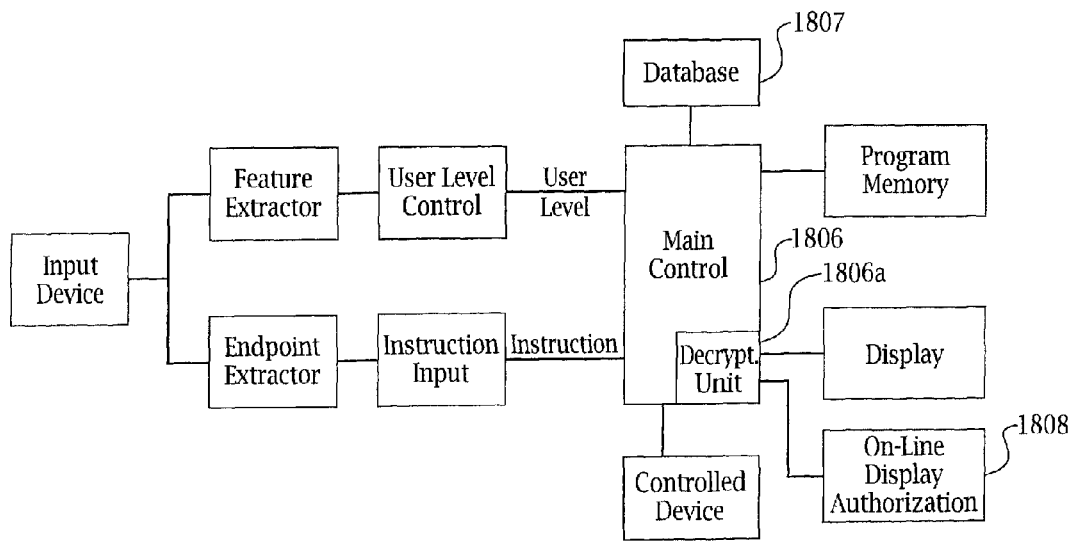
FIG. 18 is a block diagram of a non-program information feature extraction circuit of the present invention.

The interface preferably should be easy to learn and should not require that a user have prior knowledge of the interface in order to use it. An attempt has been made to minimize the learning curve, i.e., to minimize the time it takes to learn how to use the device. Research has shown that people do not program their VCRs often, and they often forget the sequence of steps between recording sessions. Thus, the present invention incorporates an adaptive user level interface, wherein a novice user is presented with a simpler interface with fewer advanced features initially available, so that there is less searching for the basic functions. A more advanced user is presented with more advanced choices and functions that are available initially. Thus, as shown in FIG. 17, the user identifies himself to the controller in block 1701. The controller 1806 of FIG. 18 thereafter uses a stored profile of the identified user in controlling the interaction with the user, as shown in block 1702 of FIG. 17, from information stored in the database 1807 of FIG. 18 of the present invention. It has been found that in the case of novice users, a greater number of simple instructions may be more quickly and easily input rather than a potentially fewer number of a larger set of more complex instructions. It has further been found that, even if presented with a set of instructions which will allow a program to be entered with a fewer number of inputs, a novice user may choose to input the program using the simple instructions exclusively, thus employing an increased number of instructions and being delayed by an increased search time for those instructions that are used, from the larger set.

Figure 19:
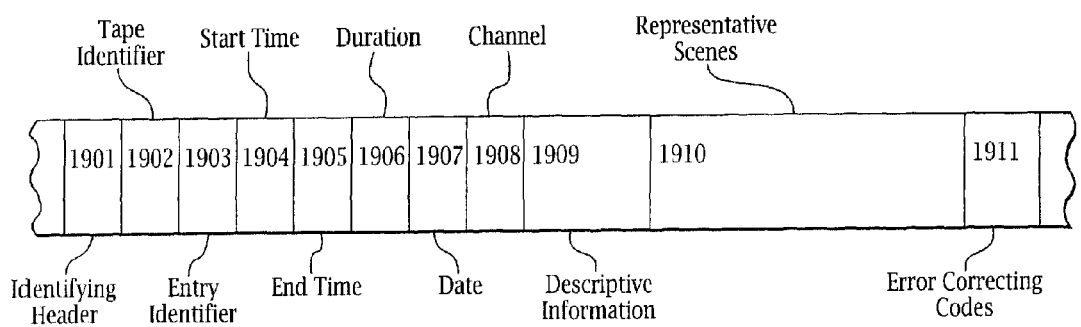
FIG. 19 is a diagram of a block of information for a catalog entry of the present invention.
Figure 20:
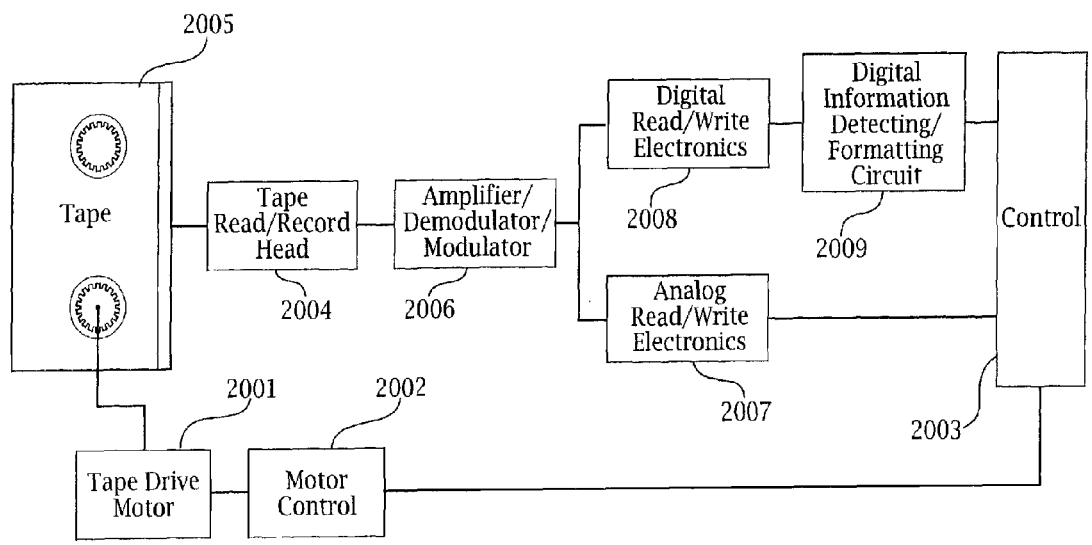
FIG. 20 is a block diagram of a digital information and analog signal reading/recording apparatus

In a preferred embodiment of the present invention, in a VCR, in order to track the content of the tape, a directory or a catalog is recorded, preferably digitally, containing the programming information, as well as additional information about the recorded programs, in a header, i.e., at the beginning of the tape, or in other locations on the tape. The device may also catalog the tape contents separately, and based on an identification of the tape, use a separately stored catalog. A format for storing information is shown in FIG. 19. Thus, if there are a number of selections on the tape, the entire contents of the tape could be accessible quickly, without the need for searching the entire tape. In a sequential access medium, the tape transport apparatus must still shuttle to the location of the desired material, but it may do so at increased speeds, because there is no need to read the tape once the location is determined; after the tape transport nears the desired spot, the tape may be slowed or precisely controlled to reach the exact location. The tape read and drive system is shown schematically in FIG. 20. The algorithm used in the final stage of approach may use fuzzy logic, mathematical formulae modeling the system (differential equations) to implement a Proportional-Differential-Integral (PID) controller, or a controller of higher order, or other known control methods. If a selection is to be recorded over, the start and stop locations would be automatically determined from the locations already indicated on the tape. Further, this information could be stored in memory device (which reads a catalog or index of the tape when a new tape is loaded) or non-volatile memory device (which stores information relating to known tapes within the device) or both types of memory in the VCR, so that an index function may be implemented in the VCR itself, without the need to read an entire tape. Optionally, a printer, such as a thermal label printer (available from, e.g. Seiko Instruments, Inc.), attached to the device, could be available to produce labels for the tapes, showing the index, so that the contents of a tape may be easily indicated. These contents may be derived from published data or database, transmitted data, and/or data determined by the control itself.

The present invention also allows encryption and decryption of material, much as the Videocipher series systems from General Instruments, and the fractal enciphering methods of $EMC^2$ and Iterated Systems, Inc. The present invention, however, is not limited to broadcasts, and instead could implement a system for both broadcasts and prerecorded materials. In the case of copying from one tape to another, such a system could not only provide the herein mentioned library functions of the present invention, it could also be used to aid in copy protection, serial copy management, and a pay-per-view royalty collection system. Such a system could be implemented by way of a telecommunication function incorporated in the device, shown as block 1808 of FIG. 18, or an electronic tag which records user activity relating to a tape or the like. A royalty fee, etc., could automatically be registered to the machine either by telecommunication or registry with the electronic tag, allowing new viewer options to be provided as is compared with present VCR's. For example, an encrypted tape or other source material (so that special playback equipment need be used, and a usage registered), used with this device, could be decrypted by a decryption key available by telecommunication with a communication center, remote from the user, in a decryption unit, shown schematically as the decrypt unit 1806*a* of FIG. 18. During acquisition of the electronic key, a VCR device of an embodiment of the present invention would indicate its identity, and an account is charged a fee for such use. Such a system could also be used for controlled access software, for example for a computer, wherein a remote account is charged for use of the software. Such a system differs from the normal "key" or "dongle" because it requires on-line access for an encryption key, which may offer different levels of use. It also differs from a call-in registration, because of the automatic nature of the telecommunication. This presently described system differs from normal pay-per-view techniques because it allows, in certain instances, the user to schedule the viewing. Finally, with an encryption function implemented in the VCR, the device allows a user to create and distribute custom "software" or program material. In addition, the present controller could then act as the "telecommunication center" and authorize decryption of the material. The present invention is advantageous in this application because it provides an advanced user interface for creating a program (i.e. a sequence of instructions), and it assists the user in selecting from the available programs, without having presented the user with a detailed description of the programs, i.e., the user may select the choice based on characteristics rather than literal description. In the case of encrypted program source material, it is particularly advantageous if the characterization of the program occurs without charging the account of the user for such characterization, and only charging the account if the program is viewed by the user. The user may make a viewing decision based on the recommendation of the interface system, or may review the decision based on the title or description of the program.

The encryption may be of any type, but for sensitive material, i.e. where mere distortion of the material (e.g., loss of synchronization information and phase distortion) would be insufficient, an analog multiple subband transform, with spread spectrum band hopping and digital encryption of various control signals, would be particularly difficult for the user to view without authorization, and could be effectively implemented with conventionally available technology. The fractal compression and encryption of the $EMC^2$ and Iterated Systems, Inc. system is also particularly preferred. Of course, if a digital storage format is employed, a strict digital encryption system may be used. The implementation of these encryption systems is known to those skilled in the art. These may include the NBS, VSS and NSA encryption standards, as well as various proprietary standards.

Menu options are preferably displayed in logical order or in their expected frequencies. Research has shown that a menu-driven interface is best for applications involving new users and does not substantially hinder experienced users. Menu selection is preferably used for tasks which involve limited choices. They are most helpful for users with little or no training. Each menu should preferably allow only one selection at a time. Most of the information is preferably entered using a numeric keypad (entry method), rather than using up and down arrow keys (selection method). If there is more than one keystroke required, the user must then select an "OK" button to continue in the programming sequence. However, if the selection method is used, all of the choices are displayed on the screen at once. In addition, no leading zeros are required. The number of steps required to complete the task through a sequence of menus should be minimized. The choice of words used to convey information should not be specific computer terms, but rather normal, everyday terms which are easy to understand. In addition, very few abbreviations should be used. All necessary information which the user needs should preferably be displayed at once. A user preferably should not have to rely on his memory or his previous experience, in order to find the correct choice, at least at the lower user levels. If all selections cannot be displayed at once, a hierarchical sequence is preferably used. A main menu should preferably provide a top level to which the user can always return and start over.

Users of VCRs are concerned with the layouts of both the control panel on the VCR device and the remote control. The vast majority prefer on-screen programming, which utilizes the remote control rather than the control panel, and express a preference for entering the numbers over pressing the "up" and "down" arrow keys for selecting the time and channel. Some favor choosing the "start" and "stop" times over choosing the "start" time and duration. When using existing VCRs, users generally want more feedback, and they want to know when the VCR is ready to program. Subjective data indicates that it is preferable to reduce the amount of time required to set the clock and two programs on a VCR to a maximum of 7 minutes, wherein the reduction should focus on lessening the search time, which is the amount of time consumed because users do not know what to do next.

Searching and learning times should be kept to a minimum in order to obtain a subjectively better interface. The system's logic should reflect the users' expectations, offer visual clues and feedback, and stay within human memory limits. For example, the VCR should turn on not only with the "Power" button, but also by inserting a tape into the device. In addition, the sequence of steps for setting the machine to is record, if the user does not indicate implicitly or explicitly that he knows how to use the device, should assume that the user is a novice. Nothing should be taken for granted. By developing an improved interface, an attempt is made to: Reduce the searching time; Reduce the learning time; Simplify the entering of data; and, Reduce the intimidation experienced by certain persons when using electronic devices.

In one embodiment of the present invention, the apparatus comprises a program entry device for a VCR. The human interface element has an infrared device to allow wireless communication between the human interface device and the VCR apparatus proper. The human interface device also includes a direct-manipulation type input device, such as a trackball or joystick. Of course it is understood that various alternatives can be employed, such as: the so-called "J-cursor" or "mousekey" which embeds a two (x,y) or three (x,y,p) axis pressure sensor in a button conformed to a finger, present in a general purpose keyboard; a keyboard joystick of the type described in Electronic Engineering Times, Oct. 28, 1991, p. 62, "IBM Points a New Way"; a so-called "isobar" which provides a two axis input by optical sensors ($\phi$,x), a two and one half axis (x,y,digital input) input device, such as a mouse or a "felix" device, infrared, acoustic, etc.; position sensors for determining the position of a finger or pointer on a display screen (touch-screen input); goniometer input (angle position, such as human joint position detector), etc. Thus, there are many available technologies which are adaptable for the present cursor positioning device. Many of these devices are summarized in Kraiss, K. F., "Alternative Input Devices For Human Computer Interaction", Forschunginstitut Für Anthropotecahnik, Werthhoven, F. R. Germany, incorporated herein by reference. A new device, which may also be suitable is the GyroPoint, available from Gyration Inc., which provides 2-D or 3-D input information in up to six axes of motion: height, length, depth, roll, pitch and yaw. While such a device is generally considered too complex and costly for use with a VCR, the many degrees of freedom available may provide suitable input for other types of controllers, such as those based on "Artificial Reality" or which track a moving object, where many degrees of freedom and a high degree of input accuracy is required.

These input devices may be broken down into a number of categories: direct inputs, i.e. touch-screen and light pen; indirect inputs, i.e. trackball, joystick, mouse, touch-tablet, bar code scanner (see, e.g., Atkinson, Terry, "VCR Programming: Making Life Easier Using Bar Codes"), keyboard, and multi-function keys; and interactive input, i.e. Voice activation/instructions (see, e.g., Rosch, Winn L., "Voice Recognition: Understanding the Master's Voice", PC Magazine, Oct. 27, 1987, 261-308); and eye tracker and data suit/data glove (see, e.g. Tello, Ernest R., "Between Man And Machine", Byte, September 1988, 288-293; products of EXOS, Inc; Data Glove).

Each of the aforementioned input devices has advantages and disadvantages, which are summarized in the Table of Advantages and Disadvantages.

Recent studies suggest that a "direct manipulation" style of interface has advantages for menu selection tasks. This type of interface provides visual objects on the screen which can be manipulated by "pointing" and "clicking" on the them. For example, the popular Graphical User Interfaces ("GUIs"), known in the art, use a direct manipulation style interface. A device such as a touch-screen, with a more natural selection technique, is technically preferable to the direct manipulation method. However, its low accuracy and high cost make other inputs more commercially practical. In addition, the user must be within arms' length of the touch-screen display. In a cursor positioning task, Albert (1982) found the trackball to be the most accurate pointing device and the touch-screen to be the least accurate when compared with other input devices such as the light pen, joystick, data tablet, trackball, and keyboard. Epps (1986) found both the mouse and trackball to be somewhat faster than both the touch-pad and joystick, but he concluded that there were no significant performance differences between the mouse and trackball as compared with the touch-pad and joystick.

It is noted that many present devices, intended for use in computers having graphic interfaces, would advantageously make use of an input device which is accessible, without the necessity of moving the user's hands from the keyboard. Thus, for example, Electronic Engineering Times (EET), Oct. 28, 1991, p. 62, incorporated herein by reference, discloses a miniature joystick incorporated into the functional area of the keyboard. This technique is directed at a different aspect of user interaction with a programmable device than the preferred embodiment of the present invention, in that the input device does not have a minimal number of keys. While the device disclosed in EET is intended for use in a full function keyboard, the preferred embodiment of the present invention is directed towards the minimization of the number of keys and avoidance of superfluous keys by provision of a pointing device. Of course, the present invention could be used with a full function input device, where appropriate, and the joystick of EET (Oct. 28, 1991, p. 62) would be suitable in this case.

In a study of menu selection tasks comparing the mouse and the trackball, the accuracy data showed no significant difference between the two. The key finding shows that both mouse users and trackball users performed better with the trackball on the menu selection task. It should be noted that this is was not the case for all tasks. However, the definition of the menu selection task used by Sperling, Bied, Tullis, in "Are You a Better 'Mouser' or 'Trackballer'? A Comparison of Cursor—Positioning Performance", An Interactive/Poster Session at the CHI+GI'87 Graphics Interface and Human Factors in Computing Systems Conference, incorporated herein by reference, which involved moving the cursor through a list of items and making a selection, is similar in nature to the selection tasks used in the present invention.

User dissatisfaction is generally proportionate to the length of "search time", the time necessary in order to locate and execute the next desired function or instruction. Search time may be minimized by the inclusion of up to a maximum of 4-8 choices per screen and by use of consistent wording and placement of items on the display.

The present invention proceeds from the understanding that there are a number of aspects of a programmable interface that are desirable:

1. Users should be able to operate the system successfully, without wide disparities in time. It should take, e.g., a normal person interacting with a VCR interface, less than seven minutes to set the time and two programs. Searching time spent in setting the clock, programming, getting into the correct mode, and checking whether or not the VCR is set correctly should be kept to a minimum through the appropriate choices of menu layout and the presentation of available choices.

2. Programming should be a stand-alone process, and not require an instruction manual. A help system should be incorporated in the interface. Word choices should be understandable, with a reduction in the use of confusing word terminology. Error messages should be understandable. The system should provide the ability to cancel, change or exit from any step.

3. The system should provide on-screen understandable information, with adequate visual feedback. The displays should be consistent. Color coding should be employed, where applicable, using, e.g. blue—new input; red—error condition; yellow—static, unchanged value. Layouts should be logical, and follow a predictable pattern. There should be a maximum of 4-8 choices per screen to minimize searching time. Keys should be labelled with text rather than with ambiguous graphics. However, a combination of both may be preferable in some cases.

4. Tasks should be simple, require a short amount of time and not create user frustration. The system should guide the user along a decision path, providing automatic sequencing of steps. The most frequently used choices should be provided as defaults, and smart screens may be employed. The learning curve should be minimized through the use of easily understandable choices. As a user becomes more sophisticated, the interface may present more advanced choices.

5. There should be a reminder to set the timer and to insert the tape once the programming information is entered. This reminder may also be automated, to eliminate the forgotten step of setting the timer, so that the VCR automatically sets the timer as soon as the necessary information is entered and a tape is inserted. Once the program is set in memory, a message should appear if a tape is not inserted. If the VCR is part of a "jukebox" (automatic changer), the tape may be automatically loaded. The VCR should preferably turn on when a tape is inserted. In addition, users should also be able to control the VCR with a Power button.

6. The VCR should be programmable from both the remote device and the control panel.

7. Each operation should require only one keypress, if possible, or otherwise reduce the number of keypresses required. There should be a 12 hour clock, not a 24 hour clock. There should be an on-screen keypad with entry keys, not "up" and "down" selector keys, allowing for the choice of specific day or time entry. There should be a "start" and a "stop" recording time, rather than "start" time and "length of program" or duration exclusively. The number of buttons on the remote control should be minimized so that as few buttons as are required are provided. The input device should provide for the direct manipulation of screen elements. A menu driven interface should be provided.

The interface of the present invention provides an automatic sequencing of steps which does not normally let the user continue until the previous step is complete. This is shown schematically in FIG. 16. In this manner, important steps will not be inadvertently omitted. Upon entering the programming sequence, if the current date or time is not set, the interface will prompt the user to enter this information. Thereafter, the interface will normally default to the main menu, the most frequently used first screen. Thus, the interface of the present invention is adaptive, in that its actions depend on the current state of the device, including prior programming or use of the device by the user. It can be appreciated that this adaptive behavior can be extended to include extended "intelligence". For example, if the device is similarly programmed on a number of occasions, then the default setup may be adapted to a new "normal" program mode. Further, the apparatus could provide multiple levels of user interface, e.g. beginner, intermediate, and advanced, which may differ for various functions, based on the behavior of the user. This user interface level determining feature extraction system is shown diagrammatically in FIG. 18. In contrast, prior art interfaces that have different user interface levels, allow the user to explicitly choose the interface level, which will then be used throughout the system until reset.

Figure 21:
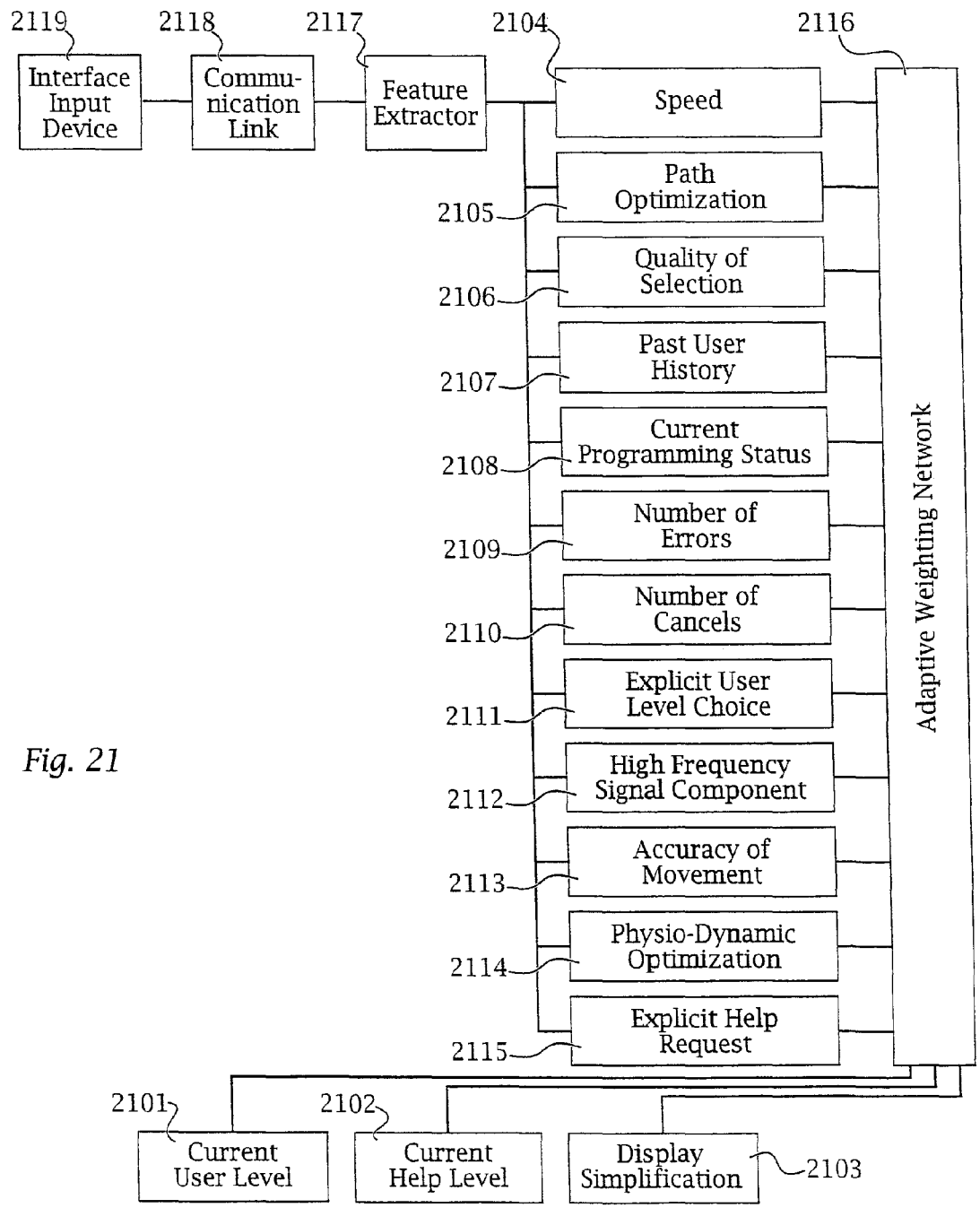
FIG. 21 is a block diagram of a user level determining system of the present invention.

The interface of the present invention would study the initial behavior of the user to determine the expected user level of that user. An apparatus for performing this function is shown schematically in FIG. 18, and in more detail in FIG. 21. Thus, for example, if a user has an unsteady hand while using the cursor control device, producing a high frequency component, measured in the high frequency signal component detector 2112, and likely to also be detected by the path optimization detector 2105, the output could be adaptively filtered to increase the reliability, a function of the main control 1806, without unnecessarily limiting an advanced user who wishes to move the cursor quickly. Another example of the use of an adaptive user interface level is a user who repeatedly requests "help" or user instructions, through the explicit help request detector 2115, which causes an output from the current help level output 2102; such a user may benefit from an automatic context-sensitive help system, however such a system may interfere with an advanced user, and is unnecessary in that case and should be avoided. This adaptive user interface level concept is not limited to a particular embodiment of the present invention, such as a VCR, and in fact, may be broadly used wherever a system may be used by both experienced and inexperienced users. This differs from normal help systems which must be specifically requested, or "balloon help" (Apple Computer, Macintosh System 7.0) which is either engaged or disengaged, but not adaptive to the particular situation based on an implicit request or predicted need. In the case of a single user or group of users, the interface could maintain a history of feature usage for each user, as in the past user history block 2107, and provide a lower user interface level for those features which are rarely used, and therefore less familiar to the user, through the current user level output 2101.

The intelligence of the device of the present invention is not limited by the foregoing examples; the user could also input characteristics of the program material that are desired, and characteristics of that program material which is not desired. The device would then, over time, monitor various broadcast choices, and determine which most closely match the criterion, and thus be selected. For example, if the user prefers "talk-shows", and indicates a dislike for "situation comedies" ("sitcoms"), then the device could scan the various available choices for characteristics indicative of one or the other type of programming, and perform a correlation to determine the most appropriate choice(s). A sitcom, for example, usually has a "laugh track" during a pause in normal dialogue. The background of a sitcom is often a confined space, from different angles, which has a large number of props. A talk-show, on the other hand, more often relies on actual audience reaction (possibly in response to an "applause" sign), and not prerecorded or synthesized sounds. The set is simple, and the broadcast often shows a head and neck, or full body shot with a bland background. A signal processing computer, programmed for audio and/or video recognition, could differentiate between at least the two types with some degree of efficiency, and with a possibly extended sampling time, have excellent recognition accuracy. Further, with the aid of feedback, the search criterion would be improved. Thus, a user could teach the interface through trial and error to record the desired programs. Thus, the presently described recognition algorithms may be adaptive and learning, and need not apply a finite set of predetermined rules in operation. For such a learning task, a neural network processor may be implemented, as known in the art.

Figure 22:
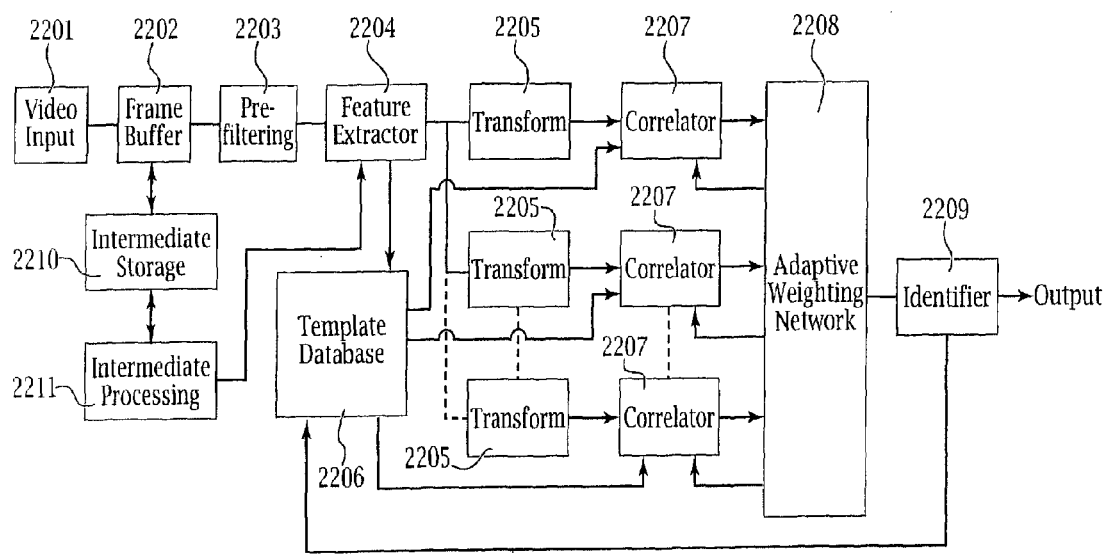
FIG. 22 is a block diagram of a template-based pattern recognition system of the present invention.

The feature extraction and correlation system of the present invention is shown in FIG. 22. In this figure, the video input, including the audio signal and all other available data, are input in the video input 2201. This is transferred to a frame buffer 2202, which temporarily stores all of the information. This frame buffer 2202 may have an integral or separate prefiltering component 2203. The filtered signal(s) are then passed to a feature extractor 2204, which divides the video frame into a number of features, including sound, movement, objects, correlated sound and object, background, etc. These features, are then passed to a transform engine or multiple engines in parallel, 2205. These transform engines 2205 serve to match the extracted features with the standard form of the templates in the template database 2206. The transformed extracted features and the templates are then correlated by a correlator or correlators 2207. The parallelism of the transforms and correlators serves to increase the recognition speed of the device. The outputs of the correlators are input into an adaptive weighing network 2208, to produce a probability of a match between a given feature and a given template. The recognition is completed in an identifier 2209, which produces a signal identifying one or more objects in the video frame input. The identifier 2209 also has an output to the template database 2206, which reinforces the recognition by providing feedback; therefore, if the same object appears again, it will be more easily recognized. The template database 2206 therefore also has an input from the feature extractor 2204, which provides it with information regarding the features recognized. It is also noted that, in addition to allowing recognition, the parallel transform engines 2205, correlators 2207, and adaptive weighing network 2208 also allows the system to ignore features that, though complex, do not aid in recognition. For example, during dialogue, the soundtrack voice will correlate with the mouth movements. Thus, the mouth movements aid little in recognition, and may be virtually ignored, except in the case where a particular person's mouth movements are unique, e.g., "Gomer Pyle". Thus, the complexity and parallelism in the intermediate recognition stages may actually simplify the later stages by allowing more abstract features to be emphasized in the analysis.

The pattern recognition function of the present invention could be used, in a VCR embodiment of the present invention to, e.g., to edit commercials out of a broadcast, either by recognition of characteristics present in commercials, in general, or by pattern recognition of specific commercials in particular, which are often repeated numerous times at various times of the day, and on various broadcast channels. Further, certain media present a recognizable audio or video cue when a commercial break has ended. (E.g. often sports events, such as the Olympic Games, will have theme music or distinctive video screens.) The present device need not respond immediately to such cues, and may incorporate a delay, which would store the information while a decision is being made. The temporary storage medium may be independent of the pattern recognition system. Thus, there may actually be two data streams: the first serving as the desired signal to be stored, and the second to the pattern recognition system. This system is advantageous because is allows a broadcast quality temporary storage, which may be analog in nature, to be separate from the digital signal processing and pattern recognition stage, which need only retain significant information for the pattern recognition, and therefore may be highly compressed, and devoid of various types of information which are irrelevant or of little importance to the pattern recognition functions. Further, the temporary storage may employ a different image compression algorithm, e.g. MPEG II or MPEG++, which is optimized for retention of visually important information, while the recognition system may use a compression system optimized for pattern recognition, which may retain information relevant to the recognition function which is lost in other compression systems, while discarding other information which would be visually important. Further, the compression algorithm is integral to the recognition function, preparing the data for the pattern matching and characterization, and therefore should be optimized for high throughput. In other words, the initial compression may include redundant information, if necessary in order to achieve real-time or near real-time recognition, and, thus may actually result in a larger intermediate data storage requirement than the instantaneous data presented to the recognition system; however, the term "compression", in this case, applies to the long term status of the device, and in a real-time recognition function, the amount of data stored for use in recognition will always be less than the cumulative amount of data presented, except during the very initial stages of data acquisition.

The image may be compressed using the so called "fractal transform", using the method of Barnsley and Sloan, which is implemented and available in product form from Iterated Systems, Inc., Norcross, Ga., as the FTC-II, which incorporates eight fractal transform integrated circuit chips, 1 MByte of RAM, and an Intel i80960CA-25 µP, and operates in conjunction with P.OEM software, which operates under MS-DOS. FTC-II hardware compression requires approximately 1 second per frame, while software decompression on an Intel 80486-25 based MS-DOS computer, using "Fractal Formatter" software, can be performed at about 30 frames per second, which allows approximately real time viewing. This is a non-symmetrical algorithm, requiring more processing to compress than to decompress the image. This method is advantageous because the transform allows compression up to about 2456:1, while still maintaining an aesthetically acceptable result. Further, since the method emphasizes the structure of the image, as opposed to the frequency decomposition used in DCT methods (JPEG, MPEG), the fractal method could be used as a part of the image recognition system. Further, the compression system might also be applicable to audio compression as well, so that a single hardware system could incorporate the basic functions of the device. It is noted that the audio compression and image recognition functions cannot be performed on the FTC-II board, and require a separate device. It should also be noted that an even more efficient compression-pattern recognition system could be constructed by using the fractal compression method in conjunction with other compression methods, which may be more efficient under certain circumstances, such as discrete cosine transform (DCT) or wavelet techniques.

Barnsley and Sloan's method for automatically processing digital image data consisting of image information, fully disclosed in U.S. Pat. Nos. 5,065,447 and 4,941,193, both expressly incorporated herein by reference, consists of the steps of storing the image data in the data processor, then generating a plurality of uniquely addressable domain blocks from the stored image data, each of the domain blocks representing a different portion of the image information such that all of the image information is contained in at least one of the domain blocks. A plurality of uniquely addressable mapped range blocks corresponding to different subsets of the stored image data are created, from the stored image data, with each of the subsets having a unique address. This step includes the substep of executing, for each of the mapped range blocks, a corresponding procedure upon the one of the subsets of the stored image data which corresponds to the mapped range block. Unique identifiers are then assigned to corresponding ones of the mapped range blocks, each of the identifiers specifying for the corresponding mapped range block a procedure and a address of the corresponding subset of the stored image data. For each of the domain blocks, the one of the mapped range blocks which most closely corresponds according to predetermined criteria is selected. Finally, the image information is represented as a set of the identifiers of the selected mapped range blocks. This method allows a fractal compression of image data. In particular, Drs. Barnsley and Sloan have optimized the match of the domain blocks with the mapping region by minimizing the Hausdorff distance. A decompression of the data precedes analogously in reverse order starting with the identifiers and the mapping regions to produce a facsimile of the original image. This system is highly asymmetric, and requires significantly more processing to compress than to decompress.

Basically, the fractal method proceeds from an understanding that real images are made up of a plurality of like subcomponents, varying in size, orientation, etc. Thus, a complex block of data may be described by reference to the subcomponent, the size, orientation, etc. of the block. The entire image may thus be described as the composite of the sub-images. This is what is meant by iterative function systems, where first a largest block is identified, and the pattern mapping is repetitively performed to describe the entire image.

The FTC-II board, as applied in the present invention, is used in conjunction with a frame-grabber board, such as Matrox, Quebec, Canada, Image-LC board, or a Data Translation DT1451, DT2651, DT2862, DT2867, DT2861 or DT2871, which may perform additional functions, such as preprocessing of the image signal, and may be further used in conjunction with an image processing system, such as the Data Translation DT2878.

A fractal-based system for real-time video compression, satellite broadcasting and decompression is also available from Iterated Systems, Inc. and Entertainment Made Convenient[2], Inc. (EMC[2]). In such a system, since the compressed signal is transmitted, the remote receiving system need not apply decompression prior to the intelligent pattern recognition function of the present invention. This system also incorporates anti-copy encryption and royalty and accounting documentation systems. Thus, the interface of the present invention could interact with the standard accounting system to allow royalty-based recording, and possibly implement a serial-copy recording prevention system. It is noted that the EMC[2] system does not incorporate the intelligent features of the present invention. In particular, a user must still explicitly select a program, rather than allow an intelligent system to assist in selection and programming of the device. This system is described in "EMC[2] Pushes Video Rental By Satellite", Electronic Engineering Times, Dec. 2, 1991, p. 1, p. 98, which is incorporated herein by reference.

Thus, one embodiment of the device may incorporate a memory for storing a program, before being transferred to a permanent storage facility, such as tape. Such a memory may include a hard disk drive, magnetic tape loop, a rewritable optical disk drive, or semiconductor memories, including such devices as wafer scale memory devices. This is shown diagrammatically as the intermediate storage 2210 of FIG. 22. The capacity of such a device may be effectively increased through the use of image data compression, which may be proprietary or a standard format, i.e. MPEG, MPEG-II, MPEG++ (Motion Picture Experts Group), JPEG (Joint Photographic Experts Group), Px64 (CCITT H.261, videoconferencing transmission standard), DVI (Digital Video Interactive), CDI (Compact Disk Interactive), etc. Standard devices are available for processing such signals such as the IIT Vision Processor (VP) chip, Integrated Information Technology Inc., Santa Clara, Calif., the C-Cube CL550B (JPEG) and CL950 (MPEG decoding), SGS-Thompson STI3220, STV3200, STV3208 (JPEG, MPEG, Px64), LSI Logic L64735, L64745 and L64765 (JPEG) and Px64 chip sets, and the Intel Corp. i750B DVI processor sets (82750PB, 82750 DB). These are available as single chips and chip sets; in board level products, such as the Super Motion Compression and Super Still-Frame Compression by New Media Graphics of Billerica, Mass., for the PC-AT bus; Optibase, Canoga Park, Calif. (Motorola DSP with dedicated processor for MPEG); NuVista+ from Truevision (Macintosh video capture and output); New Video Corp. (Venice, Calif.) EyeQ Delivery board for Macintosh NuBus systems (DVI); Intel Corp. ActionMedia II boards for Microsoft Windows and IBM OS/2 in ISA (AT bus); Micro Channel Architecture (MCA) (e.g., DVI, PLV 2.0, RTV 2.0) based machines; and as complete products, such as MediaStation by VideoLogic. The use and interfacing of chip sets and multimedia boards such as those described are known to those skilled in the art. It is noted that the present interface does not depend on a particular compression format or storage medium, so that any suitable format may be used. The following references describe various video compression hardware, and are incorporated herein by reference: Kim, Y., "Chips Deliver Multimedia", Byte, December 1991, pp. 163-173; and Donovan, J., "Intel/IBM's Audio-Video Kernel", Byte, December, 1991, pp. 177-202.

Various available DSP chips, exemplary board level signal processing products and available software are described in more detail in "32-bit Floating-Point DSP Processors", EDN, Nov. 7, 1991, pp. 127-146, incorporated herein by reference.

It should also be noted that the compression algorithm may be lossless or lossy, depending on the application. Various different methods and paradigms may be used. For example, DCT (discrete cosine transform), wavelets, fractals, and other known transform methods may be used. These may be implemented by various known means. A compressed image may also be advantageously used in conjunction with the image recognition system of the present invention, as described above. In such a case, the compression system would retain the information most important in the recognition function, and truncate the unimportant information.

A further method of performing pattern recognition, especially of two dimensional patterns, is optical pattern recognition, where an image is correlated with a set of known image patterns represented on a hologram, and the product is a pattern according to a correlation between the input pattern and the provided known patterns. Because this is an optical technique, it is performed nearly instantaneously, and the output information can be reentered into an electronic digital computer through optical transducers known in the art. Such a system is described in Casasent, D., Photonics Spectra, November 1991, pp. 134-140, which is incorporated herein by reference. The references cited therein provide further details of the theory and practice of such a system, and they are also incorporated herein by reference. Lendaris, G. G., and Stanely, G. L., "Diffraction Pattern Sampling for Automatic Target Recognition", Proc. IEEE 58:198-205 (1979); Ballard, D. H., and Brown, C. M., Computer Vision, Prentice Hall, Englewood Cliffs, N.J. (1982); Optical Engineering 28:5 (May 1988)(Special Issue on product inspection); Richards J., and Casasent, D., "Real Time Hough Transform for Industrial Inspection" Proc. SPIE Technical Symposium, Boston 1989 1192:2-21 (1989); Maragos, P., "Tutorial Advances in Morphological Image Processing" Optical Engineering 26:7:623-632 (1987); Casasent, D., and Tescher, A., Eds., "Hybrid Image and Signal Processing II", Proc. SPIE Technical Symposium, April 1990, Orlando Fla. 1297 (1990); Ravichandran, G. and Casasent, D., "Noise and Discrimination Performance of the MINACE Optical Correlation Filter", Proc. SPIE Technical Symposium, April 1990, Orlando Fla., 1471 (1990); Weshsler, H. Ed., "Neural Nets For Human and Machine Perception", Academic Press, New York (1991).

These optical recognition systems are best suited to applications where an uncharacterized input signal frame is to be compared to a finite number of visually different comparison frames (i.e., at least one), and where an optical correlation will provide useful information. Thus, if a user wished to detect one of, e.g., "Johnny Carson", "Dan Rather", "Willard Scott", or "Jane Pauley", a number of different views of these persons would be formed as a holographic correlation matrix, which could be superimposed as a multiple exposure, stacked in the width dimension, or placed in a planar matrix, side by side. The detection system produces, from the uncharacterized input image and the holographic matrix, a wavefront pattern that is detectable by photonic sensors. It is preferred that if multiple holographic images of a particular characterization are employed, that they each produce a more similar resulting wavefront pattern than the other characterizations, in order to enhance detection efficiency. The optical pattern recognition method is limited in that a holographic image must be prepared of the desired pattern to be detected, and that optically similar images might actually be of a different image, if the differences are subtle. However, this method may be used in conjunction with electronic digital pattern recognition methods, to obtain the advantages of both.

If image compression is used, once an image is compressed, it need not be decompressed and returned to NTSC or other standard transmission or format for storage on tape, and thus the compressed image information may be stored in the same format as is present in the temporary storage medium. Thus, the block labelled intermediate processing 2211 of FIG. 22 shows that the intermediate storage need not retain the information as received from the frame buffer 2202, and in fact, may prepare it for the feature extractor 2204. In addition, the storage medium itself need not be normal videotape (VHS, Beta, 8 mm) and may be an adapted analog storage technique or a digital storage technique.

Figure 23:
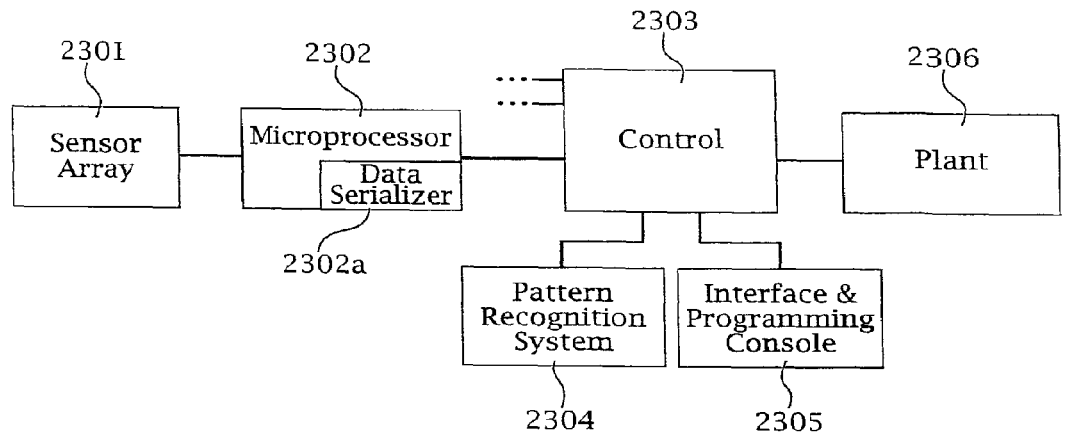
FIG. 23 is a block diagram of a control system of the present invention incorporating a pattern recognition element and an interface.

It is also noted that the interface of the present invention need not be limited to audio-visual and multimedia applications, as similar issues arise in various programmable controller environments. Such issues are disclosed in Carlson, Mark A., "Design Goals for an Effective User Interface", Electro/82 Proceedings, 3/1/1-3/1/4; Kreifeldt, John, "Human Factors Approach to Medical Instrument Design", Electro/82 Proceedings, 3/3/1-3/3/6; Wilke, William, "Easy Operation of Instruments by Both Man and Machine", Electro/82 Proceedings, 3/2/1-3/2/4; Green, Lee, "Thermo Tech: Here's a common sense guide to the new thinking thermostats", Popular Mechanics, October 1985, 155-159; Moore, T. G. and Dartnall, "Human Factors of a Microelectronic Product: The Central Heating Timer/Programmer", Applied Ergonomics, 1983, Vol. 13, No. 1, 15-23; and "The Smart House: Human Factors in Home Automation", Human Factors in Practice, December 1990, 1-36, all of which are incorporated herein by reference. In such a case, the pattern recognition function would be used to execute a contingent program. For example, in a programmable temperature controller application, a sensor or sensor array could be arranged to detect a "door opening". On the occurrence of the door opening, the system would recognize this pattern, i.e. a mass of air at a different temperature entering the environment from a single location, or a loss of climate controlled air through a single location. In either event, the system would take appropriate action, including: halt of normal climate control and impose a delay until the door is closed; after closure, set a time constant for assimilation of the replaced air with the climate controlled air; based on the actual climatic condition after assimilation, or a predicted climatic condition after assimilation, begin a climate compensation control; optionally, during the door opening, control a pressure or flow of air to counterbalance the normal flow through the door, by using a fan or other device. The climate may differ in temperature, humidity, pollutants, or the like, and appropriate sensors may be employed. This generalized system is shown in FIG. 23, in which the sensor array 2301 interfaces with a microprocessor 2302 with a serial data port 2302a, is which transmits sensor data to a control 2303. The control 2303, further interfaces or includes a data pattern recognition system 2304 and an interface and programming console 2305 of the present invention, using the intelligent features and adaptive pattern recognition techniques. The control 2203 controls the plant 2306, which includes all the controlled actuators, etc.

It is also noted that the present technology could also be applied to any sort of mass storage, such as for a personal computer. In such a case, a characteristic of the computer file, which is analogous to the broadcast program in temporary storage of a VCR, is classified according to some criteria, which may be explicit, such as an explicit header or identifying information, or implicit, such as a document in letter format, or a memorandum, as well as by words and word proximity. In particular, such a recognition system could differentiate various clients or authors based on the content of the document, and these could be stored in different manner. The text analysis system of a text-based computer storage system is analogous to the program classification system of the VCR embodiment of the present invention. However, there is a further analogy, in that the VCR could incorporate optical character recognition of text displayed in the program material, or directly receive text information as a part of a closed caption or videotext system. Thus, the VCR device of the present invention could recognize and classify programs based on textual cues, and make decisions based on these cues. This might also provide a simple method of discriminating program material, for example, if a commercial does not include close caption or Second Audio Program (SAP), while the desired program does, or vice versa, then a commercial could be discriminated from a program with very little computational expenditure.

Other characteristics of this interface include color coding to help prompt the user as to which data he/she must enter. Red text signifies instructions or errors, yellow text represents data which must be entered or has not been changed, and blue text shows newly entered program data or status information. Blue buttons represent buttons which should normally be pressed during the programming sequence. Red buttons signify an erratic pattern in the data entry, such as the "cancel" and "return to main menu" buttons. Of course, these colors can be replaced by other display attributes, such as intensity, underline, reverse video, blinking and pixel dithering pattern, in addition to the use of various fonts. Such a situation would include a monochrome monitor or display.

The date may be entered in the form of a calendar rather than as numbers (i.e., 9/6/91). This calendar method is advantageous because users may wish to input date data in one of three ways: day of the week, day relative to the present, and day of the month. The present method allows the current date to be highlighted, so that the calendar may be used to easily enter the absolute day, absolute date, and relative day. Further, the choices "today" and "tomorrow", the most frequently used relative recording times, are included in addition to a month-by-month calendar. This information is provided to avoid an unnecessary waste of time and user frustration. Thus, another aspect of the present invention is to provide a partially redundant interactive display input system which allows, according to the highest probability, the choices to be prominently displayed and easily available, in addition to allowing random access to all choices.

The present device allows common user mistakes to be recognized and possibly addressed, such as the confusion between 12:00 PM and 12:00 AM with midnight and noon, respectively. Therefore, the options of "noon" and "midnight" are provided in addition to a direct numeric clock input. When entering time information, leading zeros need not be entered, and such information may be entered in either fashion.

The criteria for system acceptance of input depends on how many keystrokes are required on the screen. If only one keystroke is required to complete input of the information, upon depressing the key, the programming sequence will continue. If more than one keypress is required, the user must depress the "OK" button to continue programming. This context sensitive information entry serves to avoid unnecessary input.

An on-line "help" system and on-line feedback is preferably provided to the user throughout various aspects of the interface. Other features include minimizing the number of keypresses required to program the device. These features, together with other aspects of the present invention allow the user to achieve a greater efficiency with the input device than with prior art devices.

The interface of the present invention applied to a VCR control comprises a virtual keypad entry device, a directional input control for a cursor on a display screen, and a selection button. The input device has an input corresponding to a direction of movement relative to the cursor position. Thus, since the present input device seeks to minimize the physical control elements of the human interface device, the display elements for a preferred embodiment of the present interface include:

1. number keys 0-9
    2. enter key
    3. cancel key
    4. status indicator
    5. return to menu option button
    6. program type indicator: program once, program once a week, program Monday-Friday, program everyday
    7. Day indicators: 7 week days, today, tomorrow
    8. Noon and midnight choices
    9. Help button
    10. Main menu options: Review, Enter new recording time, Set time, Set date
    11. Timer button
    12. Power button
    13. AM/PM choices
    14. 31 day calendar
    15. 12 month Choices
    16. 3 tape speed choices

EXAMPLE 1

The interface of the present invention includes an internal clock, 4 program memory, and the capability to display a graphical color interface. By providing the user with the aforementioned features, this design is a unique implementation for an instrument to be used for programming an event driven controller via an interactive display. All information that the user needs is displayed on the screen to avoid the unnecessary searching for information. This information includes the current date and current time.

The simulation of the AKAI VCR VS303U (on-screen programming) and the interface of the present invention, were tested to evaluate users' performances. The AKAI interface of the prior art, hereinafter referred to as the prior art interface, was chosen because users made the fewest errors while using this machine, and no subject quit while programming, as compared to three other VCRs tested, a Panasonic PV4962 (Bar Coder), an RCA VKP950 (on-screen programming), Panasonic PV4700 (Display Panel).

The present embodiment was constructed and tested using HyperPAD™, a rapid prototyping package for an IBM-PC Compatible Computer. It is, of course obvious that the present embodiment could be incorporated in a commercial VCR machine by those skilled in the art, or be implemented on many types of general purpose computers with output screens which allow on-screen feedback for the programming operation. Further, the present embodiment can control an infrared remote controlled VCR or translate the programming information and program an infrared remote control through an interface to an infrared transmitter.

An IBM PC-AT compatible (MS-DOS, Intel 80286-10 MHz) computer was used to test the two simulations. In order to simulate the use of a remote control device in programming the VCR, an infrared device made by NView™ was attached to the computer. This device came with a keyboard that was used to "teach" a Memorex™ Universal Remote so that the desired actions could be obtained. By using a universal remote, the computer could be controlled by using a remote control.

The present embodiment incorporates a mouse input device. It is understood that a small trackball with a button for selection, mounted on a remote control would be preferred. However, a computer mouse is easily available, and the mouse and trackball data are essentially similar for the type of task used in this study, with trackball performance being slightly faster. For daily use on a VCR however, a trackball would be a more preferable input device because it does not require a hard, flat surface, which is not always available to a user, such as in the situation where a person is watching television while sitting in a chair or sofa.

A Genius™ Mouse was used as the input device in the prototype of the interface of the present invention. With the mouse, the user could view all of the choices at once on the display screen, and then make a selection from the items on the screen by moving the cursor and then pressing the left mouse button.

Simulations

Two simulations were prototyped. The first was a simulation of the existing AKAI On-Screen VCR, Model Number VS-303U, hereinafter referred to as the prior art interface. The second was the newly devised interface of the present invention. Data from each test was exported to data files on the computer so that specific actions, types of action, mouse clicks, number of times each screen is entered, and time spent on each screen may be compared.

Subjective data was also collected; it was verbally supplied by the subject during and after the testing. Usability tests were run, using the "Thinking-Aloud" technique. This method requires users to verbalize their thoughts as they interact with the system. This technique is especially useful in discovering strategies which users employ in approaching tasks, pinpointing problems, and discovering the reasons why they occur. In addition, demographic data, such as each subject's age, occupation, and experience using VCRs and mice was also recorded.

The design was optimized according to the above-mentioned criteria through a procedure of testing, alteration of the simulation, and retesting. The alterations were maintained if they resulted in an improvement in subjective and/or objective criteria. Those alterations that did not result in improvement were reverted to a previous state. It is proposed that the interface be individually optimized for persons of various demographic groups, ages, education levels, etc., so that, in accordance with an object of the invention, the interface best matches a particular user's expectations. Simultaneous multivariate alterations were also implemented in order to demonstrate an interactive effect between various implementations. In such testing, subjective factors were weighted more heavily than objective factors because the purpose was to determine a qualitative effect, rather than a quantitative comparison. The resultant qualitative measurement of a multivariate alteration indicated whether the complex of changes displayed any advantage over the previous state. If an advantage was demonstrated, the multivariate alteration was decomposed into its quantum changes, full quantitative studies were performed, and statistical analysis completed. Thus, by incorporating subjective analysis, multivariate alterations in the interface could be quickly analyzed for their advantages as compared with a similar precursor.

Experimental Testing

After an optimized design was obtained, the final testing was conducted as a repeated measures experiment of naive subjects. The tasks required were to set the clock and 3 programs to simulate a situation where the subject might go on vacation and, upon arrival home, have the desired programs on tape. Three programs were set so that the learning time between programs could be more accurately studied. The subjects did not know which interface was the experimental one.

The following directions were given to the subjects:
Set Time: 9:00 PM, Wednesday, Jun. 6, 1990
Program 1: 8:00 PM-11:00 PM, Sunday, Jun. 10, 1990, Channel 5
Program 2: 3:00 AM-3:30 AM, Monday-Friday, Channel 7
Program 3: Record your favorite television show Each subject used both simulations, so as to eliminate the effect of between subject variability. The order in which the subjects used the interfaces was counterbalanced so as to offset the effect of learning. In all, 23 subjects were tested. However, data from only 16 subjects was used in the calculations because seven of the test participants quit while performing the programming tasks on the simulation of the prior art interface. Because these subjects were not able to complete all of the tasks, their data could not be validly compared with that of subjects who had fully completed the tasks.

Data Analysis

The objective data was analyzed according to Stuart Card's (1979) method, disclosed in Card, Stuart K., "A Method for Calculating Performance times for Users of Interactive Computing Systems", IEEE, 1979, 653-658, incorporated herein by reference, involving calculating performance times for users of interactive computing systems. He calculated the way in which the time to perform a task can be determined from the design phase by breaking the entire task into individual components. However, he focused his calculations on experienced users, not novices. This is a fundamental difference, in both theory and result, and this method has been herein validated by the present inventor.

Some of the interface factors affecting user performance include:

Time—How long it takes for a user to accomplish a task.

Errors—How many errors the user makes and how serious they are.

Learning—How long it takes a novice user to learn to use the system.

Functionality—The range of tasks that can be performed with the system.

Recall—How easy it is for a user to recall how to use the system after a period of non-use.

The optimized interface of the present invention sought to minimize the first three of these aspects. Recall and Learning were, for the present purpose, considered as identical since data collected has shown that most people perform the task being studied (time-shift programming) less than once a month and thus have to re-learn the task each time. Functionality was also disregarded because it was a negligible factor between tasks.

The most important factor considered in the present optimized interface focuses on time. Knowing the sequence of user actions and the response time of the system, the required user time can be predicted by application of the following equation:

$$T_{task}=T_{acquire}+T_{execute}$$

One goal of the interface of the present invention is to minimize $T_{acquire}$. By Card's model, the execution time is the time, $t_j$, for each of these operators j weighted by the frequency, $n_j$, with which they occur, plus the total system response time, $T_R$, to the steps performed by the user. The formula for the execution time is:

$$T_{execute}=\Sigma_j n_j t_j + T_R$$

Despite the endless number of possibilities that can be performed using a computer, according to Card's work, the steps necessary to perform the tasks required and their respective times can be divided into four categories:

1. The time required to use the mouse to point to the object and click: $t_p$=1.10 seconds
2. The time to mentally prepare before pointing to a command: $t_M$=1.35 seconds
3. The time to enter input:
   Prior Art interface: $t_K$=0.75 seconds for typing complex codes
   Interface of the present invention: $t_K$=0.2 seconds for an average typist or mouse user
4. The computer response time: $t_R$=Variable The subjects' entry times, actions, and the computer response time were then subtracted from the total time required to perform the task in order to determine $T_{acquire}$. This technique gives estimates accurate to about 20% of actual times required by users.

Results

Computer Response Time $T_R$, the average computer response time, was calculated individually for each subject. In order to attain a baseline, the researcher, an expert user of the systems, performed the tasks on both a 10 MHz (Intel 80286 based) and a 33 MHz (Intel 80386DX based) computer. The faster processor had a negligible computer response time, taken as $T_R$=0. The time using the faster computer was then subtracted from the time using the slower computer to achieve a measure of how much slower the 10 MHz computer was.

An additional time delay, due to the software used and dependent upon the number of screens accessed, was then subtracted from the change in time. This number was then divided by the number of keypresses required to complete the task to produce a number representing the number of seconds per keypress. The computer response times obtained were: 1.11 seconds per keypress for the prior art interface; and 0.18 seconds per keypress for the interface of the present invention.

The large difference between these numbers was confirmed when many users commented that they had to wait for the outcome of their input on the prior art interface.

Errors

Errors are often made by the users and they can be classified as follows:

OMISSION—Failure to perform any task necessary to program the VCR.

COMMISSION—Incorrectly performing a task without noticing the error.

SEQUENTIAL EFFECTS—When judgment is affected by items that precede it.

In the interface of the present invention, the errors of omission are remedied by the fact that the user cannot continue programming if the current step is not completed. In the prior art interface, this is not the case and critical actions may be overlooked.

Figure 2:
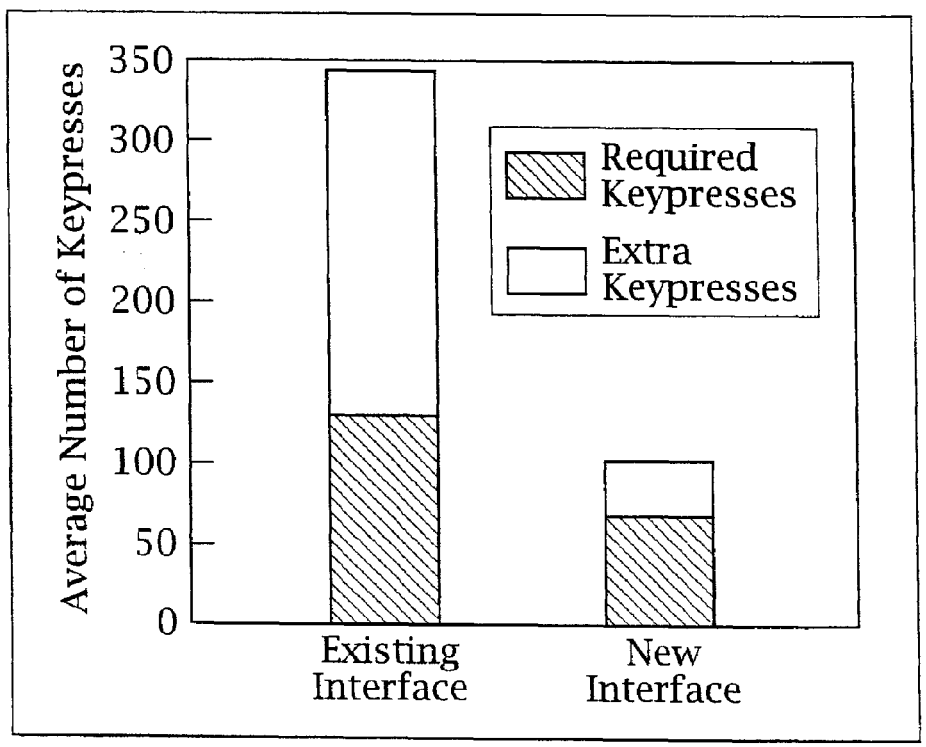
FIG. 2 shows a graphical comparison of required and extra keypresses for the prior art and the interface of the present invention.

Errors of commission seem inevitable. In the prior art interface, there were an average of 34.3 errors per subject, or 9% of the total number of buttons pressed. In the interface of the present invention, there were an average of 7.2 errors per subject, or 6% of the total number of keystrokes. In order to determine significance, a T-Test was applied and the difference between error rates of the two systems was found to be significant at $\alpha$<0.10. Sequential effects were eliminated by the testing procedure and did not affect the results obtained. FIG. 2 shows the required and the extra keypresses for each interface.

Simulation of the Prior Art Interface

Figure 3:
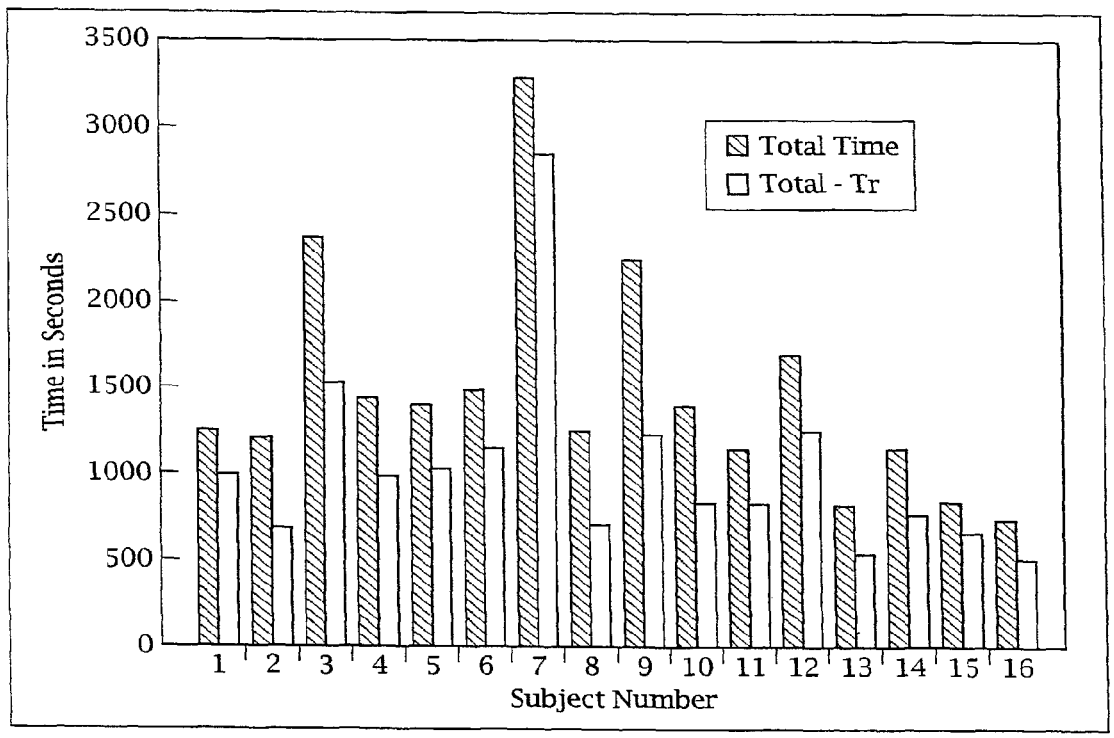
FIG. 3 graphically shows the differences in seconds between total time for the prior art for each subject.

In programming the simulation of the AKAI interface of the prior art, the average time that it took the 16 subjects to complete the setting of the clock and the recording of three programs was 1,476.9 seconds (24.6 minutes). An average of 451.4 seconds (7.5 minutes) of each trial, or 31% of the total time, can be attributed to computer response time (TR) using 1.11 seconds per keypress. This time can then be subtracted from the subjects' total time. Thus, the new average becomes 1,025.5 seconds (17.1 minutes). The fastest time recorded was 498 seconds (8.3 minutes) and the slowest time was 2,844.4 seconds (47.4 minutes). Table 1 shows the subjects and the time it took to complete the programming sequence for the prior art interface. FIG. 3 entitled "Differences In Seconds Between Total Time And (Total Time—Computer Time) For The prior art Interface" shows this data graphically.

No subject was able to complete the programming tasks in the desirable minimum time of seven minutes, and only eight subjects (50%) were able to finish in less than 14 minutes, double the ideal time goal established as a result of the previous testing. Two subjects (13%) required more than 21 minutes, triple the goal set, to perform these tasks. The seven minute time period was selected as a result of subjective data gathered earlier in research.

Only four subjects (25%) were able to correctly perform the tasks required. An additional six subjects (38%) did not select the timer button. Only one person realized his error (setting the wrong date). The problems encountered which led to incorrect recordings, and their frequency are as follows:

| Number of Subjects | Problem |
|---|---|
| 4 | Set the wrong date |
| 3 | Confused by the moving seconds field |
| 2 | Set the wrong time |
| 1 | Set the wrong channel |
| 1 | Didn't memorize a program |

| Number of Subjects | Error |
|---|---|
| 4 | Set the incorrect date |
| 4 | Did not set the timer |
| 3 | Set the incorrect time |
| 1 | Chose the wrong type of recording |

Simulation of the Interface of the Present Invention

Figure 4:
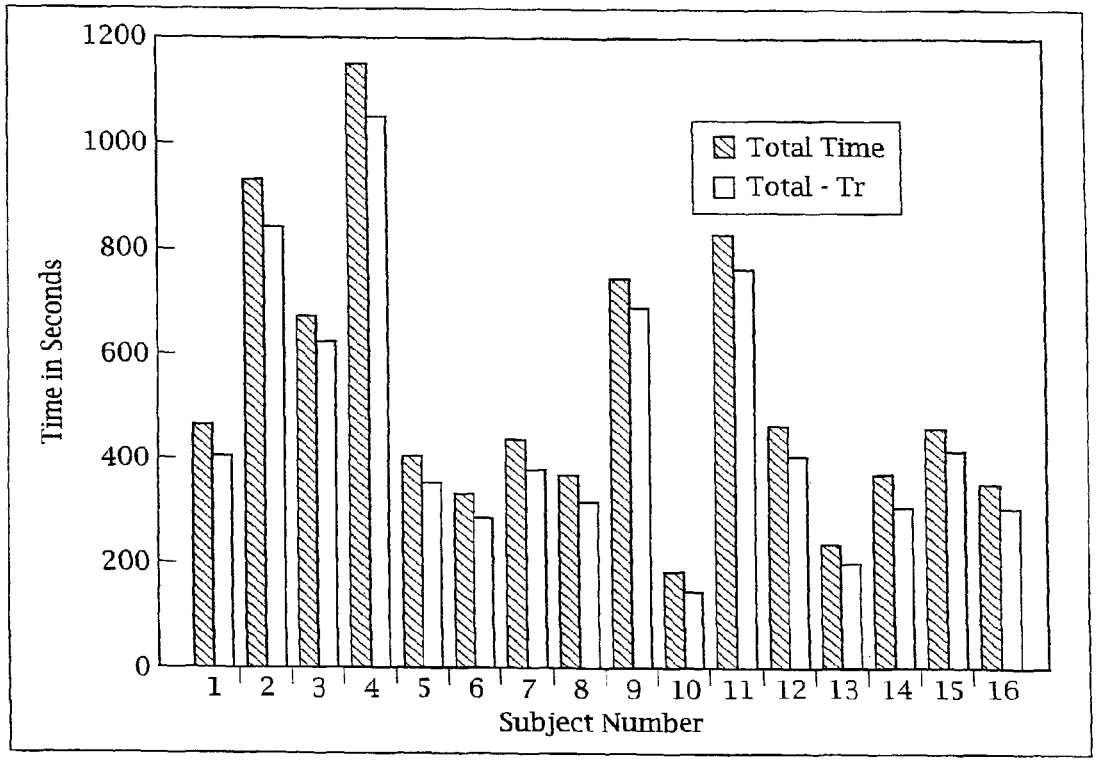
FIG. 4 graphically shows the differences in seconds between total time for the interface of the present invention for each subject.

The average time required to complete the experimental tasks with the interface of the present invention was 560.1 seconds (9.3 minutes). The average computer response time, $T_R$, assuming it took 0.18 seconds per keypress, was 57.5, or 11% of the total time. When this is deducted from the total time, the new average is 502.7 seconds (8.4 minutes). The shortest length of time recorded for programming was 143.5 seconds (2.4 minutes) and the maximum was 1,187.7 seconds (19.8 minutes). Ten of the subjects (63%) took less than seven minutes to set the clock and three programs, thus meeting the original goal of a maximum of seven minutes, and 13 subjects (81%) took less than 14 minutes. Table 2 shows the subjects and the time it took each to successfully complete the tasks on the interface of the present invention. This table can be seen graphically in FIG. 4, entitled "Differences In Seconds Between Total Time And (Total Time−Computer Time) For The Interface of the Present Invention." Overall, 14 out of 16 of the test participants took less time using the interface of the present invention.

Statistical Analysis

The data was analyzed using SPSS-X, a statistical package. The tasks can be divided into six programming steps:

1. CLOCK SET
2. PROGRAM 1
3. PROGRAM 2
4. PROGRAM 3
5. SEARCH TIME
6. TOTAL TIME

The average time for the 16 subjects, and their standard deviations can be seen in Table 3 The number of subjects and the tasks they could not accomplish can be seen in Table 4.

Figure 5:
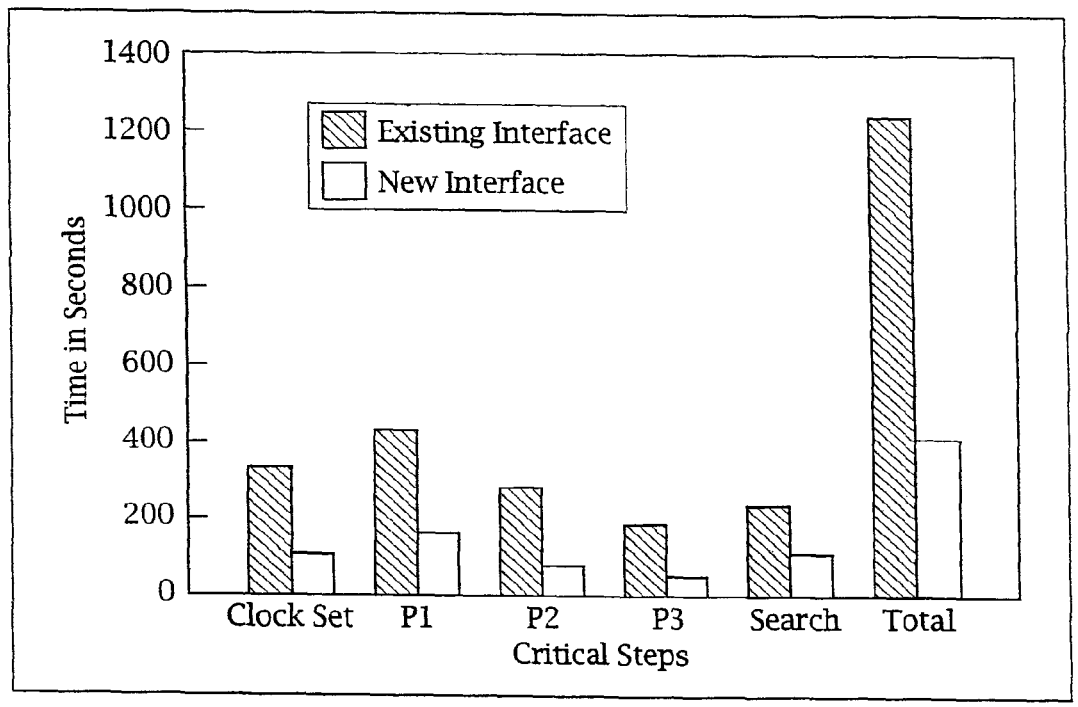
FIG. 5 graphically shows the programming steps for the comparison of the prior art and the interface of the present invention.
Figure 6:
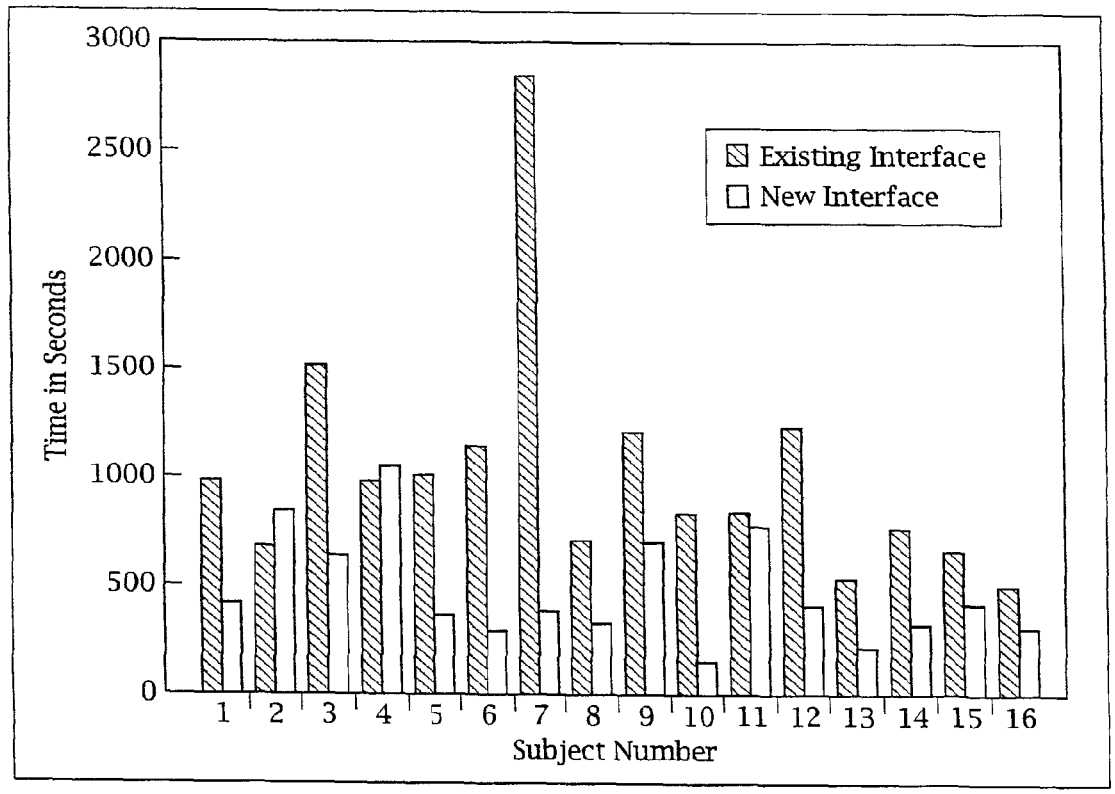
FIG. 6 graphically shows comparative statistics by subject comparing the prior art and the interface of the present invention.
Figure 7:
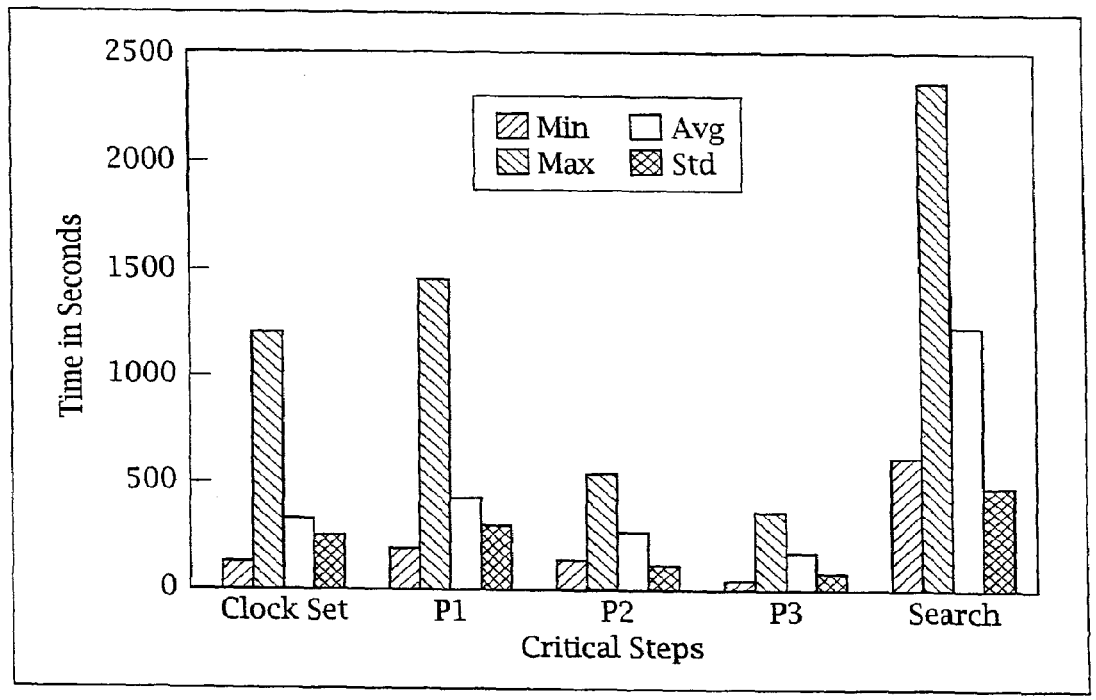
FIGS. 7 and 8 graphically show the critical steps in programming the prior art and the interface of the present invention.
Figure 8:
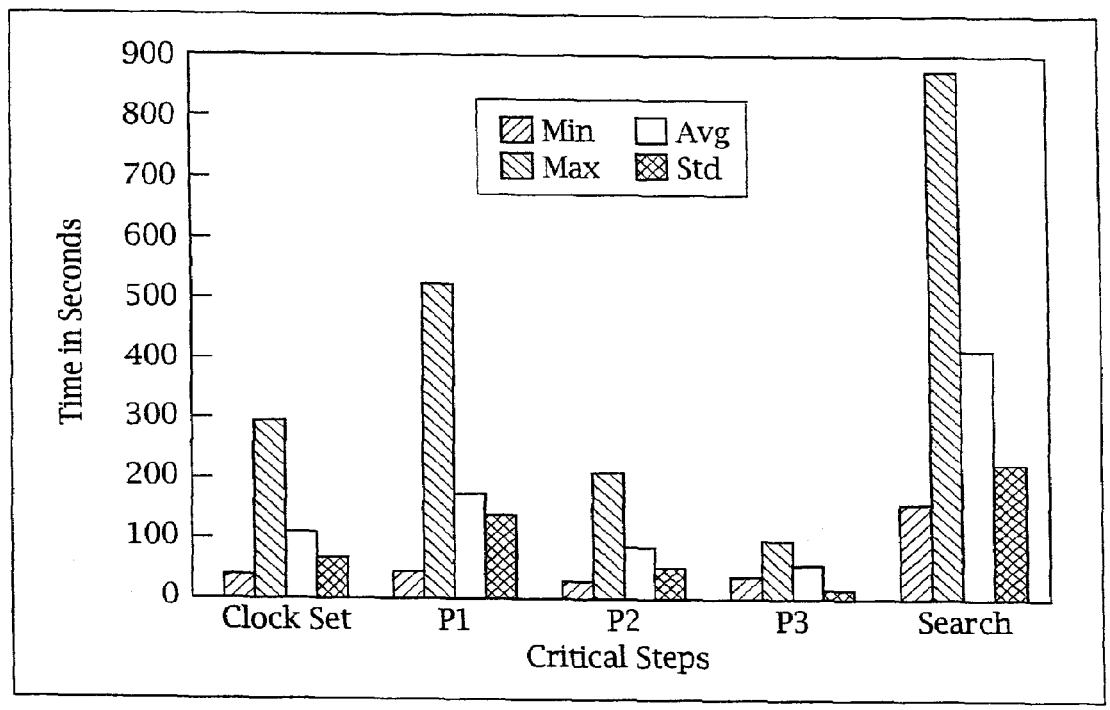

FIG. 5 graphically shows the critical steps for the two interfaces. FIG. 6 shows the total time by subject. In FIG. 6, subjects two and four took less time using the interface of the present invention in actuality, however, using adjusted times, the interface of the present invention took longer. In FIGS. 7 and 8 and show the minimum, maximum, average and standard deviations for both the prior art and the interface of the present inventions.

The interface of the present invention reduced the average programming time by 54%. However, the standard deviations are high for both cases, and equal slightly more than half of the total time. T-Tests for each of the six programming steps showed no significance. However, when subjected to the Pearson Correlation, some significance was found (p<0.10).

Ten subjects (63%) were able to correctly perform the programming tasks using the interface of the present invention. Altogether, four users did not set the timer, and two of these did not set the timer on the prior art interface. Three subjects reported that they probably could have performed the tasks quicker if they were not using a mouse as the input device. None of the subjects who made mistakes using the interface of the present invention realized their errors. The problems encountered using the present invention and their frequencies are as follows:

All measurements were subjected to separate Analysis of Variance tests. The differences between all measures were found to be statistically significant at $\alpha<0.01$, except search time, which was significant at $\alpha<0.05$.

The CHI Square test was performed to determine whether the probability of the times for each measurement is the same, or whether they are statistically different from one another. The results indicated that differences exist only between Clock Set, Program 2, and Program 3 and are significant at p<0.01.

According to Stuart Card's theory, the total amount of time from the design stage can be calculated according to the following formula:

$$T_{EXECUTE} = \text{\# OF KEYPRESSES} \times (T_M + T_K + T_P)$$

where: $T_M$—Mentally Prepare; $T_K$—Key in; $T_P$—Point with mouse Keypresses

The Prior Art Interface

To perform the necessary tasks on the prior art interface, a minimum of 130 keypresses was required for each of the 18 subjects. Using the formula above, an average of 273 seconds is calculated for $T_{EXECUTE}$. However, in the actual testing situation, an average of 342.1 keypresses were made per subject, 2.6 times the minimum number of keypresses required. According to Card's formula, it should have taken 718.4 seconds for 342.1 keypresses ($T_M=1.35$, $T_K=0.75$). It actually took an average of 1,025.5 seconds per subject, which is 1.4 times more than the theoretical time expected. Both the additional keypresses and the extra time can be attributed to $T_{ACQUIRE}$, which is dependent on the details of the task and whether it is given from without or generated from within the user.

Some of the extra keypresses can be attributed to the fact that all of the subjects had trouble deciphering the coded buttons and were confused by the week numbers and how to select the Mon-Fri option. Nine users thought that they had to "Memorize" the clock setting sequence after each step, and the subjects did not always mentally calculate whether using the "+" or "−" key would be faster, and if they realized their error, they commented that they had not selected the shortest route. One subject did not realize that there were "+" and "−" keys and therefore, when he missed setting the time by one minute, he had to cycle around 59 extra times, thus incurring 59 extra keypresses.

The Interface of the Present Invention

The interface of the present invention required a theoretical minimum of 70 keypresses per subject, which was only 54% of the number of keypresses required by the simulation of the prior art interface. It can be noted that the time to perform the task of programming the interface of the present invention was also reduced by 54%. This results in a theoretical average of 185.5 seconds per subject, 87.5 seconds less than the prior art interface. The actual testing situation resulted in an average of 103.6 keypresses per subject, 68% more keypresses than the required minimum ($T_M=1.35$, $T_K=0.2$, $T_P=1.10$). Although the interface of the present invention required far fewer keypresses than the simulation of the prior art interface, by Card's calculations, it should have taken 274.5 seconds for 103.6 keypresses. However, it took an average of 502.7 seconds per subject, 1.8 times more than the predicted time. This can be attributed to $T_{ACQUIRE}$.

Some of the extra keypresses could be attributed to four subjects who originally entered the date as "90" rather than "1990", five subjects who tried to enter information on the help screens, five subjects who selected the places where the numbers are displayed on the screen before selecting from the numeric keypad, and six subjects who had trouble selecting AM/PM. All of these errors resulted in extra keypresses, and therefore consumed additional time.

Figure 9:
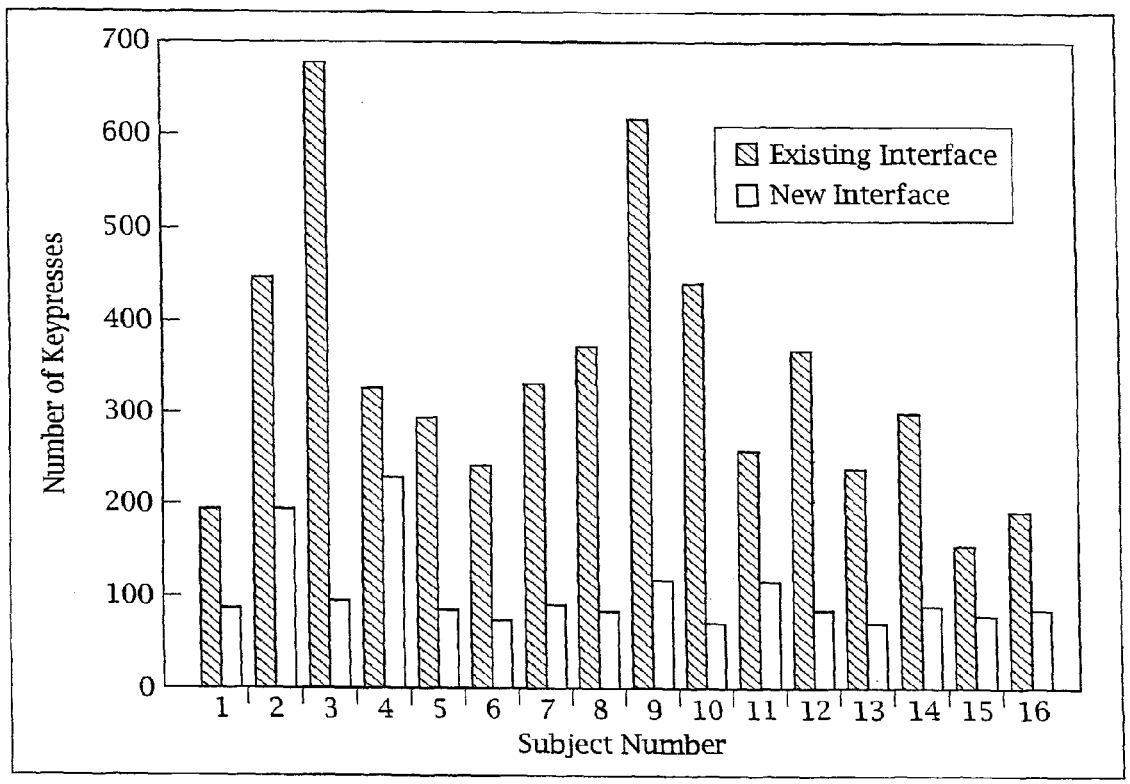
FIG. 9 graphically shows the number of keypresses made by test participants comparing the prior art and the interface of the present invention.
Figure 10:
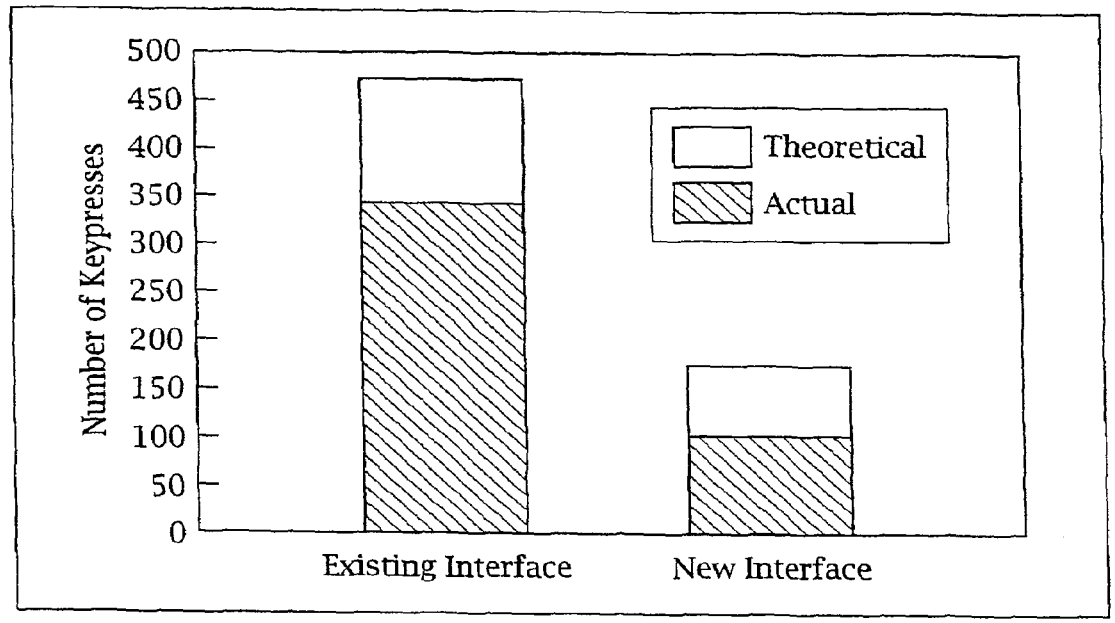
FIG. 10 graphically shows the comparison of the actual and theoretical number of keypresses necessary for programming the prior art and the interface of the present invention.

FIG. 9 shows keypresses per subject and FIG. 10 shows the differences between the theoretical and actual times for the keypresses, using Card's formulas, for each interface.

Figure 11:
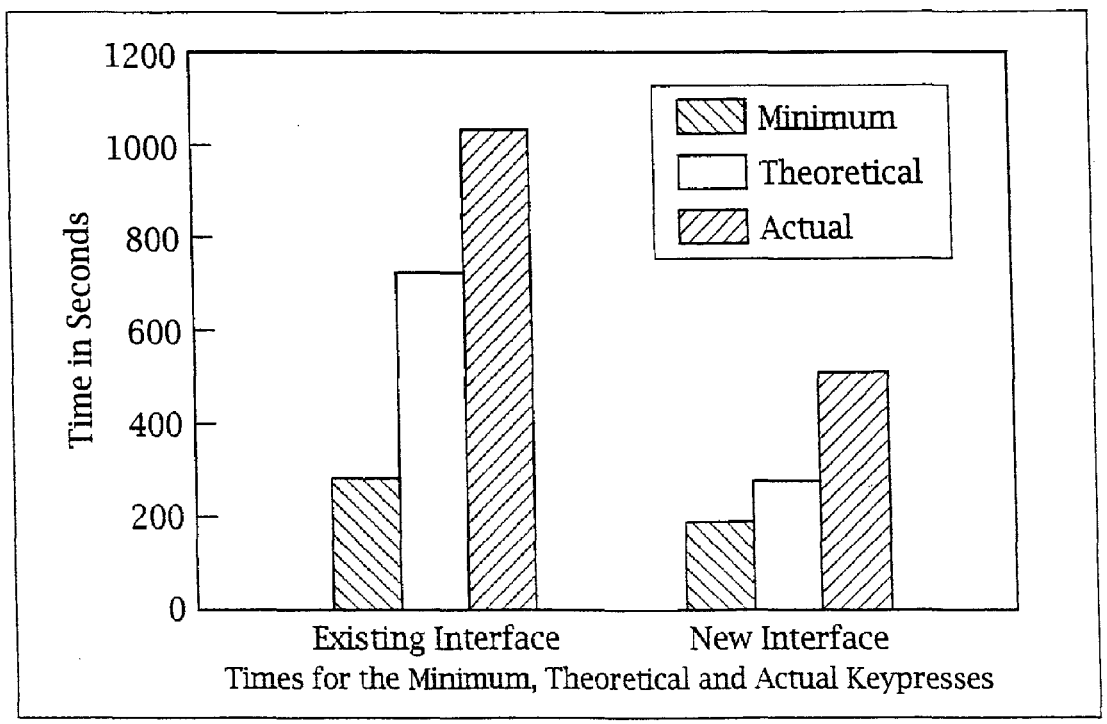
FIG. 11 graphically compares the actual and theoretical time necessary for programming the prior art and the interface of the present invention.

Several factors may account for the disparity between the times found in this study when compared with the formulas developed by Card. The major difference may be due to the fact that the formulas derived by Card are for experienced users, not novices. Thus, these numbers might indicate how well users might perform after a period of using the system. CHI Square tests, showed significance at <0.01 for both the theoretical and actual times for the keypresses and for the theoretical and actual number of keypresses. In designing the interface, an effort was made to reduce the learning time. Thus, Card's equations are appropriate since all users are considered to be experts. As can be seen in a comparison of the values between the two interfaces, the calculations of $T_{EXECUTE}$ for the interface of the present invention came much closer to that of the theoretical values than did the calculations for the prior art interface, thus proving that the interface of the present invention did reduce the learning time. The results for the theoretical time for minimum number of keypresses, theoretical time for the actual number of keypresses, and actual time can be seen in FIG. 11.

Searching Time

The Prior Art Interface

The prototypes can be divided into screens which represent the programming steps. In order to set the simulation of the prior art interface, a minimum of 13 screens must be entered by the user. The average for the trials of the 16 subjects was 36.8 screens per subject, almost three times more screens than were necessary. Table 5 shows the screens, the minimum number of times they must be accessed, the average number of times that each was accessed, the average amount of time spent on each screen, and the standard deviation of the number of screens opened.

Figure 12A:
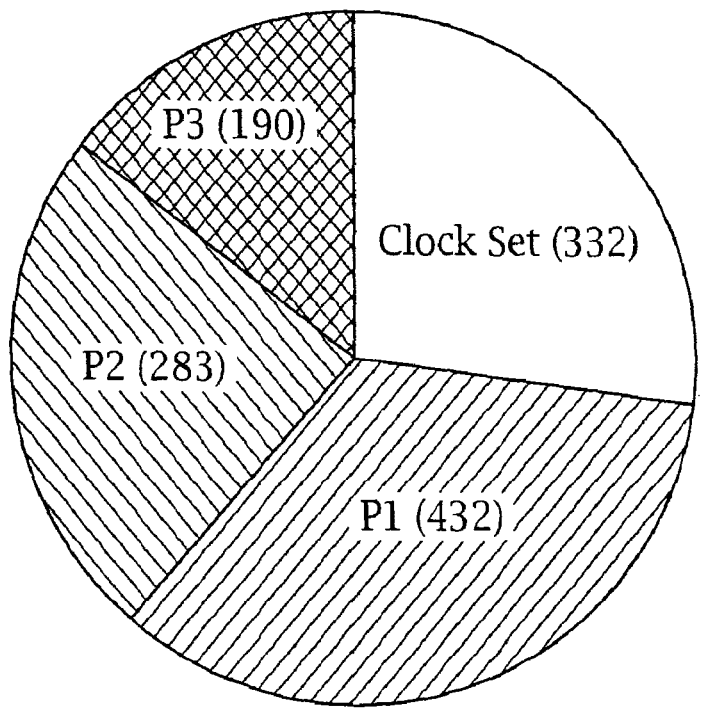
FIGS. 12a and 12b graphically compares the actual and theoretical time necessary for setting the programs in the prior art and the interface of the present invention.
Figure 12B:
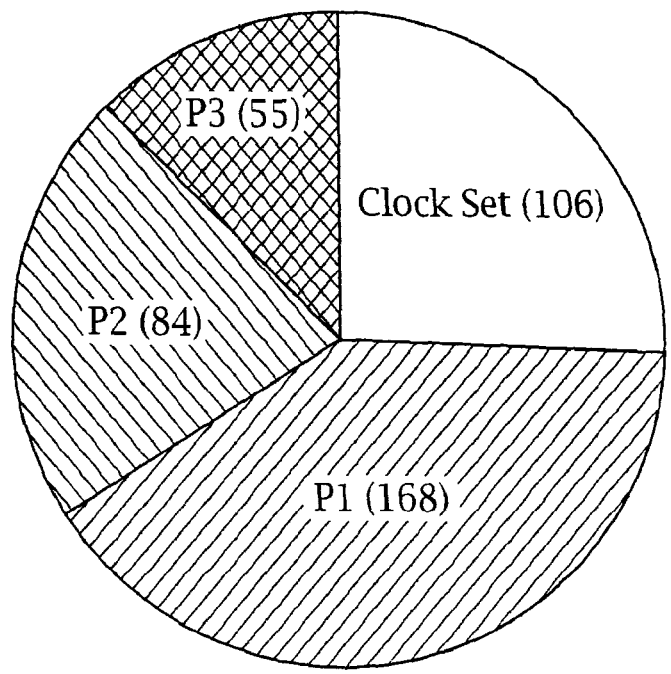

Subjects were confused when using the simulation of the prior art interface. The CLOCK ADJUST screen was displayed when the program began, and the subjects did not understand the directions on the screen. Fourteen out of the sixteen subjects pressed "CLOCK ADJUST" and then "C" which returned them to where they had started. Even if they were able to figure out that this was the correct screen on which to set the clock, 12 out of the 16 subjects wanted to "Memorize" after each step of setting the time and date, rather than after everything was set. This could account for the large number of times that the CLOCK SET, CLOCK ADJUST, and CLOCK screens were accessed. All subjects seemed to spend a great deal of time on the CLOCK SET page, trying to figure out which buttons to use. All subjects were extremely confused between "A+", "A−", "B+", and "B−". In fact, one subject never realized the difference between the "+" and "−" keys, and if, for example, he missed setting the channel, he cycled around another 98 times. In addition, users accidentally accessed Program 4 and turned on and off the VCR several times. The proportion of time spent setting the programs for the prior art interface and the interface of the present invention are shown in FIG. 12.

The Interface of the Present Invention

To set the clock and three programs on the interface of the present invention, at least 32 screens must be opened. In testing, subjects opened an average of 42.9 screens, an average of 34% more screens than the minimum required. Although more screens are required to be opened in the interface of the present invention, the percentage of extra screens opened is much smaller than that of the prior art interface. Table 6 shows the screens which must be accessed, the minimum number of times they must be used, the average number of times subjects looked at them, the average amount of time subjects spent using them, and the standard deviation of the number of screens opened.

When the VCR was first turned on, subjects viewed a prompt instructing them to set the time. Two subjects looked for a Main Menu at this point, and exited the screen before setting the time. The only occasion where the subjects had to enter the Main Menu screen was to set programs to record or to reset the current time or current date. This screen was accessed more times than necessary, possibly because several subjects selected the "Main Menu" button on the screen before setting the time, date, or pressing the "OK" button.

Help screens were accessed either when the user was confused as to what to do, or just for curiosity (from users' comments). The one "Help" button that provided the most assistance was MAIN MENU HELP. It told the users to "POWER OFF" and then to set the Timer to "ON" when programming was finished.

Only 34% more screens were opened when programming the interface of the present invention, whereas in the prior art interface, the additional number of screens opened approached 300%. This indicates that there was much more confusion when using the prior art interface. The two simulations showed significance at p<0.10 for the number of screens opened when subjected to a CHI Square test of independence.

Mental Preparation Time

The Prior Art Interface

Both interfaces required that a confirmation button be pressed before proceeding to the next step. In the prior art interface, "C" represented this confirmation. At the end of each sub-task (setting the time, program 1, program 2, and program 3), it was necessary to press "C" after the instructions OK to Memorize appeared on the screen. Pressing this button would either advance the user to the CLOCK screen if he were on the CLOCK ADJUST screen, or the PROGRAM screen if he were on one of the programming screens. Theoretically, "C" on the prior art interface must be pressed a minimum of five times by each subject to complete the task, and 10.5 seconds is consumed in doing this. In testing, this button was pressed an average of 9.1 times by each the 16 subjects, which is almost double the number of keypresses required. Each keypress should theoretically have taken 2.1 seconds. However, in actuality, it took 12.1 seconds per "C" keypress, which is almost six times more than the theoretical value calculated using Card's formula.

The extra keypresses can be attributed to the fact that five users thought that they had to press the "C" button after each category they changed. The extra time can be attributed to the fact that, as many subjects commented, they were doing the tasks by trial and error and had to recheck all of the information carefully to make sure it was correct. While test participants were using the prior art interface, many made comments that the numbers seemed to be changing by themselves. What had really happened was that the test participants were not looking at the correct place on the screen to see the changes and were confused by the blinking numbers, or they had entered information faster than it could be displayed, and as a result, pressed too many buttons and passed the desired choice.

The Interface of the Present Invention

The interface of the present invention used a blue "OK" button on the bottom of each screen that required more than one keypress. These screens included: the current year, current time, start time, stop time, channel, and the confirmation screen. Pressing "OK" either brought the user to the next step of the programming sequence or back to the Main Menu from the confirmation screen. It was necessary for each subject to press this button a minimum of 14 times to complete the task, which would theoretically have taken 37.1 seconds. In the testing situation, "OK" was pressed an average of 18.5 times per subject. This was only 33% more than the minimum number of keypresses required. The average time was 6.9 seconds per "OK" pressed, which was 2.6 times more than the theoretical 2.65 per keypress found by applying Card's formula.

Comparison of Interfaces

Comparing the results from the two interfaces on length of mental preparation time for pressing of the confirmation buttons, the interface of the present invention took considerably less time. If the user is confident about the information he enters, it takes less time to confirm the data entered. When subjected to a t-Test, there was no significance for the number of times that "C" or "OK" was pressed, or between the time that it took for the two buttons to be pressed.

The Prior Art Interface

Test participants were asked to rate each interface using the subjective ratings, including the Cooper-Harper Rating Scale. Using these ratings, the simulation of the prior art interface was rated and can be seen in Table 7.

The results show that this interface is perceived to be almost at the unsatisfactory level according to the Cooper-Harper Scale and on the "dislike" and "difficult" ends of the other scales. A T-Test on the subjective data showed no significance.

Figure 13:
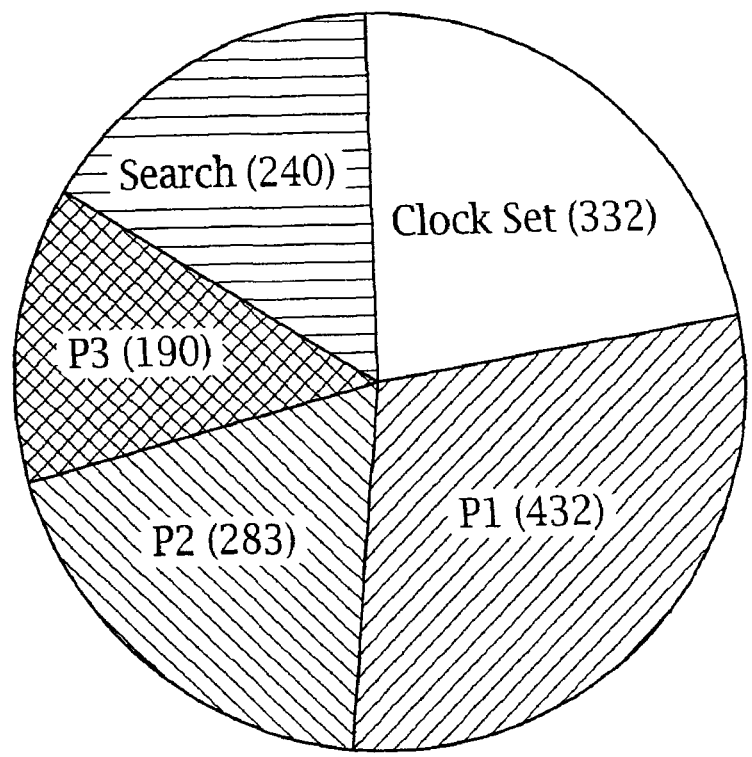
FIGS. 13 and 14 graphically show the percentage time for the critical steps in programming the prior art and the interface of the present invention.
Figure 14:
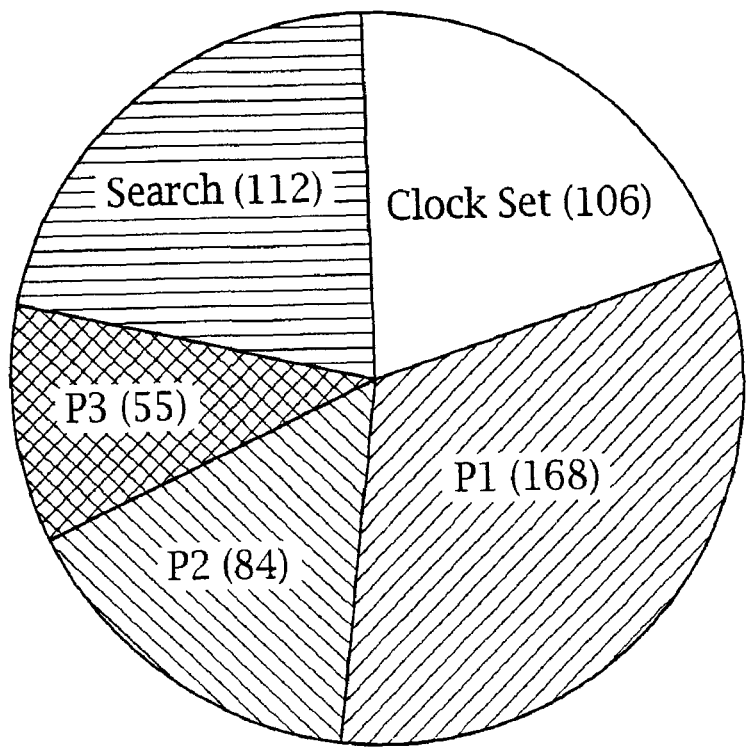

The number of keystrokes required was found to directly affect the total time. When the selection method was used in the prior art interface, most subjects did not calculate whether going up or down would be faster, thus resulting in extra keypresses. The total time for each critical step and the errors made were proportional to the number of keypresses. Both interfaces took approximately the same percentage of the total time for the critical steps. The percentages for these critical steps can be seen in Table 8 and FIGS. 13 and 14.

The interface of the present invention was able to remedy all of the above mentioned problems. Results of the evaluations for the interface of the present invention can be seen in Table 9.

The results show that the interface of the present invention was well-liked. It was rated at the "Good" level on the Cooper Harper rating scale and on the "like" and "easy" ends of the other two scales.

An analysis of users' comments regarding the interface of the present invention revealed the reasons for their evaluations. The frequency with which their likes and dislikes occurred confirms the fact that the newly developed interface clearly offers users what they want, and remedies problems perceived in the use of the prior art interfaces. Table 10 lists favorable comments made by the subjects.

When subjects compared the simulation of the interface of the present invention with the simulation of the prior art interface, they unanimously preferred the interface of the present invention over any other VCR they had used. After the testing, some of the suggestions that subjects made for alternate input devices include: touch-screen, cursor control, voice, trackball, and automatic tracking of the remote.

Overall, the critical times for programming the interface of the present invention were at least half of those for the prior art interface. The new design reduced the programming time by 54% and reduced the is errors by 500%.

The number of screens opened above the minimum number required had an effect on search time. In the prior art interface, 283% more screens were opened, whereas in the interface of the present invention, screens were opened only 34% more frequently. However, overall, the same percentage of time was spent searching on both interfaces.

Mental preparation time was measured in both simulations by pressing the confirmation buttons. The time delay in pressing "C" and "OK" respectively increases the times for the critical steps in the prior art and new simulations. The interface of the present invention took considerably less time. If the user is confident about the information entered, it takes less time to confirm the entry.

All measures remained in the same proportions to the total time in both interfaces. However these times were significantly reduced when 30% of the sample gave up while trying to program the prior art interface, therefore this data was excluded.

Attending to the user's needs is important in designing any interface, and must be modified for each application. By reducing the searching, learning times, and entry times, the mental load is also minimized. Some tradeoffs are necessary as a result of subjective and objective data. It is extremely difficult to design an interface for all levels of users. Thus, a menu system was used in an attempt to satisfy all users.

It must be noted that, in addition to reducing the programming time, the interface of the present invention reduced the number of incorrect recordings by 50%. The severity of the errors is unimportant here because one wrong entry will cause an irretrievable mistake and the user will not record the intended program. One study reported that faulty inputs, which lead to missing the program, can be reported by almost every present day owner of a VCR.

EXAMPLE 2

The "smart screen" aspect of the present invention is further explored in the present example. This aspect of the invention allows the interface to anticipate or predict the intent of the user, to provide, as a default user choice, the most likely action to be taken by the user of the programmable device as a default, which may be either accepted or rejected by the user, without delay to the user. The intelligent selection feature may also automatically choose an option and execute the selected option, without further intervention.

When a user regularly applies the VCR device, for example, to record a given television show is which appears weekly on a given television channel, at a given time, on a given channel, such an action could be immediately presented to the user as a first option, without forcing him to explicitly program the entire sequence.

Further, if an entire television programming guide for a week or month is available as a database, the interface could actively determine whether the desired show is preempted, a repeat, changed in time or programming slot, etc. Thus, the interface could present information to the user, of which he might not be aware, and predict an action based on that information. Such a device could, if set in a mode of operation that allows such, automatically execute a sequence of instructions based on a predicted course of action. Thus, if a user is to be absent for a period, he could set the machine to automatically record a show, even if the recording parameters are not known at the time of setting. Of course, this depends on the availability of a database of current broadcast schedules, however, such a database may generally be available. An on-line database system of known type may be used and need not be described in detail herein.

The smart screens may be implemented as follows. The controller may be, for example, a Macintosh ci computer, operating under Macintosh 7.0 operating system. The Hypercard 2.0 software may be used to implement the screen interface, which incorporates the above-described features, which is generally compatible with the Hyperpad software described above. HyperCard is mentioned due to its capabilities to reference external programs, thus allowing interfacing to various software and hardware devices. A more global scripting language, such as Frontier by UserLand Software Inc., may also be used, especially where low level hardware control of interfaced devices, such as a VCR, multimedia adapter, or the like is desired. Other scripting languages include versions of REXX, by IBM, available on many platforms. The input device is an Apple ADB mouse, and the output display is an 8 bit or 24 bit graphics color adapter connected to, e.g., a 14" color monitor. In addition, various parameters concerning the use of the interface are stored in the computer's memory, and a non-volatile mass storage device, such as a hard disk drive, or EEPROM or EPROM, as well as battery backed RAM could also be used.

From the stored information regarding the prior use of the interface by the user, including prior sessions and the immediate session, and a current state of the machine, a predicted course of action or operation may be realized. This predicted operation is, in the context of the current user interface state, the most probable next action to be taken by the user.

The predicted operation is based on: the identity of the user, if more than one user operates the interface and machine, the information already entered into the interface during the present programming is session, the presently available choices for data entry, settings for the use of the machine, which may be present as a result of a "setup" operation, settings saved during a prior session, and a database of programming choices. In the case of a HyperCard script, the interface software calls another program which has access to the necessary data in the memory, as well as access to any remote database which may be necessary for the function. Using a predictive technology, such as Boolean logic, fuzzy logic, neural network logic, or other type of artificial intelligence, a most probable choice may be presented to the user for his approval, or another alternative choice may be selected. Further, a number of most probable choices may be presented simultaneously or in sequence, in order to improve the probability that the user will be immediately or quickly presented with an acceptable choice. If multiple choices are presented, and there is limited room on the display, two (or more) similar choices may be merged into a single menu selection, which may be resolved in a secondary menu screen.

Figure 24:
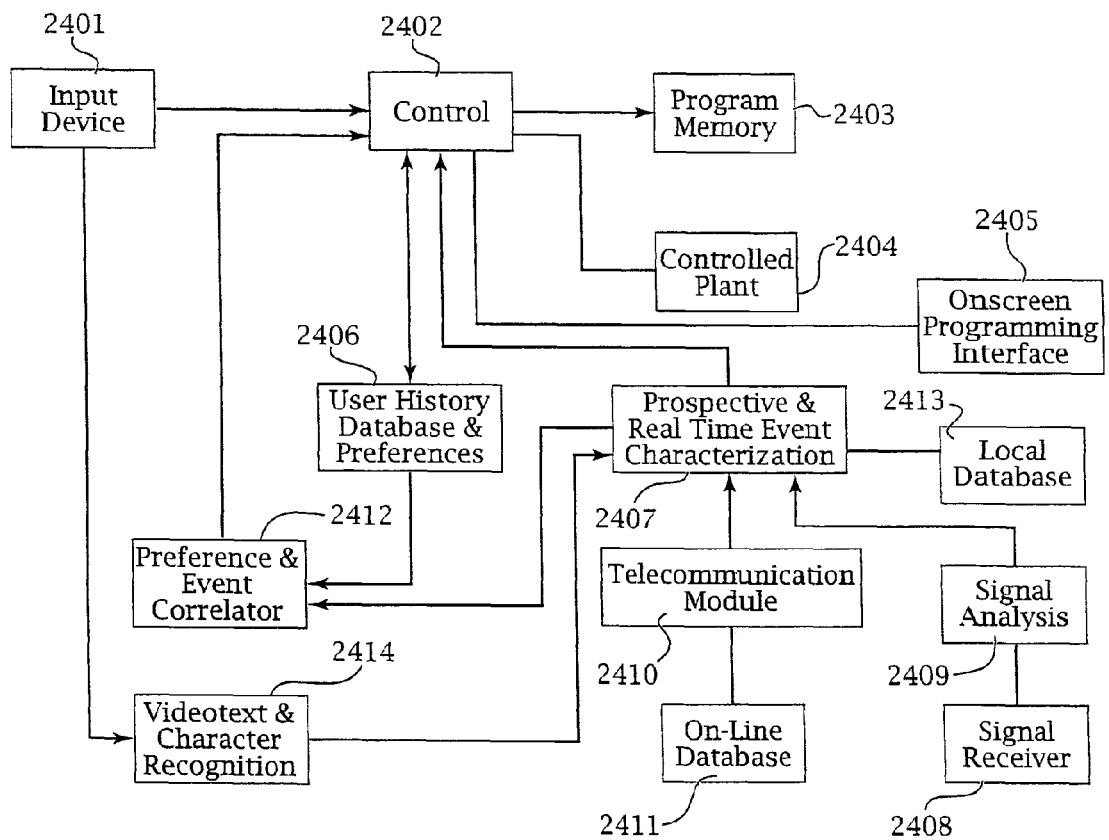
FIG. 24 is a block diagram of a control system for characterizing and correlating a signal pattern with a stored user preference of the present invention.
Figure 25:
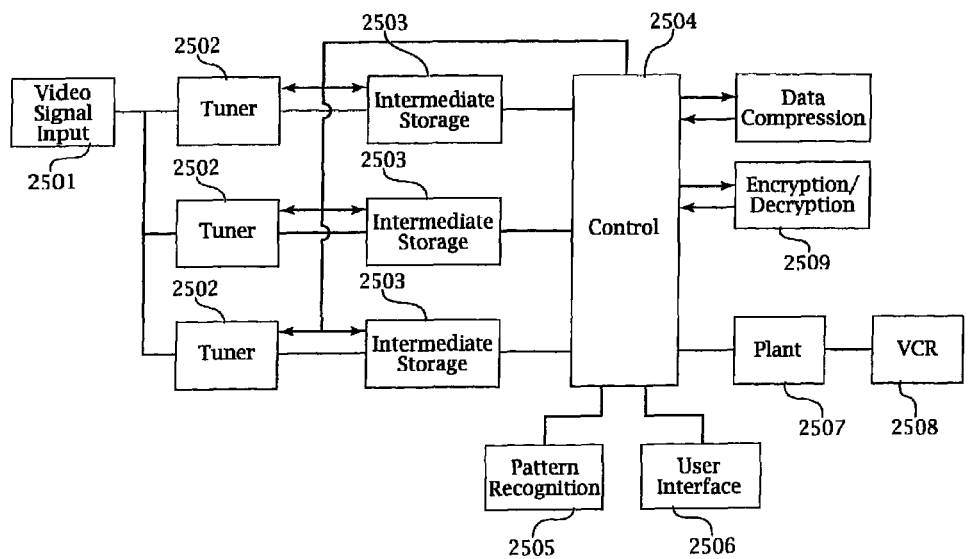
FIG. 25 is a block diagram of a multiple video signal input apparatus, with pattern recognition, data compression, data encryption, and a user interface of the present invention.

FIG. 24 shows a system for correlating a user's preferences with a prospective or real-time occurrence of an event. The input device 2401, which is a remote control with a pointing device, such as a trackball, provides the user's input to the control 2402. The program is stored in a program memory 2403, after it is entered. The control 2402 controls a plant 2404, which is a VCR. The control also controls an on-screen programming interface 2405, through which the user interactively enters the program information. Each program entry of the user is submitted to the user history database and preferences module 2406, which may also receive explicit preference information, input by the user through the input device 2401. The prospective and real time event characterization unit 2407 uses any and all information available in order to determine the character of a signal input, which is a video signal, from the signal receiver 2408. A signal analyzer 2409 provides a preliminary analysis and characterization of the signal, which is input to the prospective and real time event characterization unit 2407. The prospective and real time event characterization unit 2407 also interacts and receives an input from a telecommunication module 2410, which in turn interacts and receives information from an on-line database 2411. A user preference and event correlator 2412 produces an output relating to a relatedness of an event or prospective event and a user preference. In the event of a high correlation or relatedness, the control 2402 determines that the event or prospective event is a likely or most likely predicted action. The prospective event discussed above refers to a scheduled event, which is likely to occur in the future. The characterization unit also has a local database 2413 for storing schedule information and the like.

The following is an example of a user wishing to program the machine interface of a VCR to record, e.g., "Married With Children" (Fox, Sunday, 9:00 p.m.), every time it occurs. The interface would first perform a self diagnostic to determine whether the machine is set up and operating correctly. This would include a determination of whether the clock has been set and thereafter operating continuously. Of course, the clock could have, in practice, a battery to minimize the occurrence of problems relating to clock function. The interface would then, if the clock is not properly set, and if there is no telecommunication or other external means for automatically determining the exact time, present the user with a menu selection to set the proper time. If the user does not have access to a source of the exact time, the step may be deferred. If the machine has access to an external source of the exact time, it would then preferably access this source first. This could include a telephone connection to a voice line which repeats the time. The computer would then perform a speech recognition algorithm which would be used to determine the time. Such a speech recognition algorithm could also be used as a part of the user interface for other purposes. Alternatively, a modem could be used to obtain the time in digitally coded form, which would alleviate the need for speech recognition capabilities for this function. An on-line connection could also be used in order to obtain information concerning television scheduling. A further alternative would be to access a video signal which contains time information. For example, many cable broadcasting systems have a channel which continuously broadcasts the time. The interface could tune to this channel, acquire a representation of the screen image, and perform a character recognition algorithm to determine the time. This character recognition algorithm could also be used to decipher information regarding programming schedules, which may appear on certain cable broadcast channels. Thus, the interface determines a need for setting of the clock, and then takes measures to fulfill the necessary function, through any and all available resources, which may include speech recognition, character recognition, digital telecommunication means, radio wave reception and interpretation, and links to other devices.

The system next must determine what function the user wishes to perform. In this regard, if more than one user has access to the system, the user identifies himself to the interface, in a user identification step 1701 or an analogous action, which may be a coded entry, or a selection from the menu. If the interface has voice recognition capability, then the user may be recognized by his voice pattern, or merely by stating his name. The interface then accesses the memory for a profile of the past use of the machine by the user, which may include the entire prior history, relevant abstracts of the history, or derived user preferences, as shown in the personalized startup based on user profile step 1702, which information is also stored and used in the past user history determining element 2107. These choices differ in the amount is of storage necessary in order to retain the desired information.

Thus, if the user has only used the VCR to record, e.g., the NBC 11 o'clock news, i.e., record all days from 11:00 p.m. to 11:30 p.m. on NBC, in the past, the most likely current predicted choice would be the NBC 11 o'clock news. If the interface were to present a number of choices, having lower probability, then it would interpret the recording history to be "news" based on a database of broadcast information. Therefore, a prediction of lower probability would be ABC or CBS news at, e.g., 11:00 p.m., and the NBC news at, e.g., 5:00 p.m. Thus, these three choices would be initially presented to the user, along with a menu selection to reject these predicted choices. In this case, the user would select the "reject" selection, and would be presented with a next predicted desired menu choice. Since the user history, in this case, does not provide for another choice of high probability, the user would be prompted to explicitly choose the program sequence by day, time, channel, and duration. The user would then enter the starting time for recording according to the methods described above. The interface would then search its databases regarding the user and broadcast listings to present a most likely choice, as well as all available alternatives. In this case, the user history is of little help, and is not used to predict. In other cases, the system would use its intelligence to "fill in the blanks", which could, of course, be rejected by the user. The most likely choices would then be those programs that begin at the selected time. If the user had input the channel, instead of starting time, then the presented choices would be the broadcast schedule of the channel, e.g. Fox, for the selected day. The user then selects one of the available choices, which would complete the programming sequence. If no database of broadcasts is available, then the user must then explicitly define all parameters of the broadcast. When the programming is completed, the interface must then update its user database, prompt the user to set the VCR to record, by, e.g., inserting a blank or recordable tape.

The user would then proceed to explicitly program the VCR interface to record "Married with Children" on Fox at 9:00 p.m. on Sunday evening. If a database is available, it might also show that "Married with Children" is also syndicated in re-runs, and therefore may be available on other channels at other times. Thus, during the subsequent session, both the premier showing and re-run of "Married With Children" would be available predicted choices, along with the 11 o'clock News on NBC.

Having demonstrated a preference for "Married with Children", the interface would then characterize the program. This would include, for example, a characterization of the soundtrack, the background, foreground, actors and actresses present, credits, etc. The interface would then attempt to is correlate the features present in the reference selection with other available selections. This comparison may be with a preformed database, providing immediate results, or prospectively, after entry of the reference selection. Of course, a number of correlation functions may proceed simultaneously, and various choices may be merged to form a compound reference selection. Further, as various "episodes" of the reference selection occur, the system appends and integrates the most recent occurrence with the stored reference information.

Returning to the programming process, if the user instead wishes to record weather reports on all channels, the interface may be of further help. The interface may control a plurality of tuner elements 2502 of a video signal reception device 2501, so that a plurality of broadcasts may be simultaneously received. Using the mass storage and possibly image data compression described above, a plurality of broadcasts may also be recorded simultaneously in the intermediate storage 2503. The mass storage may be multiple VCRs, optical storage, or magnetic storage, including disk and tape. The optical recording tape produced by ICI, Inc. might also be a useful storage medium for large volumes of data, as might be generated by recording multiple video signals. In this case, the interface 2506 would access its associated database 2413 to determine, at a given time, which channels have "news". The interface could also randomly or systematically monitor broadcasts for "special reports". The interface would then monitor these channels for indicia of a "weather" broadcast. For example, the newscaster who appears to report the weather on a given show is usually the same, so that a pattern recognition system 2505 of the video frame could indicate the presence of that newscaster. In addition, the satellite photographs, weather radar, computer generated weather forecast screens, etc. are often similar for each broadcast. Finally, news segments, such as "weather" often appear at the same relative time in the broadcast. Using this information, the interface could begin recording at a beginning of a news segment, such as "weather", stop recording during commercials, and continue recording after return from break, on all selected channels. It is noted that the system of the present invention is intelligent, and may therefore "learn" either explicitly, or through training. Therefore, if the system made an error during the process, the user would define the error to the system, e.g., a substitute newscaster or rearrangement of news segments, so that the system is less likely to make the same error again. Thus, while such a system is inherently complex, it poses significant advantages for an user. Further, while the system is complicated, the interface provides simplicity, with inductive reasoning and deductive reasoning.

It is noted that various algorithms and formulae for pattern recognition, correlation, data is compression, transforms, etc., are known to those skilled in the art, and are available in compendiums, such as Netravali, Arun N., and Haskell, Barry G., "Digital Pictures Representation and Compression", Plenum Press, New York (1988); Baxes, Gregory A., "Digital Signal Processing, A Practical Primer", Prentice-Hall, Englewood Cliffs, N.J. (1984); Gonzalez, Rafael C., "Digital Image Processing", Addison-Wesley, Reading, Mass. (1987), and, of a more general nature, Press, William H. et al, "Numerical Recipes in C The Art of Scientific Computing", Cambridge University Press, 1988, which are incorporated herein by reference.

A further example of the use of the advanced intelligent features of the present invention would be the use of the system to record, e.g., "live" musical performances. These occur on many "talk" shows, such as "Tonight Show with Johnny Carson" (NBC, 11:30 p.m. to 12:30 p.m., weeknights), "Saturday Night Live" (NBC 11:30 p.m. to 1:00 a.m. Saturday-Sunday), and other shows such as the "Grammy Awards". The interface, if requested by the user to record such performances, would seek to determine their occurrence by, e.g.: analyzing a broadcast schedule; interacting with the on-line database 2411; and by reference to the local database 2413. When the interface determines with high probability that a broadcast will occur, it then monitors the channel(s) at the indicated time(s), through the plurality of tuners 2502. In the case of pay-per-view systems and the like, which incorporate encrypted signals, an encryption/decryption unit 2509 is provided for decrypting the transmitted signal for analysis and viewing. This unit also allows encryption of material in other modes of operation. During the monitoring, the interface system acquires the audio and video information being broadcast, through the signal receiver 2408, and correlates this information with a known profile of a "live musical performance", in the preference and event correlator 2412. This must be distinguished from music as a part of, e.g., a soundtrack, as well as "musicals" which are part of movies and recorded operas, if these are not desired. Further, music videos may also be undesirable. When the correlation is high between the broadcast and a reference profile of a "live musical performance", the system selects the broadcast for retention. In this case, the information in the intermediate storage 2503 is transferred to the plant 2507, which includes a permanent storage device 2508. The intermediate storage 2503 medium is used to record a "buffer" segment, so that none of the broadcast is lost while the system determines the nature of the broadcast. This, of course, allows an extended period for the determination of the type of broadcast, so that, while real-time recognition is preferred, it is not absolutely necessary in order to gain the advantages of the present invention.

Thus, while it is preferable to make a determination in real time, it is possible to make an ex post is facto determination of the nature of the broadcast program. By using an available delay, e.g., about 5 to about 300 seconds, or longer, the reliability of the determination can be greatly increased as compared to an analysis of a few frames of video data, e.g., about 15 to about 300 mS. As stated above, the determination storage need not be uncompressed nor lossless, so long as features necessary to determine the character of the broadcast are present. However, it is preferred that for broadcast recording, the storage be as accurate as possible, so that if a compression algorithm is implemented, it be as lossless as possible. The MPEG II standard would be applicable in this situation. In a preferred situation, approximately 5 minutes of broadcast material is analyzed in order to make a determination of the content. This material is stored in two media. First, it is stored by normal means on video tape. Second, it is received in parallel by the computer control, where the data is subject to a number of recognition and characterization processes. These are performed in parallel and in series, to form an extracted feature storage matrix.

A preferred method incorporates one or more digital signal processor based coprocessor elements, which may be present on, e.g., Nubus cards in the Macintosh ci or other computer type. These elements may be based on C-Cube CL550 (JPEG compression), AT&T DSP32C, AT&T DSP3210, AMD 29000 series, Motorola DSP 96000ADS, Texas Instruments TMS 32050, etc, or a combination of types. A typical board containing a DSP is the MacDSP3210 by Spectral Innovations Inc., containing an AT&T digital signal processor and an MC68020 CISC processor, and uses Apple Real-time Operating System Executive (A/ROSE) and Visible Cache Operating System (VCOS). It is preferred that the processors employed be optimized for image processing, because of their higher throughput in the present applications, to process the video signals, and more general purpose signal processors to analyze the audio signals, because of the greater availability of software to analyze audio signals on these processors, as well as their particular strengths in this area. An array processor which may be interfaced with a Macintosh is the Superserver-C available from Pacific Parallel Research Inc., incorporating parallel Inmos Transputers. Such an array processor may be suitable for parallel analysis of the image segment and classification of its attributes. Pattern recognition, especially after preprocessing of the data signal by digital signal processors and image compression engines, may also be assisted by logical inference engines, such as FUTURE (Fuzzy Information Processing Turbo Engine) by The Laboratory for International Fuzzy Engineering (LIFE), which incorporates multiple Fuzzy Set Processors (FSP), which are single-instruction, multiple data path (SIMD) processors. Using a fuzzy logic paradigm, the processing system may provide a is best fit output to a set of inputs more efficiently than standard computational techniques, and since the presently desired result requires a "best guess", rather than a very accurate determination, the present interface is an appropriate application of this technology. As noted above, these processors may also serve other functions such as voice recognition for the interface, or extracting text from video transmissions and interpreting it. It is also noted that, while these coprocessing engines are now costly, the present emergence of high levels of integration of functionality on semiconductor chips, as well as the development of optical computers will dramatically reduce the cost of implementing this aspect of the present invention; however, the present state of the art allows the basic functions to be performed.

It is noted that various methods are available for determining a relatedness of two sets of data, such as an image or a representation of an image. These include the determination of Hausdorff distance, fuzzy correlation, arithmetic correlation, mean square error, neural network "energy" minimization, covariance, cross correlation, and other known methods, which may be applied to the raw data or after a transformation process, such as an Affine transformation, a Fourier transformation, a warping transformation, a color map transformation, and the like. Further, it is emphasized that, in image or pattern recognition systems, there is no need that the entire image be correlated or even analyzed, nor that any correlation be based on the entirety of that image analyzed. Further, it is advantageous to allow redundancy, so that it is not necessary to have unique designations for the various aspects of the data to be recognized, nor the patterns to be identified as matching the uncharacterized input data.

The MSHELL from Applied Coherent Technology is a software system that runs on a Mercury MC3200 array processor, in conjunction with a Data Translation DT2861 or DT2862. The NDS1000 Development System from Nestor, Inc., provides image recognition software which runs on a PC compatible computer and a Data Translation DT2878. The above mentioned processing hardware and software, as known, is incorporated herein.

The C-Cube CL550 is fully disclosed in "C-Cube CL550 JPEG Image Compression Processor", Preliminary Data Book, August 1991, and addendum dated Nov. 20, 1991, incorporated herein by reference, and products incorporating the CL550 include the JPEG Video Development Kit (ISA bus card with Chips and Technologies PC video 82C9001A Video Window Controller), and the C-Cube CL550 Development Board/PC for ISA Bus (CL550, for use with Truevision TARGA-16 or ATVista cards) or for NuBus (Macintosh). The so-called C-Cube "CL950" (unofficially announced) is a MPEG decoder device. Such a device as the CL950 may be particularly useful for use in the present VCR for reproducing is compressed program material, which may be compressed by the present apparatus, or may be used for decompressing pre-compressed program material.

It is noted that all functions of a VCR would also be simplified by the use of such powerful processors, and thus it is not only these advanced functions which are facilitated by the processors. It is also noted that these image recognition functions need not necessarily all be executed local to the user, and may in fact be centralized. This would be advantageous for two reasons: first, the user need not have an entire system of hardware in the VCR, and second, many of the operations which must be performed are common to a number of users, so that there is a net efficiency to be gained.

EXAMPLE 3

The interface of the present invention incorporates an intelligent user interface level determination. This function analyzes the quality of the user input, rather than its content. Thus, this differs from the normal interface user level determination which requires an explicit entry of the desired user level, which is maintained throughout the interface until explicitly changed. The present interface may incorporate the "smart screen" feature discussed above, which may, through its analysis of the past user interaction with the interface predict the most likely predicted user input function. Thus, the predictive aspects of Example 1 may be considered a species of the intelligent user level interface of Example 2. However, the following better serves to define this aspect of the invention.

The input device, in addition to defining a desired command, also provides certain information about the user which has heretofore been generally ignored or intentionally removed. With respect to a two-dimensional input device, such as a mouse, trackball, joystick, etc., this information includes a velocity component, an efficiency of input, an accuracy of input, an interruption of input, and a high frequency component of input. This system is shown schematically in FIG. 21, which has a speed detector 2104, a path optimization detector 2105, a selection quality detector 2106, a current programming status 2108, an error counter 2109, a cancel counter 2110, a high frequency signal component detector 2112, an accuracy detector 2113 and a physio-dynamic optimization detector 2114. In addition, FIG. 21 also shows that the interface also uses a past user history 2107, an explicit user level choice 2111 and an explicit help request 2115.

This list is not exclusive, and is somewhat dependent on the characteristics of the specific input device. For a mouse, trackball, or other like device, the velocity or speed component refers to the speed of movement of the sensing element, i.e. the rotating ball. This may also be direction sensitive, i.e., velocity vector. It is inferred that, all other things being equal, the higher the velocity, the more likely that the user "knows" what he is doing.

The efficiency of input refers to two aspects of the user interface. First, it refers to the selection of that choice which most simply leads to the selection of the desired selection. For example, if "noon" is an available choice along with direct entry of numbers, then the selection of "noon" instead of "12:00 p.m." would be more efficient. The second aspect of efficiency has to do with the path taken by the user in moving a menu selection cursor from a current position to a desired position. For example, a random curve or swiggle between locations is less efficient than a straight line. This effect is limited, and must be analyzed in conjunction with the amount of time it takes to move from one location of a cursor on the screen to another; if the speed of movement is very rapid, i.e. less than about 400 mS for a full screen length movement, then an inefficiency in path is likely due to the momentum of the mouse and hand, momentum of the rolling ball, or a physiological arc of a joint. This aspect is detected by the physio-dynamic optimization detector 2114. Thus, only if the movement is slow, deliberate, and inefficient, should this factor weigh heavily. It is noted that arcs of movement, as well as uncritical damping of movement around the terminal position may be more efficient, and a straight path actually inefficient, so that the interface may act accordingly where indicated. Thus, an "efficient" movement would indicate an user who may work at a high level, and conversely, an inefficient movement would indicate a user who should be presented with simpler choices.

Likewise, if a movement is abrupt or interrupted, yet follows an efficient path, this would indicate a probable need for a lower user interface level. This would be detected in a number of elements shown in FIG. 21, the speed detector 2104, a high frequency signal component detector 2112, an accuracy detector 2113 and a physio-dynamic optimization detector 2114. In addition, FIG. 21 also shows the use of a past user history 2107, an explicit user level choice 2111 and an explicit help request 2115.

While the interface may incorporate screen buttons which are smart, i.e. those which intelligently resolve ambiguous end locations, the accuracy of the endpoint is another factor in determining the probable level of the user. Thus, for example, if a 14" color monitor screen is used, having a resolution of 640 by 480 pixels, an accurate endpoint location would be within a central area of a screen button of size about 0.3" by about 1.0", would be an area of about 0.25" by about 0.75". A cursor location outside this location, but inside the screen button confines would indicate an average user, while a cursor location outside the screen button may be inferred to indicate the button, with an indication that the user is less experienced in using the pointing device.

Finally, in addition to the efficiency of the path of the cursor pointing device, a high frequency component may be extracted from the pointer signal by the high frequency signal component detector 2112, which would indicate a physical infirmity of the user (tremor), a distraction in using the interface, indecision in use, or environmental disturbance such as vibration. In this case, the presence of a large amount of high frequency signal indicates that, at least, the cursor movement is likely to be inaccurate, and possibly that the user desires a lower user level. While this is ambiguous based on the high frequency signal content alone, in conjunction with the other indicia, it may be interpreted. If, for example, the jitter is due to environmental vibrations, and the user is actually a high level user, then the response of the user level adjust system would be to provide a screen display with a lowered required accuracy of cursor placement, without necessarily qualitatively reducing the implied user level of the presented choices, thus, it would have an impact on the display simplification 2103, with only the necessary changes in the current user level 2101.

It is noted that, the adaptive user level interface is of use in uncontrolled environments, such as in a moving vehicle, especially for use by a driver. An intelligent system of the present invention would allow the driver of such a vehicle to execute control sequences, which may compensate for the limited ability to interact with an interface while driving. Thus, the driver need not explicitly control all individual elements, because the driver is assisted by an intelligent interface. Thus, for example, if it begins raining, the interface would predict the windshield wipers should be actuated, the windows and any roof opening closed, and possibly the headlights activated. Thus, the driver could immediately assent to these actions, without individually actuating each control. In such a case, the screen interface would provide a small number of choices, which may be simply selected. Further, under such conditions, there would likely be a large amount of jitter from the input device, which would be filtered to ease menu selection. Further, this jitter would indicate an unstable environment condition, which would cause the interface to present an appropriate display.

Likewise, the present interface could be used to control complex telecommunications functions of advanced telephone and telecommunications equipment. In such a case, the user display interface would be a video display, or a flat panel display, such as an LCD display. The interface would hierarchically present the available choices to the user, based on a probability of selection by the user. The input device would be, for example, a small track ball near the keypad. Thus, simple telephone dialing would not be substantially impeded, while complex functions, such as call diversion, automated teledictation control, complex conferencing, caller identification-database interaction, and videotel systems, could easily be performed.

EXAMPLE 4

Another aspect of the present invention relates to the cataloging and indexing of the contents of a storage medium. While random access media normally incorporate a directory of entries on a disk, and devices such as optical juke boxes normally are used in conjunction with software that indexes the contents of the available disks, serial access mass storage devices, such as magnetic tape, do not usually employ an index; therefore, the entire tape must be searched in order to locate a specific selection.

In the present invention, an area of the tape, preferable at the beginning of the tape or at multiple locations therein, is encoded to hold information relating to the contents of the tape. This encoding is shown in FIG. 19, which shows a data format for the information. This format has an identifying header 1901, a unique tape identifier 1902, an entry identifier 1903, a start time 1904, an end time 1905 and/or a duration 1906, a date code 1907, a channel code 1908, descriptive information 1909 of the described entry, which may include recording parameters and actual recorded locations on the tape, as well as a title or episode identifying information, which may be a fixed or variable length entry, optionally representative scenes 1910, which may be analog, digital, compressed form, or in a form related to the abstract characterizations of the scenes formed in the operation of the device. Finally, there are error correcting codes 1911 for the catalog entry, which may also include advanced block encoding schemes to reduce the affect of non-Gaussian correlated errors which may occur on video tape, transmission media and the like. This information is preferably a modulated digital signal, recorded on, in the case of Hi-Fi VHS, one or more of the preexisting tracks on the tape, including the video, overscan area, Audio, Hi-Fi stereo audio, SAP or control tracks. It should be noted that an additional track could be added, in similar fashion to the overlay of Hi-Fi audio on the video tracks of Hi-Fi VHS. It is also noted that similar techniques could be used with Beta format, 8 mm, or other recording systems, to provide the necessary indexing functions.

The recording method is preferable a block encoding method with error correction within each block, block redundancy, and interleaving. Methods are known for reducing the error rate for digital signals recorded on unverified media, such as videotape, which are subject to burst errors and long term non-random errors. Such techniques reduce the effective error rate to acceptable levels. These are known to those skilled in the art and need not be discussed herein in detail. A standard reference related to this topic is *Digital Communications* by John G. Proakis, McGraw-Hill (1983), which is incorporated herein by reference. The digital data recording scheme is best determined according to the characteristics of the recording apparatus. Therefore, if an, e.g. Sony Corporation helical scan recording/reproducing apparatus was employed, one of ordinary skill in the art would initially reference methods of the Sony Corporation initially for an optimal error correcting recording scheme, which are available in the patent literature, in the U.S., Japan, and internationally, and the skilled artisan would also review the known methods used by other manufacturers of digital data recording equipment. Therefore, these methods need not be explained herein in detail.

The catalog of entries is also preferably stored in non-volatile memory, such as hard disk, associated with the VCR controller. This allows the random selection of a tape from a library, without need for manually scanning the contents of each tape. This also facilitates the random storage of recordings on tape, without the requirement of storing related entries in physical proximity with one another so that they may be easily located. This, in turn, allows more efficient use of tape, because of reduced empty space at the end of a tape. The apparatus is shown schematically in FIG. 20, in which a tape drive motor 2001, controlled by a transport control 2002, which in turn is controlled by the control 2003, moves a tape 2005 past a reading head 2004. The output of the reading head 2004 is processed by the amplifier/demodulator 2006, which produces a split output signal. One part of the output signal comprises the analog signal path 2007, which is described elsewhere. A digital reading circuit 2008 transmits the digital information to a digital information detecting circuit 2009, which in turn decodes the information and provides it to the control 2003.

In order to retrieve an entry, the user interacts with the same interface that is used for programming the recorder functions; however, the user selects different menu selections, which guide him to the available selections. This function, instead of focusing mainly on the particular user's history in order to predict a selection, would analyze the entire library, regardless of which user instituted the recording. Further, there would likely be a bias against performing identically the most recently executed function, and rather the predicted function would be an analogous function, based on a programmed or inferred user preference. This is because it is unlikely that a user will perform an identical action repeatedly, but a pattern may still be derived.

It is noted that the present library functions differ from the prior art VHS tape index function, because the present index is intelligent, and does not require the user to mark an index location and is explicitly program the VCR to shuttle to that location. Rather, the index is content based. Another advantage of the present library function is that it can automatically switch media. Such a system might be used, for example, if a user wishes to record, e.g., "The Tonight Show With Johnny Carson" in highly compressed form, e.g. MPEG at 200:1 compression, except during the performance of a musical guest, at which time the recording should be as lossless as possible. A normal VCR could hardly be used to implement such a function even manually, because the tape speed (the analogy of quality level) cannot be changed in mid recording. The present system could recognize the desired special segment, record it as desired, and indicate the specific parameters on the information directory. The recorded information may then be retrieved sequentially, as in a normal VCR, or the desired selection may be preferentially retrieved. If the interface of the present invention is set to automatically record such special requests, the catalog section would then be available for the user to indicate which selections were recorded based upon the implicit request of the user. Because the interface has the ability to characterize the input and record these characterizations in the index, the user may make an explicit request different from the recording criteria, after a selection has been recorded. The controller would then search the index for matching entries, which could then be retrieved based on the index, and without a manual search of the entire tape. Other advantages of the present system are obvious to those of ordinary skill in the art.

A library system is available from Open Eyes Video, called "Scene Locator", which implements a non-intelligent system for indexing the contents of a videotape. See NewMedia, November/December 1991, p. 69.

It is noted that, if the standard audio tracks are used to record the information, then standard audio frequency modems and recording/receiving methods are available. These standard modems range in speed from 300 baud to 19,200 baud, e.g. v.FAST, v.32bis, etc. While these systems are designed for dial-up telecommunications, and are therefore slower than necessary and incorporate features unnecessary for closed systems, they require a minimum of design effort and the same circuitry may be multiplexed and also be used for telecommunication with an on-line database, such as a database of broadcast listings, discussed above.

The Videotext standard may also be used to record the catalog or indexing information on the tape. This method, however, if used while desired material is on the screen, makes it difficult to change the information after it has been recorded, because the videotext uses the video channel, during non-visible scan periods thereof.

The use of on-line database listings may be used by the present interface to provide information to be downloaded and incorporated in the index entry of the library function, and may also be used as part of the intelligent determination of the content of a broadcast. This information may further be used for explicitly programming the interface by the user, in that the user may be explicitly presented with the available choices available from the database.

EXAMPLE 5

The present invention may incorporate character recognition from the video broadcast for automatic entry of this information. This is shown schematically in FIG. 24, with the inclusion of the videotext and character recognition module 2414. This information is shown to be transmitted to the event characterization unit 2407, where the detected information is correlated with the other available information. This information may also be returned to the control 2402. Examples of the types of information which would be recognized are titles of shows, cast and crew from programming material, broadcast special alerts, time (from digital display on special access channels), stock prices from "ticker tape" on special access channels, etc. Thus, this technology adds functionality to the interface. In addition, subtitled presentations could be recognized and presented through a voice synthesizer, to avoid the necessity of reading the subtitle. Further, foreign language subtitles could be translated into, e.g., English, and presented.

The character recognition is performed in known manner on a buffer memory containing a frame of video, from a device such as a Data Translation DT2851, DT2853, DT2855, DT2867, DT2861, DT2862 and DT2871. A contrast algorithm, run on, for example, a Data Translation DT2858, DT2868, or DT2878, first removes the background, leaving the characters. This works especially well where the characters are of a single color, e.g. white, so that all other colors are masked. After the "layer" containing the information to be recognized is masked, an algorithm similar to that used for optical character recognition (OCR) is employed. These methods are well known in the art. This may be specially tuned to the resolution of the video device, e.g. NTSC, S-VHS, IDTV, EDTV, MUSE, PAL, SECAM, etc. In addition, since the text normally lasts for a period in excess of one frame, a spatial-temporal image enhancement algorithm may be employed to improve the quality of the information to be recognized.

EXAMPLE 6

The present invention may also be incorporated into other types of programmable controls, for example those necessary or otherwise used in the control of a smart house. See, "The Smart House: Human Factors in Home Automation", Human Factors in Practice, December 1990, 1-36. The user interface in such a system is very important, because it must present the relevant data to the user for programming the control to perform the desired function. A smart house would likely have many rarely used functions, so that the presentation of both the data and the available program options must be done in the simplest manner consistent with the goal of allowing the user to make the desired program choice. For example, a smart house system might be used to execute the program "start dishwasher, if more than half full, at 9:00 p.m." A user who wishes to delay starting until 11:00 p.m. would be initially presented with the default time as an option, which would be simply modified by correcting the starting time. The next time the user wishes to program the device, an algorithm would change the predicted starting time to, e.g. 10:00 p.m., which is a compromise between the historical choices.

The smart house system also controls the climate control system. Thus, it could coordinate temperatures, air flow and other factors, based on learned complex behaviors, such as individual movement within the dwelling. Since the goal of the programming of the smart house is not based on the storage of discrete information, but rather the execution of control sequences at various times and under certain circumstances, the control would differ in various ways from that of a VCR. However, the user interface system, adaptive user level, help system, and the like would be common to both types of system. This differs from the Fuzzy Logic controlled air conditioner available (in Japan) from Mitsubishi in that that device does not have an intelligent interface of the present invention. It should also be noted that the control for the VCR could be the same control as that for the smart house, so that the common elements are not redundant. Therefore, by applying a single control to many tasks, a common user interface is used, and the cost is reduced.

EXAMPLE 7

The present Example relates to a programmable environmental controller application. In this case, a sensor or sensor array is arranged to detect a change in the environment which is related to a climatic condition, such as an open door. On the occurrence of the door opening, the system would apply a pattern recognition analysis to recognize this particular sensor pattern, i.e. a mass of air at a different temperature entering the environment from a single location, or a loss of climate controlled air to a single location. These sensor patterns must be distinguished from other events, such as the action of appliances, movement of individuals in the vicinity of the sensor, a shower and other such events. It is noted that in this instance, a neural network based adaptive controller may be more efficient, because the installation and design of such a system is custom, and therefore it would be difficult to program a priori. In this case, a learning system, such as a neural network, may be more efficient and produce a better result than other adaptive methods. The training procedure could be fully automated, so long as sufficient sensors are provided for controlling the system, and also that an initial presumption of the control strategy is workable during the training period. In this case, the initial strategy incorporated is the prior art "bang-bang" controller, which operates as a simple thermostat, or multi-zone thermostat. As a better starting point, a fuzzy logic temperature controller may be modeled and employed. Other known strategies which are not often used in environmental control include the proportional-integral-differential controller (PID).

In this example, which may be described with reference to FIG. 23, sufficient sensors in a sensor array 2301 are provided, being light, temperature, humidity, pressure, air flow and possibly a sensor for determining an event proximate to the sensor, such as door opening. While a single sensor array 2301 could provide input to the present control, a plurality of sensor arrays are preferably employed in complex installations, such as that described here. The sensors, with the possible exceptions of the flow sensor and event sensor, are housed in a single sensor head. Further, the temperature and pressure sensors may be combined in a single integrated circuit by known means. The light and temperature sensors are known to those skilled in the art, and need not be described herein. The pressure sensor may be a Sensym strain gage pressure transducer, a Motorola pressure transducer device, or the like, and may also be a derivative of the Analog Devices monolithic accelerometer. These devices are known in the art. The humidity sensor is preferably an electronic type, producing an electrical signal output. It need not be internally compensated for the other measured environmental factors. The air flow sensor may be based on pressure differentials, using the pressure sensor described above, or may be a mechanical vane type. In most applications, a single flow axis will be sufficient, however, in some circumstances, a two or greater axis sensor will be required. Further, in the case of large volume areas, complex turbulent flow patterns may be relevant, for which known sensors exist. The event sensor may be of any type, and depends particularly on the event being measured. In the present case, where a door opening is to be detected, it is preferred that the environmental control be interfaced with a perimeter intrusion alarm system, which, for example, provides a magnet embedded in the door and a magnetic reed switch in the door frame. Individual sensors are normally wired to the alarm control panel, thus providing central access to many or all of the desired event detection sensors while minimizing the added cost. The event detector may also be an ultrasonic, infrared, microwave-Doppler, mechanical, or other type of sensor.

The preferred method of receiving sensor information is through a serial digital or multiplexed analog (i.e., 4-20 mA transmitter) data transmission scheme, with minimal local processing of the sensor data by the microprocessor 2302 with the serial link 2302a in the sensor head. This system allows the central control 2303 to incorporate the desired processing, e.g., by the pattern recognition system 2304, etc., while minimizing the installation expense. A simple microprocessor device 2302 in the sensor head interfaces the sensing elements, and may provide analog-to-digital conversion, or other conversion which may be necessary, of the sensor signal. In the case of a serial digital data transmission, the local microprocessor formats the sensor data, including a code indicating the sensor serial number and type, the sensor status (i.e., operative, defective, in need of maintenance or calibration, etc.), the sensor data, and an error correcting code. In the case that the data is transmitted on a local area network, the microprocessor also arbitrates for bus usage and the messaging protocol.

The control, it must be understood, has a number of available operative systems at its disposal, comprising the plant 2306. In this case, the system is a forced air heating and cooling system. This system has a heating unit, a humidifier, blowers, a cooling unit (which also dehumidifies), ducts, dampers, and possible control over various elements, such as automated door openers.

As described above, the system is installed with a complete array of sensors, some of which may be shared with other control systems in the environment, and begins operation with a basic acceptable initial control protocol. The system then receives data from the sensors, and correlates data from the various sensors, including the event sensors, with the operation of the systems being controlled. In such a case, a "door open" event may be correlated with a change in other measured variables. The system then correlates the control status with the effect on the interrelation of the measured variables. Thus, the system would detect that if the blower is operating while the door is open, then there is a high correlation that air will flow out of the door, unless a blower operates to recirculate air from a return near the door. Thus, the system will learn to operate the proximate return device while the door is open and the blower is on. Once this correlation is defined, the system may further interrelate the variables, such as a wind speed and direction outside the door, effects of other events such as other open doors, the absolute and relative speeds of the blowers and the return device, the effect of various damper devices, etc. It is further noted that, under some circumstances, an exchange of air through an open door is desired, and in such instance, the system may operate to facilitate the flow through such an open door. Finally, the system must be able to "learn" that conditions may exist which produce similar sensor patterns which should be handled differently. An example is a broken or inoperative sensor. In such a case, the system must be able to distinguish the type of condition, and not execute an aggressive control algorithm in an attempt to compensate for an erroneous reading or otherwise normal event. This requires the intelligent control of the present invention.

It is further noted that energy efficiency is a critical issue in climate control systems, and an absolute and continuous control over the internal environment may be very inefficient. Thus, the starting of large electrical motors may cause a large power draw, and simultaneous starting of such equipment may increase the peak power draw of a facility, causing an increase in the utility rates. Further, some facilities may operate on emergency or private power generation (co-generation) which may have different characteristics and efficiency criteria. These must all be considered in the intelligent control. It is also noted that a higher efficiency may also be achieved, in certain circumstances, by employing auxiliary elements of the climate control system which have a lower capacity and lower operating costs than the main elements. Thus, for example, if one side of a building is heated by the sun, it may be more efficient to employ an auxiliary device which suitably affects only a part of the building. Thus, if such equipment is installed, the aggregate efficiency of the system may be improved, even if the individual efficiency of an element is lower. The present intelligent control allows a fine degree of control, making use of all available control elements, in an adaptive and intelligent manner.

Returning to the situation of a door opening event, the system would take appropriate action, including: interruption of normal climate control until after the disturbance has subsided and normal conditions are achieved; based on the actual climatic conditions or predicted climatic conditions begin a climate compensation control, designed to maximize efficiency and also maintain climatic conditions during the disturbance, as well as return to normal after the disturbance; optionally, during the door opening disturbance, the system would control a pressure or flow of air to counterbalance a flow through the door, by using a fan, blower or other device, or halting such a device, if necessary. It is also noted that the climatic control system could also be outfitted with actuators for opening and closing doors and windows, or an interface with such other system, so that it could take direct action to correct the disturbance, e.g., by closing the door. The climate between the internal and external ambients may differ in temperature, humidity, pollutants, or the like, and appropriate sensors may be employed.

It is thus realized that the concepts of using all available resources to control an event, as well as using a predictive algorithm in order to determine a best course of action and a desired correction are a part of the present invention.

EXAMPLE 8

A remote control of the present invention may be constructed from, for example, a Micromint (Vernon, Conn.) RTC-LCD, RTC-V25 or RTC-HC11 or RTC180 or RTC31/52, and RTC-SIR, in conjunction with an infrared transmitter and receiver, input keys and a compatible trackball, which may provide raw encoder signals, or may employ a serial encoder and have a serial interface to the processor module. A power supply, such as a battery, is used. The use, interfacing and programming of such devices is known to those skilled in the art, and such information is generally available from the manufacturer of the boards and the individual circuit elements of the boards. The function of such a remote control is to receive inputs from the trackball and keys and to transmit an infrared signal to the controller. The processor and display, if present, may provide added functionality by providing a local screen, which would be useful for programming feedback and remote control status, as well as compressing the data stream from the trackball into a more efficient form. In this case, certain of the extracted information may be relevant to the determination of the user level, so that information related to the user level would be analyzed and transmitted separately to the controller by the infrared transmitter. If the local LCD screen is used in the programming process, then the main controller would transmit relevant information to the remote display, by a reverse infrared link. These components are known in the art, and many other types may also be used in known manner.

EXAMPLE 9

The interface and intelligent control of the present invention are applicable to control applications in medicine or surgery. This system may also be described with reference to the generic system drawings of FIGS. 23 and 24. In this case, an operator identifies himself and enters information regarding the patient, through the interface 2305. The interface 2305 automatically loads the profile 2406 of both the operator and the patient, if the device is used for more than one at a time, and is connected to a database containing such information, such as a hospital central records bureau. The interface may be connected to various sensors, of the input device 2401, such as ambient conditions (temperature, humidity, etc.), as well as data from the patient, such as EKC, EMG, EEG, Evoked Potentials, respirator, anesthesia, temperature, catheter status, arterial blood gas monitor, transcutaneous blood gas monitor, urinary output, IV solutions, pharmaceutical and chemotherapy administration data, mental status, movement, pacemaker, etc. as well as sensors and data sources separate from the patient such as lab results, radiology and medical scanner is data, radiotherapy data and renal status, etc. Based on the available information, the interface 2405, using the simple input device and the display screen described above, presents the most important information to the operator, along with a most probable course of action. The user then may either review more parameters, investigate further treatment options, input new data, or accept the presented option(s). The system described has a large memory in the signal analysis module 2409 for recording available patient data from the signal receiver 2408, and thus assists in medical record keeping and data analysis, as well as diagnosis. While various systems are available for assisting in both controlling medical devices and for applying artificial intelligence to assist in diagnosis, the present system allows for individualization based on both the service provider and the patient. Further, the present invention provides the improved interface for interaction with the system. It is further noted that, analogously to the library function discussed above, medical events may be characterized in the characterization unit 2407 and recorded by the plant 2404, so that a recording of the data need not be reviewed in its entirety in order to locate a particular significant event, and the nature of this event need not be determined in advance. It is also noted that the compression feature of the recorder of the present invention could be advantageously employed with the large volume of medical data that is often generated. It is finally noted that, because of its ability to store and correlate various types of medical data in the characterization unit 2407, the system could be used by the operator to create notes and discharge summaries for patients, using the database stored in the local database 2413, as well as the user history and preferences 2406. Thus, in addition to saving time and effort during the use of the device, it would also perform an additional function, that of synthesizing the data, based on medical significance.

In addition to providing the aforementioned intelligence and ease of use, the present example also comprises a control 2402, and may interface with any of the sensors and devices, performing standard control and alarm functions. However, because the present control 2402 is intelligent and has pattern recognition capability, in addition to full data integration from all available data sources, it may execute advanced control functions. For example, if the present control 2402 is interfaced to a controlled infusion pump for, e.g., morphine solution, in e.g., a terminally ill patient, then certain parameters must be maintained, while others may be flexible. For example, a maximum flow rate is established as a matter of practice as a safety measure; too high a flow rate could result in patient death. However, a patient may not need a continuous infusion of a constant dose of narcotic. Further, as the patient's status changes, the level of infusion may be advantageously altered. In particular, if the renal status of the patient were to change, the excretion of the drug may be impaired. Therefore, if the controller had a urinary output monitor, it could immediately suppress the morphine infusion as soon as the renal output is recognized as being decreased, and further indicate an alarm condition. Further, it may be advantageous to provide a diurnal variation in the infusion rate, to provide a "sleep" period and a period of heightened consciousness with correspondingly lower levels of narcosis.

As another example of the use of the present device as a medical controller, the control 2402 could be interfaced with a cardiac catheter monitor, as a part of the signal receiver 2408. In such a case, normally, alarms are set based on outer ranges of each sensor measurement, and possibly a simple formula relating two sensor measurements, to provide a useful clinical index. However, by incorporating the advanced interface and pattern recognition function of the present invention, as well as its ability to interface with a variety of unrelated sensors, the present device, including the present control, may be more easily programmed to execute control and alarm functions, may provide a centralized source of patient information, including storage and retrieval, if diverse sources of such information are linked, and may execute advanced, adaptive control functions. The present control 2402 is equipped to recognize trends in the sensor data from the signal receiver 2408, which would allow earlier recognition and correction of various abnormal conditions, as well as recognizing improvements in conditions, which could allow a reduction in the treatment necessary. Further, by allowing a fine degree of control, parameters may be maintained within optimal limits for a greater percentage of the time. In addition, by monitoring various sensors, various false alarms may be avoided or reduced. In particular, false alarms may occur in prior art devices even when sensors do not indicate a dangerous condition, merely as a safety precaution when a particular parameter is out of a specified range. In such a case, if a cause of such abnormal condition may be identified, such as patient movement or the normal activities of the patient's caretakers, then such condition may be safely ignored, without indicating an alarm. Further, even if a sensor parameter does in and of itself indicate a dangerous condition, if a cause, other than a health risk, may be identified, then the alarm may be ignored, or at least signaled with a different level of priority. By providing an intelligent and active filter for false alarm events, the system may be designed to have a higher level of sensitivity to real health risks, and further to provide a finer level of control based on the sensor readings.

EXAMPLE 10

The present invention is also of use in automated securities, debt, variable yield and currency trading systems, where many complex functions are available, yet often a particular user under particular circumstances will use a small subset of the functionality available at a given time. Such a situation would benefit from the present interface, which provides adaptive user levels, prioritized screen information presentation, and pattern recognition and intelligent control. A securities trading system is disclosed in U.S. Pat. No. 5,034,916, for a mouse driven Fast Contact Conversational Video System, incorporated herein by reference. The present system relates primarily to the user terminal, wherein the user must rapidly respond to external events, in order to be successful. In such a case, the advantages of the interface aspects are obvious, and need not be detailed herein. However, the pattern recognition functions of the present invention may be applied to correspond to the desired actions of the trader, unlike in prior intelligent trading systems, where the terminal is not individually and adaptively responsive to the particular user. Thus, the system exploits the particular strengths of the user, facilitating his actions, including: providing the desired background information and trading histories, in the sequence most preferred by the user; following the various securities to determine when a user would execute a particular transaction, and notifying the user that such a condition exists; monitoring the success of the user's strategy, and providing suggestions for optimization to achieve greater gains, lower risk, or other parameters which may be defined by the user. Such a system, rather than attempting to provide a "level playing field", allows a user to use his own strategy, providing intelligent assistance.

EXAMPLE 11

The fractal method employing Affine transforms may be used to recognize images. This method proceeds as follows. A plurality of templates are stored in a memory device, which represent the images to be recognized. These templates may be preprocessed, or processed in parallel with the remainder of the procedure, in a corresponding manner. Image data, which may be high contrast line image, greyscale, or having a full color map, the greyscale being a unidimensional color map, is stored in the data processor, provided for performing the recognition function. A plurality of addressable domains are generated from the stored image data, each of the domains representing a portion of the image information. It is noted that the entire image need not be represented, only those parts necessary for the recognition, which may be determined by known means. From the stored image data, a plurality of addressable mapped ranges are created, corresponding to different subsets of the stored image data. Creating these addressable mapped ranges, which should be uniquely addressable, also entails the step of executing, for each of the mapped ranges, a corresponding procedure upon the one of the subsets of the stored image data which corresponds to the mapped ranges. Identifiers are then assigned to corresponding ones of the mapped ranges, each of the identifiers specifying, for the corresponding mapped range, a procedure and a address of the corresponding subset of the stored image data. The treatment of the template and the image data is analogous, so that the resulting data is comparable. The domains are optionally each subjected to a transform, which may be a predetermined rotation, an inversion, a predetermined scaling, and a predetermined frequency domain preprocessing transform. This transform is used to optimize the procedure, and also to conform the presentation of the image data with the template, or vice versa. Each of the domains need not be transformed the same way. For each of the domains or transformed domains, as may be the case, the one of the mapped ranges which most closely corresponds according to predetermined criteria, is selected. The image is then represented as a set of the identifiers of the selected mapped ranges. Finally, from the stored templates, a template is selected which most closely corresponds to the set of identifiers representing the image information. It is preferred that, for each domain, a most closely corresponding one of the mapped ranges be selected. By performing analogous operations on a template and an unrecognized object in an image, a correspondence between the two may be determined.

In selecting the most closely corresponding one of the mapped ranges, for each domain, the mapped range is selected which is the most similar, by a method which is appropriate, and may be, for example, selecting minimum Hausdorff distance from the domain, selecting the highest cross-correlation with the domain, the minimum mean square error with the domain and selecting the highest fuzzy correlation with the domain. Neural network energy minimization may also yield the best fit, and other techniques may also be appropriate.

In particular, the step of selecting the most closely corresponding one of mapped ranges according to the minimum modified Hausdorff distance includes the step of selecting, for each domain, the mapped range with the minimum modified Hausdorff distance calculated as $D[db,mrb]+D[1-db,1-mrb]$, where D is a distance calculated between a pair of sets of data each representative of an image, db is a domain, mrb is a mapped range, 1−db is the inverse of a domain, and 1−mrb is an inverse of a mapped range.

In the case where the digital image data consists of a plurality of pixels, each having one of a plurality of associated color map values, the method includes a matching of the color map, which as stated above, includes a simple grey scale. In such a case, the method is modified to optionally transform the color map values of the pixels of each domain by a function including at least one scaling function, for each axis of said color map, each of which may be the same or different, and selected to maximize the correspondence between the domains and ranges to which they are to be matched. For each of the domains, the one of the mapped ranges having color map pixel values is selected which most closely corresponds to the color map pixel values of the domain according to a predetermined criteria, wherein the step of representing the image color map information includes the substep of representing the image color map information as a set of values each including an identifier of the selected mapped range and the scaling functions. The correspondence method may be of any sort and, because of the added degree of complexity, may be a different method than that chosen for non-color images. The method of optimizing the correspondence may be minimizing the Hausdorff distance or other "relatedness" measurement between each domain and the selected range. The recognition method concludes by selecting a most closely corresponding stored template, based on the identifier of the color map mapped range and the scaling functions, which is the recognized image.

In the case of moving images, the method is further modified to accommodate time varying images. These images usually vary by small amounts between frames, and this allows a statistical improvement of the recognition function by compensating for a movement vector, as well as any other transformation of the image. This also allows a minimization of the processing necessary because redundant information between successive frames is not subject to the full degree of processing. Of course, if the image is substantially changed, then the statistical processing ceases, and a new recognition function may be begun, "flushing" the system of the old values. The basic method is thus modified by storing delayed image data information, i.e., a subsequent frame of a moving image. This represents an image of a moving object differing in time from the image data in the data processor. A plurality of addressable further domains are generated from the stored delayed image data, each of the further domains representing a portion of the delayed image information, and corresponding to a domain. Thus, an analogous transform is conducted so that the further domains each are corresponding to a domain. A plurality of addressable mapped ranges corresponding to different subsets of the stored delayed image data are created from the stored delayed image data. The further domain and the domain are optionally matched by subjecting a further domain to a corresponding transform selected from the group consisting of a predetermined rotation, an inversion, a predetermined scaling, and a predetermined frequency domain preprocessing transform, which corresponds to a transform applied to a corresponding domain, and a noncorresponding transform selected from the group consisting of a predetermined rotation, an inversion, a predetermined scaling, a translation and a predetermined frequency domain preprocessing transform, which does not correspond to a transform applied to a corresponding domain. For each of the further domains or transformed further domains, the one of the mapped ranges is selected which most closely corresponds according to predetermined criteria. A motion vector is then computed between one of the domain and the further domain, or the set of identifiers representing the image information and the set of identifiers representing the delayed image information, and the motion vector is stored. The further domain is compensated with the motion vector and a difference between the compensated further domain and the domain is computed. For each of the delayed domains, the one of the mapped ranges is selected which most closely corresponds according to predetermined criteria. The difference between the compensated further domain and the domain is represented as a set of difference identifiers of the selected mapping ranges and an associated motion vector.

Figure 27:
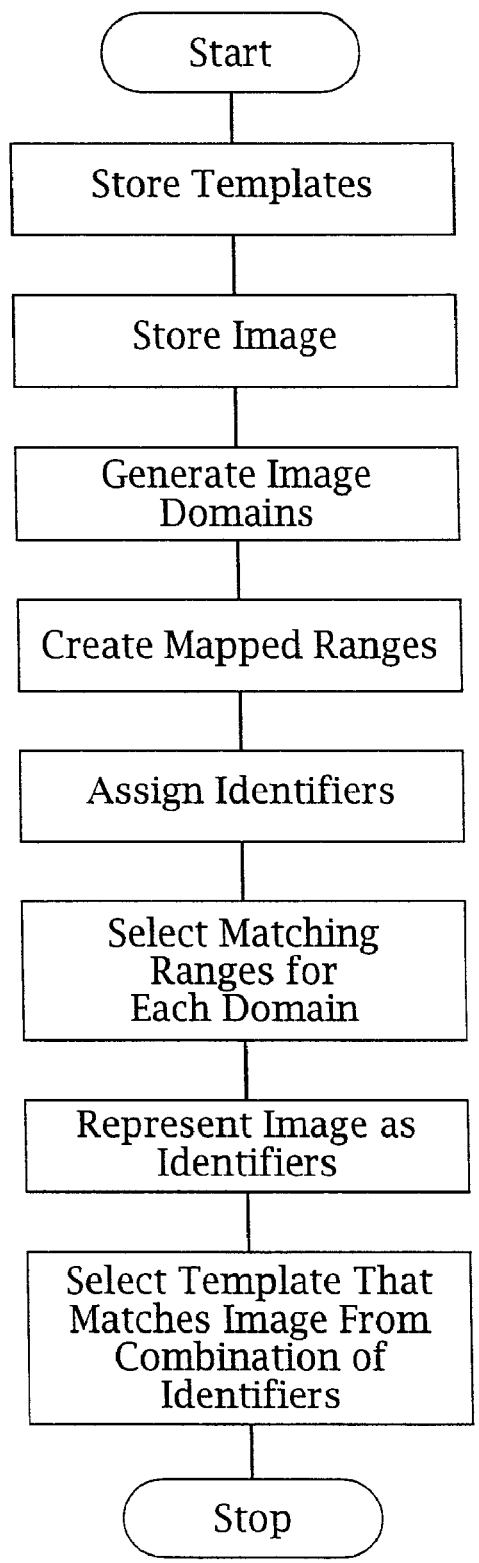
FIGS. 27, 28 and 29 are flow diagrams of an iterated function system method for recognizing a pattern according to the present invention.
Figure 28:
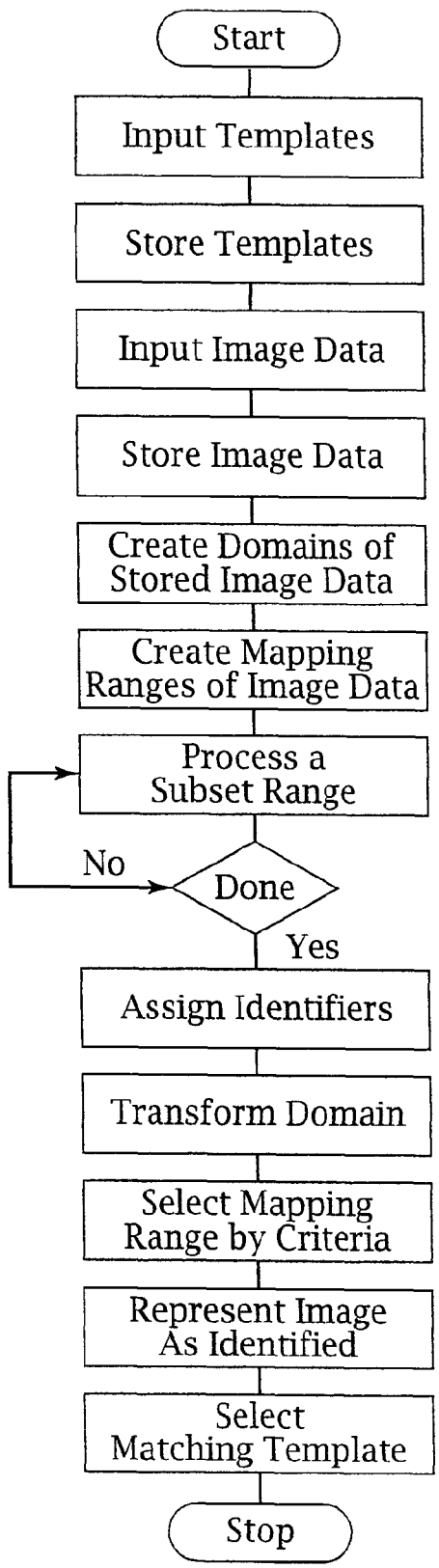
Figure 29:
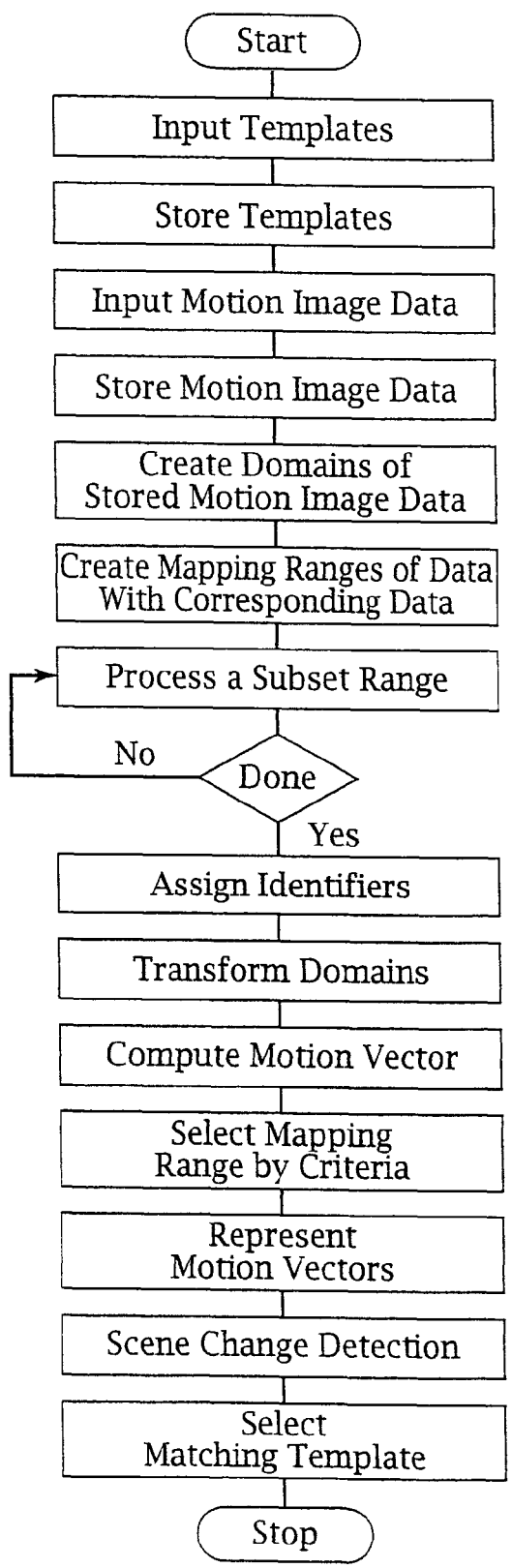

This method is described with respect to FIGS. 27, 28 and 29. FIG. 27 is a basic flow diagram of the recognition system of the present invention. FIG. 28 provides a more detailed description, including substeps, which are included in the major steps shown in FIG. 27. Basically, the image, or a part thereof, is decomposed into a compressed coded version of the scene, by a modified fractal-based compression method. In particular, this differs from the prior compression algorithms in that only a part, preferably that part containing objects of interest, need be processed. Thus, if a background is known (identified) or uninteresting, it may be ignored. Further, the emphasis is on matching the available templates to produce an image recognition, not achieving a high degree of compression. Therefore, the image, or domains thereof, may be transformed as required in order to facilitate the matching of the templates. As with respect to single images, the templates are represented in analogous form, having been processed similarly, so that a comparison of the relatedness of an object in an image and the templates may be performed. In particular, if an oblique view of an object is presented, then either the object may be transformed to achieve a predicted front view, or the template transformed or specially selected to correspond to the oblique view. Further, once a recognition has taken place with a high degree of certainty, the system need only ensure that the scene has not changed, and need not continually process the data. This has implications where multiple recognition processes are occurring simultaneously, either in a single scene or in different images, wherein the throughput of the recognition apparatus need not meet that required for de novo recognition of all aspects of all the objects or images.

Figure 30:
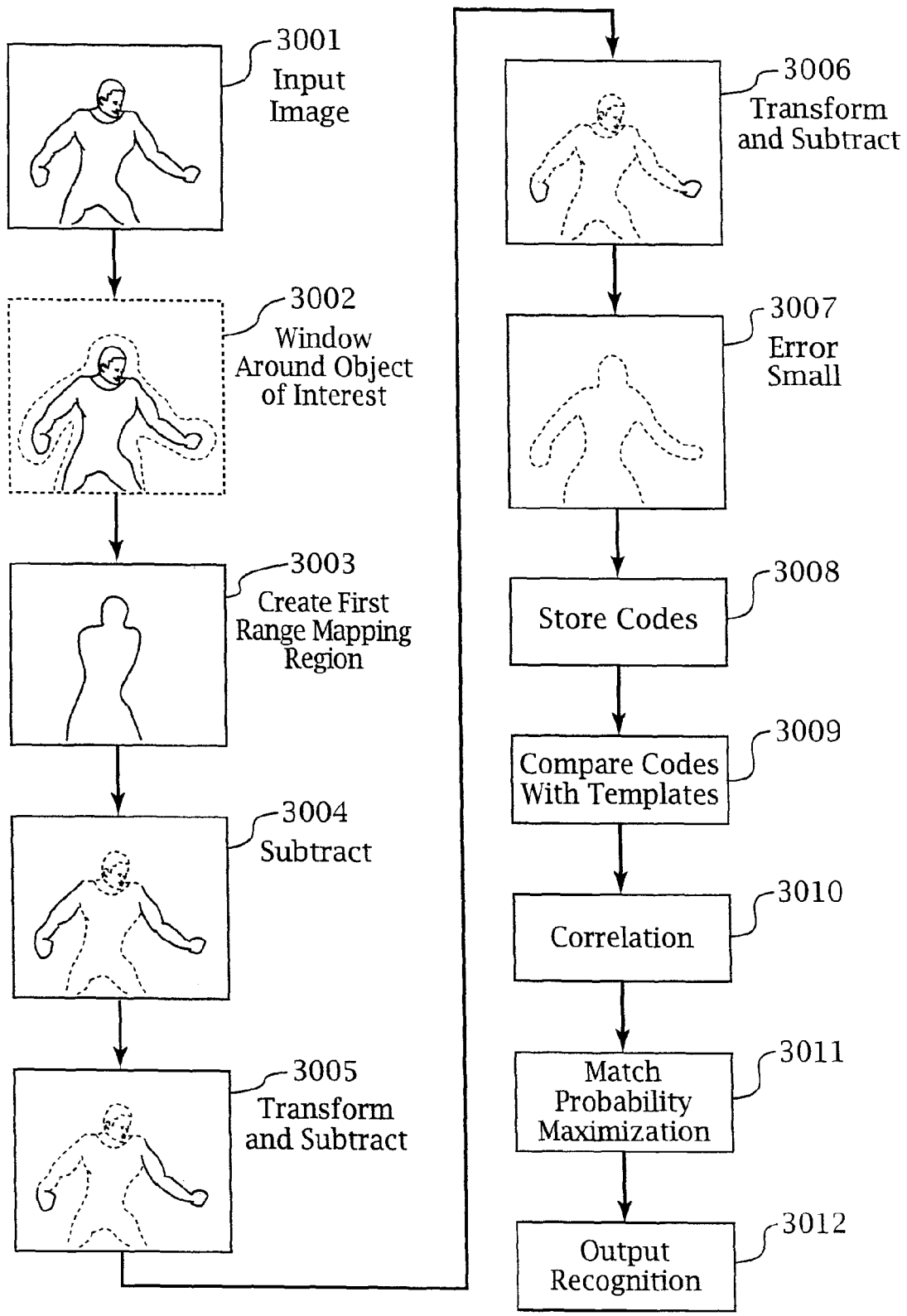
FIG. 30 is a semi-cartoon flow diagram of the object decomposition and recognition method of the present invention.

FIG. 30 shows a flow diagram of a cartoon-like representation of an image recognition method of the present invention. It shows initially, an input image 3001, having a degree of complexity. A windowing function 3002 isolates the object from the background. A first order approximation of the image is generated 3003, here called a mapping region. The first order approximation is then subtracted from the initial image to produce a difference 3004. The first order error is then subjected, iteratively, to successive transform and subtract operations 3005 and 3006, until the error is acceptably small, at which point the input image is characterized by a series of codes, representing the first order approximation and the successive transforms, which are stored 3008. These codes are then compared with stored templates 3009. The comparisons are then analyzed to determine which template produces the highest correlation 3010, and the match probability is maximized 3011. The recognized image is then indicated as an output 3012.

Figure 26:
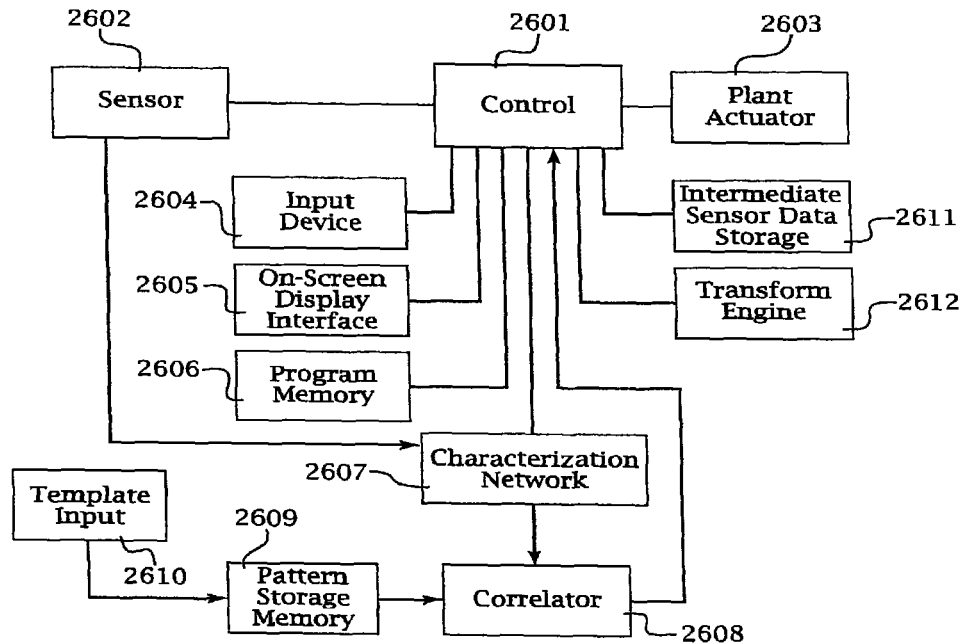
FIG. 26 is a block diagram of a control system for matching a template with a sensor input, of the present invention.

This system is shown in FIG. 26, wherein a sensor 2602 provides data, which may be image data, to a control 2601. The control 2601 serves to control the plant 2603, which has an actuator. The plant 2603 may be a VCR or the like. The control 2601 has associated with it an intermediate sensor data storage unit 2611, which may be, for example a frame buffer or the like. The control 2601 also has associated with it a transform engine 2612, which may perform a reversible or irreversible transform on the data or stored data.

The system also has a template input 2610, which may receive data from the sensor 2602, if accompanied by identifying information. Thus, the pattern storage memory 2609 stores a pattern, such as an image pattern, along with an identifier.

The control 2601 also has an input device 2604, an on-screen display interface 2605, and a program memory 2606, for inputting instructions from a user, providing feedback to the user, and recording the result of the user interaction, respectively. Finally, a characterization network 2607 characterizes the sensor 2602 data, which may be provided directly from the sensor 2602 or preprocessing circuitry, or through the control 2601. A correlator 2608 correlates the output of the characterization network with the stored patterns, representing the templates from the template input 2610. The system therefore operates to recognize sensor patterns, based on the correlator 2608 output to the control 2601.

A determination is made of the complexity of the difference based on a density of representation. In other words, the error between the movement and transform compensated delayed image and the image is quantified, to determine if the compensation is valid, or whether the scene is significantly changed. When the difference has a complexity below a predetermined threshold, a template is selected, from the stored templates, which most closely corresponds or correlates with both the set of identifiers of the image data and the set of identifiers of the delayed image data, thus improving recognition accuracy, by allowing a statistical correlation or other technique. For example, if the two images both have a high correlation with one template, while a first of the images has a slightly higher correlation with another template, while the second image has a much lower correlation with that other template, then the system would score the first template as a better match to the first image.

It should be understood that the preferred embodiments and examples described herein are for illustrative purposes only and are not to be construed as limiting the scope of the present invention, which is properly delineated only in the appended claims.

| TABLE OF ADVANTAGES AND DISADVANTAGES | | |
|---|---|---|
| DEVICE | ADVANTAGES | DISADVANTAGES |
| Touch-Screen: a device which allows users to point directly to the screen to enter their choices. | accurate. fast. "natural" pointing device. Hand obscures view Difficult with curved screens. | Doesn't show location of the cursor on the screen. Requires an overlay. Requires frequent cleaning. Expensive. Must be within reach envelope. |
| Light Pen: a pen shaped device with which the users touch the screen to select their choices. | Points to the screen. | Inexpensive. Inaccurate. Awkward to use. Pen needs a storage location. Must be within reach envelope. |
| Trackball: a ball mounted on a stationary object; the ball's rolling motion controls the cursor. | Can be mounted and used anywhere. Does not require a horizontal surface. Quick to use. | |
| Joystick: a stick mounted on a stationary object; the sticks movement controls the cursor. | Can be mounted and used anywhere. Does not require a horizontal surface. | Clumsy for cursor control. |
| Mouse: a ball mounted on the bottom of a movable object, which is rolled on a horizontal surface to control the cursor. | Most effective for pointing and selecting objects on the screen. Popular. | Requires a horizontal surface area. |
| Touch-Tablet: a pad which sits on a horizontal surface on which selections are made by using a finger or stylus. | Activated with fingers or stylus. | Small interface. Remote from display. |
| Keyboard: a device which lies on a horizontal surface and which has alphanumeric keys on which to type information. | | Requires a horizontal surface. Large. Many keys. |
| Multi-Function Keys: buttons which serve more than one function. | Inexpensive. Space efficient. | Confusing. |
| Bar Code Scanner: a wand which must be wiped over a bar code to type enter information. Pressing a button then signals the controlling device. | Quick if Barcode is present in TV directory. | May require several tries to send data. Tedious if Barcode is not available in the TV directory. |
| Voice: the use of the human voice to give speech prompts or to accept commands. | Frees hands. Enables disabled persons to use the device. | Requires training. Affected by surrounding noises. Low accuracy. Expensive. Has a limited vocabulary. Is sensitive to differences in languages, accents, and speech patterns. |
| Eye Tracker: an optical scanner which is activated by the human eye. | Frees hands. Enables disabled persons to use the device. | Expensive. Inaccurate. |
| Data Suit/Data Glove: a suit or glove which is controlled by manipulation of an on-screen "Virtual Image". It is controlled by optical fibers which measure the degree of bending. | Reacts to hand and body gestures. Gives a 3-D image. | Expensive. Computer intensive. |

TABLE 1

Total Time In Seconds And (Total Time − Computer Time) For The Critical Steps Using The Prior Art Interface

| SUBJECT # | TOTAL | TOTAL − $T_R$ |
|---|---|---|
| 1 | 1228 | 981.9 |
| 2 | 1190 | 663.3 |
| 3 | 2358 | 1513.9 |
| 4 | 1425 | 976.2 |
| 5 | 1394 | 1022.5 |
| 6 | 1482 | 1144.6 |
| 7 | 3289 | 2844.4 |
| 8 | 1247 | 697.6 |
| 9 | 2248 | 1220.7 |
| 10 | 1389 | 825.8 |
| 11 | 1143 | 829.7 |
| 12 | 1697 | 1243.2 |
| 13 | 817 | 533.3 |
| 14 | 1146 | 764.3 |
| 15 | 841 | 648.2 |
| 16 | 737 | 498.0 |
| MEAN | 1477 | 1025.5 |

TABLE 2

Total Time In Seconds And (Total Time − Computer Time) For The Programming Steps Using The Interface of the present invention by subject.

| SUBJECT # | TOTAL | TOTAL − $T_R$ |
|---|---|---|
| 1 | 461 | 406.1 |
| 2 | 929 | 840.5 |
| 3 | 675 | 625.6 |
| 4 | 1151 | 1046.7 |
| 5 | 403 | 359.2 |
| 6 | 331 | 281.5 |
| 7 | 437 | 374.2 |
| 8 | 372 | 317.2 |
| 9 | 747 | 688.7 |
| 10 | 180 | 143.5 |
| 11 | 823 | 759.3 |
| 12 | 462 | 403.6 |
| 13 | 239 | 202.2 |
| 14 | 368 | 305.1 |
| 15 | 456 | 412.5 |
| 16 | 352 | 299.9 |
| MEAN | 560 | 502.7 |

TABLE 3

Average Time In Seconds For The Six Programming Steps

| | PRIOR ART INTERFACE | | INTERFACE OF THE PRESENT INVENTION | |
|---|---|---|---|---|
| CRITICAL STEP | AVERAGE | STD | AVERAGE | STD |
| CLOCK SET | 332.0 | 266.7 | 105.9 | 67.8 |
| PROGRAM 1 | 431.7 | 316.7 | 167.6 | 142.7 |
| PROGRAM 2 | 283.3 | 135.0 | 85.6 | 52.6 |
| PROGRAM 3 | 189.7 | 97.4 | 55.3 | 16.5 |
| TOTAL | 1025.4 | 559.7 | 466.6 | 251.9 |
| SEARCH | 240.3 | 203.1 | 111.8 | 81.2 |

TABLE 4

Number Of Subjects Unable To Succeed In Programming Both Interfaces

| CRITICAL STEPS | PRIOR ART INTERFACE | INTERFACE OF THE PRESENT INVENTION |
|---|---|---|
| MISTAKE | 8 | 4 |
| TIMER | 6 | 4 |

TABLE 5

Screens Required For The Prior Art Interface

| SCREEN | MIN | # OF TIMES OPENED AVG | TIME | S.D. |
|---|---|---|---|---|
| CLOCK SET | 1 | 4.9 | 249.4 | 6.2 |
| GET TO CLOCK SET | 0 | 7.2 | 49.0 | 10.6 |
| DISPLAY CLOCK | 1 | 2.6 | 38.7 | 1.5 |
| SELECT PROGRAM | 4 | 8.4 | 99.7 | 3.9 |
| PROGRAM 1 | 3 | 5.5 | 446.6 | 2.1 |
| PROGRAM 2 | 2 | 2.9 | 207.3 | 1.2 |
| PROGRAM 3 | 1 | 1.5 | 172.2 | 0.7 |
| PROGRAM 4 | 0 | 0.9 | 14.4 | 1.0 |
| ON/OFF | 1 | 2.9 | 70.8 | 2.5 |
| TOTAL | 13 | 36.8 | 1476.9 | 21.7 |

TABLE 6

Screens Required For The Interface of the present invention

| SCREEN | MIN | # OF TIMES OPENED AVG | AVG TIME | S.D. |
|---|---|---|---|---|
| MAIN MENU: To make a selection | 5 | 6.6 | 70.1 | 3.4 |
| TIMER: To set the timer | 1 | 0.9 | 5.8 | 0.3 |
| MAIN MENU HELP: Help on Main Menu | 0 | 0.4 | 8.1 | 0.5 |
| HELP: Help on the Help Screen | 0 | 0.6 | 4.1 | 0.6 |
| CURRENT TIME: To set current time | 1 | 1.4 | 43.4 | 0.8 |
| CURRENT TIME HELP: To obtain help | 0 | 0.1 | 0.1 | 0.2 |
| SELECT THE PROGRAM: Select program | 3 | 4.0 | 26.9 | 1.7 |
| SPECIFIC DAY: To choose day type | 1 | 1.7 | 8.7 | 0.9 |
| SELECT THE PROGRAM HELP: Help | 0 | 0.1 | 0.1 | 0.2 |
| SELECT THE DAY: Choose specific day | 1 | 0.9 | 6.0 | 0.8 |
| SELECT THE MONTH: To choose month | 2 | 2.7 | 23.3 | 1.1 |
| YEAR SET: To set the current year | 1 | 1.4 | 41.4 | 0.5 |
| CHANNEL: To choose the channel | 3 | 3.6 | 24.9 | 1.4 |
| START TIME: To choose start time | 3 | 3.8 | 65.8 | 1.5 |
| STOP TIME: To choose stop time | 3 | 3.6 | 48.4 | 1.4 |
| TAPE SPEED: To choose tape speed | 3 | 3.6 | 17.3 | 1.4 |
| CONFIRMATION: To review programs | 3 | 4.8 | 114.9 | 2.6 |
| DAY OF MONTH: To choose the day | 2 | 2.6 | 16.6 | 1.1 |
| TOTAL | 32 | 42.9 | 560.1 | 15.9 |

TABLE 7

Averages And Standard Deviations Of The Subjective Ratings For The Prior Art Interface

| SCALE | AVERAGE | STANDARD DEVIATION |
|---|---|---|
| LIKE/DISLIKE | 5.47 | 1.58 |
| EASY/DIFFICULT | 5.41 | 1.40 |
| COOPER-HARPER | 6.66 | 2.61 |

TABLE 8

Percentage Of Total Time For The Six Programming Steps

| Critical Step | Prior Art Interface | Interface of the present invention |
|---|---|---|
| Clock Set | 22% | 20% |
| Program 1 | 30% | 32% |
| Program 2 | 19% | 16% |
| Program 3 | 13% | 11% |
| Search Time | 16% | 21% |

TABLE 9

Numerical Averages And Standard Deviations Of The Subjective Ratings For The Interface of the present invention

| SCALE | AVERAGE | STANDARD DEVIATION |
|---|---|---|
| LIKE/DISLIKE | 1.94 | 1.13 |
| EASY/DIFFICULT | 1.91 | 1.02 |
| COOPER-HARPER | 2.13 | 1.21 |

Note:
The Like/Dislike and Easy/Difficult ratings were based on a 7-point scale and the Cooper-Harper rating was based on a 10-point scale.

TABLE 10

Comments Regarding The Interface of the Present Invention

| Number of Comments | Subjects |
|---|---|
| 8 | Easy to operate |
| 8 | Like it much better and would use it more often |
| 7 | No searching for choices was required |
| 6 | All choices were given at once |
| 6 | Like on-screen instructions |
| 5 | Like menu driven interface |
| 3 | Like entry method rather than selection method |
| 3 | Like single button keypress |
| 3 | Like to correct mistakes easily |
| 3 | Like "today", "tomorrow", "Monday Friday", and "Days of Week" features |
| 2 | Like the use of a remote controlled device |
| 2 | Good confirmation screen |
| 2 | Like color coding |
| 1 | Like feedback |
| 1 | Like are no abbreviations |
| 1 | Like User-Friendliness |
| 1 | Like no leading zeros |
| 1 | Like "OK" buttons |
| 1 | Like the calendar and clock display |
| 1 | Like the quick interface |
| 1 | Like the good Help system |
| 1 | Like entering start and stop times, rather than duration |
| 1 | Thought it was even easier to use than the bar coder |

What is claimed is:

1. A programmable environmental controller, comprising:
an local area network interface port configured to communicate digital data through a local area network;
at least one climate sensor configured to sense environmental climate conditions;
at least one movement sensor configured to detect a movement of an individual in a vicinity of the at least one movement sensor; and
at least one automated processor configured to receive the sensed environmental climate conditions and the detected movement, to jointly classify a temporal pattern of the sensed environmental climate conditions and the detected movement, and to communicate at least one signal in dependence on the jointly classified pattern, the at least one signal being adapted to at least control an environmental control system.

2. The programmable environmental controller according to claim 1, wherein the pattern recognition process is adaptive, and learns new classifications of patterns.

3. The programmable environmental controller according to claim 1, wherein the at least one signal is adapted to control an environmental heater and an environmental cooler.

4. The programmable environmental controller according to claim 1, wherein the local area network communicates information with a second programmable environmental controller,
comprising a second local area network interface port configured to communicate digital data through the local area network;
at least one second climate sensor configured to sense second environmental climate conditions;
at least one second movement sensor configured to detect a second movement of an individual in a vicinity of the at least one second movement sensor; and
at least one second automated processor configured to receive the sensed second environmental conditions and the detected second movement, to jointly classify a temporal pattern of the sensed second environmental climate conditions and the detected second movement, and to communicate at least one second signal in dependence on the jointly classified pattern.

5. The programmable environmental controller according to claim 4, wherein the programmable environmental controller and the second programmable environmental controller communicate with each other through the local area network and together interact to at least control a single environmental control system.

6. The programmable environmental controller according to claim 4, wherein the programmable environmental controller and the second programmable environmental controller communicate with each other through the local area network and control a plurality of environmental control systems.

7. The programmable environmental controller according to claim 1, further comprising a humidity sensor configured to sense a humidity, wherein the at least one automated processor is configured to jointly classify a temporal pattern of the sensed environmental climate conditions, the detected movement, and the humidity, and to communicate the at least one signal in dependence thereon.

8. The programmable environmental controller according to claim 1, further comprising a pressure sensor configured to sense a pressure, wherein the at least one automated processor is configured to jointly classify a temporal pattern of the sensed environmental climate conditions, the detected movement, and the pressure, and to communicate the at least one signal in dependence thereon.

9. The programmable environmental controller according to claim 1, further comprising an air flow sensor configured to sense an air flow, wherein the at least one automated processor is configured to jointly classify a temporal pattern of the sensed environmental climate conditions, the detected movement, and the air flow, and to communicate the at least one signal in dependence thereon.

10. The programmable environmental controller according to claim 1, further comprising a light sensor, wherein the at least one signal is further responsive to an output of the light sensor.

11. The programmable environmental controller according to claim 1, further comprising an interface port configured to receive a signal responsive to an opening state of a door, wherein the at least one signal is further responsive to the signal responsive to the opening state of the door.

12. The programmable environmental controller according to claim 1, further comprising an interface port configured to receive a perimeter intrusion alarm signal, wherein the at least one signal is further responsive to the perimeter intrusion alarm signal.

13. The programmable environmental controller according to claim 1, wherein the at least one automated processor is further configured to determine a sensor status of at least the at least one climate sensor with respect to at least one of defectiveness and need for calibration.

14. The programmable environmental controller according to claim 1, wherein the environmental control system comprises at least one damper, and the at least one signal is further adapted to control the at least one damper.

15. The programmable environmental controller according to claim 1, wherein the environmental control system comprises a blower, and the at least one signal is further adapted to control the at least the blower to compensate for a bulk flow of air.

16. The programmable environmental controller according to claim 1, wherein the at least one automated processor is further configured to calculate a cost associated with a control of the environmental control system in dependence on the at least one signal, and to optimize the cost with respect to at least a predicted change in the sensed environmental climate conditions as a result of the at least one signal.

17. The programmable environmental controller according to claim 1, wherein the at least one automated processor is further configured to model an efficiency of the environmental control system in dependence on the at least one control signal, and to produce the at least one signal in a manner adapted to optimize the modeled efficiency.

18. The programmable environmental controller according to claim 1, wherein the at least one automated processor is configured to predict a heating of the environment by the sun, wherein the at least one signal is responsive to the predicted heating of the environment by the sun.

19. The programmable environmental controller according to claim 1, wherein the digital data comprises the sensed environmental climate conditions.

20. An environmental control method, comprising:
communicating digital data through a local area network;
receiving sensed environmental climate conditions from at least one climate condition sensor;
detecting a movement of an individual in a vicinity of a movement sensor;
perform a pattern recognition process with at least one automated processor to jointly classify a temporal pattern of the sensed environmental climate conditions and the detected movement of the individual; and
communicating at least one signal in dependence on the pattern recognition process, the at least one signal being adapted to at least control an environmental control system.

21. The method according to claim 20, wherein the pattern recognition process is adaptive, and is adapted to learn new classifications of patterns.

22. The method according to claim 20, wherein the at least one climate condition sensor configured to sense environmental conditions is configured to sense at least two conditions selected from the group consisting of humidity, pressure, air flow, light, opening state of a portal, and perimeter intrusion alarm state.

23. The method according to claim 20, wherein the environmental control system comprises at least one of a damper and a blower, and at least one signal is further adapted to control the at least one of a damper and a blower to compensate for a bulk flow of air.

24. The method according to claim 20, further comprising modeling the environmental control system, calculating at least one of a cost of operating the environmental control system and an efficiency of operating the environmental control system in dependence on a state of the at least one signal and the modeled environmental control system, and optimizing the at least one signal in dependence on said calculating.

25. The environmental control method according to claim 20, wherein the digital data comprises the sensed environmental climate conditions.

26. A controller, comprising:
at least one sensor configured to sense environmental climate conditions and movement events proximate to the at least one sensor;
an local area network interface port configured to communicate digital data through a local area network; and
at least one automated processor configured to receive the sensed environmental climate conditions and the movement events, control communication of the digital data through the local area network, classify patterns of the sensed environmental climate conditions, the movement events, and the communicated digital data in an adaptive pattern recognition process, and generate at least one signal in dependence on the adaptive pattern recognition process adapted to cost-efficiently control an environmental control system for altering environmental climate conditions sensed by the at least one sensor.

27. The controller according to claim 26, wherein the digital data communicated through the local area network comprises the at least one signal.

* * * * *